US010837190B2

United States Patent
Rief et al.

(10) Patent No.: US 10,837,190 B2
(45) Date of Patent: Nov. 17, 2020

(54) SWIMMING POOL CLEANER

(71) Applicant: Hayward Industries, Inc., Berkeley Heights, NJ (US)

(72) Inventors: Dieter J. Rief, Santa Rosa, CA (US); Hans Rainer Schlitzer, Rohnert Park, CA (US); Manuela Rief, Santa Rosa, CA (US); Rosemarie Rief, Santa Rosa, CA (US); Benoit Joseph Renaud, Fort Atkinson, WI (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 206 days.

(21) Appl. No.: 15/903,365

(22) Filed: Feb. 23, 2018

(65) Prior Publication Data

US 2018/0179774 A1 Jun. 28, 2018

Related U.S. Application Data

(62) Division of application No. 14/464,947, filed on Aug. 21, 2014, now Pat. No. 10,066,411.

(Continued)

(51) Int. Cl.
*E04H 4/16* (2006.01)

(52) U.S. Cl.
CPC ............. *E04H 4/1672* (2013.01); *E04H 4/16* (2013.01); *E04H 4/1654* (2013.01); *E04H 4/1663* (2013.01)

(58) Field of Classification Search
CPC ....... E04H 4/16; E04H 4/1654; E04H 4/1636; E04H 4/1672
See application file for complete search history.

(56) References Cited

U.S. PATENT DOCUMENTS

| 2,806,236 A | 9/1957 | Stefano |
| 3,321,787 A | 5/1967 | Myers |

(Continued)

FOREIGN PATENT DOCUMENTS

| AU | 704603 B2 | 4/1999 |
| DE | 2612043 A1 | 9/1977 |

(Continued)

OTHER PUBLICATIONS

Zodiac Baracuda MX 8 Pool Cleaner Owner's Manual (2011) (32 pages).

(Continued)

*Primary Examiner* — Michael D Jennings
(74) *Attorney, Agent, or Firm* — McCarter & English, LLP

(57) ABSTRACT

Disclosed herein are a steering system for a suction cleaning device, a locomotion system for a pool cleaner, and a turbine for use in an automatic cleaner. The steering system includes a fluid driven turbine that rotates a cam gear that is interconnected with a cam wheel for directing a drive pinion. The drive pinion is positionable in a plurality of positions to drive a nose cone that steers the suction cleaning device. The locomotion system includes first and second A-frame arms that respectively engage first and second bearings about first and second eccentrics of a turbine. Rotation of the turbine causes the first and second A-frame arms to rotate back and forth driving associated walking pod assemblies. The turbine includes a turbine rotor and a plurality of vanes connected to the turbine rotor. The plurality of vanes including lateral edges having lateral open regions to facilitate debris-removing efficiency.

25 Claims, 77 Drawing Sheets

Related U.S. Application Data

(60) Provisional application No. 61/872,389, filed on Aug. 30, 2013.

(56) References Cited

U.S. PATENT DOCUMENTS

| | | |
|---|---|---|
| 3,391,678 A | 7/1968 | Luckhardt |
| 3,439,368 A | 4/1969 | Myers |
| 3,551,930 A | 1/1971 | Myers |
| 3,626,265 A | 12/1971 | Kraakman |
| 3,689,408 A | 9/1972 | Edmiston et al. |
| 3,803,658 A | 4/1974 | Raubenheimer |
| 3,822,754 A | 7/1974 | Henkin et al. |
| 3,936,899 A | 2/1976 | Henkin et al. |
| 3,959,838 A | 6/1976 | Hannah |
| 3,972,339 A | 8/1976 | Henkin et al. |
| 3,979,788 A | 9/1976 | Strausak |
| 4,023,227 A | 5/1977 | Chauvier |
| 4,100,641 A | 7/1978 | Pansini |
| 4,306,329 A | 12/1981 | Yokoi |
| 4,434,519 A | 3/1984 | Raubenheimer |
| 4,449,265 A | 5/1984 | Hoy |
| 4,449,268 A | 5/1984 | Schnuell |
| 4,509,221 A | 4/1985 | Simpson |
| 4,536,908 A | 8/1985 | Raubenheimer |
| 4,558,479 A | 12/1985 | Greskovics et al. |
| 4,589,986 A | 5/1986 | Greskovics et al. |
| 4,656,683 A | 4/1987 | Raubenheimer |
| 4,778,599 A | 10/1988 | Brooks |
| 4,849,024 A | 7/1989 | Supra |
| 4,920,599 A | 5/1990 | Rief |
| 5,044,034 A | 9/1991 | Iannucci |
| 5,093,950 A | 3/1992 | Heier |
| 5,097,559 A | 3/1992 | Brunt et al. |
| 5,099,535 A | 3/1992 | Chauvier et al. |
| 5,105,496 A | 4/1992 | Gray, Jr. et al. |
| 5,172,445 A | 12/1992 | Chandler |
| 5,197,158 A | 3/1993 | Moini |
| 5,225,074 A | 7/1993 | Moini |
| 5,226,205 A | 7/1993 | Pearce |
| 5,293,659 A | 3/1994 | Rief et al. |
| 5,412,826 A | 5/1995 | Raubenheimer |
| 5,435,031 A | 7/1995 | Minami et al. |
| 5,507,058 A | 4/1996 | Minami et al. |
| 5,604,950 A | 2/1997 | Stern |
| 5,617,600 A | 4/1997 | Frattini et al. |
| 5,771,987 A | 6/1998 | Marbach |
| 5,797,156 A | 8/1998 | Sebor |
| 5,802,653 A | 9/1998 | Roumagnac |
| 5,893,188 A | 4/1999 | Campbell et al. |
| 5,896,610 A | 4/1999 | Sebor et al. |
| 5,933,899 A | 8/1999 | Campbell et al. |
| 5,985,156 A | 11/1999 | Henkin et al. |
| 6,003,184 A | 12/1999 | Campbell et al. |
| 6,039,886 A | 3/2000 | Henkin et al. |
| 6,090,219 A | 7/2000 | Henkin et al. |
| 6,094,764 A | 8/2000 | Veloskey et al. |
| 6,119,293 A | 9/2000 | Phillipson et al. |
| 6,131,227 A | 10/2000 | Rief et al. |
| 6,280,611 B1 | 8/2001 | Henkin et al. |
| 6,292,970 B1 * | 9/2001 | Rief .................. E04H 4/1654 15/1.7 |
| 6,311,353 B1 | 11/2001 | Phillipson et al. |
| 6,365,039 B1 | 4/2002 | Henkin et al. |
| 6,387,250 B1 | 5/2002 | Henkin et al. |
| 6,398,878 B1 | 6/2002 | Henkin et al. |
| 6,665,900 B2 | 12/2003 | Wichmann et al. |
| RE38,479 E | 3/2004 | Henkin et al. |
| 6,751,822 B2 | 6/2004 | Phillipson et al. |
| 6,758,226 B2 | 7/2004 | Porat |
| 6,782,578 B1 | 8/2004 | Rief et al. |
| 6,854,148 B1 | 2/2005 | Rief et al. |
| 7,318,448 B2 | 1/2008 | Fleischer et al. |
| 7,395,571 B2 | 7/2008 | Van Der Meijden et al. |
| 7,501,056 B2 | 3/2009 | Henkin et al. |
| 7,677,268 B2 | 3/2010 | Griffin et al. |
| 7,805,792 B2 | 10/2010 | Roumagnac |
| 8,117,704 B2 | 2/2012 | Schneider et al. |
| 8,220,096 B2 | 7/2012 | Hui |
| 8,266,752 B2 | 9/2012 | Henkin et al. |
| 8,296,891 B1 | 10/2012 | Rowam et al. |
| 8,341,789 B2 | 1/2013 | Garti |
| 8,402,585 B2 | 3/2013 | Rief et al. |
| 8,505,143 B2 | 8/2013 | Finezilber |
| 8,784,652 B2 | 7/2014 | Rief et al. |
| 2002/0116772 A1 | 8/2002 | Phillipson et al. |
| 2003/0106174 A1 | 6/2003 | Kallenbach et al. |
| 2003/0182742 A1 | 10/2003 | Wichmann et al. |
| 2004/0216251 A1 | 11/2004 | Van Der Meijden et al. |
| 2005/0108836 A1 | 5/2005 | Rowan et al. |
| 2005/0279682 A1 | 12/2005 | Davidson et al. |
| 2006/0207041 A1 | 9/2006 | Van Der Meyden et al. |
| 2007/0056124 A1 | 3/2007 | Wichmann et al. |
| 2007/0107148 A1 | 5/2007 | Rowan et al. |
| 2008/0060984 A1 | 3/2008 | Henkin et al. |
| 2008/0092322 A1 | 4/2008 | Halle et al. |
| 2008/0202997 A1 | 8/2008 | Davidson et al. |
| 2008/0276388 A1 | 11/2008 | Dodd |
| 2008/0307589 A1 | 12/2008 | Schneider et al. |
| 2009/0307854 A1 | 12/2009 | Garti |
| 2010/0043154 A1 | 2/2010 | Kellogg |
| 2011/0088181 A1 | 4/2011 | Rief et al. |
| 2012/0060307 A1 | 3/2012 | Stoltz |
| 2012/0074050 A1 | 3/2012 | Rief et al. |
| 2013/0152316 A1 | 6/2013 | Rief et al. |
| 2014/0042063 A1 | 2/2014 | Rief |
| 2014/0115796 A1 | 5/2014 | Sebor et al. |
| 2014/0271175 A1 | 9/2014 | Kumar et al. |
| 2014/0273541 A1 | 9/2014 | Renaud et al. |
| 2015/0020322 A1 | 1/2015 | Rief et al. |
| 2015/0020368 A1 | 1/2015 | Rief et al. |
| 2015/0059106 A1 | 3/2015 | Rief et al. |
| 2015/0076048 A1 | 3/2015 | Rief et al. |

FOREIGN PATENT DOCUMENTS

| | | |
|---|---|---|
| EP | 0323883 A1 | 7/1989 |
| EP | 0468876 A1 | 1/1992 |
| EP | 0565226 A1 | 10/1993 |
| EP | 0657603 A1 | 6/1995 |
| EP | 2706170 A2 | 3/2014 |
| WO | 99/63185 A1 | 12/1999 |
| WO | 01/27415 A1 | 4/2001 |
| WO | 01/92663 A1 | 12/2001 |
| WO | 01/92664 A1 | 12/2001 |
| WO | 2004/055299 A1 | 7/2004 |
| WO | 2006/121808 A2 | 11/2006 |
| WO | 2008/102325 A1 | 8/2008 |
| WO | 2011/049594 A1 | 4/2011 |
| WO | 2014/052234 A2 | 4/2014 |
| WO | 2014/153121 A1 | 9/2014 |
| WO | 2015/031150 A1 | 3/2015 |

OTHER PUBLICATIONS

International Search Report and Written Opinion dated Feb. 6, 2015, issued in International Application No. PCT/US2014/052034 (14 pages).

Extended European Search Report dated May 23, 2017, issued in European Application No. 16196932.4 (9 pages).

Examination Report dated Aug. 15, 2017, in connection with Australian Application No. 2014311608 (3 pages).

Office Action dated Aug. 16, 2017, issued in connection with U.S. Appl. No. 14/464,947 (9 pages).

Extended European Search Report dated Sep. 1, 2017, issued in European Application No. 16196937.3 (8 pages).

Extended European Search Report dated Oct. 24, 2017, issued in European Application No. 14839567.6 (9 pages).

Office Action dated Oct. 26, 2017, issued in connection with U.S. Appl. No. 14/464,947 (5 pages).

(56) References Cited

OTHER PUBLICATIONS

European Examination Report dated Mar. 16, 2018, issued in connection with European Patent Application No. 16196932.4 (7 pages).
Notice of Allowance dated Apr. 25, 2018, issued in connection with U.S. Appl. No. 14/464,947 (7 pages).
European Examination Report dated May 30, 2018, issued in connection with European Patent Application No. 16196937.3 (6 pages).
European Examination Report dated Jul. 12, 2018, issued in connection with European Patent Application No. 14839567.6 (6 pages).
European Examination Report dated Jan. 31, 2019, issued in connection with European Patent Application No. 16196932.4 (5 pages).
European Examination Report dated Feb. 5, 2019, issued in connection with European Patent Application No. 16196937.3 (5 pages).
Examination Report dated Mar. 6, 2019, in connection with Australian Application No. 2018203413 (3 pages).
Examination Report dated May 29, 2019, in connection with Australian Application No. 2018203419 (4 pages).
European Examination Report dated Oct. 23, 2019, issued in connection with European Patent Application No. 16196932.4 (4 pages).
Summons to Attend Oral Proceedings issued Dec. 18, 2019, in connection with European Patent Application No. 16196937.3 (5 pages).
Office Action (Restriction Requirement) dated Feb. 20, 2020, issued in connection with U.S. Appl. No. 15/903,202 (9 pages).
Office Action dated Apr. 30, 2020, issued in connection with U.S. Appl. No. 15/903,202 (6 pages).
Communication under Rule 71(3) (Intention to Grant) dated Apr. 6, 2020, issued in connection with European Patent Application No. 16196932.4 (7 pages).
Communication under Rule 71(3) (Intention to Grant) dated May 4, 2020, issued in connection with European Patent Application No. 16196937.3 (7 pages).
Australian Examination Report dated May 19, 2020, issued in connection with Australian Application No. 2018203419 (4 pages).
European Examination Report dated Apr. 2, 2020, issued in connection with European Patent Application No. 14839567.6 (6 pages).
Notice of Allowance dated Aug. 12, 2020, issued in connection with U.S. Appl. No. 15/903,202 (5 pages).

* cited by examiner

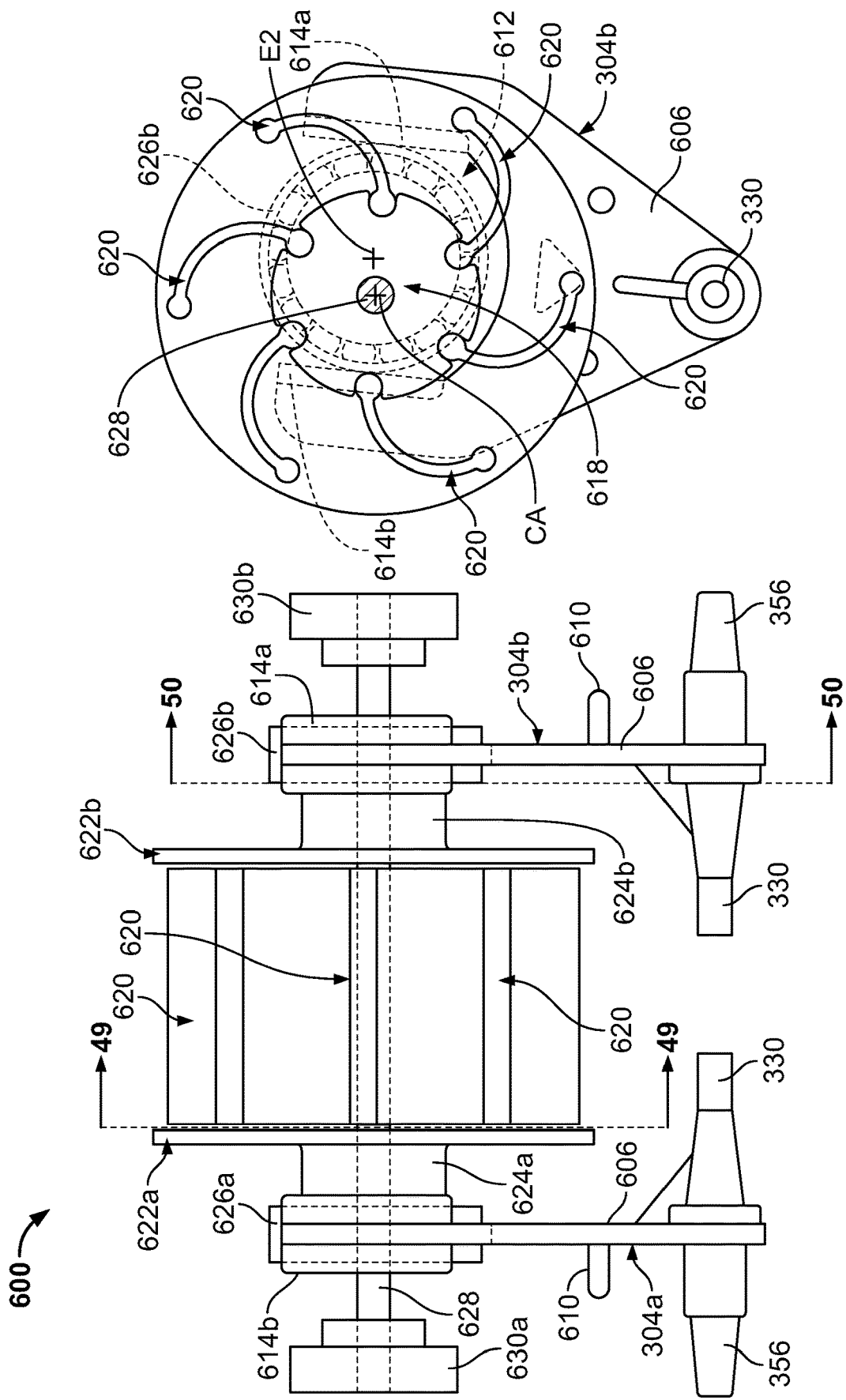

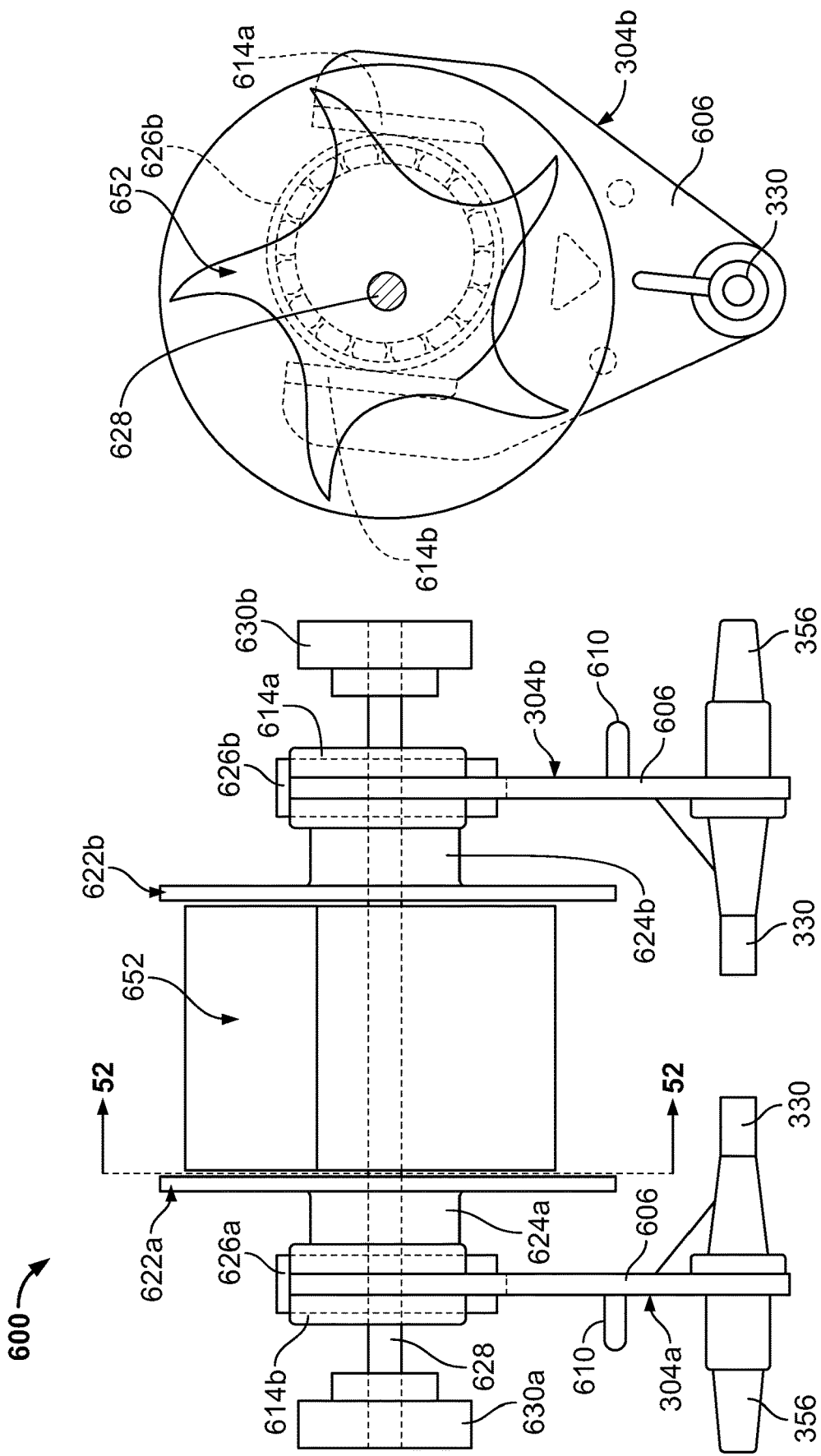

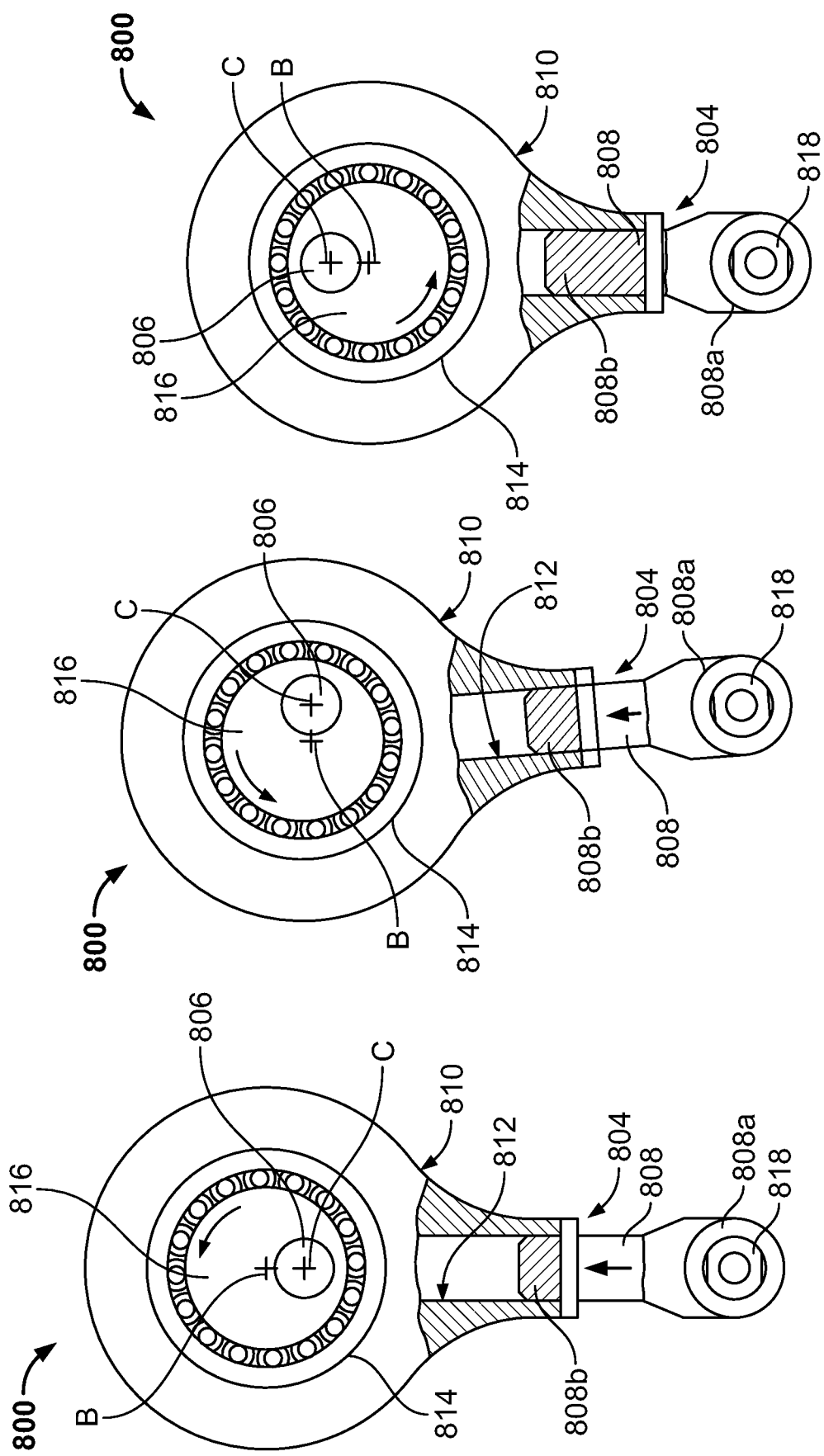

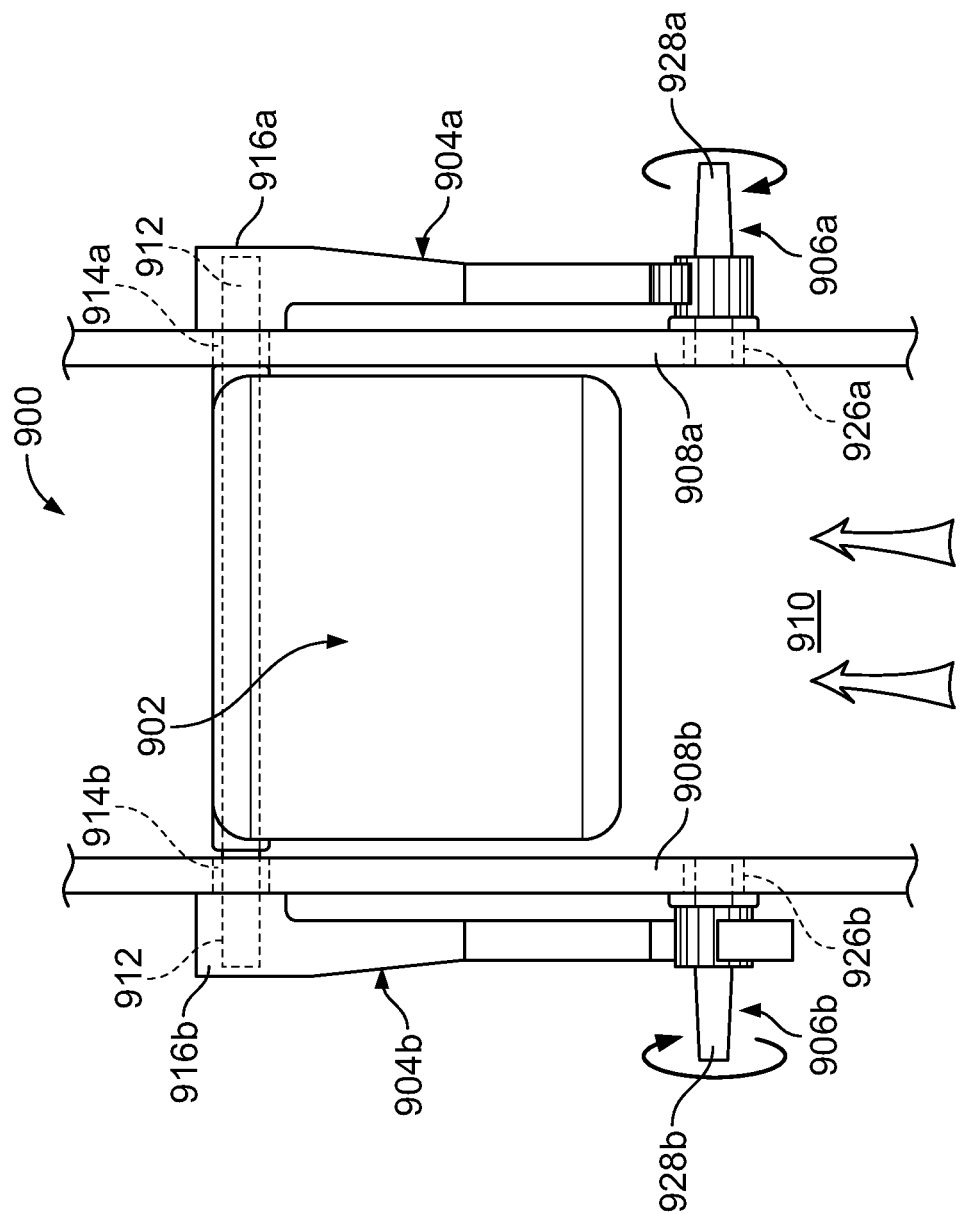

SWIMMING POOL CLEANER

RELATED APPLICATIONS

The present application is a divisional application of, and claims the benefit of priority to, U.S. patent application Ser. No. 14/464,947, filed Aug. 21, 2014, which claims the benefit of priority to U.S. Provisional Patent Application No. 61/872,389, filed on Aug. 30, 2013, which applications are both incorporated herein by reference in their entirety.

FIELD OF THE PRESENT DISCLOSURE

Embodiments of the present disclosure relate to swimming pool cleaners and, more particularly, to automatic swimming pool cleaners movable along an underwater pool surface for purposes of cleaning debris therefrom. Some embodiments of the present disclosure relate to swimming pool cleaners having the flow of water pumped and/or sucked by remote pumps using negative pressure into and through the pool cleaners, also referred to as a suction cleaner.

BACKGROUND OF THE PRESENT DISCLOSURE

Automatic swimming pool cleaners of the type that move about the underwater surfaces of a swimming pool are driven by many different kinds of systems. A variety of different pool-cleaner devices in one way or another harness the flow of water, as it is drawn or pushed through the pool cleaner by the pumping action of a remote pump for debris collection purposes.

The present disclosure is applicable to both pressure and suction cleaners. An example of a suction (negative pressure) cleaner is disclosed in commonly-owned U.S. Pat. No. 6,854,148 (Rief et al.), entire contents of which are incorporated herein by reference. An example of a pressure cleaner is disclosed in commonly-owned U.S. Pat. No. 6,782,578 (Rief et al.), entire contents of which are incorporated herein by reference.

Referring to FIGS. 1-4, a suction cleaner 100 of the prior art for use in a swimming pool is disclosed. The suction cleaner 100 can be in accordance with U.S. Pat. No. 5,105,496 to Gray, Jr. et al. and U.S. Pat. No. 4,536,908 to Raubenheimer, which are incorporated herein by reference in their entirety and which are discussed in part in this Background of the Present Disclosure section. FIG. 1 is a perspective view of the suction cleaner 100, which includes a housing 102, a rear inlet 104, walking pods 106, and a cone gear 108 that engages a suction hose 17. FIG. 2 is a partial sectional view of the suction cleaner of FIG. 1 taken along line 2-2 of FIG. 1 showing a prior art rocker arm, rocker arm locomotion system, and steering system. Referring to FIG. 2, there is shown the primary and secondary fluid flow paths for a suction device for cleaning swimming pools. Water enters a primary flow path at the primary fluid inlet 112. It meets the fluid from one of the secondary fluid outlets 114, continues past the primary turbine 116, and joins with the other secondary fluid outlet 118. The primary turbine 116 is mounted on a shaft 120 having eccentric cams 122. As the primary turbine 116 turns, it turns the rocker arms 124 which are on pivots 126 and which extend out to walking pods 106 which cause the suction device 100 to move forward. The fluid from the primary and secondary flow paths is discharged through the cone gear 108 (e.g., the primary fluid outlet) which is connected to the suction hose 110 as shown in FIG. 1.

Continuing with a discussion of the prior art, in the secondary fluid flow paths, fluid enters at the secondary fluid inlet 130, which extends across the rear inlet, passing through a cleaner steering gear assembly 131 that includes a pair of secondary turbines 132, 134. The first secondary turbine 132 is housed within a gearbox 136. The second secondary turbine 134 is housed within a chamber 137. The secondary turbines 132, 134 work together to intermittently apply torque about the axis of the suction hose 110. The top secondary turbine 134 turns the suction hose 110 thereby providing the torque. The bottom secondary turbine 132 provides the change in direction of the torque applied by the top secondary turbine 134 by causing a reverse in the rotation of the top secondary turbine 134. This operation is similar to that described in U.S. Pat. No. 4,521,933 to Raubenheimer, which is incorporated herein by reference in its entirety.

The fluid outlet from the bottom secondary turbine 132 passes through the integral screen 138 and out the secondary fluid outlet 114 at the inlet of the primary turbine 116. The fluid outlet from the top secondary turbine 134 passes through internal screen 140 and out the secondary outlet 118 at the top of the primary turbine 116.

A captured screw 142 mounted in a mounting 144 rigidly positions and secures a removable door 146. Guide channels 148 fixedly position the filter screen 138 at the discharge of the bottom secondary turbine 132 thereby preventing back wash from the primary turbine inlet from entering the secondary fluid outlet 114.

Continuing with a discussion of the prior art, FIG. 3 shows a cross section of the suction cleaning device 100 ready for use. The location of the removable door 146 is outlined and is shown to be positioned over the entrance to the primary flow path and the primary turbine inlet. The turbine 116 is housed in the housing 102 and secured to the housing walls 149 by means of bearings 150 on the turbine shaft 120. It will be seen that if water flows from the primary fluid inlet 112 to cone gear 108 (e.g., the primary fluid outlet), the turbine 116 will rotate. Also on the shaft 120 are the eccentric cams 122 which are between rocker arm bearings 152 fitted to the rocker arms 124. The eccentric cams 122 are 180 degrees out of phase with each other. As the shaft 120 rotates, the rocker arms 124 will rock back and forth about the pivots 126.

Continuing with a discussion of the prior art, FIG. 4 is a partial sectional view of the suction cleaner of FIG. 1 taken along line 3-3 of FIG. 2 showing the prior art rocker arms of the locomotion system with the turbine removed. Further, FIG. 4 shows a cross-section of the suction cleaning device 100 without the turbine 116, and showing the rocker arms 124 in greater detail. As shown in FIGS. 2 and 4, each rocker arm 124 includes a body 154 with two arms 156 extending therefrom. Each of the two legs 156 of the rocker arms 124 includes a respective rocker arm bearing 152, as discussed above. Each rocker arm 124 is integrated with a walking pod 106 to which it is connected by the pivot 126. The pivot 126 can include a square end where it connects with the walking pod 106 such that rotation of the pivots 126 is imparted to the walking pods 106. The inner ends 158 of the pivots 126 are secured for rotation in a split bearing 160 on the housing 102.

Continuing with a discussion of the prior art, as the turbine 116 rotates, the turbine shaft 120 and eccentric cams 122 also rotate, with the turbine shaft 120 rotating within the bearings 150 that are secured to the housing 149. As the eccentric cams 122 respectively rotate between and engage a pair of rocker arm bearings 152, which are secured to a respective rocker arm 124, they push the rocker arms 124 in opposite directions. That is, because of the eccentric cams 122 are 180 degrees out of phase with one another, one of the eccentric cams 122 will push the rocker arm 124 that it is engaged with rearward (e.g., clockwise rotation about the pivot 126), while the a second of the eccentric cams 122 will push the rocker arm 124 that it is engaged with forward (e.g., counter-clockwise rotation about the pivot 126). Accordingly, continued rotation of the turbine 116 causes the rocker arms 124 to rock back and forth. As the rocker arms 124 rock, their movements are imparted to the walking pods 106. The result is that as the turbine 116 rotates, the walking pods 106 rock and the whole device moves forward.

However, the rocker arms 124 of the prior art and four associated bearings 150 (two bearings per arm) are vulnerable to extreme wear and tear due to fine sand and debris. Contact shock between the bearings 150 and the eccentric cams 122 of the turbine 116 are also adverse to the bearings, resulting in replacement that can be costly to replace. Additionally, the turbine 116 has a ridged fixed shape and is also supported by two bearings on either rend that also suffer from wear and tear in a short period of time, which can be costly. Generally, there is an excessive clearance between the bearings 152 of the rocker arms 124 and the turbine eccentric cams 122, such that when the eccentric cams 122 rotate contact between the eccentric cams 122 and the bearings 152 is lost for a period of time, resulting in a hammer or knocking effect to occur when the eccentric cams 122 come back into contact with the bearings 152. This hammer effect can result in damage to the bearings 152 and the eccentric cams 122.

Continuing with a discussion of the prior art, as previously discussed in connection with FIG. 2, the housing includes a gearbox 136 housing a first secondary turbine 132, and a chamber 137 housing a second secondary turbine 134. Two passages 162 port into the chamber 137 and the interior space 164 of the housing. The interior space 164 is in fluidic communication with the passages 162 and the rear inlet 104, such that fluid can flow through the rear inlet 104, into the interior space 164 and across the passages 162. The ports 162 to the chamber 137 are controlled by a valve plate 166, which is discussed in greater detail below.

Continuing with a discussion of the prior art, the cleaner steering gear assembly 131 of the prior art includes the cone gear 108 that has a large gear wheel 168, and a drive pinion 174. The drive pinion 174 is connected to a gear 176 by a shaft 178. The cleaner 100 further includes the first and second secondary turbines 132, 134, the valve plate 166 connected to a gear 170 by a shaft 172, and a gear reduction stack 180. The first secondary turbine 132 includes a pinion 182 that meshes with an input gear to the gear reduction stack 180, all of which is located in the gearbox 136. The gear reduction stack 180 includes an output gear that meshes with the gear 170 connected to the shaft 172 and valve plate 166. Fluid that flows through the rear inlet 104 and into the interior space 164 can flow across the passages 162 into the chamber 137 and across gearbox openings 184 and into the gearbox 136. Fluid flowing into the gearbox 136 rotates the first secondary turbine 132 which outputs to the gear reduction stack 180, which in turn outputs to the gear 170 causing the valve plate 166 to rotate. As the first secondary turbine 132 rotates the valve plate 166, the valve plate 166 alternately covers and uncovers the ports 162 with relatively long periods when both parts are covered. When one of the ports 162 is covered fluid flowing through the open port 162 will cause the second secondary gear 134 to rotate clockwise, while when the other of the ports 162 is covered fluid flowing through the other open port 162 will cause the second secondary turbine 134 to rotate counter-clockwise. When both ports 162 are covered the second secondary turbine 134 does not spin. Accordingly, alternately covering and uncovering the ports 162 causes the second secondary turbine 134 to change direction of rotation.

Continuing with a discussion of the prior art, the second secondary turbine 134 includes an output pinion 186 that meshes with the gear 176 connected to the drive pinion 174 by the shaft 178. The drive pinion 174 meshes with the large gear wheel 168 of the cone gear 108. Accordingly, as the second secondary turbine 134 rotates, the pinion 186 rotates the gear 176, causing the drive pinion 174 to rotate. In turn, the drive pinion 174 rotationally drives the large gear wheel 168 thus applying a high slow speed torque to the cone gear 108. Rotation of the second secondary turbine 134 in a clockwise direction results in clockwise rotation of the cone gear 108, while counter-clockwise rotation of the second secondary turbine 134 results in counter-clockwise rotation of the cone gear 108.

Continuing with a discussion of the prior art, as one of the ports 162 are uncovered, the second secondary turbine 134 applies a torque to the cone gear 108 which in use is attached to the suction hose 110. The hose 110 will resist the turning movement and the net effect is that the whole cleaner 100 turns around the axis of the cone gear 108. When the then open port is closed, the device will be facing a random new direction usually different from its original direction. Of course, the running of the second secondary turbine 134 will constantly tend to move the cleaner 100 in its forward direction at any given time so that in turn a somewhat spiral movement will take place (when one of the ports 162 are open).

SUMMARY OF THE DISCLOSURE

Embodiments of the present disclosure provides for improved steering systems, locomotion systems, turbines, and turbine vanes for swimming pool cleaners including suction cleaning devices.

In some embodiments of the disclosure a steering system for a suction cleaner device is connectable to a suction source by a suction hose. The steering system includes a turbine rotatably connected with a main rotatable member that drives a cam drive train and a steering drive train. The cam drive train rotatably drives a cam mechanism, which includes a cam gear and a cam wheel, through engagement with a cam gear thereof. The steering drive train is movable through engagement with the cam wheel and includes a pinion gear that is positionable in plurality of steering positions. In a first steering position the pinion gear engages a first track of a nose cone and rotationally drives the nose cone in a first direction. In a second steering position the pinion gear engages a second track of the nose cone and rotationally drives the nose cone in a second direction. The cam wheel can have a plurality of outer profile regions of varying radii, that each correspond to one of the plurality of steering positions. The steering system can include a roller connected to the pinion gear, such that the roller is biased against the outer-profile regions of the cam wheel to ride there along, thereby moving the pinion gear between the plurality of steering positions.

In some embodiments of the disclosure, a locomotion system for a pool cleaner includes a turbine, first and second A-frame arms, and first and second walking pods. The turbine includes two eccentrics with bearings positioned thereabout, the eccentrics having central axes offset from the turbine central axis such that rotation of the turbine results in rotation of the eccentrics and the respective axes about the turbine central axis. The locomotion system further includes first and second A-frame arms pivotally secured about a pivot shaft, and each including a forked body. The bearings and respective eccentrics are positioned within and in engagement with the forked body of a respective A-frame arm such that each bearing and eccentric is engaged with an A-frame arm. Each A-frame arm further includes a keyed head extending therefrom and coaxial with the pivot shaft. Each keyed head is configured to engage a socket of a walking pod, such that each A-frame arm is engaged with a respective walking pod. Rotation of the turbine causes the first eccentric central axis and the second eccentric central axis to rotate about the turbine hub central axis thus forcing the first A-frame arm to rotate in a first direction and resulting in the first walking pod rotating in the first direction, and the second A-frame arm to rotate in a second direction and resulting in the second walking pod rotating in the second direction opposite from the first direction. Rotation of the first and second walking pods results in locomotion.

In some embodiments of the disclosure, a turbine includes a turbine rotor having a plurality of vanes connected thereto. The turbine vanes can include a distal end and a proximal end, with the proximal end being connected to the turbine rotor. A body extends between the proximal end and the distal end such that the body is generally "V"-shaped with the distal end being wider than the proximal end. This shape creates two lateral fluid passages on the sides of the body that permit increased fluid flow across the turbine.

In some embodiments of the disclosure, each of the plurality of vanes can be pivotally connected to the turbine rotor via a vane-rotor interconnection. The vane-rotor interconnection can be comprised of a slotted cavity on the turbine rotor that is engaged by an elongate member formed at the proximal vane edge of the vanes, such that the elongate member is secured within the slotted cavity. The slotted cavity and the elongate member can have non-congruent shapes that form an interconnection with a hollow space therebetween. The hollow space facilitates washing out of debris from within the interconnection to minimize locking of pivotal movement of the vane with respect to the rotor. Additionally, at least one of the slotted cavity and the elongate inner member can have a substantially polygonal cross-section, or an irregular-shaped cross-section.

In some embodiments of the disclosure, a turbine includes a turbine rotor having a rotor axis and a plurality of vanes connected thereto. The vanes include a proximal vane edge and a distal vane edge with a body extending between the proximal and distal vane edges Each of the plurality of vanes is connected with the turbine rotor at an interconnection that permits rotation of the proximal vane edge to positions of varying angles with respect to the rotor axis.

In some embodiments of the disclosure, the rotor can include a rotor shaft having a plurality of substantially planar shaft surfaces at substantially equal angle with respect to one another, with one of the plurality of vanes supported with respect to each of the shaft surfaces. Additionally, the proximal edge of each vane can include a cavity while each planar shaft surface includes a protrusion extending therefrom. The protrusion of each shaft surface can engage a cavity of one of the plurality of vanes to form the interconnection. The rotor can further include first and second cuffs that have inner surfaces that are each substantially equidistantly spaced from and parallel to a corresponding shaft surface, forming inner-surface corners that limit the angle of rotation of the vanes. In such configuration, the vanes can include first and second elongate proximal edges with the first elongate proximal edge extending between the first cuff and the rotor shaft, and the second elongate proximal edge extending between the second cuff and the rotor shaft.

Additional features, functions and benefits of the disclosed swimming pool cleaner and methods in connection therewith will be apparent from the detailed description which follows, particularly when read in conjunction with the accompanying figures.

BRIEF DESCRIPTION OF THE DRAWINGS

For a more complete understanding of the present disclosure, reference is made to the following detailed description of an exemplary embodiment considered in conjunction with the accompanying drawings, in which:

FIG. 48 is a front view of the turbine of FIG. 41 engaged with the A-frame arm assemblies of FIG. 38 forming the locomotion system of the present disclosure;

FIG. 49 is a partial sectional view of the turbine of FIG. 48 taken along line 49-49 of FIG. 48;

FIG. 51 is a diagrammatic side view of the turbine of FIG. 41 including fixed vanes and engaged with the A-frame arm assemblies of the present disclosure;

FIG. 52 is a sectional view of the turbine of FIG. 51 taken along line 52-52 of FIG. 51;

FIG. 56A is a partial sectional view of a self-adjusting frame assembly of the present disclosure in a first position;

FIG. 56B is a partial sectional view of the self-adjusting frame assembly of the present disclosure in a second position;

FIG. 56C is a partial sectional view of the self-adjusting frame assembly of the present disclosure in a third position;

FIG. 57 is a partial side view showing an oscillator locomotion system including an oscillator driving first and second gear frames engaged with rotatable components;

FIG. 71L is a side elevational view showing the turbine rotor forming a substantially round slotted cavity engaged with a proximal edge of a turbine vane having a cross-section having a shape resembling a butterfly;

DETAILED DESCRIPTION OF THE PRESENT DISCLOSURE

Figure 1:
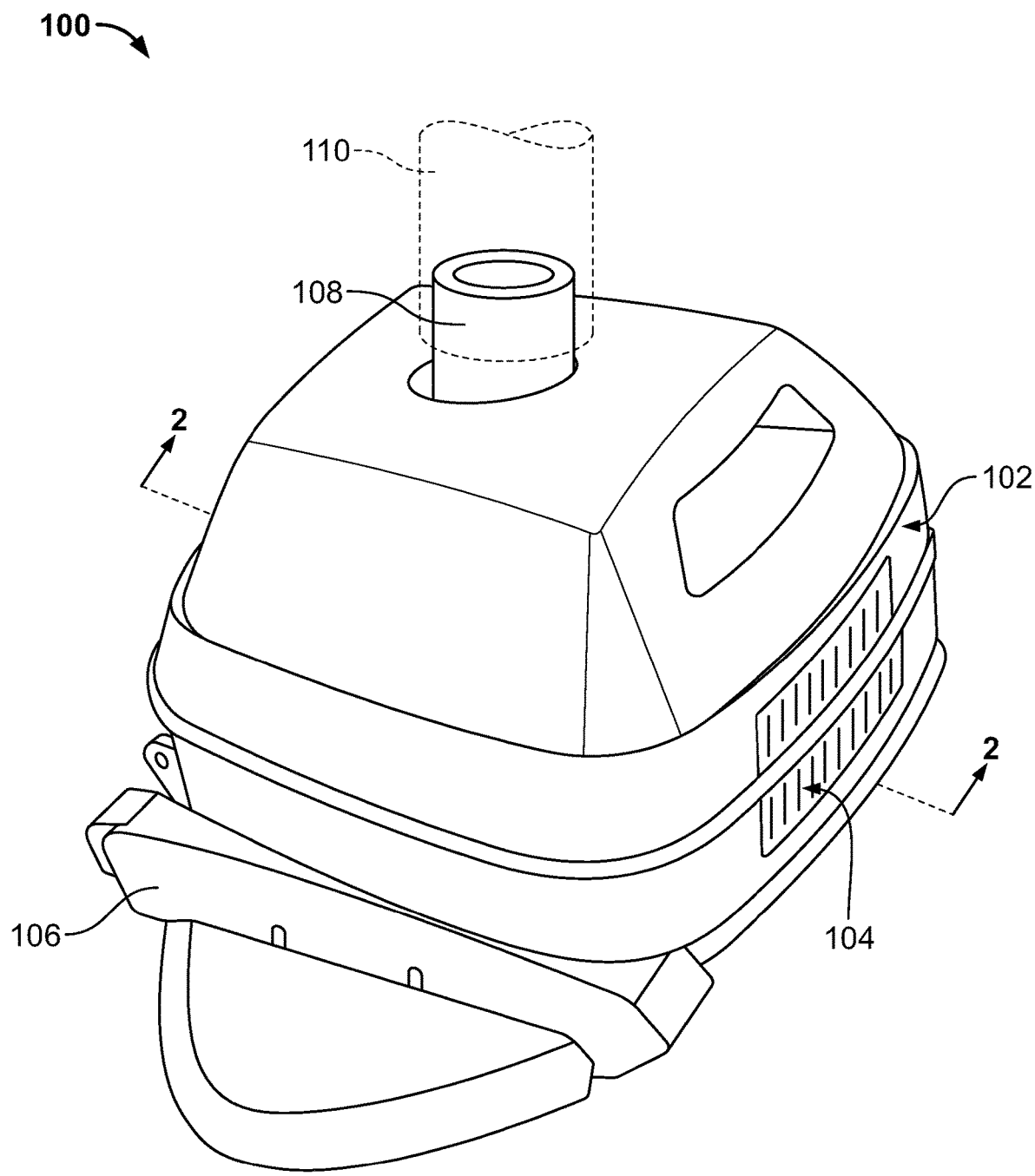
FIG. 1 is a perspective view of a suction cleaner for a pool or spa of the prior art.
Figure 2:
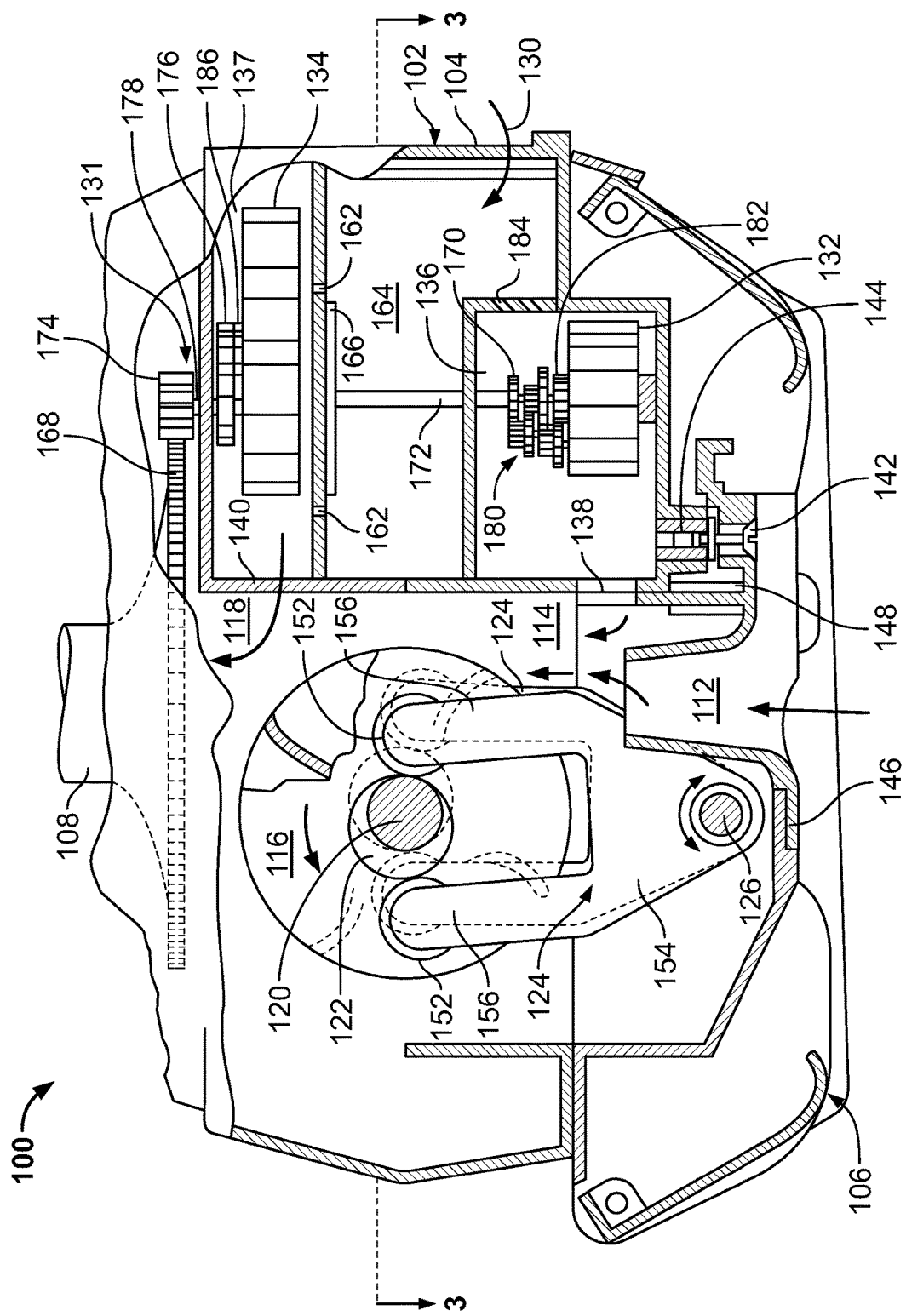
FIG. 2 is a partial sectional view of the suction cleaner of FIG. 1 taken along line 2-2 of FIG. 1 showing a rocker, turbine locomotion system, and steering system.
Figure 3:
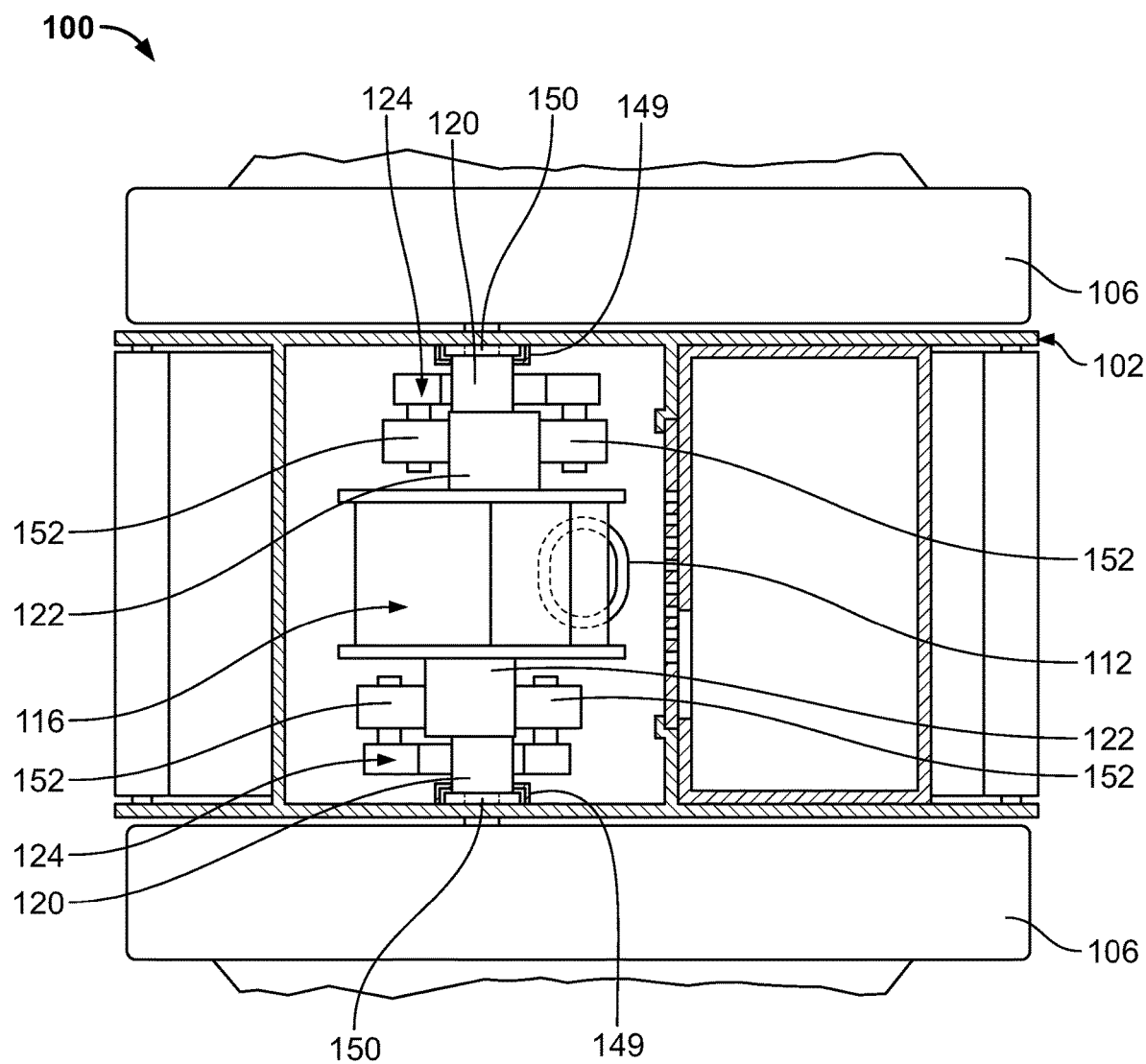
FIG. 3 is a partial sectional view of the suction cleaner of FIG. 2 taken along line 3-3 of FIG. 2 showing a prior art rocker arm and turbine locomotion system.
Figure 4:
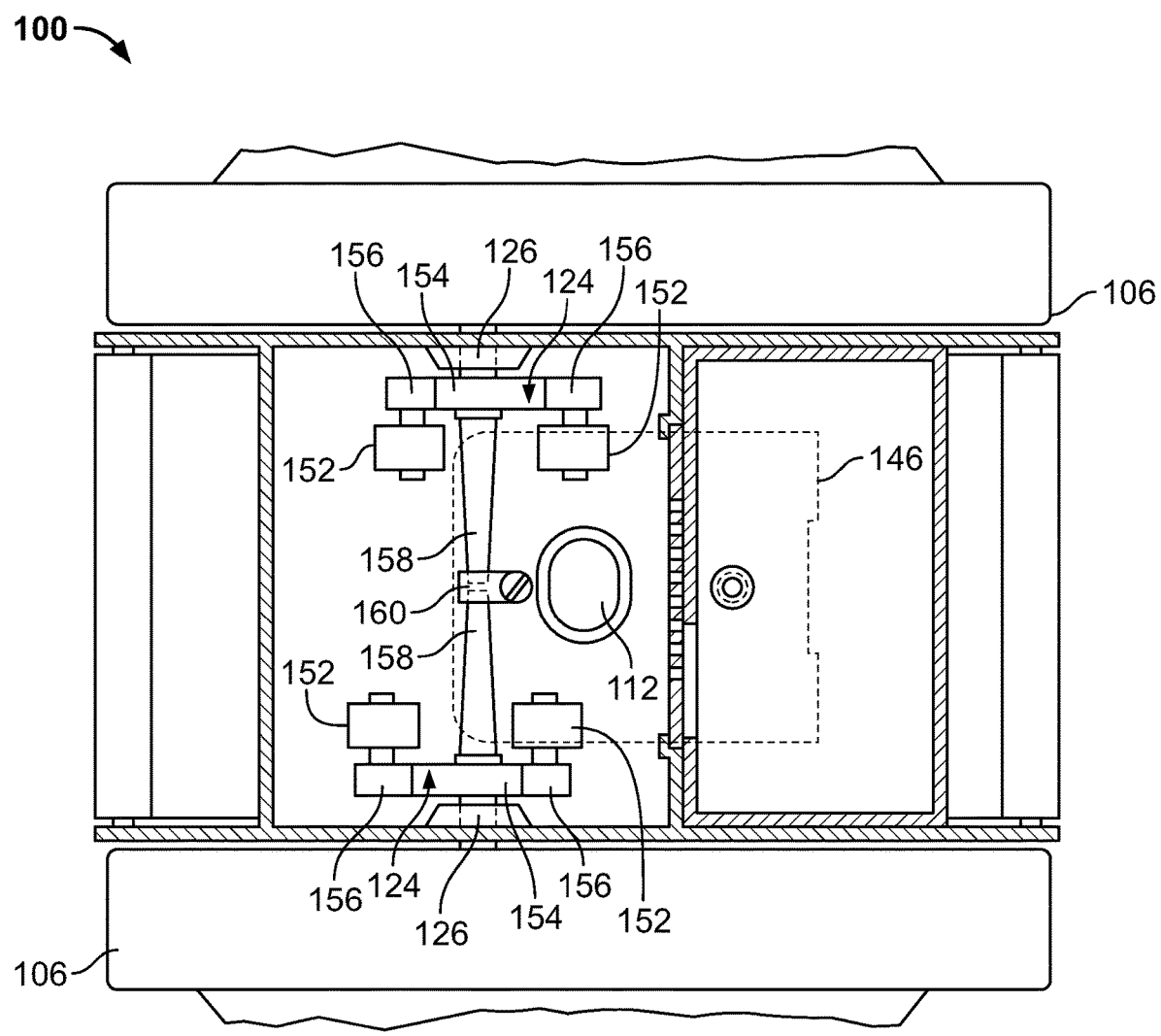
FIG. 4 is a partial sectional view of the suction cleaner of FIG. 2 taken along line 3-3 of FIG. 2 showing the prior art rocker arm of the locomotion system with the turbine removed.

In the description which follows, like parts are marked throughout the specification and drawings with the same reference numerals, respectively. Drawing figures are not necessarily to scale and in certain views, parts may have been exaggerated or omitted for purposes of clarity.

This disclosure relates to an improved automatic swimming pool cleaner of the type motivated by flow of water therethrough to move along a pool surface to be cleaned. The flow of water may be established by pumping action of a remote pump communicating with the pool-cleaner body through a hose connected to the cleaner, such as for a suction cleaner. The present disclosure further relates to an automatic swimming pool cleaner, such as a suction cleaner, that includes a fluid driven steering system including a cam mechanism for automatically varying motion of the cleaner between right turn motion, left turn motion, and no-turn motion. The present disclosure still further relates to an automatic swimming pool cleaner, such as a suction cleaner, including an improved A-frame and turbine for locomotion. Additionally, the present disclosure relates to improvements in fluid turbines for swimming pool cleaners.

For example, in embodiments, the pool cleaner of the present disclosure has a steering system connected to the hose to direct movement of the pool cleaner with respect to the hose.

Figure 5:
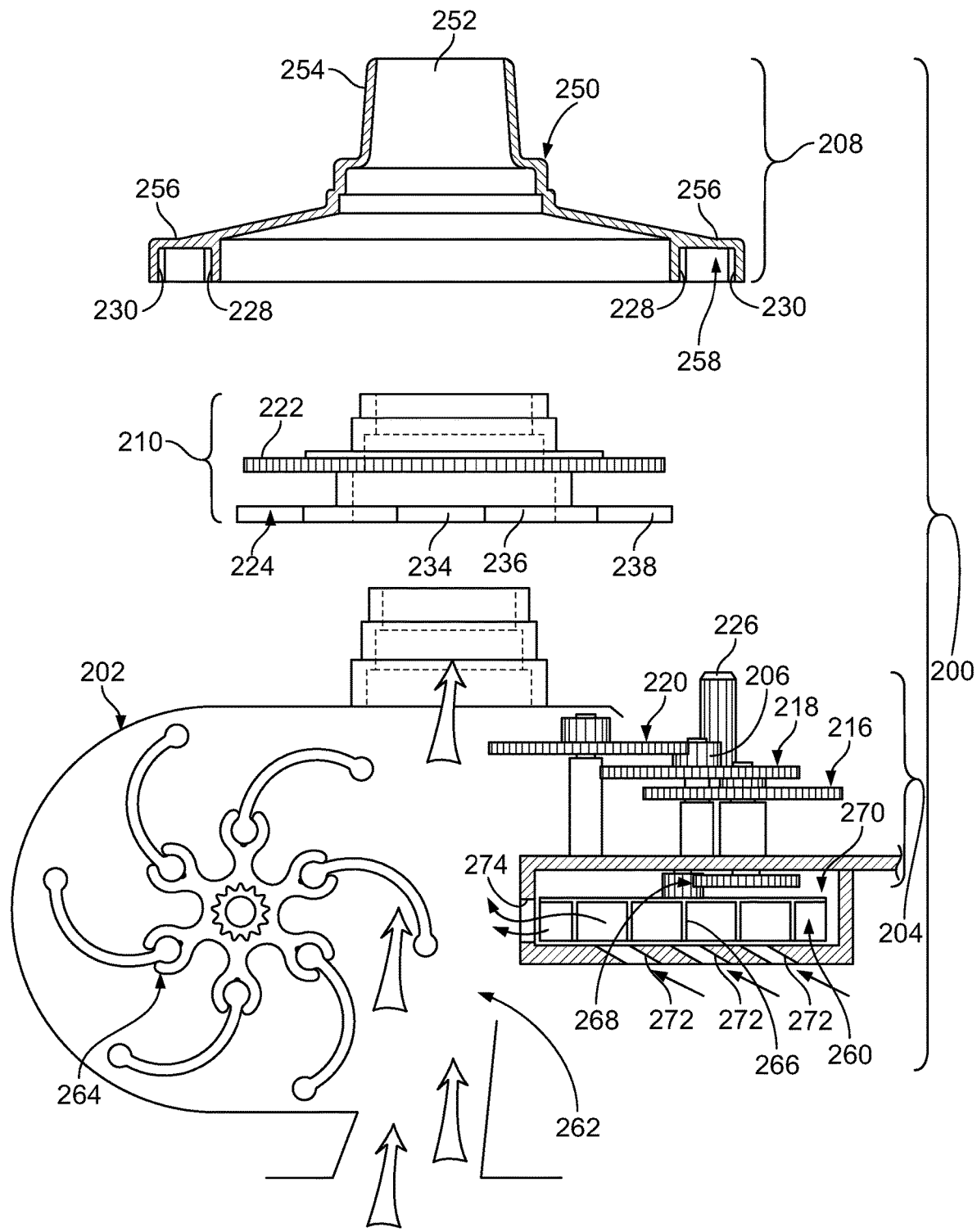
FIG. 5 is a diagrammatic partial-sectional view of the steering system of the present disclosure incorporated into a turbine-driven suction cleaner showing some components exploded.
Figures 6, 6A:
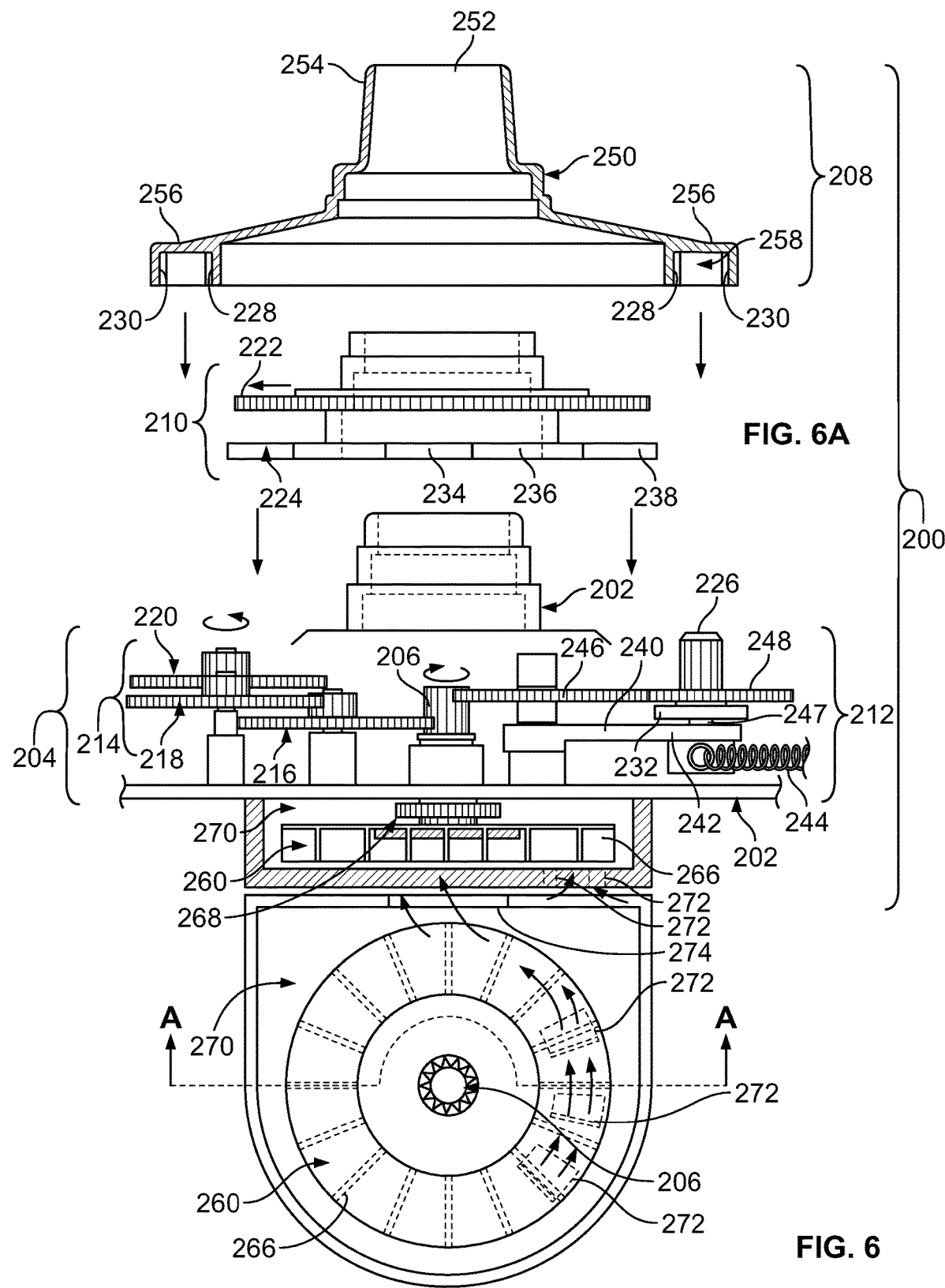
FIG. 6 is a top view of a turbine and turbine chamber of the steering system.
FIG. 6A is an exploded cross-sectional side view of the steering system taken along line A-A seen in a fragmentary top plan view of FIG. 6.
Figure 7:
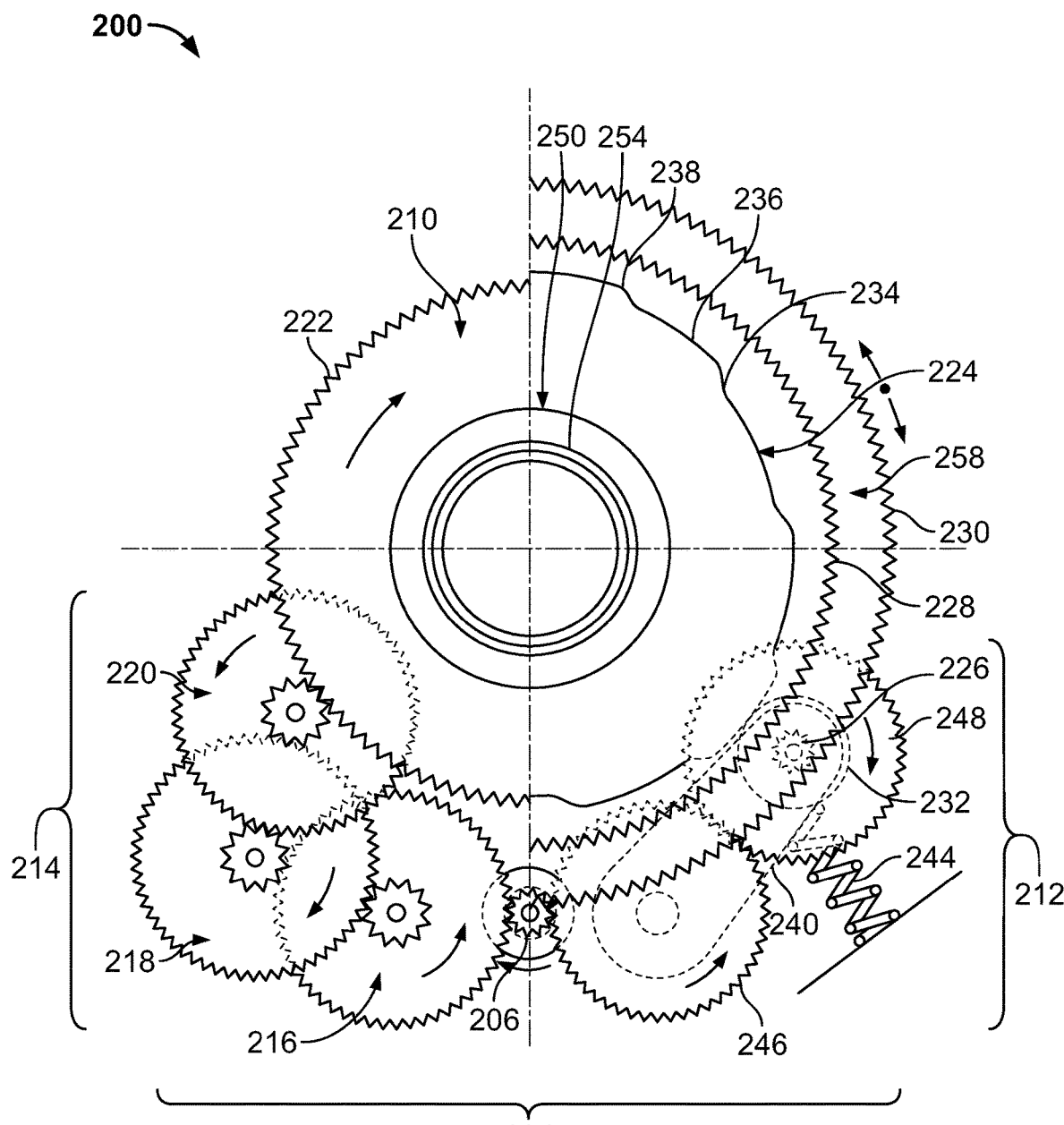
FIG. 7 is a fragmentary top plan view of the steering system of FIG. 6A showing an exemplary configuration of the gears thereof.

FIG. 5 is a diagrammatic partial-sectional view of a steering system 200 of the present disclosure incorporated into a turbine-driven suction cleaner body 202 showing some components of the steering system 200 exploded. Additionally, FIG. 5 is a side view of the steering system 200. As illustrated in FIGS. 5-15, the steering system 200 includes a steering drive mechanism 204 incorporated into and secured with respect to the cleaner body 202. The steering drive mechanism 204 includes a main rotatable member 206, a steering drive train 212, and a cam drive train 214 (see FIG. 6A). FIGS. 6A and 7 best illustrate the details of the inventive steering system 200. FIG. 6A is an exploded cross-sectional side view of the steering system taken along lines A-A seen in a fragmentary top plan view of FIG. 6. FIGS. 6A and 7 show that the main rotatable member 206 is operatively connected to both a steering mechanism 208, which is seen on the right side of FIG. 6A, and a cam mechanism 210, seen on the left side of FIG. 6A. The steering drive train 212 extends from the main rotatable member 206 to the steering mechanism 208 which is secured with respect to the cleaner body 202 and to the hose (not illustrated) for steering the cleaner body 202 in a plurality of directions with respect to the hose. FIGS. 5 and 6 illustrate the cam drive train 214 which includes a set of reduction gears 216, 218, 220 extending from the main rotatable member 206 to the cam mechanism 210. The cam mechanism 210 includes a cam drive gear 222 in contact with gear 220 of the cam drive train 214.

Figure 8A:
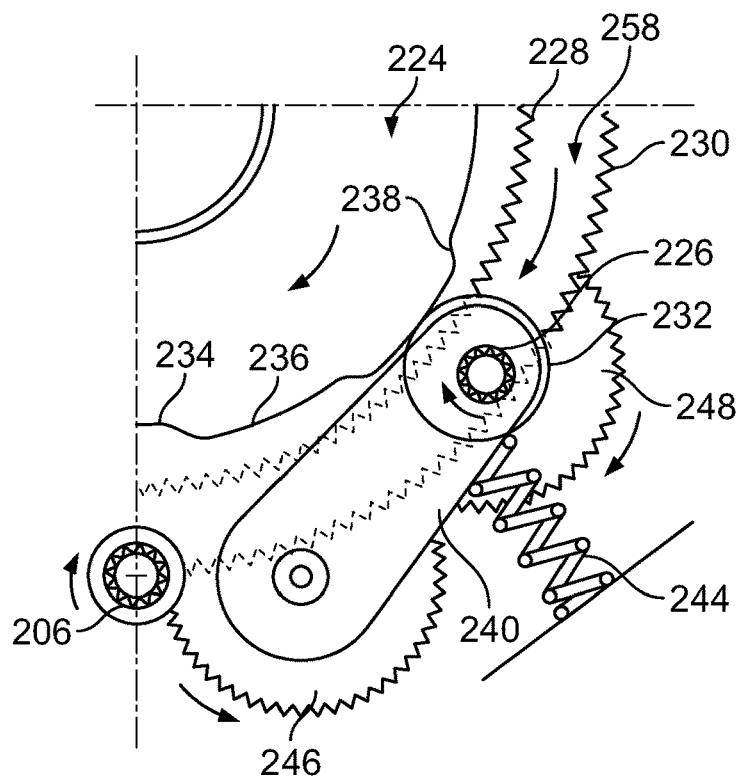
FIG. 8A is a fragmentary top plan view of the steering system of FIG. 7 showing a drive gear and associated bushing engaging a first region of a cam and positioned in a "high" position.
Figure 8B:
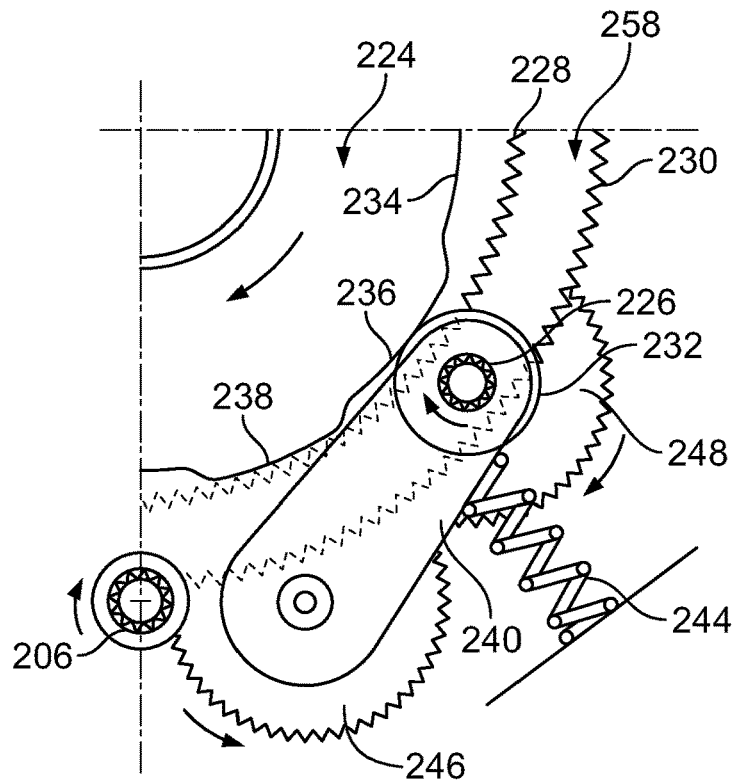
FIG. 8B is a fragmentary top plan view of the steering system of FIG. 7 showing a drive gear and associated bushing engaging a second region of a cam and positioned in a "middle" position.

The cam mechanism 210 includes a cam wheel 224 rotatably secured with respect to the cleaner body 202 and operatively connected to the steering mechanism 208 for switching between steering modes. Cam wheel 224 is rotated by the cam drive gear 222. FIGS. 7-9 illustrate cam wheel 224 having outer-profile regions of greater and lesser radii each corresponding to one of the directions of the steering mechanism 208.

In some embodiments, the steering drive mechanism 204 includes a steering pinion gear 226 and first and second gear tracks 228, 230 for steering movement of the cleaner body 202 with respect to the hose. The steering pinion gear 226 is driven by the steering drive train 212 and movable into one of the steering positions, including first and second positions each in engagement with one of the gear tracks 228, 230 for steering the cleaner body 202 in one of clockwise and counter-clockwise directions around the hose.

The steering pinion gear 226 may also be movable into a third steering position between the tracks 228, 230 for steering the cleaner body 202 in a substantially no-turn position with respect to the hose.

In certain versions, the steering drive train 212 further includes a roller 232 connected to the pinion gear 226 and biased against the outer-profile regions of the cam wheel 224 to ride there along, thereby moving the pinion gear 226 between the steering positions. In some embodiments, the first gear track 228 is of a smaller radius than the second gear track 230, and the tracks 228, 230 are coaxial.

In certain embodiments, such as that illustrated in FIG. 9, the cam wheel 224 has three outer-profile regions of lesser 234, medium 236, and greater 238 radii each corresponding to one of the steering directions. When the roller 232 rides the lower radii region 234, the pinion gear 226 engages the smaller-radii gear track 228 and steers the cleaner body 202 in one of the directions around the hose. When the roller 232 rides the greater radii region 238, the pinion gear 226 engages the outer of the gear tracks 230 and steers the cleaner body 202 in the other of the directions around the hose. And, when the roller 202 rides the medium radii region 236, the pinion gear 226 is between the gear tracks 228, 230 and steers the cleaner body 202 in a substantially no-turn direction with respect to the hose.

Some embodiments of the inventive pool cleaner, such as those illustrated in FIGS. 7 and 8A-8C, also include a swivel arm 240 pivotally held by the body 202 and having a distal end 242 biased by a spring 244 against the cam-wheel 224 outer profile. Such pool cleaners may also include a steering shaft 247 journaled in the swivel-arm 240 distal end 242. The steering shaft 247 supports the roller 232 and the pinion gear 226 for movement between the steering positions. In some examples, the pool cleaner includes a spring 244 which biases the swivel arm 242 toward the cam wheel 224.

In certain embodiments, such as those illustrated in FIGS. 6 and 7, the cam drive train 214 includes a reduction gear assembly 216, 218, 220 secured with respect to the body 202 and linking the main rotatable member 206 with the cam wheel 224 such that rotation of the cam wheel 224 occurs upon rotation of the main rotatable member 206. In such embodiments, the cam wheel 224, acting through the swivel arm 240, alternately moves the pinion gear 226 to one of the steering positions.

The cam mechanism 210 may have a single-piece cam member which includes the cam wheel 224 and a coaxial cam drive gear 222 for its rotation.

FIG. 6A illustrates the main rotatable member 206 which is rotatably connected to the swivel arm 240 through a swivel arm gear set 246, 248, 226. The illustrated swivel arm gear set 246, 248, 226 has a constant force imposed by a spring 244.

FIG. 9 is top plan view of one example of cam wheel 224. FIG. 9 shows lower 234, medium 236, and higher 238 profiles of cam wheel 224 which is turned by the cam drive train 214. Roller 232 is shown constantly turning in contact with the outside diameter of cam wheel 224. Roller 232 follows along the contours on the cam wheel 224 by having constant tension on it from the spring 244.

In some embodiments, such as those shown in FIGS. 6 and 7, the steering system further includes a hose-mounting structure 250. As used herein, the hose-mounting structure 250 may also be referred to as, and/or characterized as, a cone gear structure, a cone drive gear structure, and/or a cone gear hose connection. The hose-mounting structure 250 defines a water-flow passage 252 therethrough and includes a hose-connecting portion 254 and outward portion 256, the outward portion 256 forming the first and second gear tracks 228, 230 concentric with the hose, the first gear track 228 being of a smaller radius than the second gear track 230, and the tracks 228, 230 are coaxial.

In certain of such embodiments, the outward portion 256 forms a gear-track cavity 258. FIG. 6A shows the gear-track cavity 258 with spaced inner and outer walls each forming a respective one of the first and second gear tracks 228, 230. The figures illustrate a hose-mounting structure 254 as a cone with gear cavity 258. Cone gear structure 250 is held by the hose causing the cleaner to turn around the cone gear structure 250 when roller 232 engages on the low or high profile 234, 238 of cam wheel 224. The pinion gear 226 is disposed within the cavity 258 for engagement with the first gear track 228 to steer the cleaner body 202 in one of clockwise and counter-clockwise directions with respect to the hose and with the outer of the gear tracks 230 to steer the cleaner body 202 in the other of the clockwise and counter-clockwise direction around the hose.

The steering system 200 may also include a neutral steering mode with the pinion gear 226 positioned in the space between the gear tracks 228, 230 to steer the cleaner body 202 in a substantially no-turn direction around the hose.

Figure 8C:
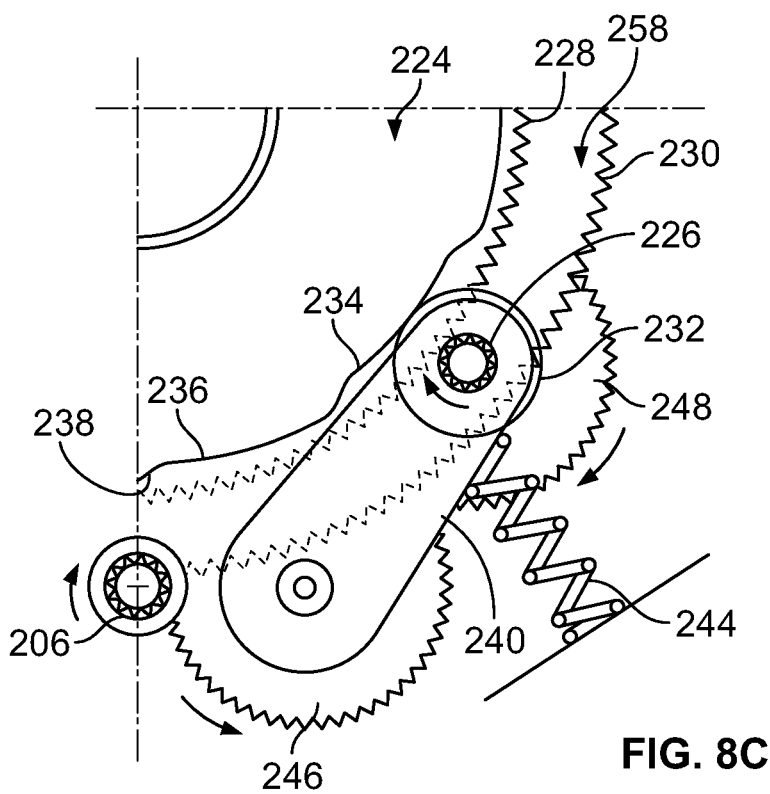
FIG. 8C is a fragmentary top plan view of the steering system of FIG. 7 showing a drive gear and associated bushing engaging a third region of a cam and positioned in a "low" position.
Figure 9:
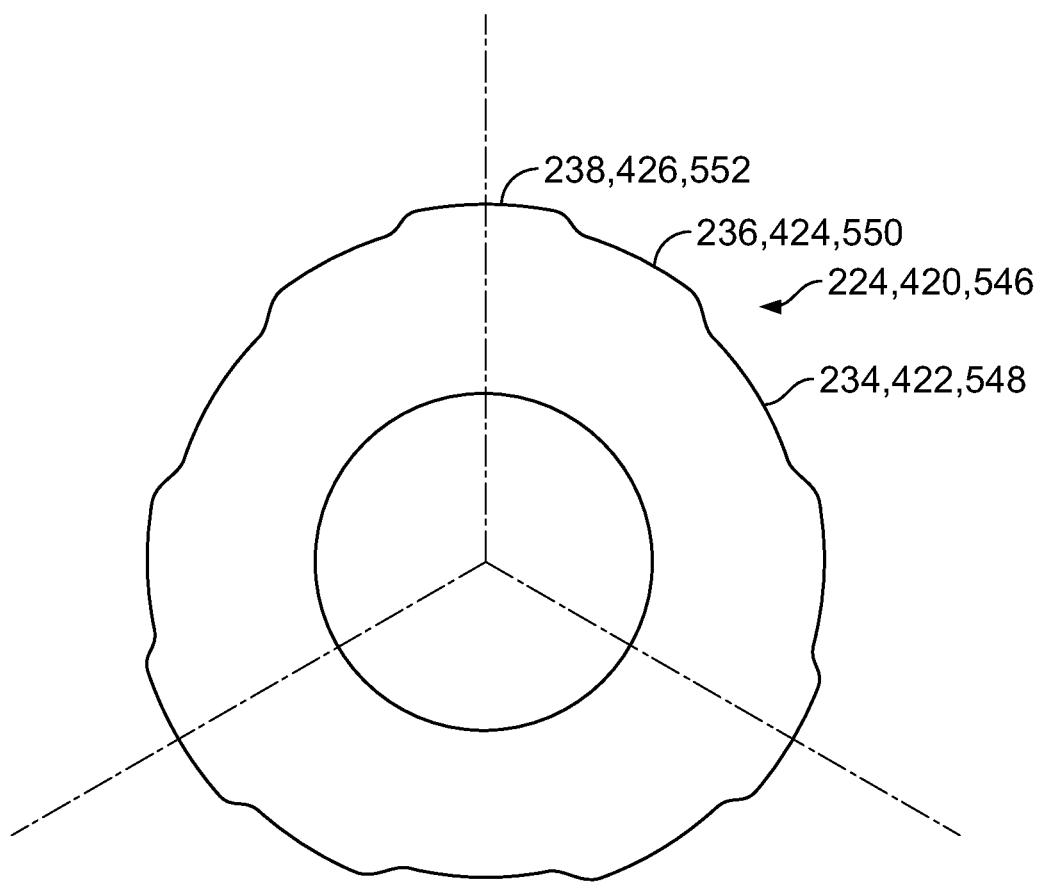
FIG. 9 is a top plan view of the cam of FIGS. 7 and 8A-8C.

FIGS. 7-8C illustrate the direction of rotation being determined by whether the pinion gear 226 is running on the inside or outside 228, 230 of the cone gear structure 250 or is in a position between the gear tracks 228, 230. Depending on engagement of roller 232 with cam wheel 224 the pool cleaner 202 will turn left, stay in neutral (running substantially straight), or turn right. Cone gear structure 250 uses the force/tension, e.g., torque resistance, of the hose to turn around the hose while alternating between left, neutral and right.

In certain of such embodiments, the single-piece cam member 224 is secured to the hose-mounting structure 254 in a position concentric with the hose such that the cam member 224 is substantially concentric with the gear tracks 228, 230.

FIG. 7 is a fragmentary top plan view of one example of the inventive steering system 200. FIG. 7 shows an exemplary configuration of gears and the direction that the gears turn. The cone gear structure 250 is shown as the only gear that alternates between turning clockwise, counterclockwise and idles in no-turn neutral position.

FIGS. 8A-8C are fragmentary top plan views of the example of the inventive steering system of FIG. 7.

FIG. 8A shows a position when cam wheel 224 comes around and, due to the constant force from spring 244, roller 232 engages with cam wheel 224 on the higher profile 238 position. With roller 232 in such higher-diameter position, the pinion gear 226 engages the outer gear track 230 of the cone drive gear structure 250 which is held by the hose. Due to such engagement of pinion gear 226 with the outer gear track 230, the cleaner 202 is being steered to turn counter-clockwise.

FIG. 8B shows a position when cam wheel 224 comes around and, due to the constant force from spring 244, roller 232 engages with cam wheel 224 on the medium profile 236 position such that pinion gear 226 is out of engagement with either of the inner or outer gear tracks 228, 230. Such lack of engagement of the pinion gear 226 with either of the gear tracks 228, 230, leaves the cleaner 202 in a neutral steering position allowing the cleaner 202 to move along with the hose substantially straight, e.g., without turning around the hose.

FIG. 8C shows a position when cam wheel 224 comes around and, due to the constant force from spring 244, roller 232 engages with cam wheel 224 on the lower profile 234 position. With roller 232 in such lower-diameter position, the pinion gear 226 engages the inner gear track 228 of the cone drive gear structure 250 which is held by the hose. Due to such engagement of pinion gear 226 with the inner gear track 228, the cleaner 202 is being steered to turn clockwise.

FIG. 9 shows the three outer profiles 234, 236, 238 of the cam wheel 224, including the lower profile 234 for turning the cleaner 202 clockwise around the cone gear hose connection 250, the medium profile 236 for allowing the cleaner 202 to run substantially straight without turning around the hose, and the higher profile 238 for turning the cleaner 202 counter clockwise around the cone gear hose connection 250, as described above.

The pool cleaner body 202 forms a water-flow chamber having water-flow inlet and outlet ports. In some embodiments, the steering drive mechanism 204 is moved by the flow of water. In some alternative embodiments, the steering drive mechanism 204 is moved by an electric motor operatively connected to the main rotatable member 206.

In certain of the embodiments, the steering drive mechanism 204 is moved by the flow of water. Examples of such embodiments include FIGS. 5, 6, 6A, and 10-14. In such embodiments, the cleaner includes a steering turbine 260 which is driven by the flow of water established by pumping action of a remote pump in one of suction and pressure flow directions. In FIGS. 5 and 10-14, the cleaner is shown with the steering turbine 260 mounted in communication with a water-flow chamber 262 for rotation by the flow of water. FIGS. 5 and 14 show versions of the pool cleaner which have two turbines, including the steering turbine 260 and a drive turbine 264 which is rotatably mounted within the water-flow chamber 262 for moving the cleaner body 202 along the pool surface to be cleaned. It should be understood that in some embodiments of the present disclosure the drive turbine 264 may also perform the function of the steering turbine 260.

As seen in FIG. 6, the steering turbine 260 has a steering rotor 266 rotatable about an axis. The main rotatable member 206 is connected to the steering rotor 266 through a compound drive gear 268 such that the main rotatable member 206 turns only in one direction and communicates such one-direction rotation to the cam drive gear 222 which also rotates only in one direction. The compound drive gear 268 can be provided as a gear stack.

In some embodiments, the steering turbine 260 is mounted within the water-flow chamber 262 and the water-flow chamber 262 includes a steering-turbine compartment 270 in communication with the water-flow chamber 262 such that the steering turbine 260 is rotated by the flow of water motivated by the flow of water through the cleaner body 202. The steering-turbine compartment 270 has water-flow inlet and outlet ports 272, 274 positioned and arranged for the flow of water to rotate the steering rotor 266.

Figure 10:
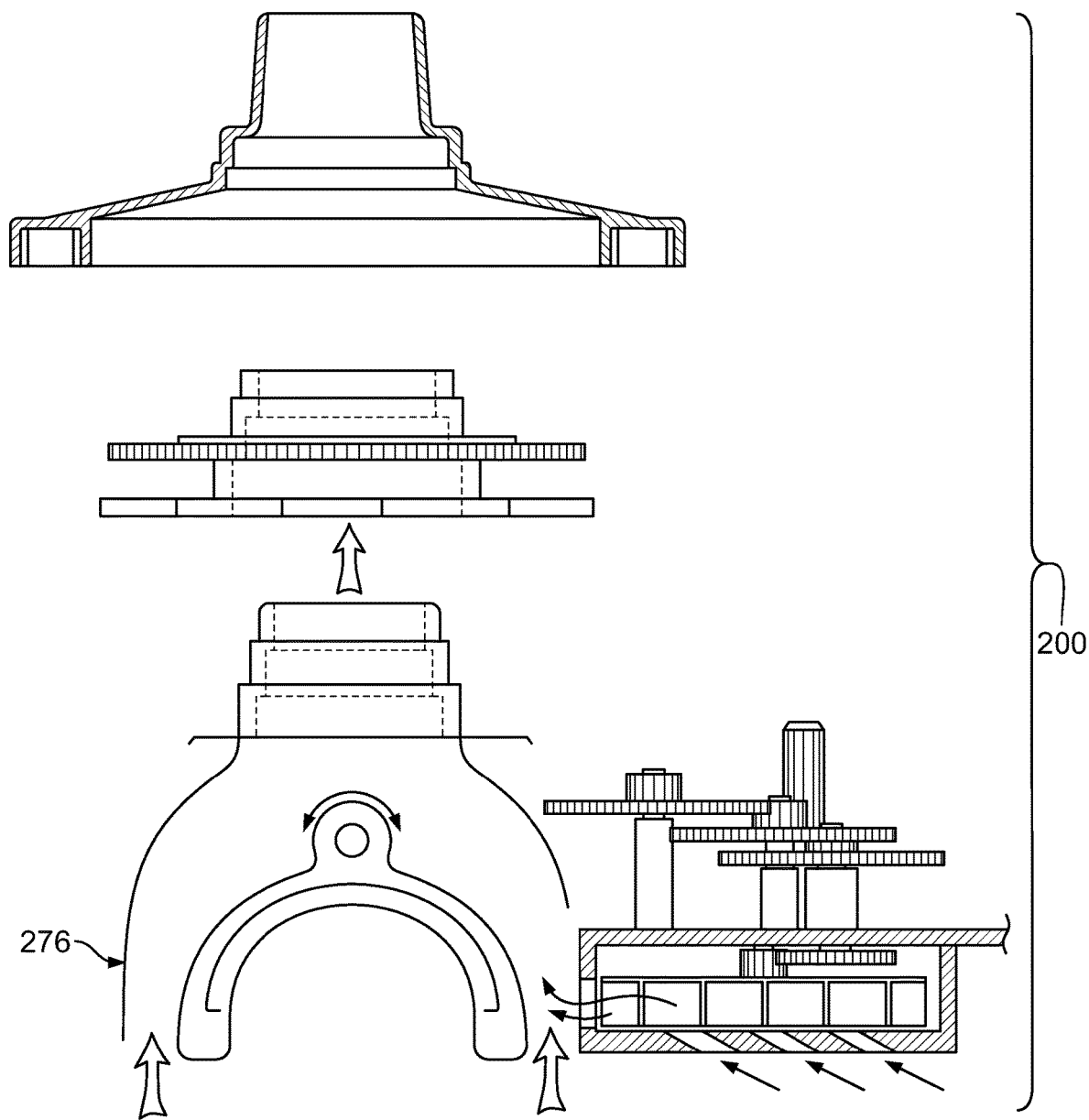
FIG. 10 is a diagrammatic partial-sectional view of the steering system of FIG. 6A incorporated into a tube-shaped suction cleaner having a horseshoe-shaped oscillator.
Figure 11:
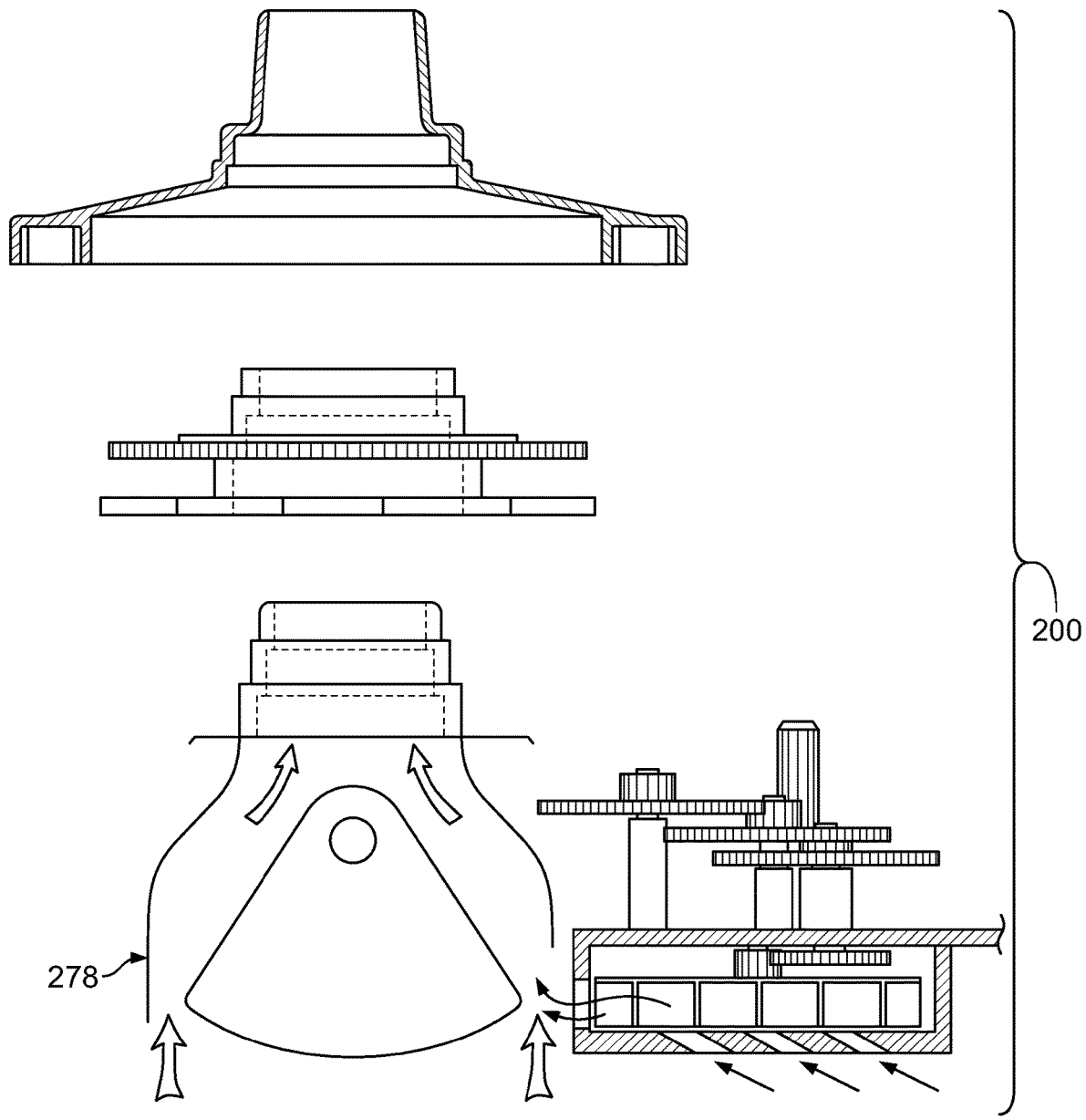
FIG. 11 is a diagrammatic partial-sectional view of the steering system of FIG. 6A incorporated into a tube-shaped suction cleaner having a hammer oscillator.
Figure 12:
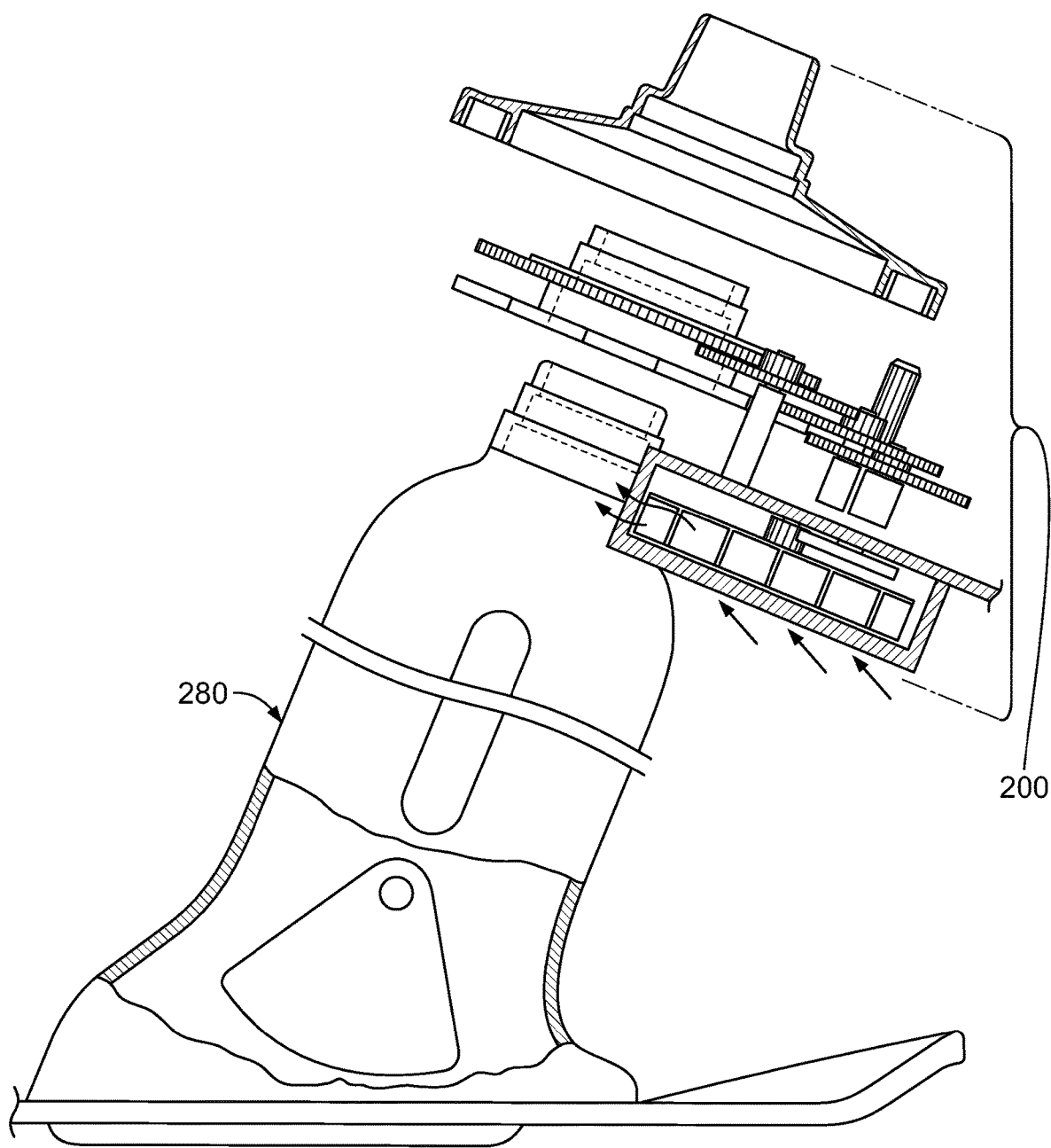
FIG. 12 is a diagrammatic partial-sectional view of the steering system of FIG. 6A incorporated into a tube-shaped suction cleaner having two tubes and a hammer oscillator.
Figure 13:
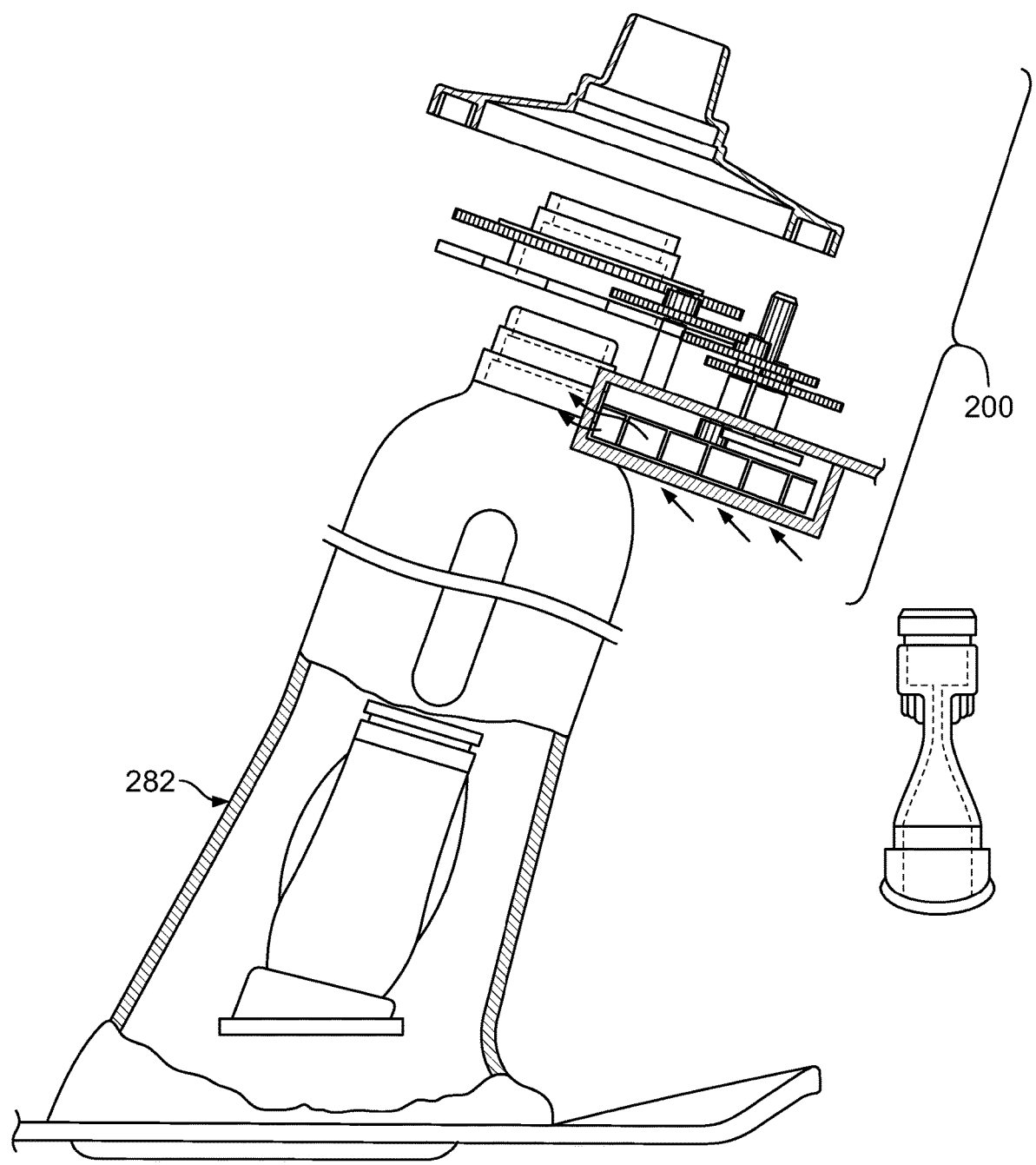
FIG. 13 is a diagrammatic partial-sectional view of the steering system of FIG. 6A incorporated into a tube-shaped suction cleaner having two tubes and a diaphragm oscillator.
Figure 14:
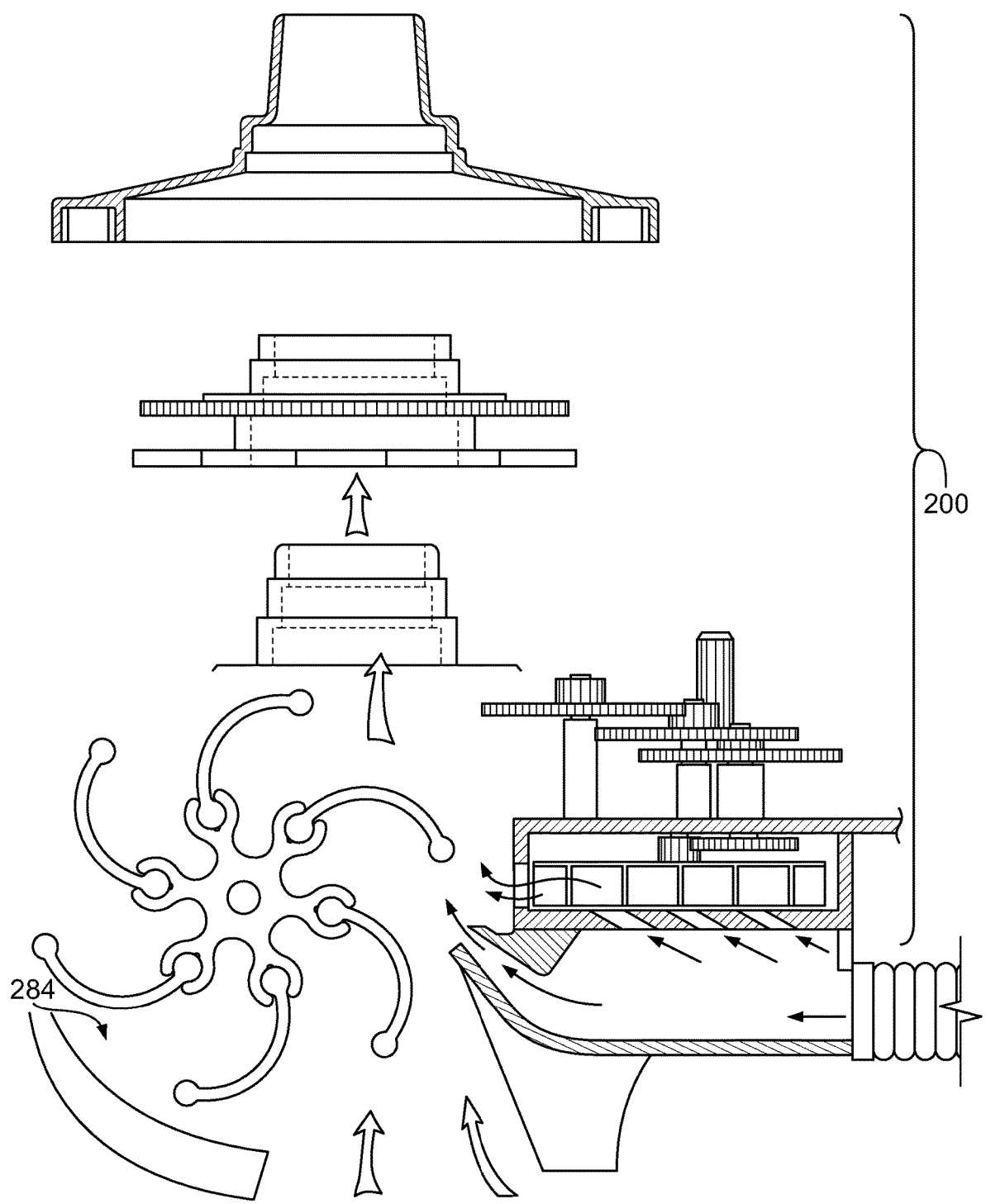
FIG. 14 is a diagrammatic partial-sectional view of the steering system of FIG. 6A incorporated into a hybrid pressure and suction cleaner.

FIGS. 5 and 10-13 are schematic fragmentary cross-sectional side views which illustrate exemplary applications of the steering system 200 of FIGS. 6 and 6A incorporated into various type of suction-type pool cleaners. FIG. 5 shows the steering system 200 with a turbine-driven suction-type cleaner 202. FIG. 10 show the steering system 200 with an oscillator-action driven pool cleaner 276. FIGS. 11 and 12 show the steering system 200 with two kinds of a hammer-action driven cleaners 278, 280. FIG. 13 shows the steering system 200 with a diaphragm-type pool cleaner 282.

FIG. 14 is a schematic fragmentary cross-sectional side view which illustrates an exemplary application of the steering system 200 of FIG. 7 with a hybrid pressure and suction pool cleaner 284. It should be noted that FIG. 7 does not represent any required positioning or orientation of the steering system 200 with respect to the cleaner body or the hose.

Figure 15:
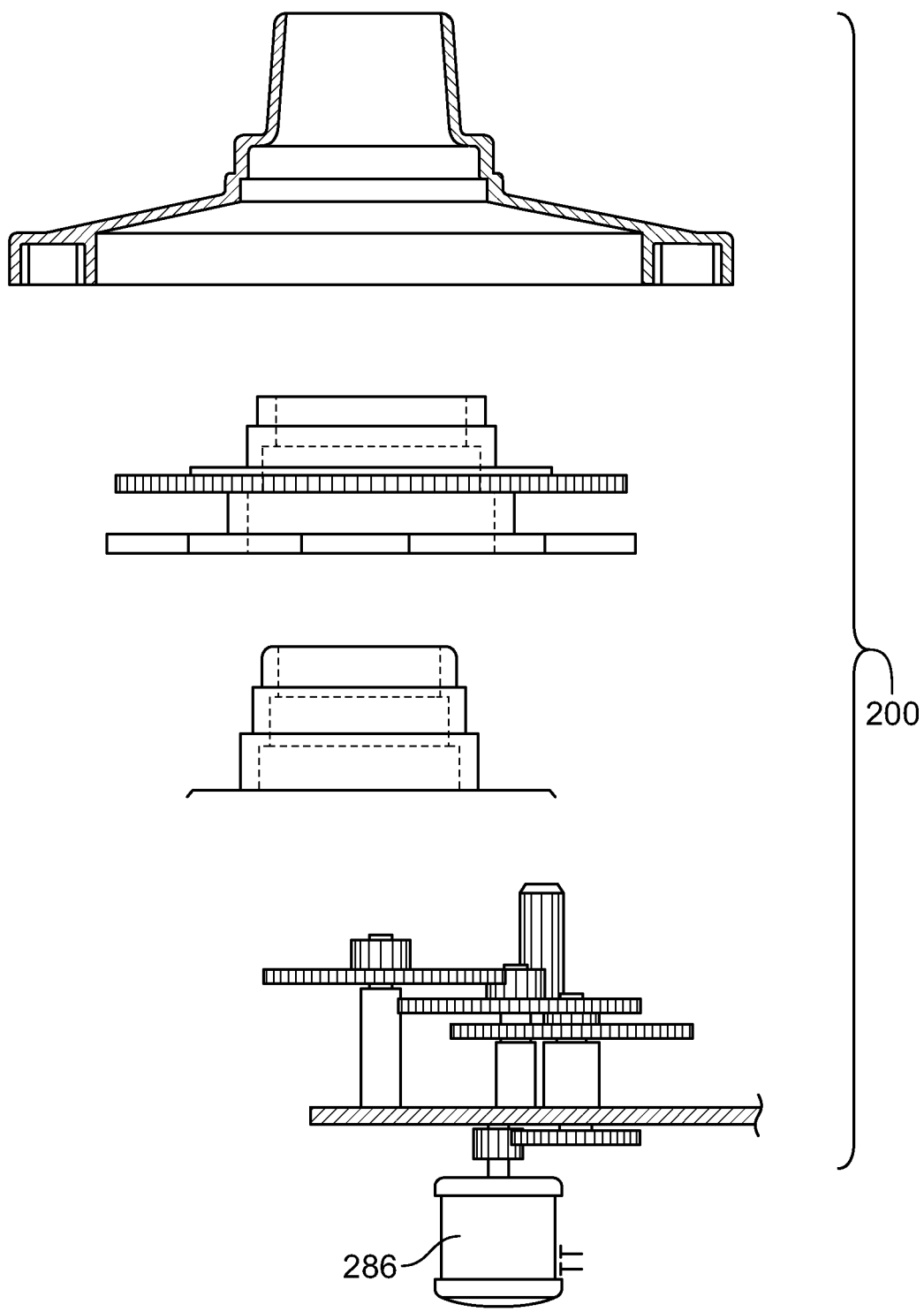
FIG. 15 is a diagrammatic partial-sectional view of the steering system of FIG. 6A including a motor for assisting with powering the steering system.

FIG. 15 is a schematic fragmentary cross-sectional side view which illustrates an exemplary embodiment with the steering drive mechanism 204 being moved by an electric motor 286 operatively connected to the main rotatable member 206.

Figure 16:
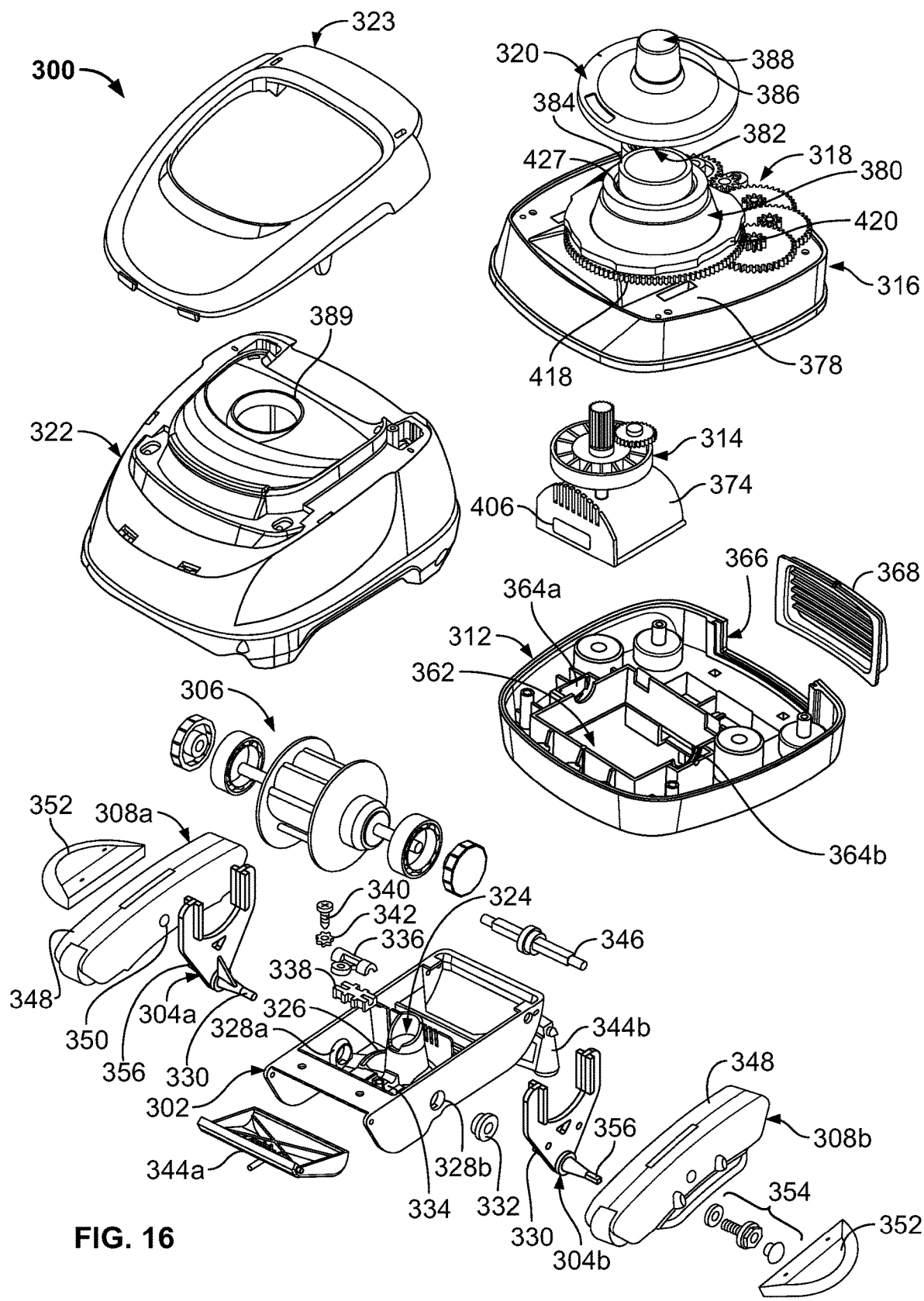
FIG. 16 is an exploded perspective view of a suction cleaner of the present disclosure.

FIG. 16 is an exploded perspective view of a suction cleaner 300 of the present disclosure. The suction cleaner 300 generally includes a lower body 302, a locomotion system 600 (see FIGS. 34-36, and 48) including a pair of A-frame arm assemblies 304a, 304b and a drive turbine assembly 306, a pair of walking pod assemblies 308a, 308b, a lower middle body 312, steering turbine assembly 314, an upper middle body 316, a steering system 318 including a nose cone 320, a top shell 322, and a handle assembly 323. While the focus of the present disclosure is on three aspects of the suction cleaner 300, namely, the steering system 318, the locomotion system 600 (see FIGS. 34-36 and 48), and the drive turbine assembly 306, an overview of the entire cleaner 300 is provided for contextual purposes.

The lower body 302 defines an internal cavity 326 that includes an inlet nozzle 324 thereto. The internal cavity 326 and inlet 324 allow water and debris to flow into the lower body 302 of the cleaner 300 and across the lower body 302 into the lower middle body 312, discussed in greater detail below. The lower body 302 further includes first and second A-frame side pivot openings 328a, 328b on opposite lateral sides thereof. The side pivot openings 328a, 328b allow a keyed (square) head 356 of each A-frame arm 304a, 304b to extend therethrough and out of the internal cavity 326 of the lower body 302. A bushing 332 is provided around a shaft of the square head 356 of each A-frame arm 304a, 304b and is inserted into each side pivot opening 328a, 328b. A pivot lower bracket 334, pivot upper bracket 336, bushing 338, screw 340, and washer 342 are included in the lower body 302 for pivotally securing the pivot shaft 330 of each A-frame arm 304a, 304b to the lower body 302. The lower body 302 further includes front and rear flaps 344a, 344b connected to the front and rear of the lower body 302, respectively. The front and rear flaps 344a, 344b can be spring biased away from the lower body 302 such that in operation as suction occurs the flaps 344a, 344b move inwardly to allow water to reach the inlet 324, while water is prevented from flowing in from the sides. A flap adjuster 346 can be provided for the flaps 344a, 344b.

The walking pod assemblies 308a, 308b are provided on lateral sides of the lower body 302 and each respectively connected with an A-frame arm 304a, 304b. The walking pod assemblies 308a, 308b are mirror images of one another in structure and are placed on opposite sides of the lower body 302. The walking pod assemblies 308a, 308b each include a walking pod body 348 that includes a square socket 350, and can also include side flaps 352 that can "snap-on" to the walking pod body 348. The square socket 350 of the walking pod body 348 is engaged by the square head 356 extending from a respective A-frame arm 304a, 304b. The square head 356 is coaxial with the pivot shaft 330 of each A-frame arm 304a, 304b. Accordingly, rotation of the A-frame arms 304a, 304b about the respective pivot shaft 330 results in the square head 356 rotating or rocking the engaged walking pod assembly 308a, 308b, resulting in locomotion of the cleaner 300. Each A-frame arm 304a, 304b is respectively engaged with a walking pod assembly 308a, 308b by a screw assembly 354. Operation and engagement of the A-frame arms 304a, 304b with the walking pod assemblies 308a, 308b is discussed in greater detail below in connection with FIGS. 34-54.

Still referencing FIG. 16, the lower middle body 312 defines a turbine housing 362, first and second bushing housings 364a, 364b, and a rear opening 366. The lower middle body 312 is configured to be placed adjacent the lower body 302. The turbine housing 362 is configured to have a portion of the A-frame arms 304a, 304b inserted therein, to house the turbine 306, and be in fluidic communication with the internal cavity 326 and inlet 324 of the lower body 302 such that water flows in through the inlet 324 and across the turbine 306, thereby operatively rotating the turbine 306. The first and second bushing housings 364a, 364b are positioned on opposite lateral sides of the turbine housing 362 and configured to fixedly engage first and second bushings of the turbine 306, discussed in greater detail in connection with FIGS. 34-54. The rear opening 366 is configured to have a screen 368 inserted therein so that water can flow into the lower middle body 312.

Figure 19:
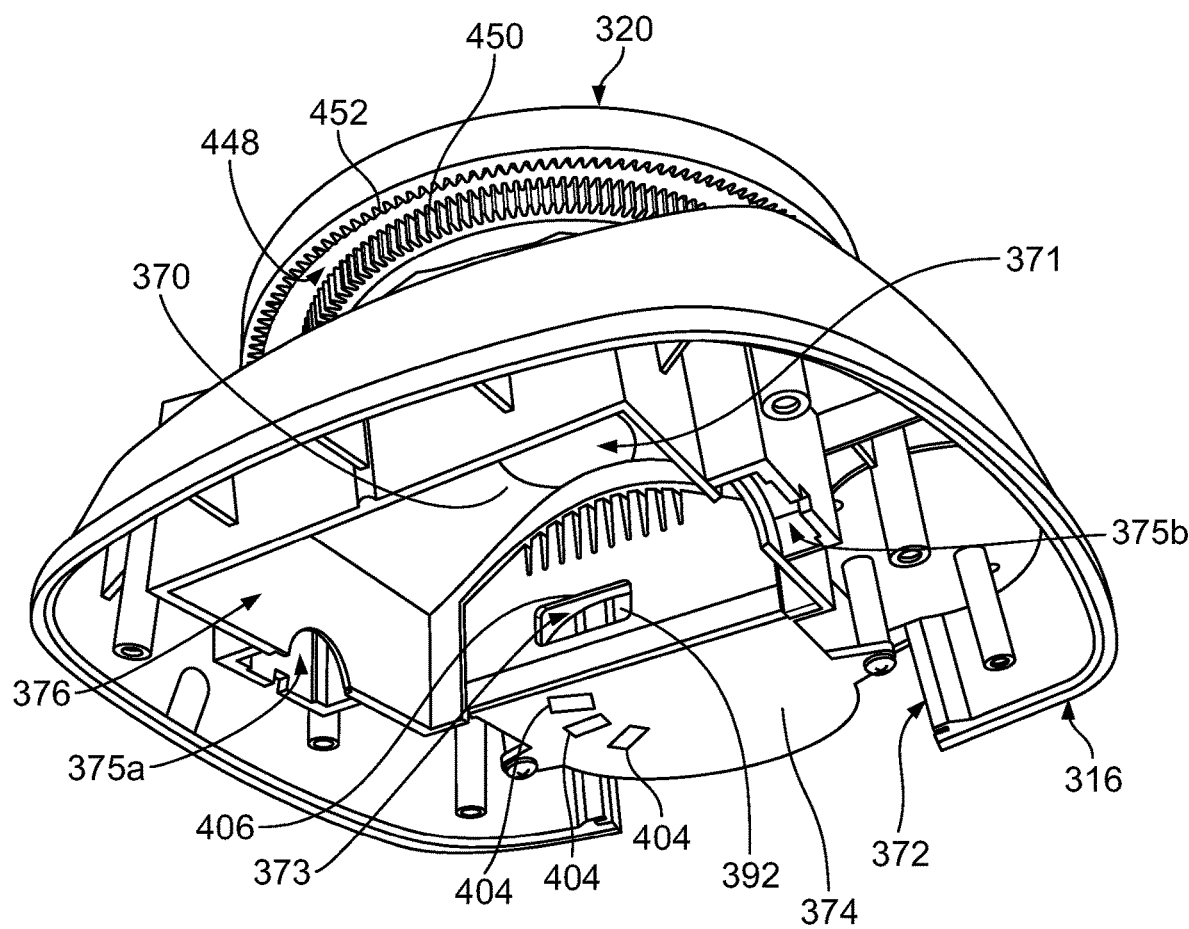
FIG. 19 is a bottom rear perspective view of the upper middle body and steering system of FIG. 17A.

As shown in FIG. 16, and further illustrated in FIG. 19, the upper middle body 316 is configured to be attached to the lower middle body 312 to encase the turbine 306, and generally includes an outlet boss 370 defining an outlet 371, and a rear opening 372. The upper middle body 316 further houses the steering turbine assembly 314, which is secured in a steering turbine chamber 373 (see FIG. 19) by a plate 374. Additionally, the upper middle body 316 includes first and second bushing housings 375a, 375b (see FIG. 19) that are configured to be placed adjacent to the first and second bushing housings 364a, 364b of the lower middle body 312 and fixedly secure the first and second bushings of the turbine 306 when the upper middle body 316 is engaged with the lower middle body 312. The rear opening 372 (FIG. 19) is configured to have the screen 368 inserted therein such that the screen 368 is secured between the rear openings 366, 372 and water can flow into the upper and lower middle bodies 312, 316. As shown in FIG. 19, the upper middle body 316 includes a turbine housing 376 that is configured to be placed adjacent to the lower middle body turbine housing 362 when the upper middle body 316 is engaged with the lower middle body 312. The turbine housing 376 houses a portion of the turbine 306 and is in fluidic communication with the outlet 371 and the lower middle body turbine housing 362. Accordingly, a continuous first flow path is provided from the inlet 324 at the bottom of the lower body 302 to the outlet boss 370 of the upper middle body 316 that passes across the turbine 306.

Figure 17:
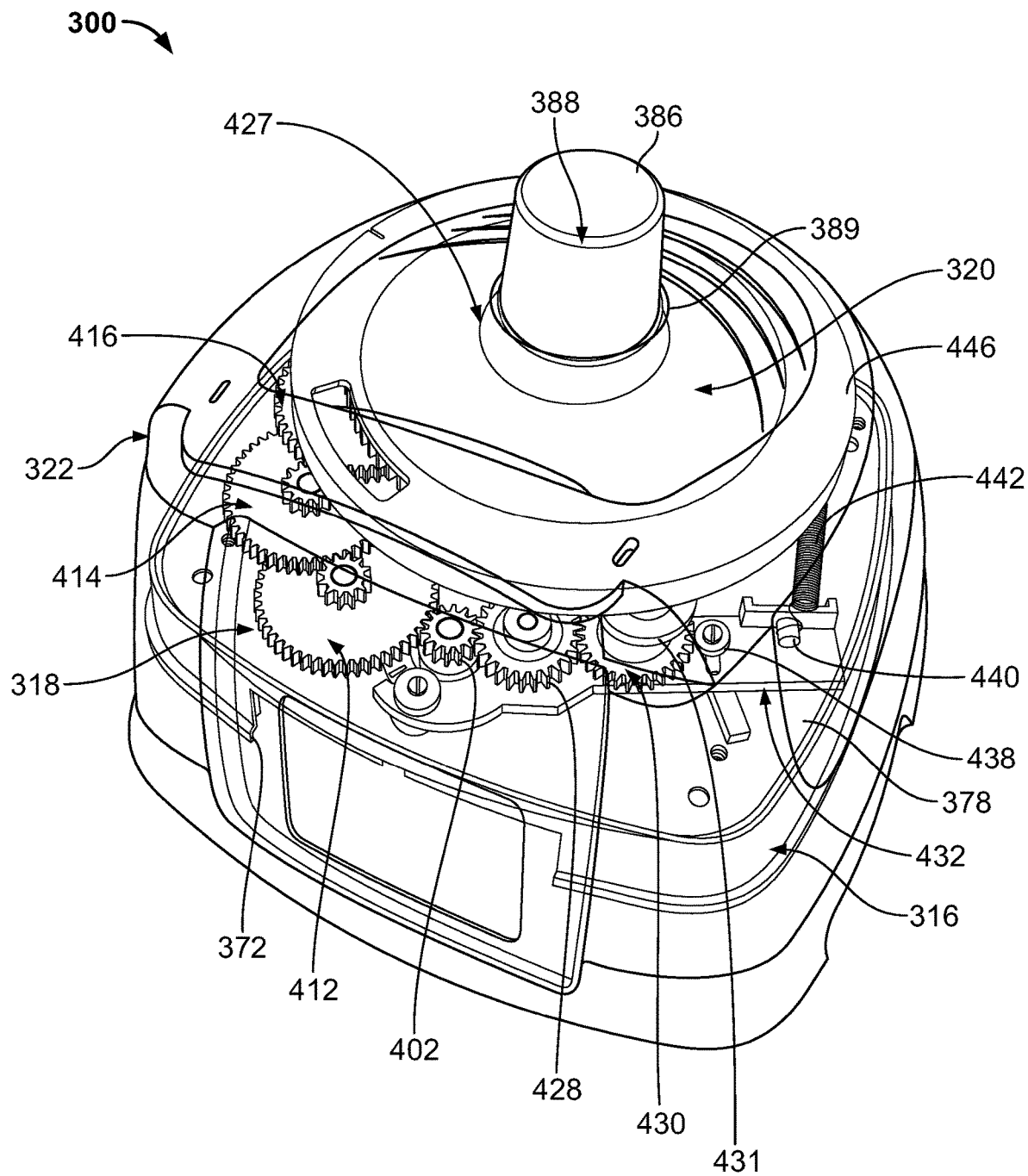
FIG. 17 is a top rear perspective view of the upper middle body, steering system, and top shell of the suction cleaner of FIG. 16.
Figure 18:
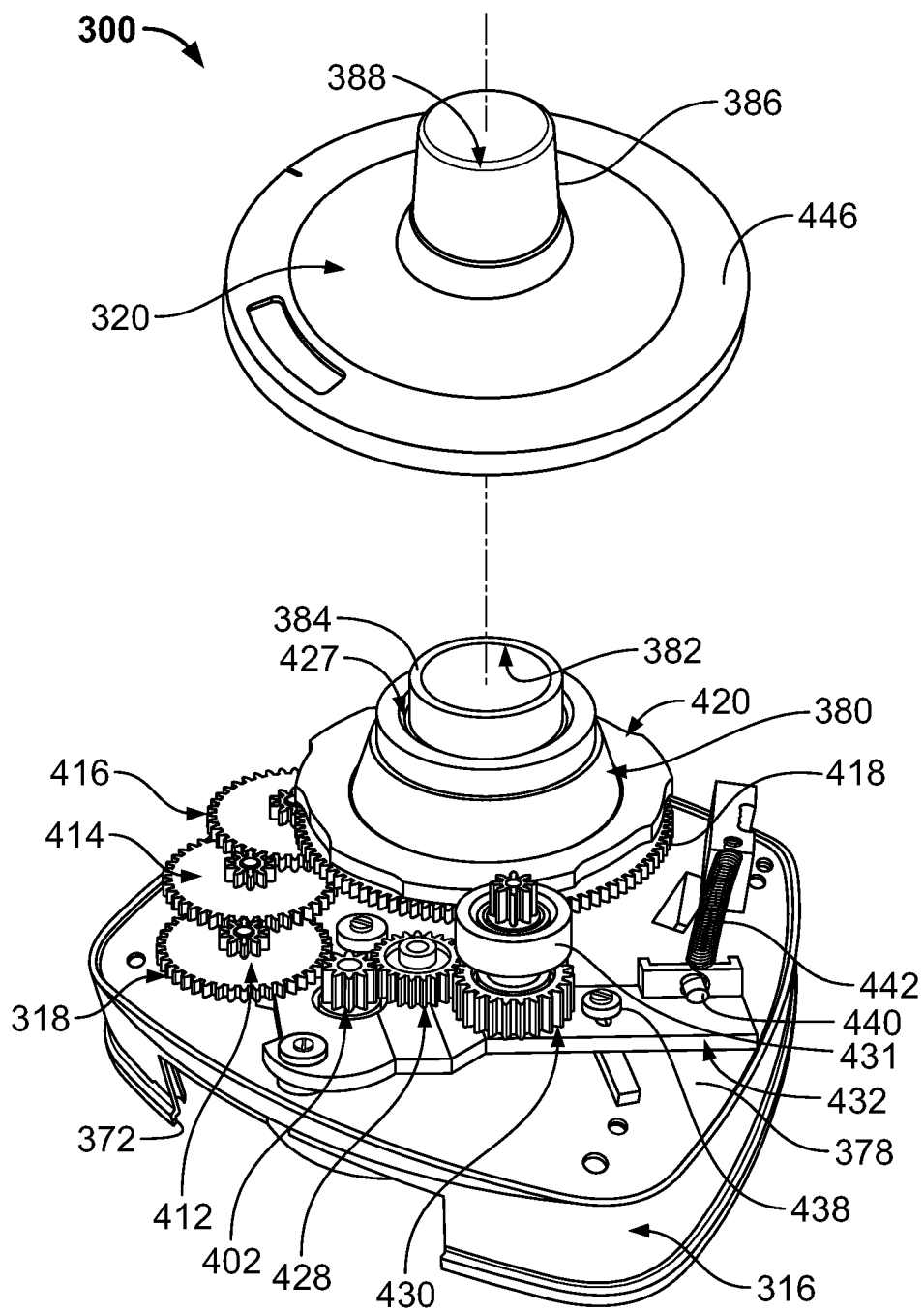
FIG. 18 is a partially exploded top rear perspective view of FIG. 17 with the top shell not shown.

As shown in FIGS. 16-18, the steering system 318 is positioned on and engaged with a top surface 378 of the upper middle body 316. The steering system 318 is a gearing assembly that is utilized to steer the cleaner 300, and is discussed in greater detail below in connection with FIGS. 17-25C. Still with reference to FIG. 16, the steering system 318 includes a cam mechanism 380 and the nose cone 320. The cam mechanism 380 includes a central opening 382 extending through a boss 384. The cam mechanism 380 is positioned on the upper middle body outlet boss 370 (see FIGS. 19-23) such that the outlet boss 370 is partially inserted into, and coaxial with, the cam mechanism boss 384 such that the cam mechanism 380 can rotate about the outlet boss 370 and water that flows through the outlet boss 370 will also flow through the cam mechanism boss 384. Similarly, the nose cone 320 includes a nose 386 defining an outlet passage 388 extending therethrough. The nose cone 320 is positioned on the cam mechanism boss 384 such that the cam mechanism boss 384 is partially inserted into, and coaxial with, the nose 386 so that the nose cone 320 can rotate about the cam mechanism boss 384 and water that flows through the cam mechanism boss 384 will also flow through the nose 386 (see FIGS. 19-23). The nose 386 of the nose cone 320 is configured to have a hose engaged therewith. In such an arrangement, a continuous path for water is provided from the inlet 324 at the bottom of the lower body 302 to the nose 386 and hose attached thereto, e.g., the first flow path. Accordingly, suction that is provided by the hose will pull water into the inlet 324, through the cleaner 302, and into the hose.

Still with reference to FIG. 16, the top shell 322 includes a top opening 389 and is configured to be positioned over the steering system 318 and engaged with the upper middle body 316, such that the nose 386 extends through the top opening 389. Accordingly, the top shell 322 secures the steering system 318 therein. Additionally, the top shell 322 generally restrains the nose cone 320, and therefore the cam mechanism 380 due to the interaction between the cam mechanism 380 and the nose cone 320, from lateral and vertical movement so that the steering system 318 does not become disengaged.

Figure 17A:
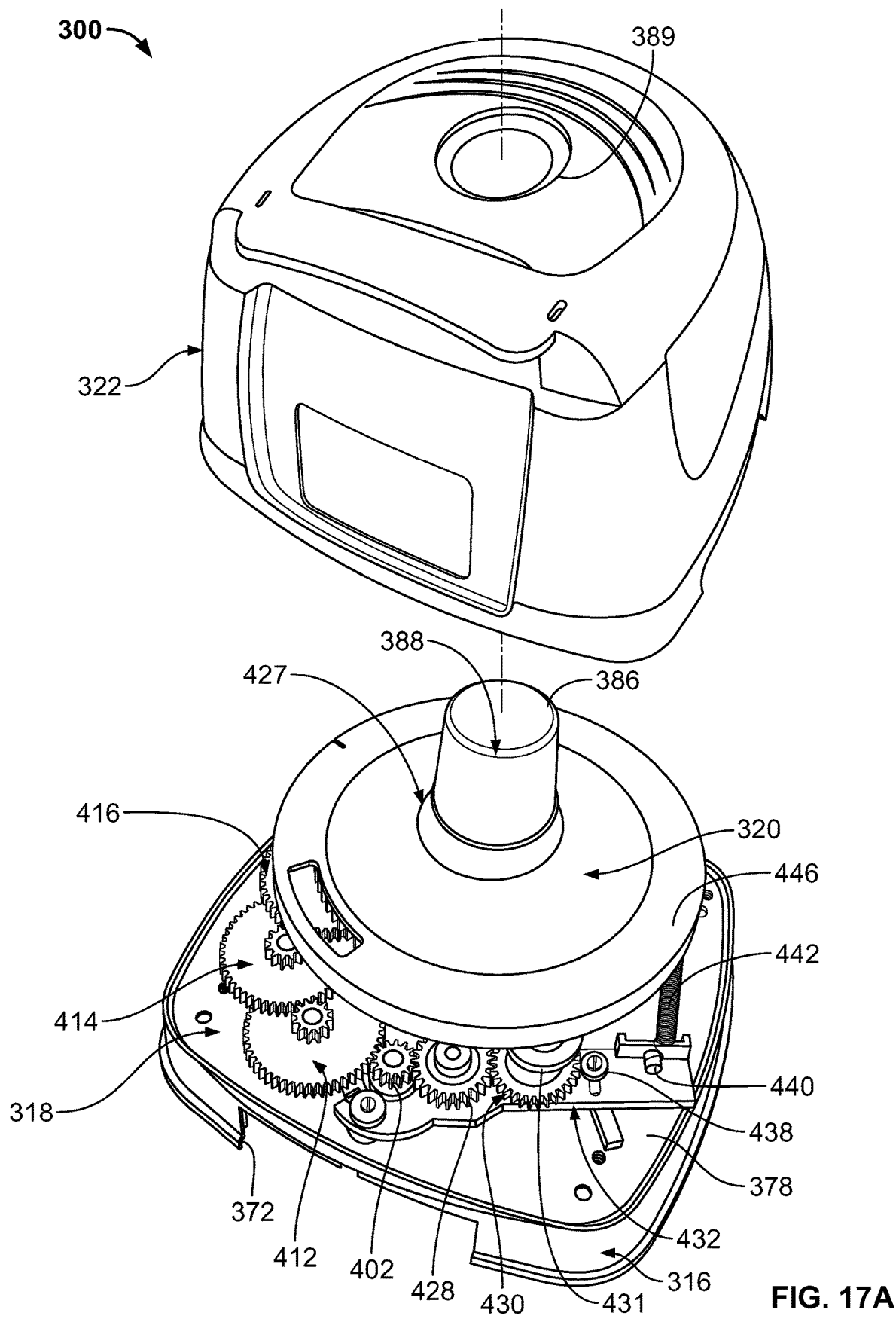
FIG. 17A is a partially exploded top rear perspective view of FIG. 17.

With specific reference to FIGS. 17-25C, the steering system 318 of the present disclosure is discussed in greater detail. FIG. 17 is a top rear perspective view of the upper middle body 316, top shell 322 (shown as constructed from a transparent material, e.g., plastic), and the steering system 318. FIG. 17A is a top rear perspective view of the upper middle body 316 and the steering system 318, e.g., FIG. 17A is the perspective view of FIG. 17 with the top shell 322 exploded. FIG. 18 is a partially exploded top rear perspective view of FIG. 17 showing the upper middle body 316, top shell 322, and the steering system 318. FIG. 19 is a bottom rear perspective view of the upper middle body 316. FIGS. 20-23 are respectively rear, front, right side, and left side views of the upper middle body 316 and steering system 318 with FIG. 20 including a cut-out showing the steering turbine assembly 314.

As previously detailed in connection with FIG. 16, the steering system 318 is generally positioned on top of and engaged with the top surface 378 of the upper middle body 316. The steering system 318 includes the steering turbine assembly 314, a steering drive mechanism 390, the cam mechanism 380, and the nose cone 320. The steering turbine assembly 314 is generally housed in the steering turbine chamber 373 (see FIGS. 19 and 20) and secured therein by the plate 374 that is secured to the interior of the upper middle body 316.

Figure 20:
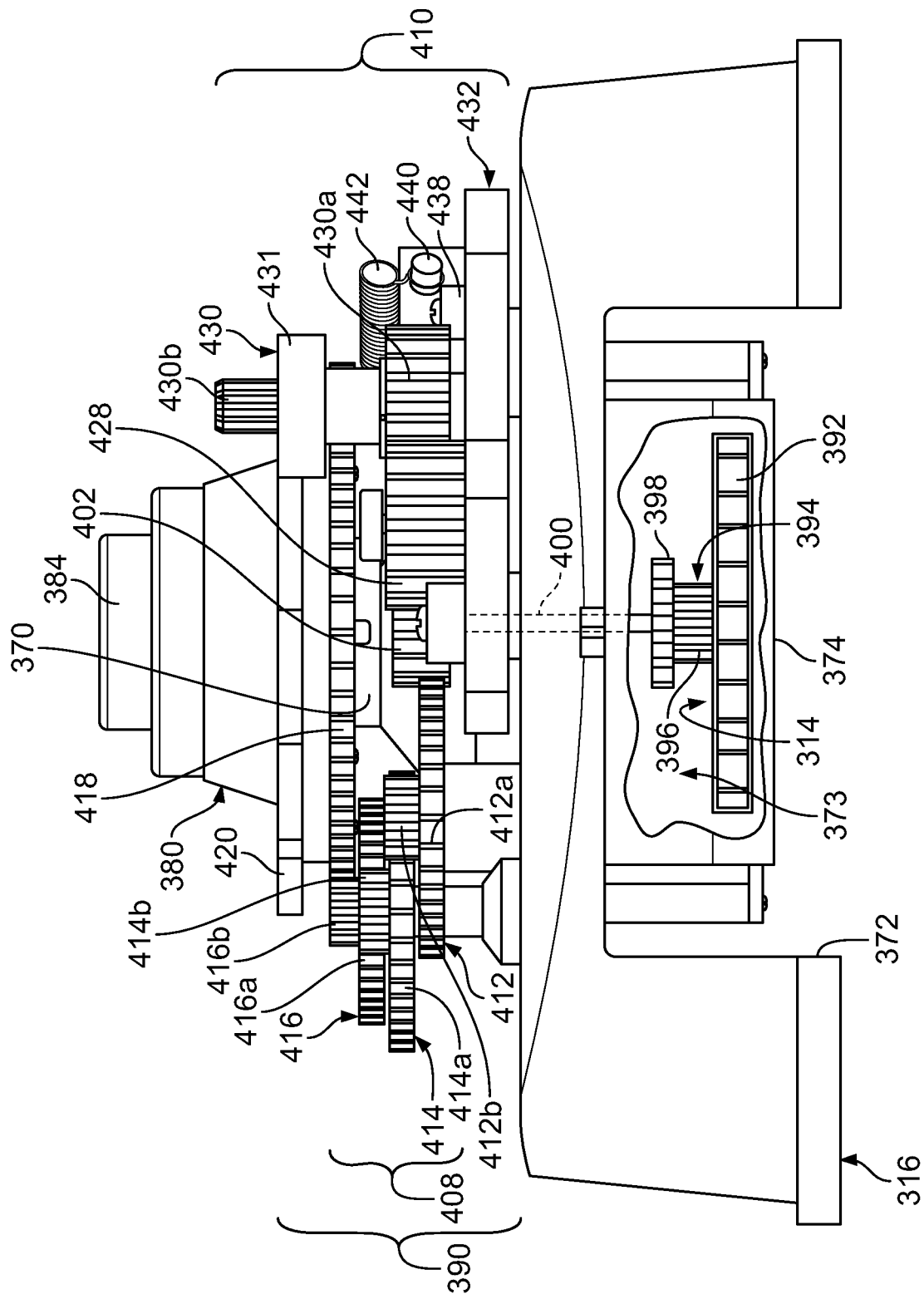
FIG. 20 is a rear view of steering system of FIG. 17A including a cut out showing a steering turbine that drives the steering system.
Figure 21:
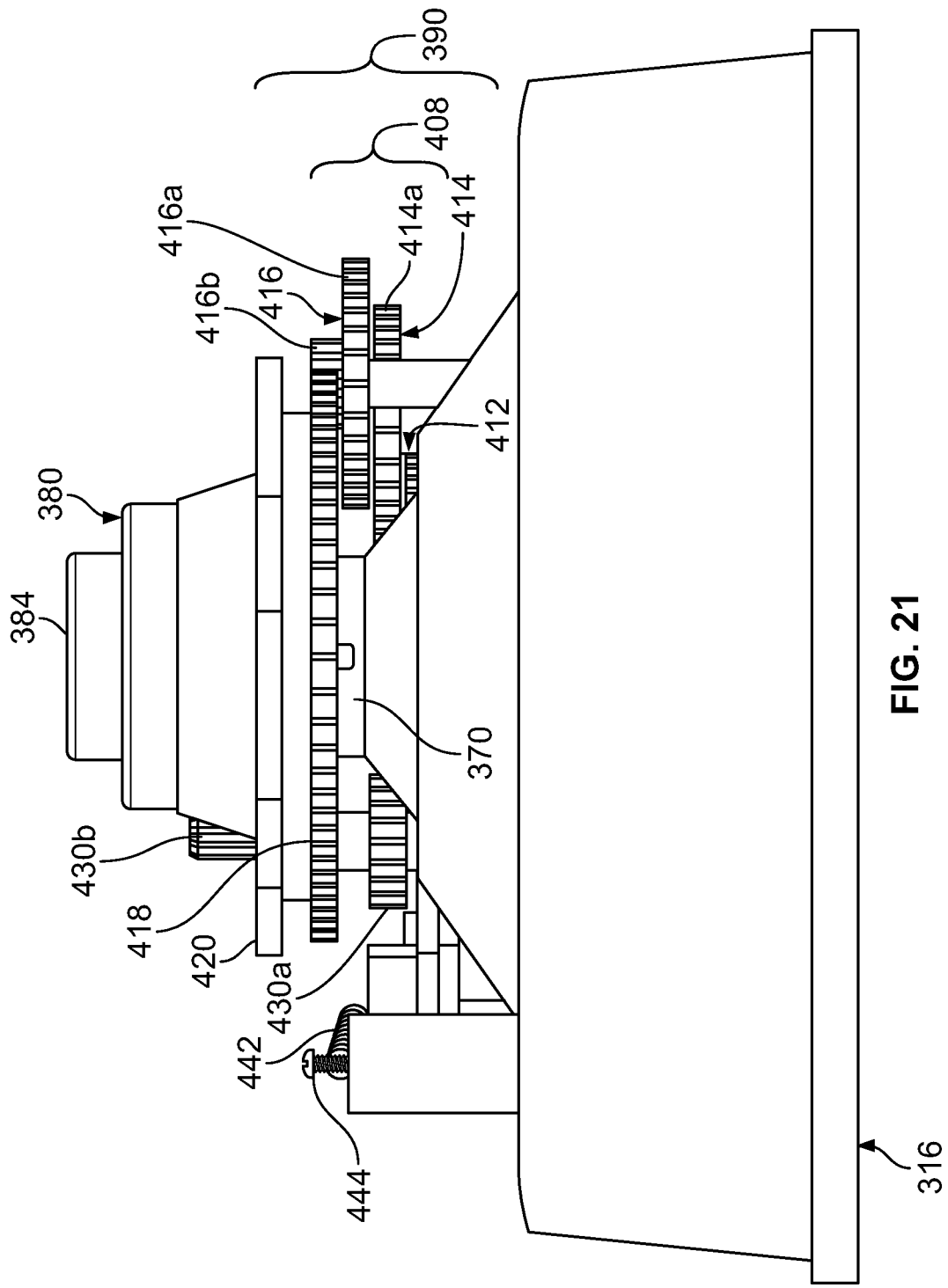
FIG. 21 is a front view of the steering system of FIG. 17A.
Figure 22:
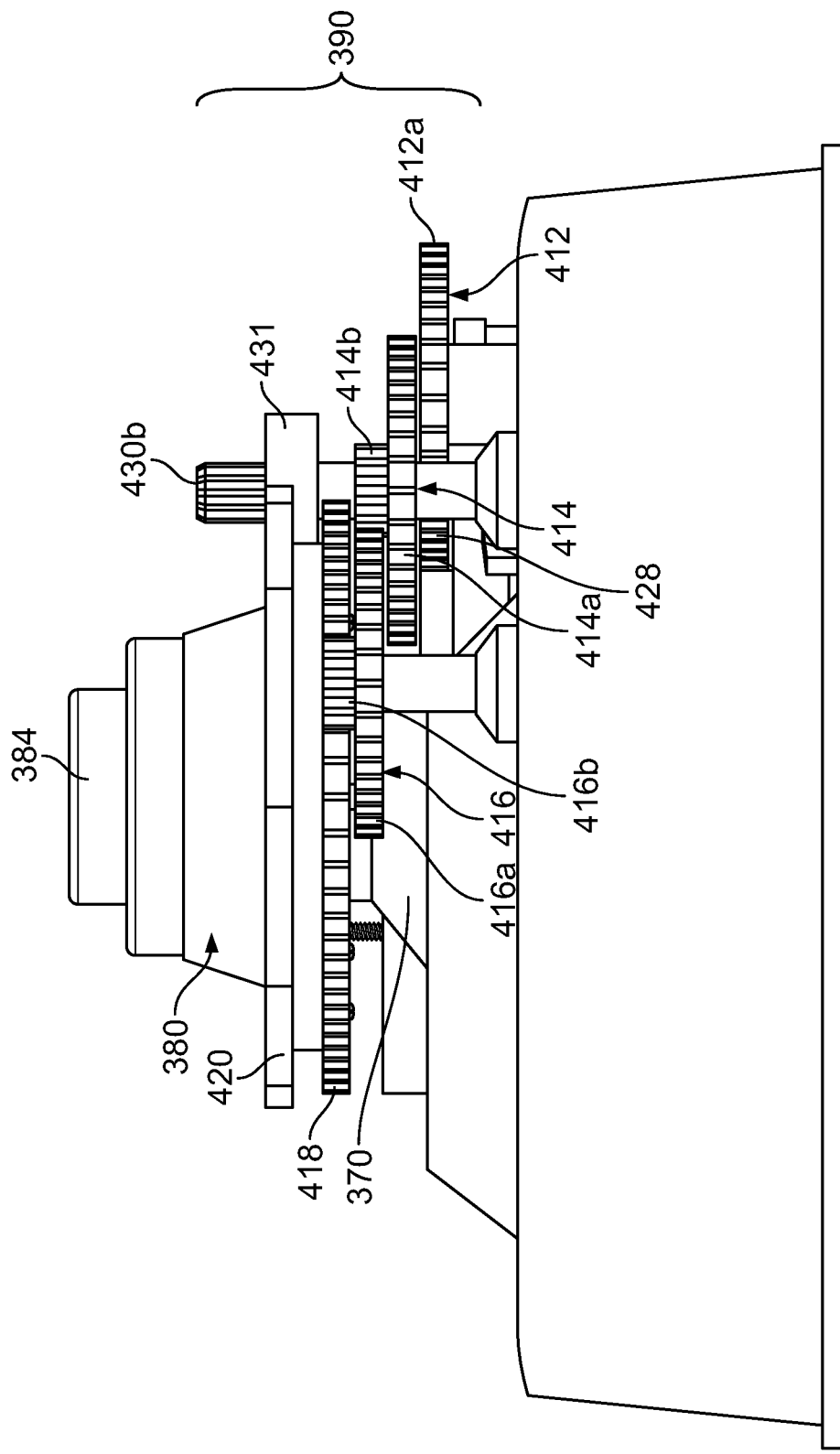
FIG. 22 is a right side view of the steering system of FIG. 17A.
Figure 23:
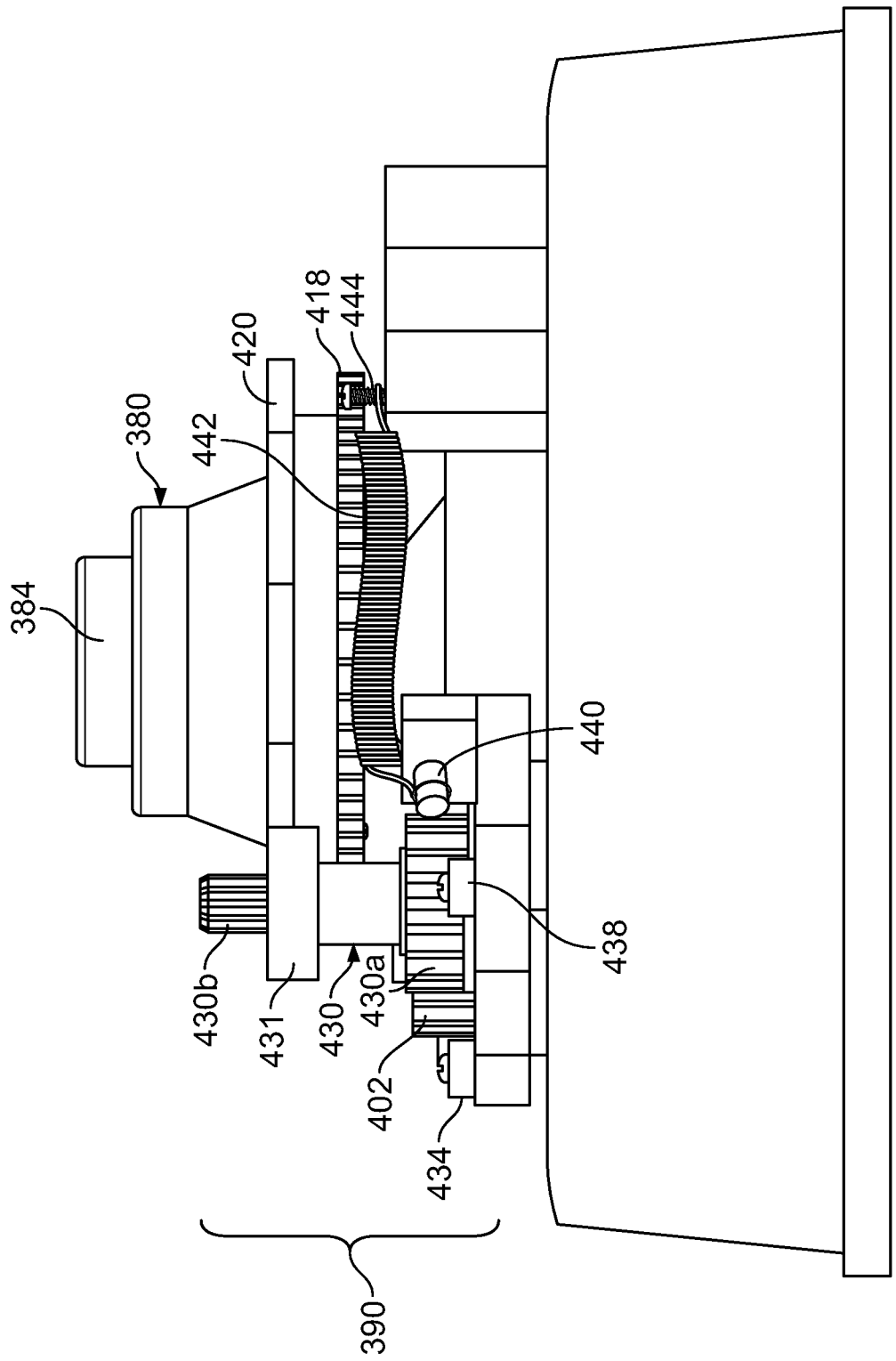
FIG. 23 is a left side view of the steering system of FIG. 17A.

As shown in FIG. 20, the steering turbine assembly 314 includes a steering turbine 392 and a compound drive gear 394 engaged with the steering turbine 392. The compound drive gear 394 includes a pinion 396 extending from and coaxial with the steering turbine 392 and a translation gear 398 that is meshed with the pinion 396 such that rotation of the pinion 396 results in rotation of the translation gear 398. The translation gear 398 includes a coaxial shaft 400 extending upwardly therefrom that extends through the upper middle body 316, and includes a main rotatable member (input gear) 402 engaged to an end opposite to where the shaft 400 engages the translation gear 398. The translation gear 398, the coaxial shaft 400, and the main rotatable member 402 are operatively connected such that rotation of the translation gear 398 is translated to the main rotatable member 402 by the coaxial shaft 400. Accordingly, rotation of the steering turbine 392 rotates the pinion 396, which drives the translation gear 398, which in turn drives the main rotatable member 402. The main rotatable member 402 is the main driving component of the steering drive mechanism 390, which is discussed in greater detail below.

With reference to FIG. 19, the plate 374 includes one or more inlet openings 404 that allow fluid to enter the steering turbine chamber 373 and rotate the steering turbine 392. More specifically, water is pulled through the screen 368 (see FIG. 16), which is positioned in the rear openings 366, 372, into the lower and upper middle bodies 312, 316, through the inlet openings 404, and into the steering turbine chamber 373. The steering turbine chamber 373 also includes an outlet 406 that is adjacent the turbine housing 376 such that a second flow path is created in which the water flowing into the steering turbine chamber 373 exits the steering turbine chamber 373 through the outlet 406 and into the turbine housing 376 where it is introduced into and mixed with the water flowing through the cleaner 300 in the first flow path. Accordingly, suction from an associated hose not only pulls fluid through the inlet 324 of the lower body 302 and through the first flow path, but also through the rear openings 366, 372 to drive the steering turbine 392, which in turn rotates the main rotatable member 402, and into the steering turbine chamber 373, e.g., the second flow path.

Referring to FIGS. 20-23, and generally to FIG. 20, the steering drive mechanism 390 includes a cam drive train 408 and a steering drive train 410, both being operatively engaged with the main rotatable member 402. Generally, the cam drive train 408 operatively engages the cam mechanism 380 and the steering drive train 410 operatively engages the nose cone 320, which, as discussed above, is secured within the cleaner 300 and to a hose for steering the cleaner 300 in a plurality of directions with respect to the hose. The cam drive train 408 includes a set of reduction gears 412, 414, 416 that each include a driven gear 412a, 414a, 416a and a drive gear 412b, 414b, 416b, which are operatively engaged in sequence to reduce the angular velocity output and increase the torque output. The third drive gear 416b meshes with and engages a cam drive gear 418 of the cam mechanism 380.

The cam mechanism 380 includes a cam wheel 420 rotatably secured with respect to the upper middle body 316 and operatively connected to the nose cone 320 for switching between steering modes. The cam mechanism 380 can be a unitary structure including the cam wheel 420 and the cam drive gear 418, which are coaxial with one another. Accordingly, the cam wheel 420 is rotated as the cam drive gear 418 is driven by the third drive gear 416b. The cam wheel 420 is similar in structure to the cam wheel 224 illustrated in FIG. 9. In accordance therewith, the cam wheel 420 includes outer-profile regions of greater and lesser radii each corresponding to one of the directions of the nose cone 320. As illustrated in FIG. 9, the cam wheel 420 has three outer-profile regions of lesser 422, medium 424, and greater 426 radii each corresponding to one of the steering directions, which is discussed in greater detail below. The cam mechanism 380 can also include a bearing 427 (see FIG. 24) between the cam wheel 420 and cam drive gear 418 combination, and the cam mechanism boss 384 such that the cam wheel 420 and cam drive gear 418 conjointly rotate about the boss 384, which can be secured in place in contact with the outlet boss 370 of the upper middle body 316.

Still with reference to FIGS. 20-23, the steering drive train 410 includes an idler gear 428 and a combination gear 430 having a driven gear 430a and a pinion drive gear 430b. The driven gear 430a and the pinion drive gear 430b are coaxial and engaged with one another such that rotation of the driven gear 430a results in rotation of the pinion drive gear 430b. The idler gear 428 is operatively meshed with the main rotatable member 402 and the reduction gear driven gear 430a, such that the idler gear 428 transfers rotation of the main rotatable member 402 to the driven gear 430a and thus the pinion gear 430b. The combination gear 430 also includes a roller 431 positioned between the driven gear 430a and the pinion drive gear 430b. The roller 431 is coaxial with the driven gear 430a and the pinion drive gear 430b, and rotatable about the axis shared between the driven gear 430a, the pinion drive gear 430b, and the roller 431. The roller 431 is configured to engage the outer-profile regions 422, 424, 426 of the cam wheel 420 to ride there along. The steering drive train 410 is mounted on a spring-biased swivel arm 432. The swivel arm 432 is pivotally mounted to the top surface 378 of the upper middle body 316 at a pivot 434. The pivot 434 is generally placed at a location such that the swivel arm 432 can rotate about the pivot 434 while maintaining the steering drive train 410 in operative engagement with, e.g., meshed with, the main rotatable member 402. The swivel arm 432 further includes a slot 436 that is engaged by a pin 438 extending from the top surface 378 of the upper middle body 316. The slot 436 and pin 438 restrict the angular motion of the swivel arm 432 so that it can only rotate a predetermined amount. The swivel arm 432 also includes a pin 440 that secures a spring 442 that is also secured to a pin 444 extending from the top surface 378 of the upper middle body 316. The spring 442 bias the swivel arm 432 so that the roller 431 is biased against and into contact with the outer-profile regions 422, 424, 426 of the cam wheel 420 to ride there along, thereby moving the pinion gear 430b between multiple steering positions.

In another aspect of the present disclosure, the spring-biased swivel arm 432 can include a deformable arm that provides the spring-biasing force on the swivel arm 432. The deformable arm can be formed as a compliant mechanism with the swivel arm 432. For example, the deformable arm can extend from the swivel arm 432 and be compressed (e.g., elastically deformed) against, for example, a wall when swivel arm 432 is forced outward through engagement of the roller with the cam wheel 420. The compression, e.g., elastic deformation, of the deformable arm generates a force that biases the swivel arm 432 so that the roller 431 is biased against and into contact with the outer-profile regions 422, 424, 426 of the cam wheel 420 to ride there along, thereby moving the pinion gear 430b between multiple steering positions.

Figure 24:
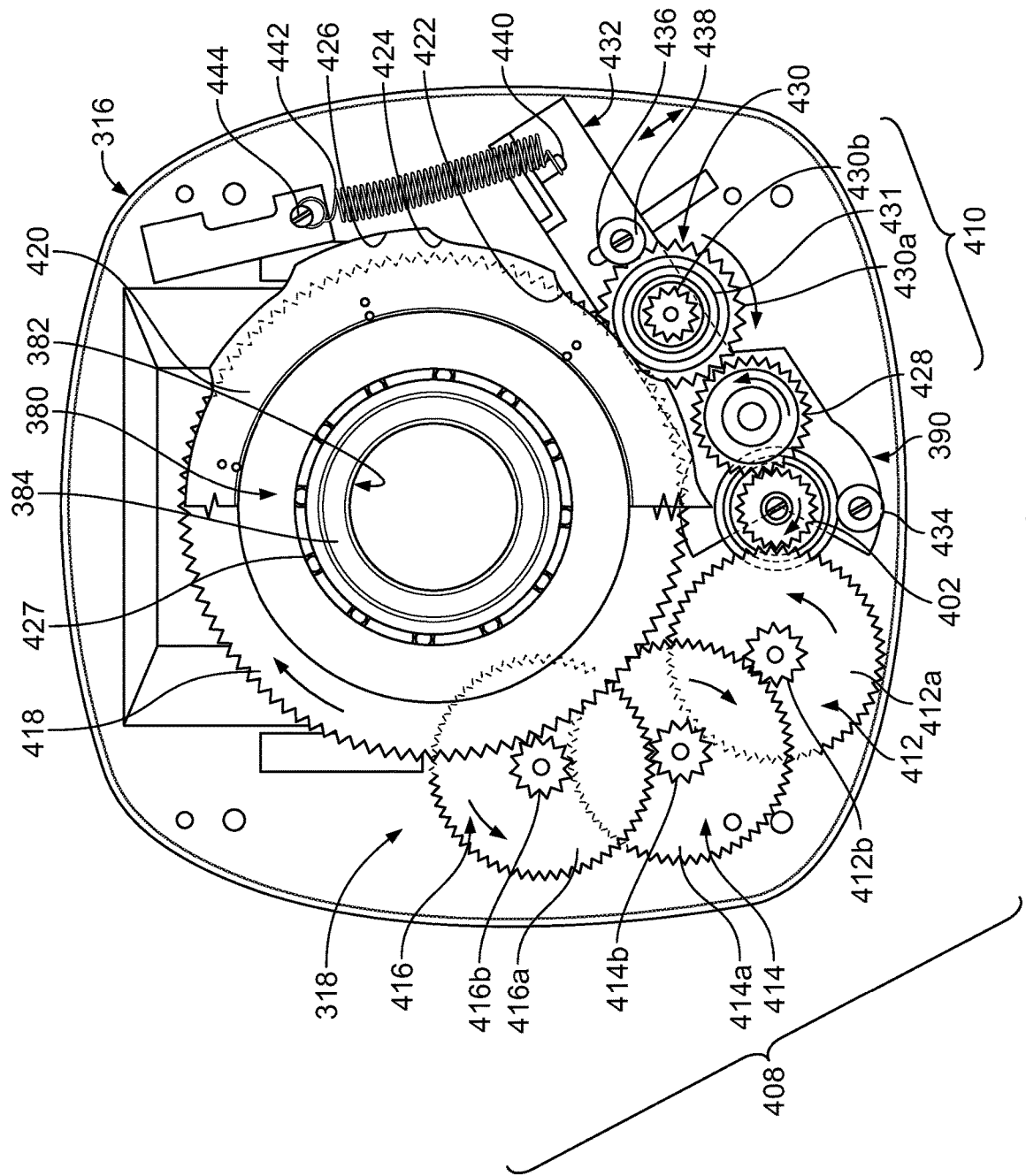
FIG. 24 is a top view of the steering system of FIG. 17A with the cam wheel partially cut-away to show the underlying cam gear that is conjoint with the cam wheel.

Interaction and connectivity of the gears of the steering assembly 318 is further illustrated in FIG. 24, which is a top view of the steering system 318 with the cam wheel 420 partially cut-away to show the underlying cam gear 418 that is conjoint with the cam wheel 420. Additionally, FIG. 24 shows the engagement between the cam drive gear 418 and the third drive gear 416b of the cam drive train 408, as well as the engagement of the cam wheel 420 with the roller 431. More specifically, as the cam wheel 420 is rotated by the cam drive train, the roller 431 rides there along and transfers between the lesser radii 422, middle radii 424, and greater radii 426 sections of the cam wheel 420 as they are rotated into contact with the roller 431. When the roller 431 is engaged with the lesser radii section 422 of the cam wheel 420, due to the bias implemented by the spring 442, the pinion gear 430b is in a first position (see FIG. 25A) that is radially closer to the rotational axis of the cam wheel 420 than a second and third position. When the roller 431 is engaged with the medium radii section 424 of the cam wheel 420, due to the bias implemented by the spring 442, the pinion gear 430b is in the second position (see FIG. 25B) that is radially closer to the rotational axis of the cam wheel 420 than the third position but radially further than the first position. When the roller 431 is engaged with the greater radii section 426 of the cam wheel 420, due to the bias implemented by the spring 442, the pinion gear 430b is in the third position (see FIG. 25C) that is radially further from the rotational axis of the cam wheel 420 than the first and second positions.

Figure 25A:
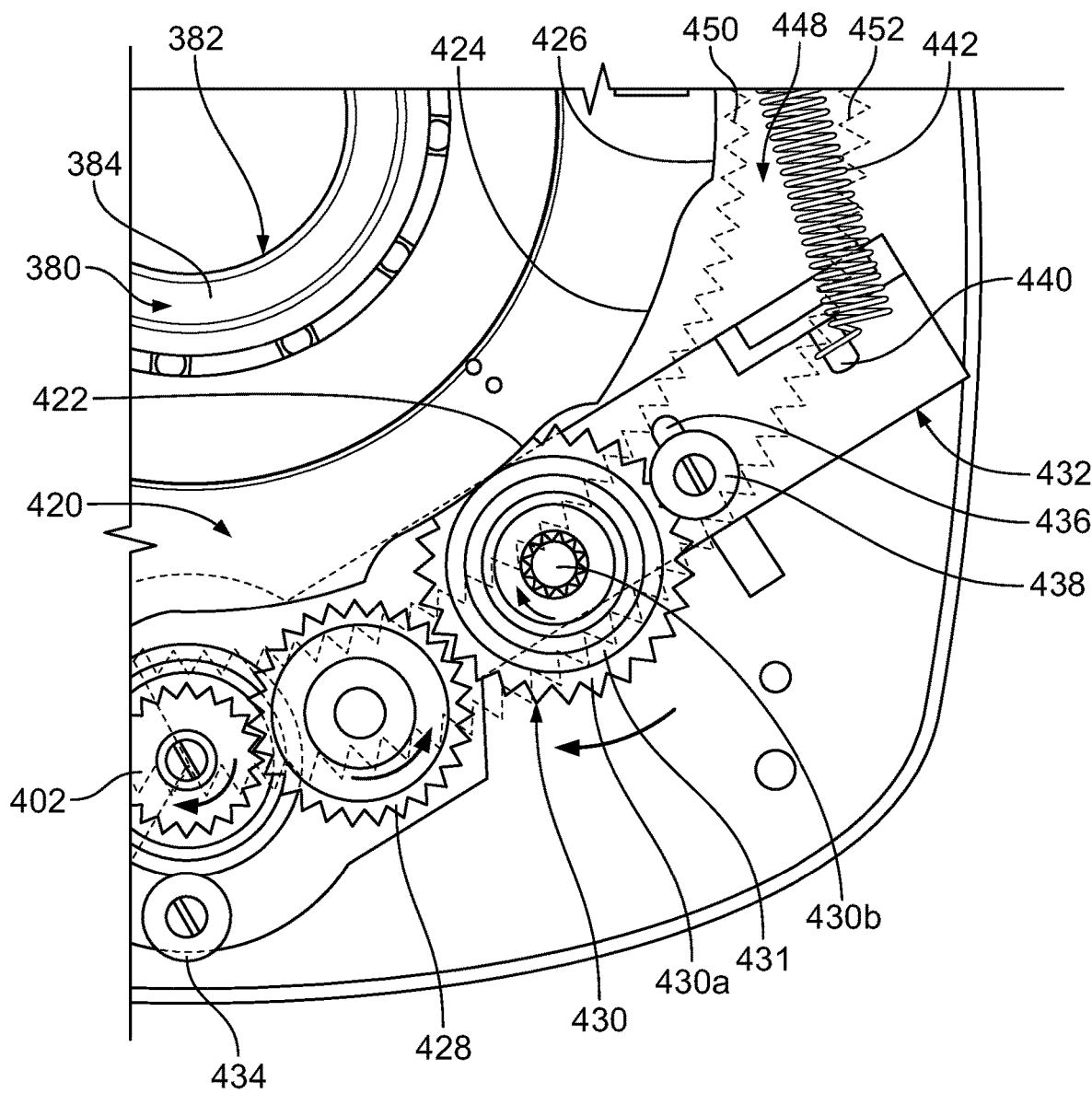
FIG. 25A is a partial top schematic view of a portion of the steering system of FIG. 24 showing a pinion gear and associated roller engaging a lesser radii region of a cam wheel and positioned in a first position.
Figure 25B:
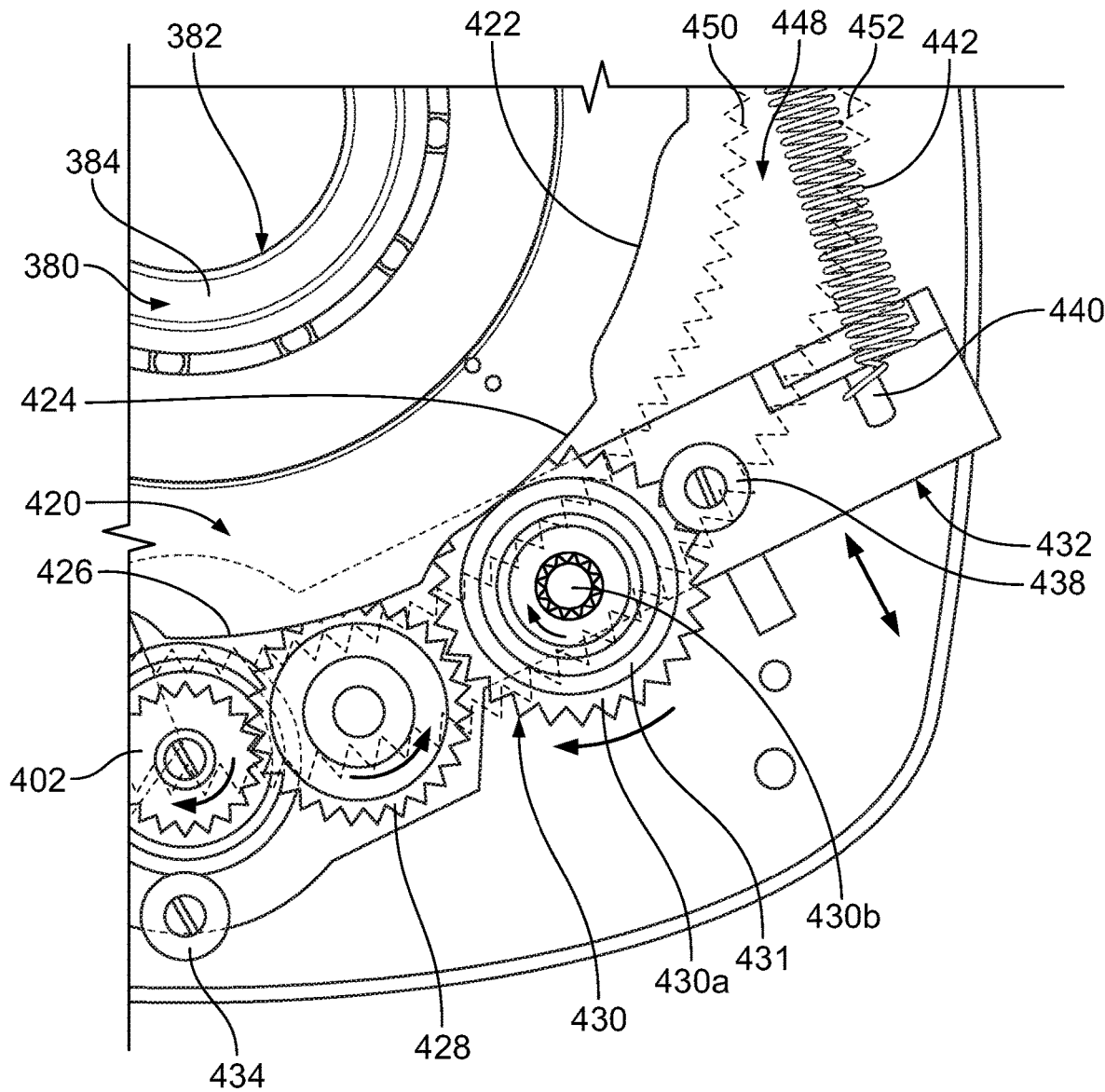
FIG. 25B is a partial top schematic view of a portion of the steering system of FIG. 24 showing the pinion gear and associated roller engaging a middle radii region of a cam wheel and positioned in a second position.
Figure 25C:
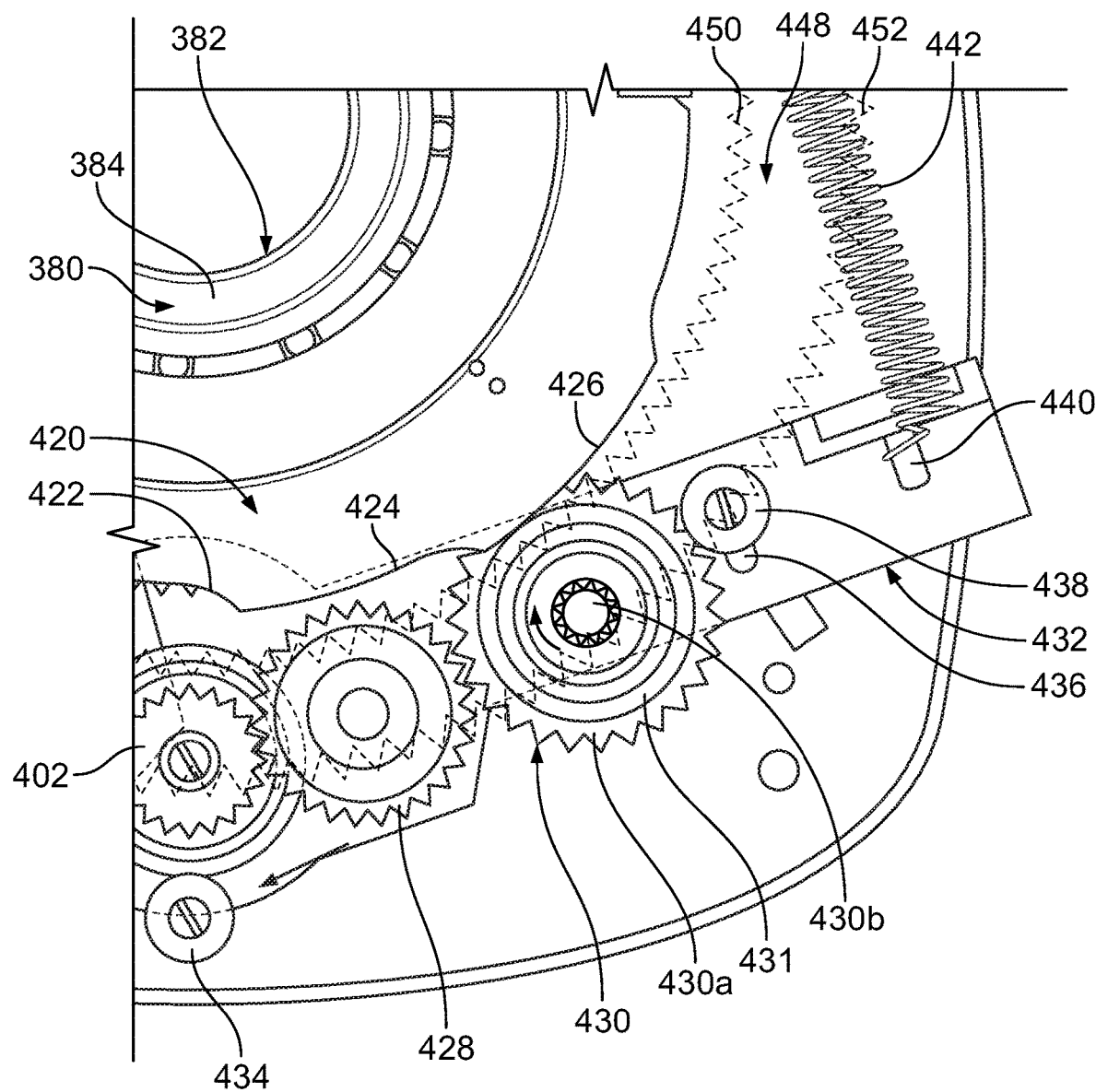
FIG. 25C is a partial top schematic view of a portion of the steering system of FIG. 24 showing the pinion gear and associated roller engaging a greater radii region of a cam and positioned in a third position.

The nose cone 320 includes the nose 386, a radial plate 446 (see FIG. 17A), and a gear track cavity 448 (see FIG. 19) on the underside of the radial plate 446 at the radial edge thereof that is defined by a first (inner) gear track 450 and a second (outer) gear track 452 (see FIG. 19). The first and second gear tracks 450, 452 are utilized for steering the movement of the cleaner 300 with respect to the hose attached to the nose 386 of the nose cone 320. As discussed above in connection with FIG. 20, the pinion gear 430b is rotatably driven by the steering drive train 410 and is positioned in one of the three steering positions, e.g., the first, second, and third positions, by the cam wheel 420 engaging the roller 431. As discussed previously in connection with FIG. 16, the nose cone 320 is positioned in the cleaner 300 so that it is on top of the cam mechanism 380, with the cam mechanism boss 384 extending into the nose 386 of the nose cone 320, and the nose cone rotates about the cam mechanism boss 384. When in this position, the pinion gear 430*b* is positioned within the gear track cavity 448. FIGS. 25A, 25B, and 25C are partial top schematic views showing positioning of the pinion gear 430*b* with respect to the first and second gear tracks 450, 452 when in each of the first, second, and third positions respectively.

As shown in FIG. 25A, which illustrates a first position of the pinion gear 430*b*, when the pinion gear 430*b* is in the first position, e.g., the roller is engaged with the lesser radii section 422 of the cam wheel 420, the pinion gear 430*b* is meshed and engaged with the first (inner) gear track 450 to rotationally drive the nose cone 320 which is held by the hose. Because the nose cone 320 is secured with the hose, and because the pinion gear 430*b* is engaged with the first (inner) gear track 450, the cleaner 300 will be steered to turn clockwise. More specifically, the entire cleaner 300 rotates clockwise about the nose cone 320 and the hose.

As shown in FIG. 25B, which illustrates a second position of the pinion gear 430*b*, when the pinion gear 430*b* is in the second position, e.g., the roller is engaged with the middle radii section 424 of the cam wheel 420, the pinion gear 430*b* is positioned in the middle of the gear track cavity 448 and is not engaged with either of the first or second gear tracks 450, 452 and the nose cone 320, which is held by the hose, is not rotationally driven. In such a configuration, the cleaner 300 does not rotate about the hose but instead moves in a straight/forward direction.

As shown in FIG. 25C, which illustrates a third position of the pinion gear 430*b*, when the pinion gear 430*b* is in the third position, e.g., the roller is engaged with the greater radii section 426 of the cam wheel 420, the pinion gear 430*b* is meshed and engaged with the second (outer) gear track 452 to rotationally drive the nose cone 320 which is held by the hose. Because the nose cone 320 is secured with the hose, and because the pinion gear 430*b* is engaged with the second (outer) gear track 452, the cleaner 300 will be steered to turn counter-clockwise. More specifically, the entire cleaner 300 rotates counter-clockwise about the nose cone 320 and the hose.

It should be understood by one of ordinary skill in the art that the rotation direction of the pinion gear 430*b*, e.g., clockwise vs. counter-clockwise, can be controlled through the inclusion or exclusion of idler gears, such as idler gear 428 (see FIG. 24). In doing so, one can adjust which of the first and second gear tracks 450, 452 rotates the cleaner 300 in a clockwise direction and which rotates the cleaner 300 in a counter-clockwise direction.

In operation, the cleaner 300 is connected with an external pumping system by a hose that is connected with the nose 386 of the nose cone 320. The external pumping system provides a source of suction through the hose to provide a suction to the pool cleaner 300. The suction provided by the hose causes water to flow into the cleaner 300 from at least two spots. First, water is pulled into the cleaner 300 through the inlet 324 of the lower body 302. Second, water is pulled into the cleaner 300 through the screen 368 that is inserted therein and secured between the rear openings 366, 372.

In the first flow path, discussed in connection with FIGS. 16 and 19 above, the water flowing through the inlet 324 of the lower body 302 flows across the lower body 302 and into the turbine housing 362 of the lower middle body 312 and the turbine housing 376 of the upper middle body 316 (the two turbine housings 362, 376 essentially create a single space), which houses the drive turbine assembly 306. The water flows across the drive turbine assembly 306 and exits the upper middle body 316 through the outlet boss 370 and associated outlet 371. The water then flows through the central opening 382 of the cam mechanism 380, which is in fluidic communication with the outlet boss 370 and outlet 371 of the upper middle body 316. The water then flows out the opening 382 of the cam mechanism 380 and into the nose 386 of the nose cone 320 where it exits through the outlet 388 and enters the hose. Accordingly, a continuous flow path is provided from the inlet 324 at the bottom of the lower body 302 to the nose cone outlet 388 where it enters the hose, which passes across the turbine 306. This flow path is utilized to clean the surfaces, e.g., walls, of a pool or spa as debris is suctioned through the inlet 324, across the cleaner 300, and exits through the nose cone outlet 388. Additionally, this flow path is utilized to operate the turbine 306 which is interconnected with the walking pods 308*a*, 308*b* and causes the cleaner to "walk" across the pool surface.

In the second flow path, discussed in connection with FIGS. 16 and 19 above, the water is suctioned through the screen 368, which is positioned in the rear openings 366, 372, into the lower and upper middle bodies 312, 316, through the inlet openings 404, and into the steering turbine chamber 373. The water flowing into the steering turbine chamber 373 drives the steering turbine 392 causing it to rotate, which in turn rotates the main rotatable member 402 through the compound drive gear 394. The water flowing into the steering turbine chamber 373 exits the steering turbine chamber 373 through the outlet 406 and into the turbine housing 376 where it is introduced into and mixed with the water flowing through the cleaner 300, e.g., the water in the first flow path.

Again, with reference to FIGS. 19-24, and particularly, FIGS. 19, 20, and 24, as the flow of fluid along the second flow path causes the steering turbine 392 to rotate, the rotation of the steering turbine 392 causes the main rotatable member 402 to rotate. As detailed above, the main rotatable member 402 is drivingly engaged with both the cam drive train 408 and the steering drive train 410. Specifically, the main rotatable member 402 drives both the driven gear 412*a* of the first reduction gear 412, and the idler gear 428. Focusing on the cam drive train 408, rotation of the first driven gear 412*a* results in conjoint rotation of the first drive gear 412*b*, which is meshed with and drives the second driven gear 414*a* of the second reduction gear 414. Rotation of the second driven gear 414*a* results in conjoint rotation of the second drive gear 414*b*, which is meshed with and drives the third driven gear 416*a* of the third reduction gear 416. Rotation of the third driven gear 416*a* results in conjoint rotation of the third drive gear 416*b*, which is meshed with and drives the cam drive gear 418 of the cam mechanism 380. As such, the third drive gear 416*b* drivingly rotates the cam drive gear 418, which is conjointly engaged with the cam wheel 420. Thus, the third drive gear 416*b* also rotates the cam wheel 420. The cam wheel 420 is biased by the spring 442 into engagement with the roller 431, such that the roller 431 rides along the perimeter of the cam wheel 420 and is biased radially outward by the outer-profile regions of the cam wheel 420, e.g., the lesser radii region 422, the medium radii region 424, and the greater radii region 426. As the cam wheel 420 continues to rotate, the roller 431 alternates between engagement the lesser radii region 422, the middle radii region 424, and the greater radii region 426 as the regions continuously rotate past the roller 431. As discussed in detail above, the roller 431 is engaged and coaxial with a pinion drive gear 430b, which are both mounted on a swivel arm 432. Accordingly, engagement of the roller 431 with the different regions of the cam wheel 420, as shown in FIGS. 25A-25C, will cause the roller 431 and associated pinion drive gear 430b to rotate by way of the swivel arm 432. When the roller 431 is engaged with the lesser radii region 422 the pinion drive gear 430b is placed in a first position (see FIG. 25A), when the roller 431 is engaged with the middle radii region 424 the pinion drive gear 430b is placed in a second position (see FIG. 25B), and when the roller 431 is engaged with the greater radii region 426 the pinion drive gear 430b is placed in a third position (see FIG. 25C).

The nose cone 320 is positioned over the cam mechanism 380 so that the pinion drive gear 430b is placed within the gear track cavity 448 on the underside of the nose cone radial plate 446 (see FIGS. 17-19 and 25A-25C). When the pinion drive gear 430b is in the first position it meshes with the first (inner) gear track 450 of the nose cone 320 (see FIG. 25A), when the pinion drive gear 430b is in the second position it is in the center of the gear track cavity 448 and does not mesh with either the first or second gear track 450, 452 (see FIG. 25B), and when the pinion drive gear 430b is in the third position it meshes with the second (outer) gear track 452 of the nose cone (see FIG. 25C).

Turning now to operation of the steering drive train 410, and still with reference to FIGS. 19-24, and particularly, FIGS. 20 and 24, the main rotatable member 402 is meshed with and drives the idler gear 428 of the steering drive train 410. The idler gear 428 drives the driven gear 430a which is in conjoint rotation with the pinion drive gear 430b and the roller 431 such that rotation of the driven gear 430a results in rotation of the pinion drive gear 430b. Accordingly, rotation of the main rotatable member 402 results in the rotation of the pinion drive gear 430b, which, as described above, will be in one of three positions based on the roller's 431 engagement with the cam wheel 420. Thus, when in the first position the pinion drive gear 430b rotatably drives the inner gear track 450 of the nose cone 320 resulting in the cleaner 300 being steered to turn clockwise, when in the second position the pinion drive gear 430b does not rotatably drive the nose cone 320 resulting in the cleaner 300 traveling in a straight/forward direction, and when in the third position the pinion drive gear 430b rotatably drives the outer gear track 452 of the nose cone 320 resulting in the cleaner 300 being steered to turn counter-clockwise.

One of ordinary skill in the art will understand that the regions 422, 424, 426 of the cam wheel 420 can span different angular distances, e.g., have different lengths, such that the cleaner 300 can stay in different directions of movement for different amounts of time depending on a user's desire.

FIGS. 26-33 illustrate alternative applications of the steering system 318 of the present disclosure implemented with various types of suction-type pool cleaners.

Figure 26:
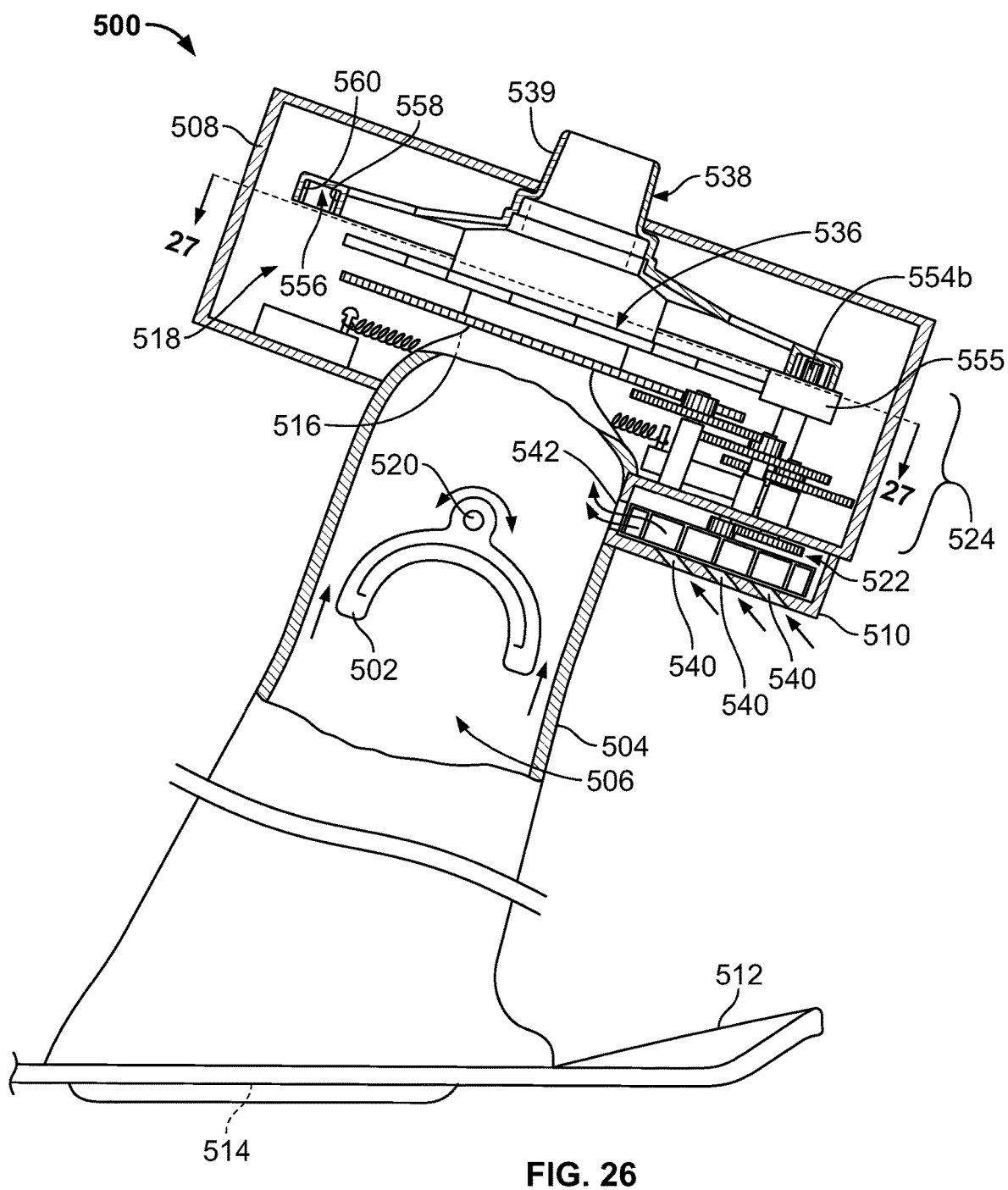
FIG. 26 is a diagrammatic partial sectional view of the steering system of FIGS. 16-25C incorporated into a tube-shaped suction cleaner having a horseshoe-shaped oscillator.
Figure 27:
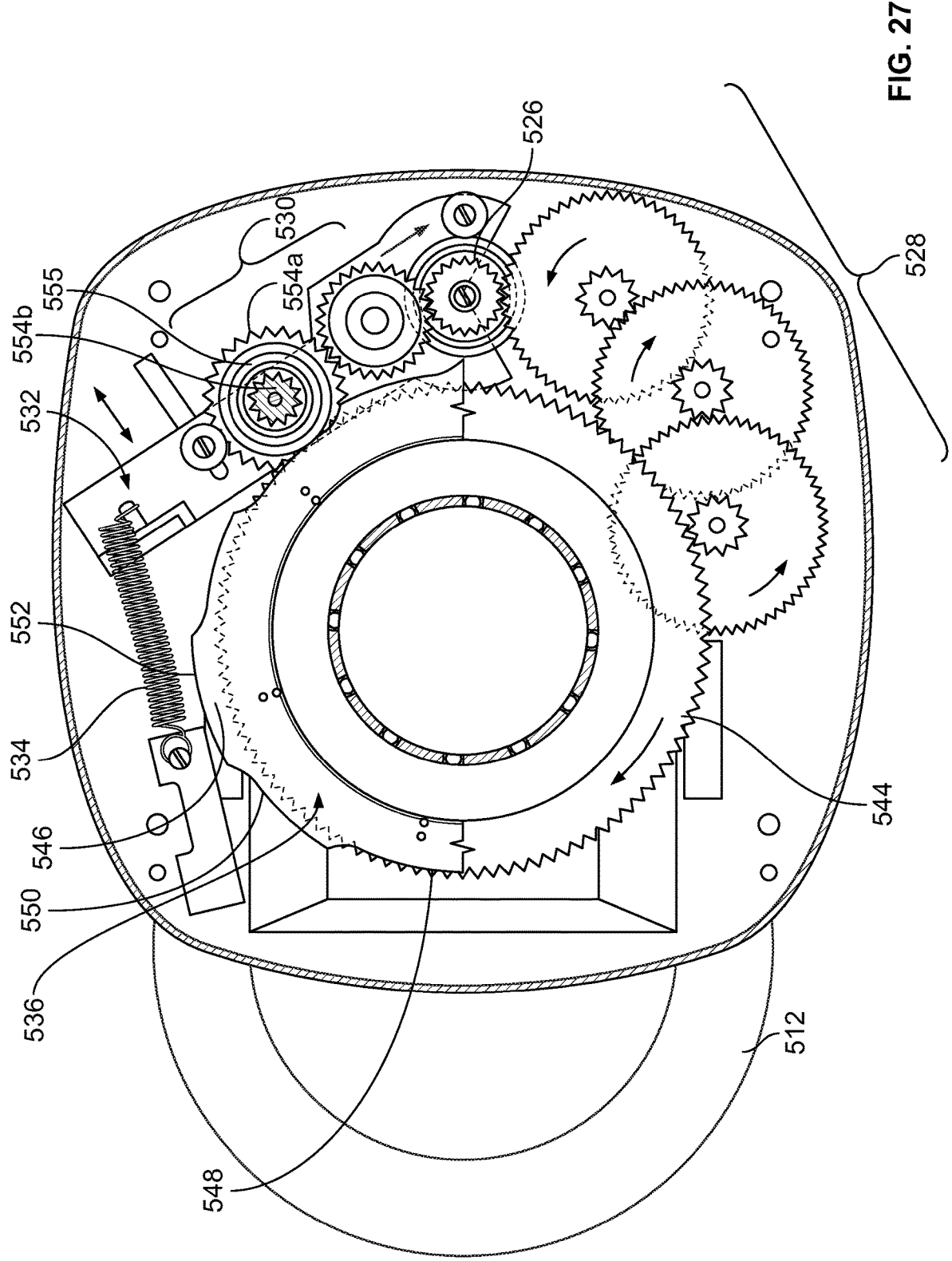
FIG. 27 is a top sectional view of the cleaner of FIG. 26 taken along line 27-27 of FIG. 26 and showing the steering system in greater detail.

FIG. 26 is a diagrammatic partial sectional view of a steering system 518, which is substantially similar to the steering system 318 of FIGS. 16-25C, incorporated into a tube-shaped suction cleaner 500 having a horseshoe-shaped oscillator 502. FIG. 27 is a partial sectional view of the suction cleaner 500 showing the steering system 518. The steering system 518 is substantially similar in construction and operation to the steering system 318 detailed above in connection with FIGS. 16-25C. In describing the steering system 518, reference will be made to the counterpart components of the steering system 318 as an additional full overview of the functionality and operation need not be provided in view of the detailed description above. Instead, a focus will be made on how the steering system of the present disclosure is implemented with the tube-shaped suction cleaner 500.

The driving force of the suction cleaner 500 is shown diagrammatically.

The suction cleaner 500 includes a tubular body 504 defining an internal cavity 506, a steering system housing 508, a steering turbine housing 510, and a disc 512. The tubular body 504 includes an inlet 514 extending through the disc 512 and into the internal cavity 506, and an outlet 516. The oscillator 502 is mounted on a pivot 520 in the internal cavity 506 of the tubular body 504. As water is suctioned through the internal cavity 506 it flows along the sides of the oscillator 502. This creates a pressure differential causing the oscillator 502 to rotate to one side thus blocking one of the flow paths. One skilled in the art will appreciate that FIG. 26 is diagrammatic, and that two inner tubes might be provided on each side of the oscillator. The water then flows along a single side of the oscillator 502 which generates a pressure differential resulting in the oscillator 502 rotating to the other side and blocking that flow path. This process continues repeatedly causing the oscillator 502 to oscillate. As the oscillator 502 oscillates it "hammers" against the tubular body 504 causing the suction cleaner 500 to incrementally and gradually skip across the pool surface.

As can be seen in FIGS. 26-27, the steering system 518 includes a steering turbine assembly 522 (see steering turbine assembly 314 of FIG. 20), a steering drive mechanism 524 (see steering drive mechanism 390 of FIG. 20) including: a main rotatable member (input gear) 526 (see main rotatable member 402 of FIG. 20), a cam drive train 528 (see cam drive train 408 of FIG. 20), and a steering drive train 530 (see steering drive train 410 of FIG. 20) mounted to a swivel arm 532 (see swivel arm 432 of FIG. 20) biased by a spring 534 (see spring 442 of FIG. 20), a cam mechanism 536 (see cam mechanism 380 of FIG. 20), and a nose cone 538 (see nose cone 320 of FIG. 20).

With further reference to FIG. 26, the steering turbine assembly 522 is housed in the steering turbine housing 510, while the steering drive mechanism 524, the cam mechanism 536, and the nose cone 538 is housed in the steering system housing 508. The turbine housing 510 includes a plurality of inlets 540 and an outlet 542 that is adjacent the internal cavity 506 such that fluid can flow into the steering turbine housing 510 through the inlets 540 and out through the outlet 542 into the internal cavity 506. The flow of water through the steering turbine housing 510 causes a turbine 544 to rotate resulting in the steering turbine assembly 522 rotating the main rotatable member 526 (in the same fashion as the turbine 392 and steering turbine assembly 314 of FIG. 20).

The main rotatable member 526 is operatively engaged with the cam drive train 528 and the steering drive train 530 such that when the main rotatable member 526 rotates it drives each of the cam drive train 528 and the steering drive train 530 (each of these components, and engagement therebetween, operates consistently with the counter-part component of the steering system 318 of FIG. 20).

The cam drive train 528 is in turn operatively engaged with the cam mechanism 536 and rotationally drives the cam mechanism 536 through engagement with a cam drive gear 544 (see cam drive gear 418 of FIG. 20). The cam mechanism 536 further includes a cam wheel 546 (see cam wheel 420 of FIG. 20) that is interconnected and coaxial with the cam drive gear 544 such that rotation of the cam drive gear 544 results in rotation of the cam wheel 546. The cam mechanism 536 is positioned about the outlet 516 (see FIG. 26) to the cleaner body 504 and rotatably secured with respect thereto such that it allows water to flow out from the outlet 516 and through the cam mechanism 536. The cam wheel 546 is similar in structure to the cam wheel 224 illustrated in FIG. 9. In accordance therewith, the cam wheel 546 includes outer-profile regions of greater and lesser radii each corresponding to one of the directions of the steering drive mechanism 524. As illustrated in FIG. 9, the cam wheel 546 has three outer-profile regions of lesser 548, medium 550, and greater 552 radii each corresponding to one of the steering directions, as discussed in detail above in connection with FIGS. 16-25C.

The steering drive train 530 operatively engages the nose cone 538 and is engaged by the cam wheel 546 (see FIG. 9) of the cam mechanism 536. Specifically, the steering drive train 530 includes a driven gear 554a, a pinion drive gear 554b, and a roller 555 (see driven gear 430a, pinion drive gear 430b, and roller 431 of FIG. 24), which are coaxial with the driven gear 554a and the pinion drive gear 554b having conjoint rotation. The roller 555 engages the cam wheel 546 such that the cam wheel 456 pushes on the roller 555 causing the swivel arm 532 and steering drive train 530 mounted thereto to rotate and move into three different positions based on which cam wheel region, e.g., lesser radii region 548, medium radii region 550, or greater radii region 552 (see FIG. 9), that the roller 555 is engaged with. The steering drive mechanism 524 is configured to be placed adjacent to the cam mechanism 536 with the pinion drive gear 554b inserted into a gear track cavity 556 (see FIG. 26) of the steering drive mechanism 524. The gear track cavity 556 is defined by a first (inner) gear track 558 and a second (outer) gear track 560 (see FIG. 26). The nose cone 538 further includes a nose 539 that is connected to a hose, which provides a source of suction to the cleaner 500.

With reference to FIG. 27, rotation of the main rotatable member 526 results in the cam drive train 528 and the steering drive train 530 being driven, and, thus, the cam wheel 546 rotating and the pinion drive gear 554b rotating. The cam wheel 546 pushes against the roller 555 causing the pinion drive gear 554b to be placed into one of three different positions. In accordance with the above-description, when the roller 555 is engaged with the lesser radii region 548 (see FIG. 9) of the cam wheel 546, the pinion drive gear 554b is placed in a first position where it engages and rotatably drives the first gear track 558 resulting in the cleaner 500 rotating clockwise about the hose. When the roller 555 is engaged with the medium radii region 550 (see FIG. 9) of the cam wheel 546, the pinion drive gear 554b is placed in a second position where it is between the first and second gear tracks 558, 560 and does not rotatably drive the nose cone 538 resulting in the cleaner 500 traveling in a straight/forward direction. When the roller 555 is engaged with the greater radii region 552 (see FIG. 9) of the cam wheel 546, the pinion drive gear 554b is placed in a third position where it engages and rotatably drives the second gear track 560 resulting in the cleaner 500 rotating counter-clockwise about the hose.

Figure 28:
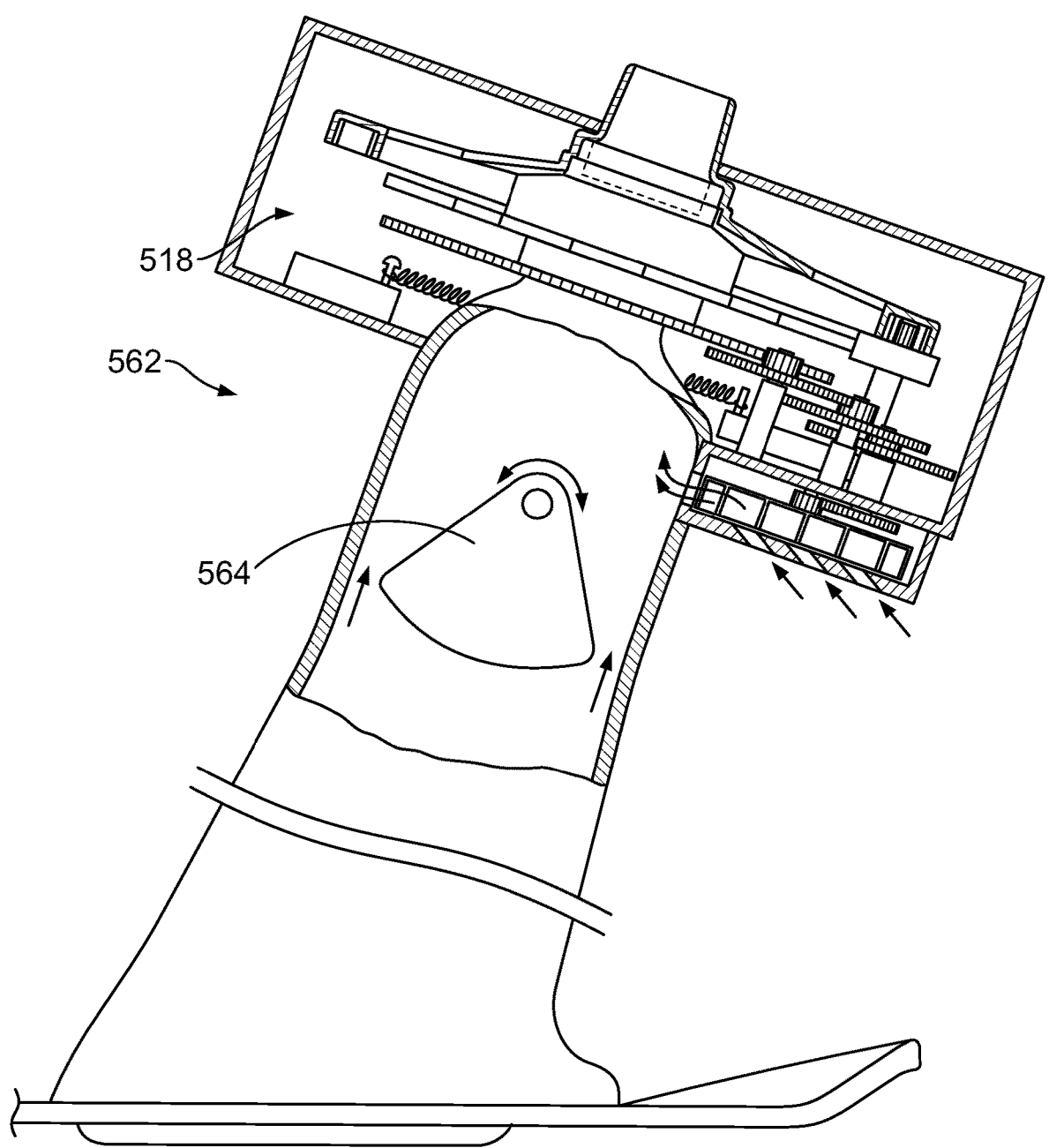
FIG. 28 is a diagrammatic partial sectional view of the steering system of FIGS. 16-25C incorporated into a tube-shaped suction cleaner having a hammer oscillator.

FIG. 28 is a diagrammatic partial sectional view of a suction cleaner 562 that is identical in structure to the suction cleaner 500 of FIGS. 26 and 27, but with a hammer oscillator 564 replacing the horseshoe-shaped oscillator 502. The suction cleaner 562 incorporates the steering system 518 and functions in accordance with the description provided above in connection with the suction cleaner 500 of FIG. 26. One skilled in the art will appreciate that FIG. 28 is diagrammatic, and that two inner tubes might be provided on each side of the hammer.

Figure 29:
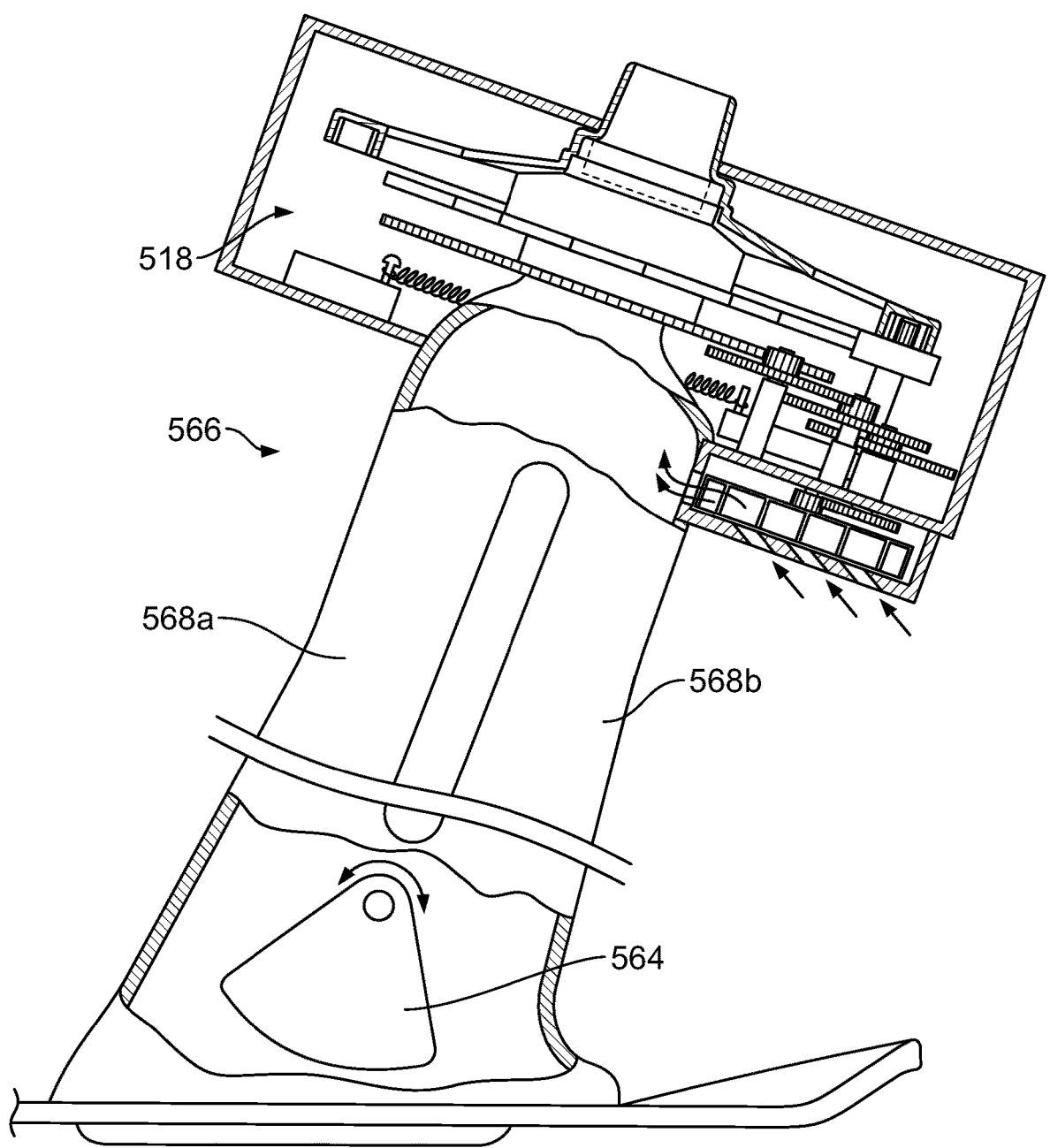
FIG. 29 is a diagrammatic partial sectional view of the steering system of FIGS. 16-25C incorporated into a tube-shaped suction cleaner having two tubes and a hammer oscillator.

FIG. 29 is a diagrammatic partial sectional view of a suction cleaner 566 that is identical in structure to the suction cleaner 562 of FIG. 28, but with a body bifurcated into two flow paths 568a, 568b such that the hammer oscillator 564 oscillates between restricting flow to each of the flow paths 568a, 568b. The suction cleaner 566 incorporates the steering system 518 and functions in accordance with the description provided above in connection with the suction cleaner 500 of FIG. 26.

Figure 30:
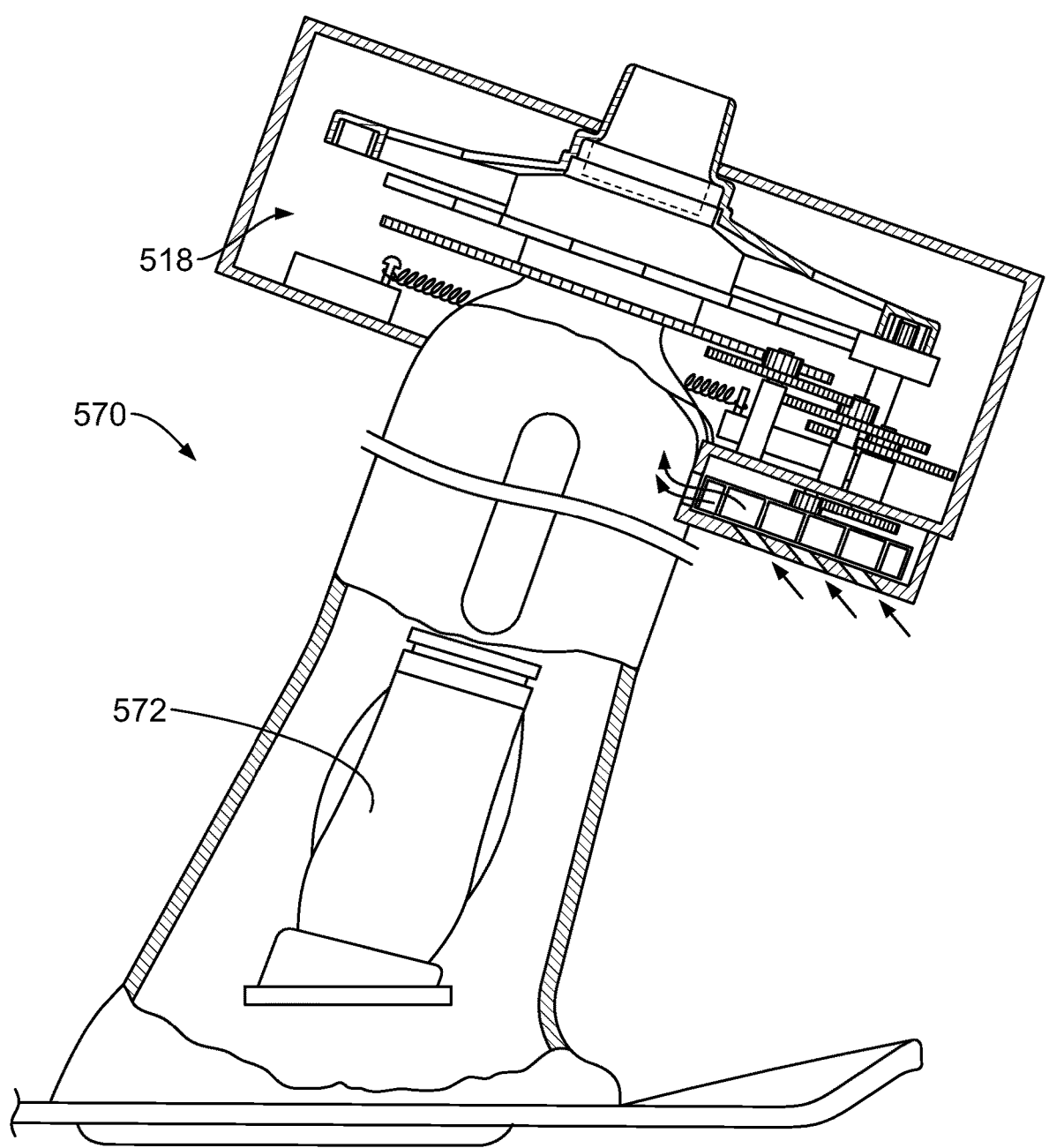
FIG. 30 is a diagrammatic partial sectional view of the steering system of FIGS. 16-25C incorporated into a tube-shaped suction cleaner having two tubes and a diaphragm oscillator.

FIG. 30 is a diagrammatic partial sectional view of a suction cleaner 570 that is identical in structure to the suction cleaner 566 of FIG. 26, but with a diaphragm 572 replacing the oscillator 502. The suction cleaner 570 incorporates the steering system 518 and functions in accordance with the description provided above in connection with the suction cleaner 500 of FIG. 26. FIG. 30 is diagrammatic and one of ordinary skill in the art will appreciate that the diaphragm 572 can be provided with additional or concentric chambers for driving oscillation.

Figure 31:
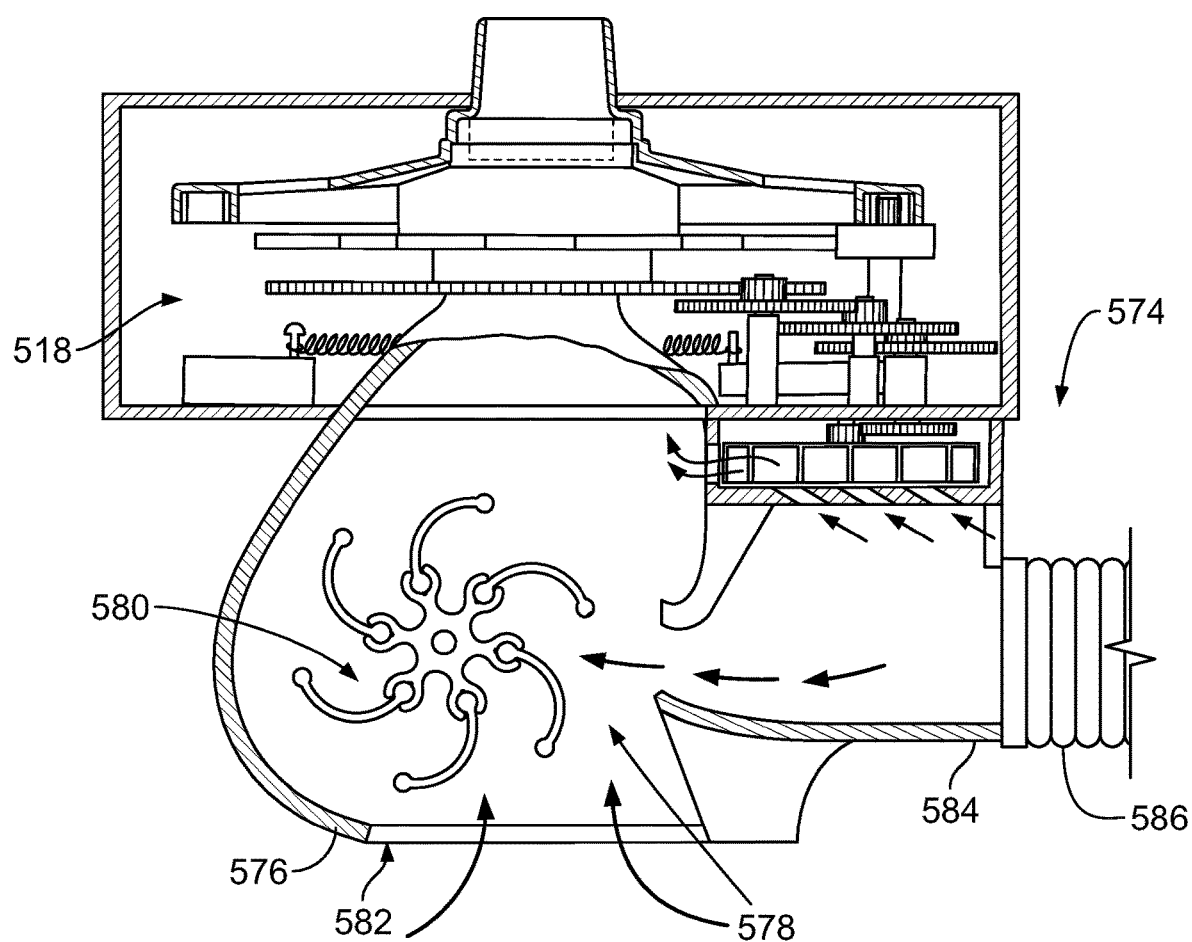
FIG. 31 is a diagrammatic partial sectional view of the steering system of FIGS. 16-25C incorporated into a hybrid pressure and suction cleaner.

FIG. 31 is a diagrammatic partial sectional view of a hybrid pressure and suction cleaner 574 that incorporates the steering system 518 and functions in accordance with the description provided above in connection with the suction cleaner 500 of FIG. 26. The pressure cleaner 574 includes a body 576 defining a turbine housing 578 that houses a turbine 580, an inlet 582 in fluidic communication with the turbine housing 578, a pressurized fluid inlet 584 connected with a hose 586 that provides a supply of pressurized fluid, and the steering system 518. The hose 586, which provides the supply of pressurized fluid, is utilized to power the steering system and the turbine 580. The steering system 518 functions in accordance with the description provided above in connection with the suction cleaner 500 of FIG. 26.

Figure 32:
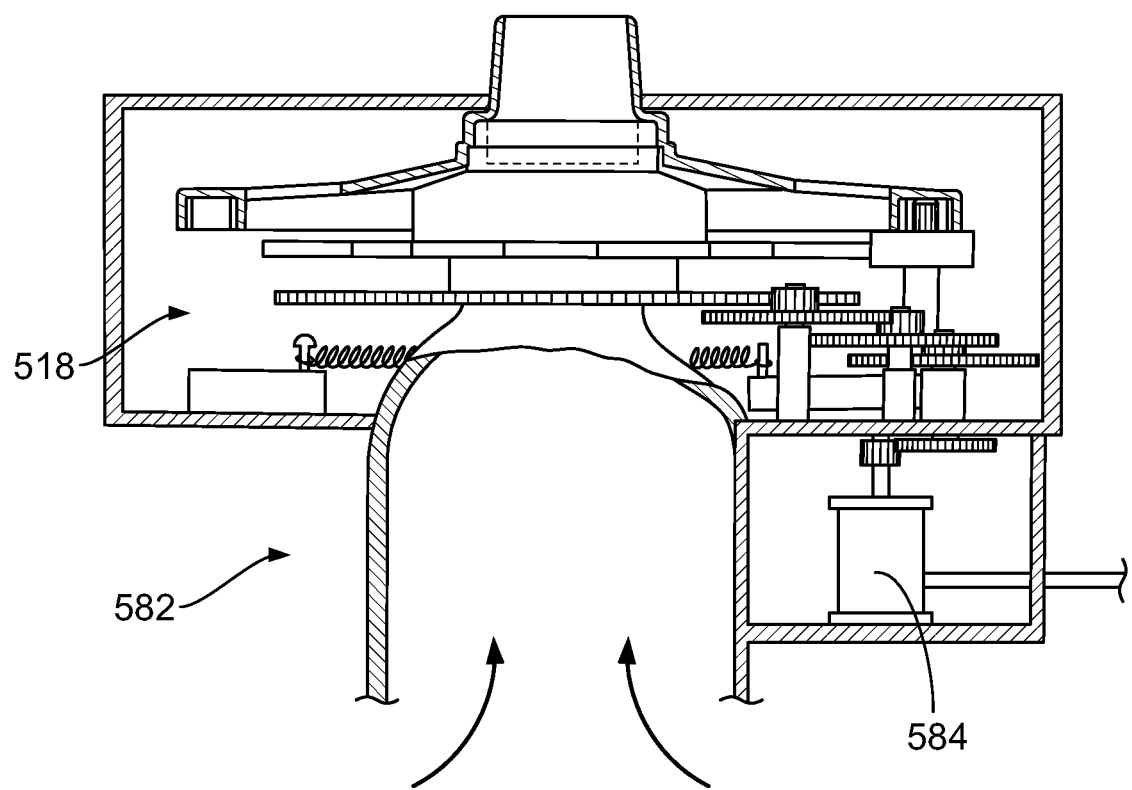
FIG. 32 is diagrammatic partial sectional view of the steering system of FIGS. 16-25C incorporated into a tube-shaped suction cleaner and including a motor for assisting with powering the steering system.

FIG. 32 is diagrammatic partial-sectional view of the steering system 518 of FIG. 26 incorporated into a cleaner 582 and including a motor 584 replacing the turbine for powering the steering system 518. The steering system 518 and motor 584 can be implemented in any one of the cleaners 300 (see FIGS. 16-25 and associated steering system 318), 500 (see FIGS. 26-27), 562 (see FIG. 28), 566 (see FIG. 29), 570 (see FIG. 30), 574 (see FIG. 31) discussed herein.

Figure 33:
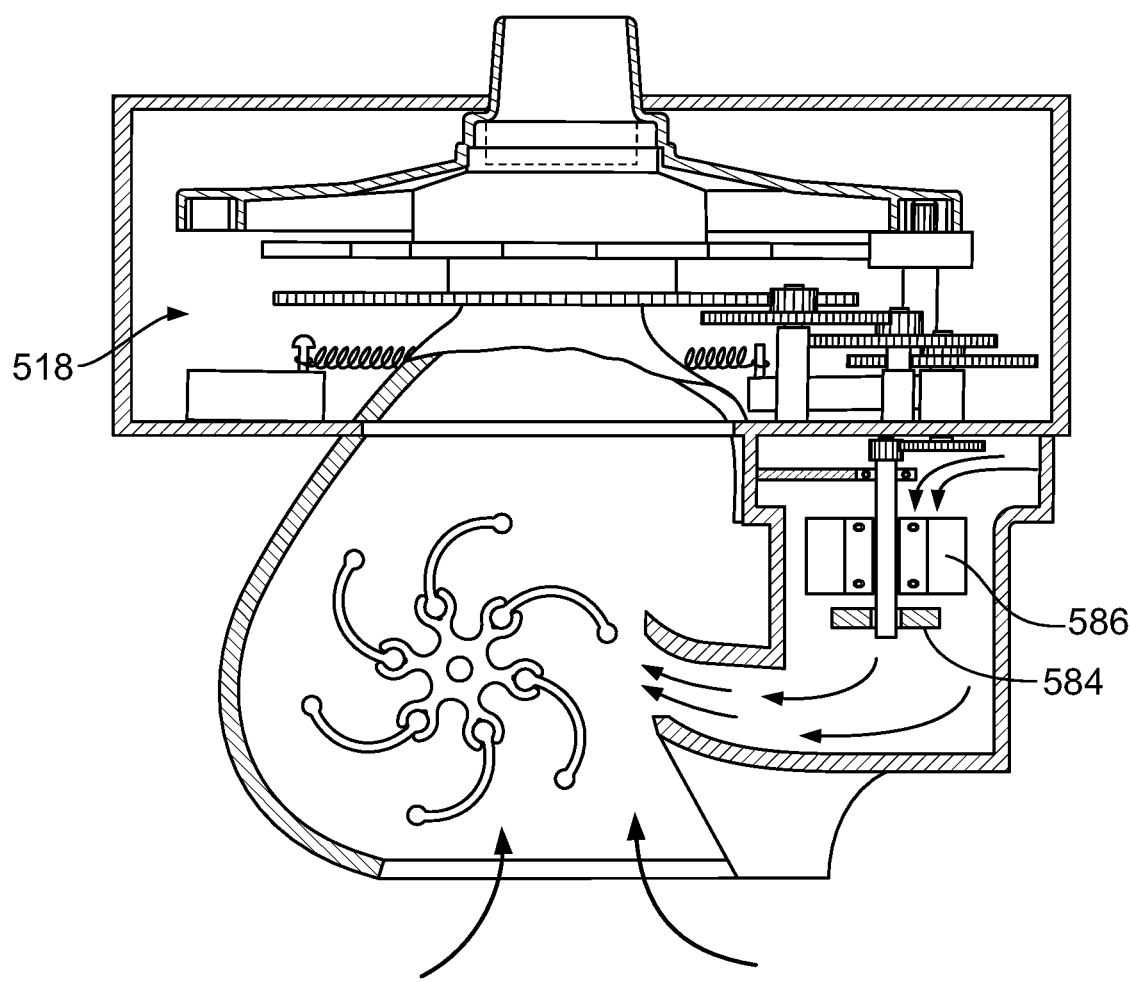
FIG. 33 is a diagrammatic partial sectional view of the steering system of FIGS. 16-25C incorporated into a pressure cleaner and including a guide vane and impeller.

FIG. 33 is a diagrammatic partial sectional view showing how the steering system 518 of FIGS. 16-25 could be implemented with an impeller 584 and guide vane 586 instead of the standard steering turbine 392. The steering system 518 with the impeller 584 and guide vane 586 would operate in substantial consistency and accordance with the description provided above in connection with FIGS. 16-25, but for the guide van 586 directing water flow and the impeller 584 providing power to the steering system 518 instead of the steering turbine 392 described. This impeller 584 and guide vane 586 system can be implemented in any one of the cleaners 300 (see FIGS. 16-25 and associated steering system 318), 500 (see FIGS. 26-27), 562 (see FIG. 28), 566 (see FIG. 29), 570 (see FIG. 30), 574 (see FIG. 31) discussed herein and can replace the respective steering turbine 392 thereof.

Figure 34:
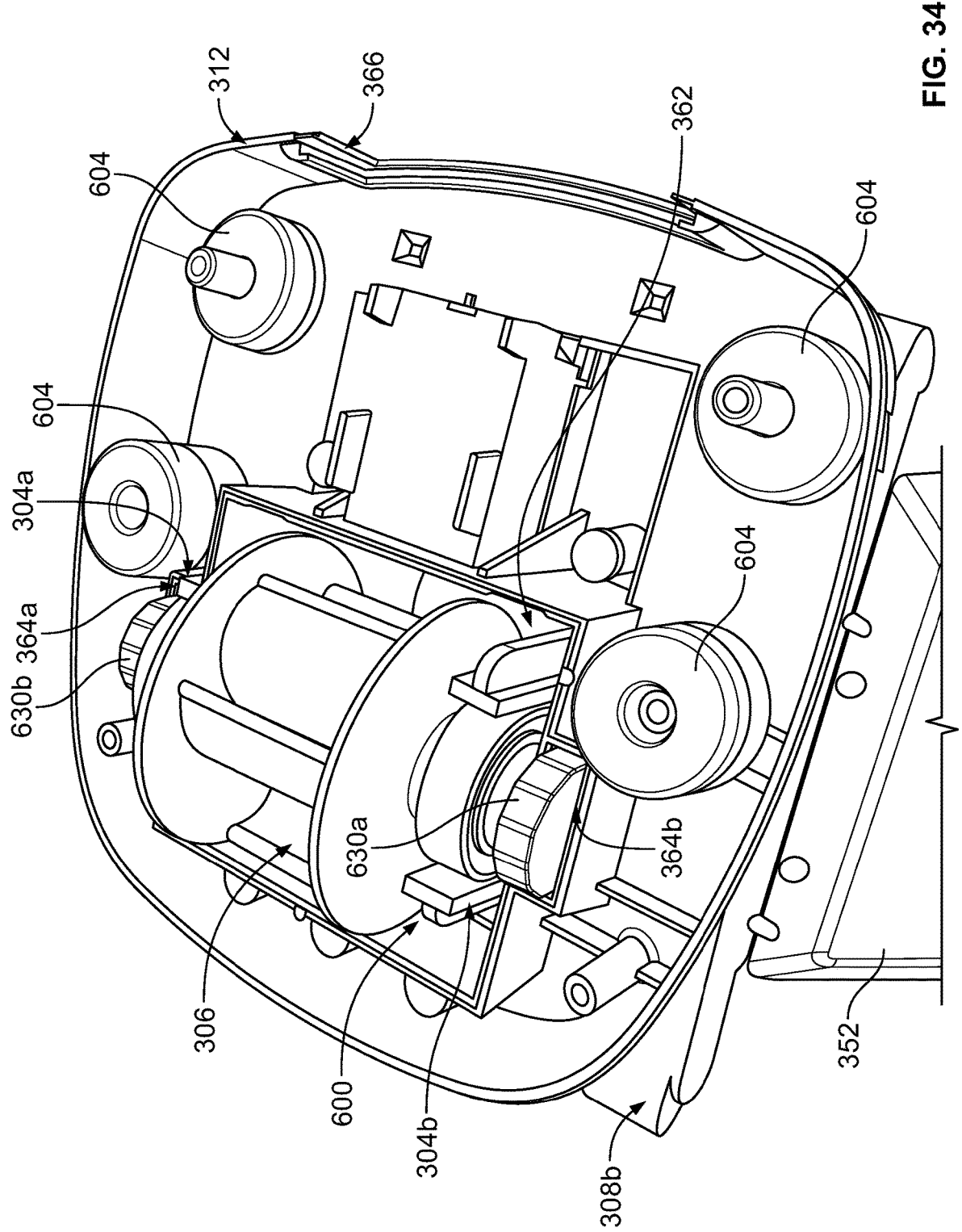
FIG. 34 is a top perspective view of the lower middle body of the suction cleaner of FIG. 16 showing the locomotion system.
Figure 35:
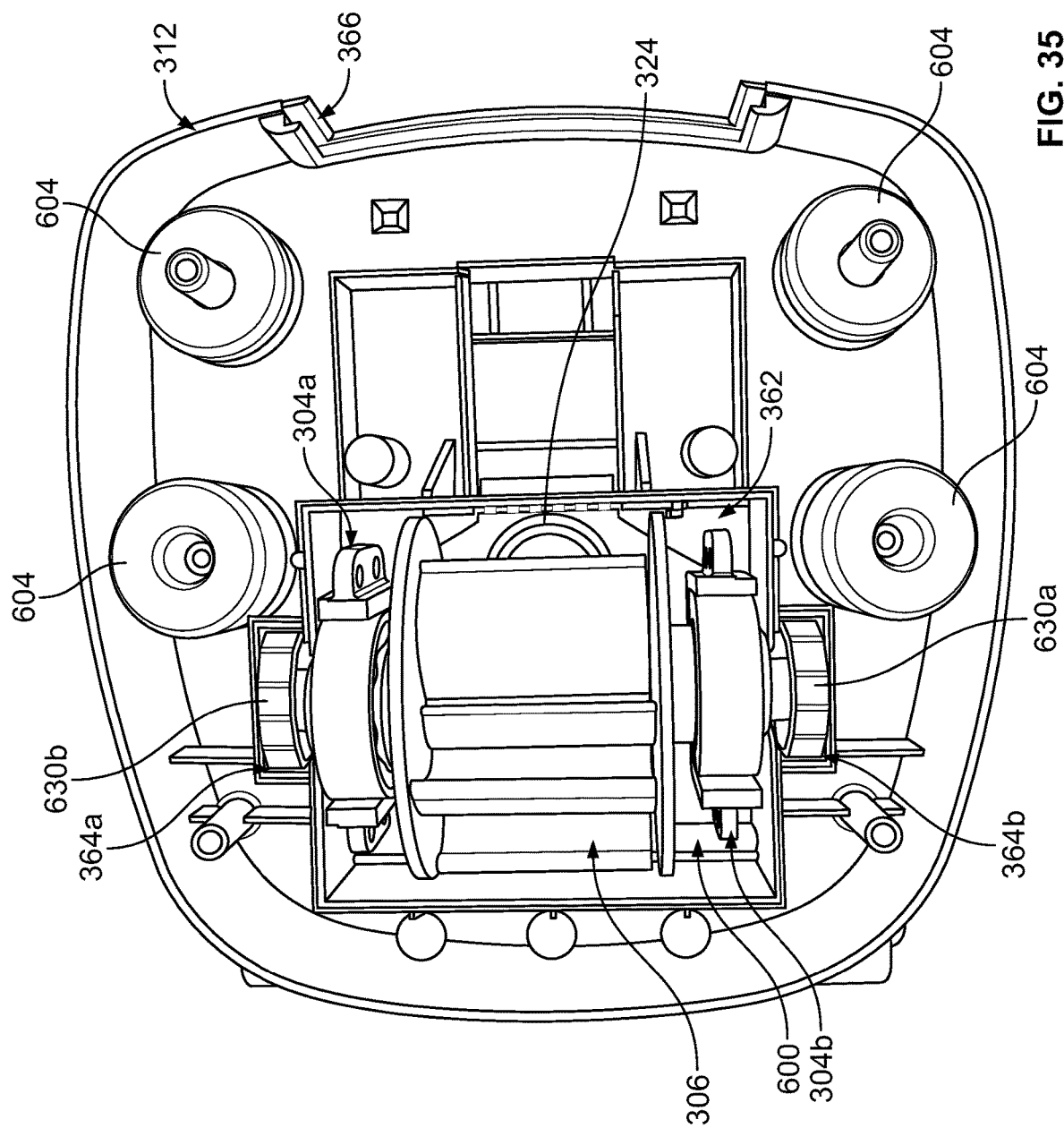
FIG. 35 is a top perspective view of the lower middle body and the locomotion system of FIG. 34.
Figure 36:
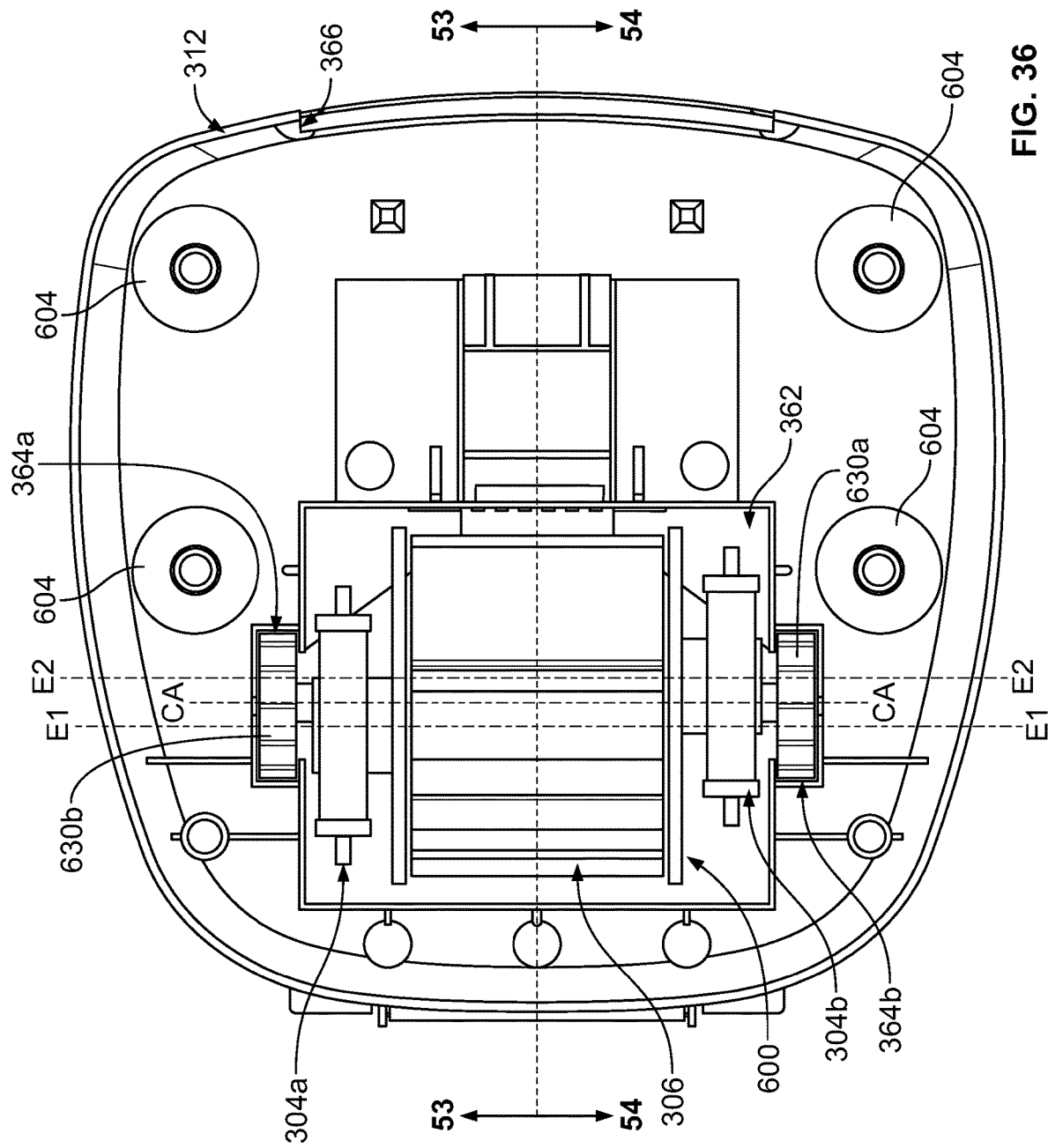
FIG. 36 is a top view of the lower middle body and locomotion system of FIG. 34.
Figure 37:
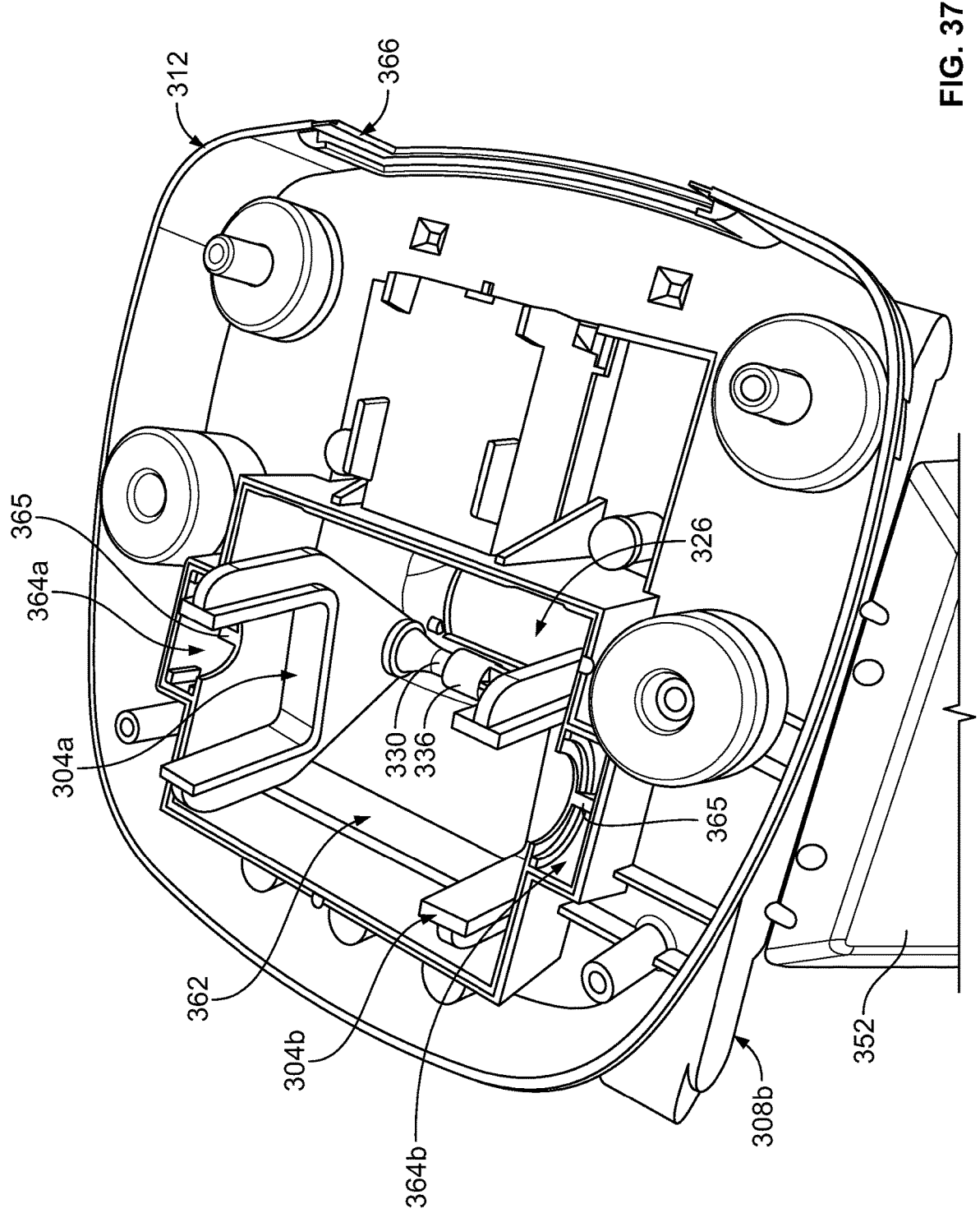
FIG. 37 is a top perspective view of the lower middle body of the suction cleaner of FIG. 16 showing the A-frame arms of the present disclosure engaged therewith.

Turning now to FIGS. 34-56, the cleaner 300, as illustrated in FIG. 16, includes the first and second A-frame arm assemblies 304a, 304b and the drive turbine assembly 306, which form a locomotion system 600 of the present disclosure. FIGS. 34-36 illustrate the lower middle body 312 of the cleaner 300 with the locomotion system 600 installed therein. FIG. 34 is a first top perspective view showing the lower middle body 312 and the locomotion system 600 installed therein. FIG. 35 is a second top perspective view showing the lower middle body 312 and the locomotion system 600 installed therein. FIG. 36 is a top view of the lower middle body 312 and the locomotion system 600 installed therein. As discussed above in connection with FIG. 16, the lower middle body 312 defines the turbine housing 362, first and second bushing housings 364a, 364b, and the rear opening 366. The lower middle body 312 is configured to be placed adjacent the lower body 302. The turbine housing 362 is configured for insertion of a portion of the A-frame arms 304a, 304b therein and to house the drive turbine assembly 306 and be in fluidic communication with the inlet 324 (see FIG. 37) of the lower body 302 such that water flows in through the inlet 324 and across the drive turbine assembly 306, thereby operatively rotating the drive turbine assembly 306. As shown in FIG. 37, the first and second bushing housings 364a, 364b are positioned on opposite lateral sides of the turbine housing 362 and configured to fixedly engage first and second bushings 630a, 630b of the drive turbine assembly 306. The first and second bushing housings 364a, 364b can each include a protrusion 365 (see FIG. 37) positioned therein that is configured to engage a notch 631 of each bushing 630a, 630b (see FIGS. 41 and 42). The rear opening 366 is configured to have the screen 368 (see FIG. 16) inserted therein so that water can flow into the lower middle body 312. The lower middle body 312 can also include buoyant elements 604 that can be included or removed to increase or decrease the buoyancy of the cleaner 300.

FIG. 37 is a top perspective view of the lower middle body 312 with the turbine assembly 600 removed showing the A-frame arm assemblies 304a, 304b installed in the turbine housing 362. As can be seen in FIG. 37, the A-frame arm assemblies 304a, 304b are housed within the turbine housing 362 and secured by the respective pivot shaft 330 to the pivot lower bracket 334 (see FIG. 16) of the lower middle body 312 by the pivot upper bracket 336. The A-frame arm assemblies 304a, 304b each rotated about the respective pivot shaft 330. Operation thereof is discussed in greater detail below.

Figure 38:
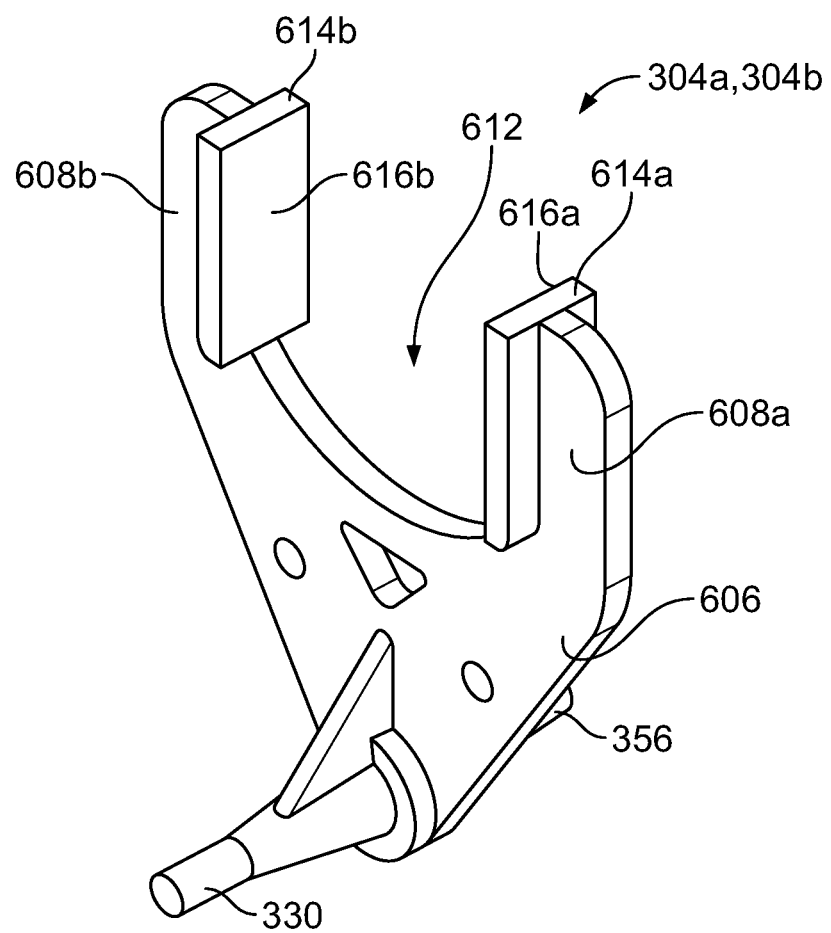
FIG. 38 is a perspective view of the A-frame arm assembly of FIG. 16.
Figure 39:
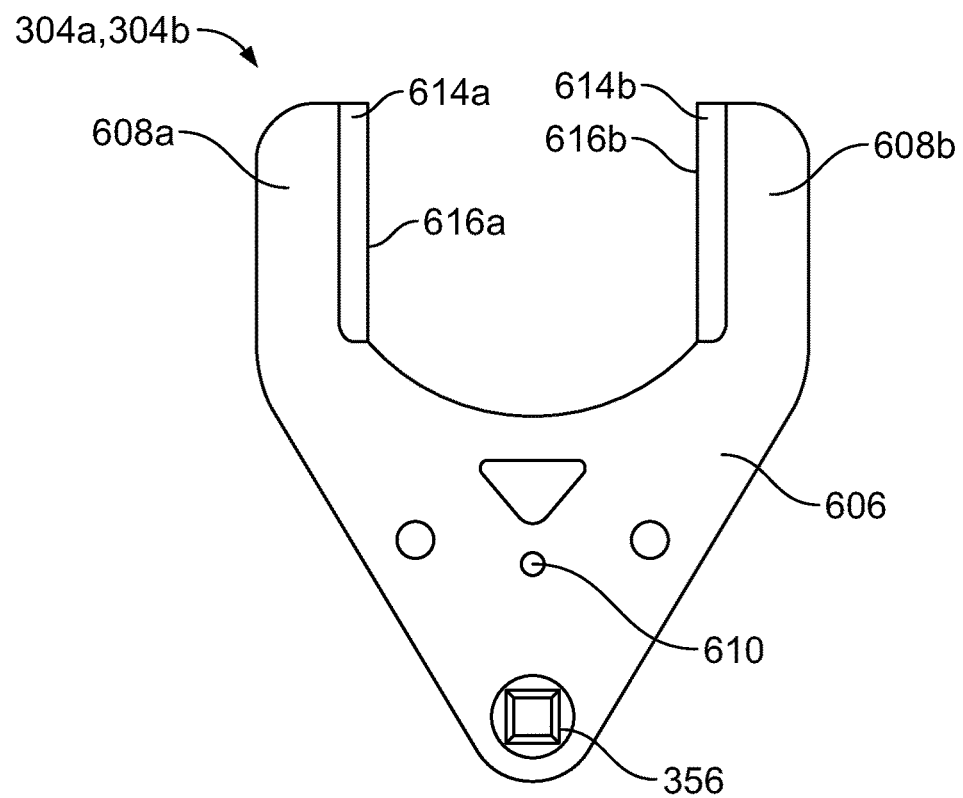
FIG. 39 is a front view of the A-frame arm assembly of FIG. 38.
Figure 40:
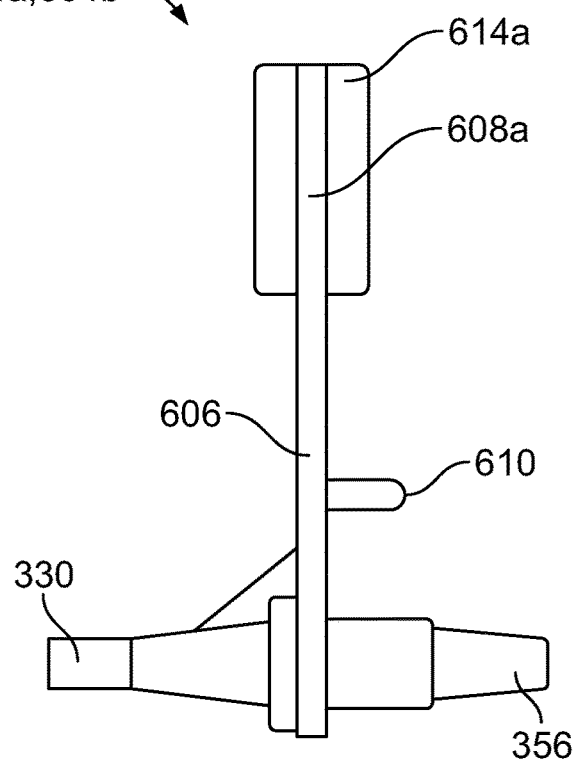
FIG. 40 is a side view of the A-frame assembly of FIG. 38.

FIGS. 38-40 show an A-frame arm assembly 304a of the present disclosure. It should be understood that the A-frame arm assemblies 304a, 304b are identical in construction, and, accordingly, the reference numerals will be consistent between the A-frame arm assemblies 304a, 304b. FIG. 38 is a perspective view of the A-frame arm assembly 304a, 304b. FIG. 39 is a rear view of the A-frame arm assembly 304a, 304b while FIG. 40 is a side view of the A-frame arm assembly 304a, 304b. The A-frame arm assembly 304a, 304b includes a body 606 having first and second fingers 608a, 608b extending therefrom, the pivot shaft 330 extending perpendicular from a first side of a lower portion of the body 606, a square head 356 extending perpendicular from a 15 second side of the lower portion of the body 606 opposite the pivot shaft 330, and a standoff 610 extending from the body 606 on the same side as the square head 356. The pivot shaft 330 and the square head 356 are generally coaxial.

The first and second fingers 608a, 608b define a bearing housing 612 and each include a respective extension plate 614a, 614b that form a straight flat surface 616a, 616b. The pivot shaft 330 is configured to be secured by the pivot upper and lower brackets 334, 336 to the lower middle body 312, while the square head 356 is configured to extend through the side pivot openings 328a, 328b of the lower body 302 and engage the square socket 350 of a respective walking pod assembly 308a, 308b (see FIG. 16). The square heads 356 of the A-frame arm assemblies 304a, 304b mate with the square socket 350 of the respective walking pod assembly 308a, 308b (see FIG. 16) such that rotation of the square head 356 results in rotation of the engaged walking pod assembly 308a, 308b (see FIG. 16). The standoff 610 is positioned on the A-frame arm assembly body 606 to prevent the body 606 from contacting an internal wall of the lower middle body 312. The A-frame arm assemblies 304a, 304b are configured so that when they are installed in a pool cleaner, that is, when the pivot shaft 330 is secured by the upper and lower brackets 334, 336 (see FIG. 16) and the square head 356 is engaged with the square socket 350 of the respective walking pod assembly 308a, 308b (see FIG. 16), a portion of the drive turbine assembly 306 is placed in the bearing housing 612 of each A-frame arm assembly 304a, 304b and engages the straight flat surfaces 616a, 616b of the extension plates 614a, 614b (see FIG. 36). The drive turbine assembly 306, when partially positioned within the bearing housing 612 of each A-frame arm assembly 304a, 304b rotates or rocks the A-frame arm assemblies 304a, 304b about the pivot shaft 330, causing the square heads 356 to rotate the respective walking pod assembly 308a, 308b that they are engaged with.

Figure 41:
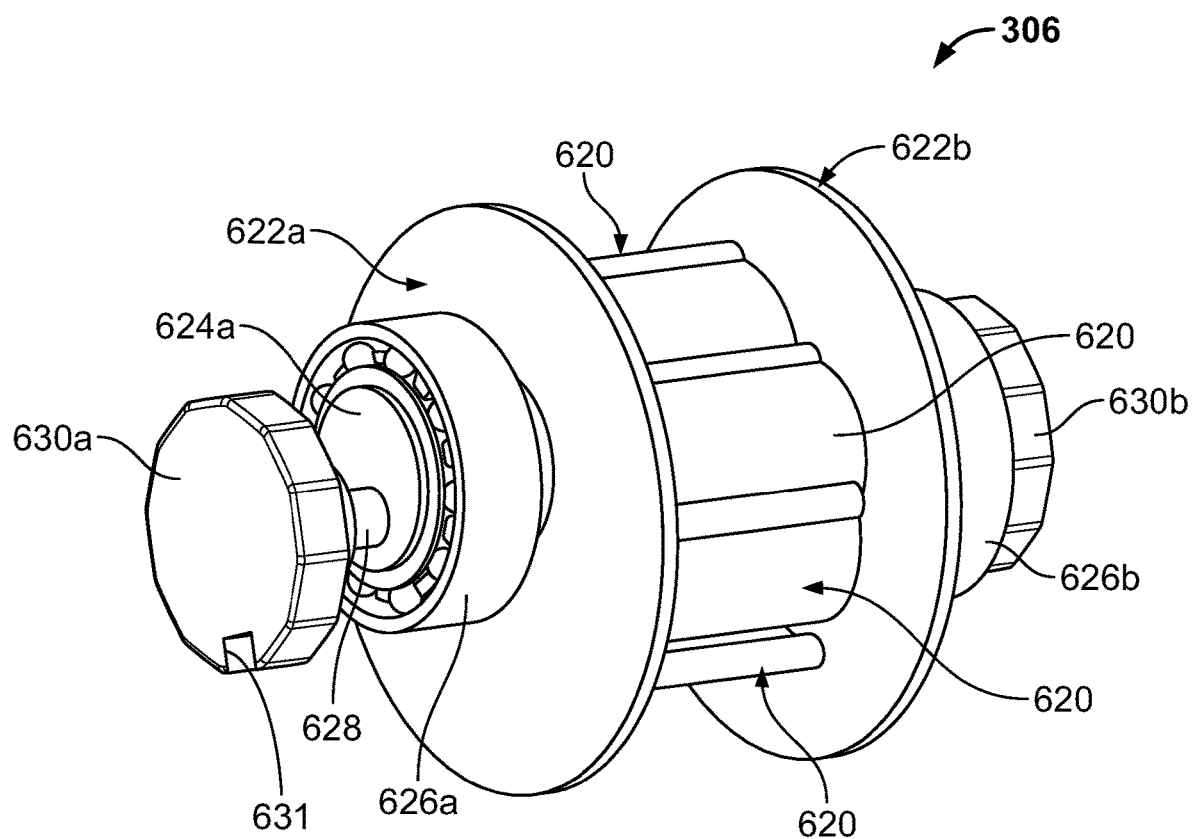
FIG. 41 is a perspective view of the turbine assembly of the locomotion system shown in FIG. 6.
Figure 42:
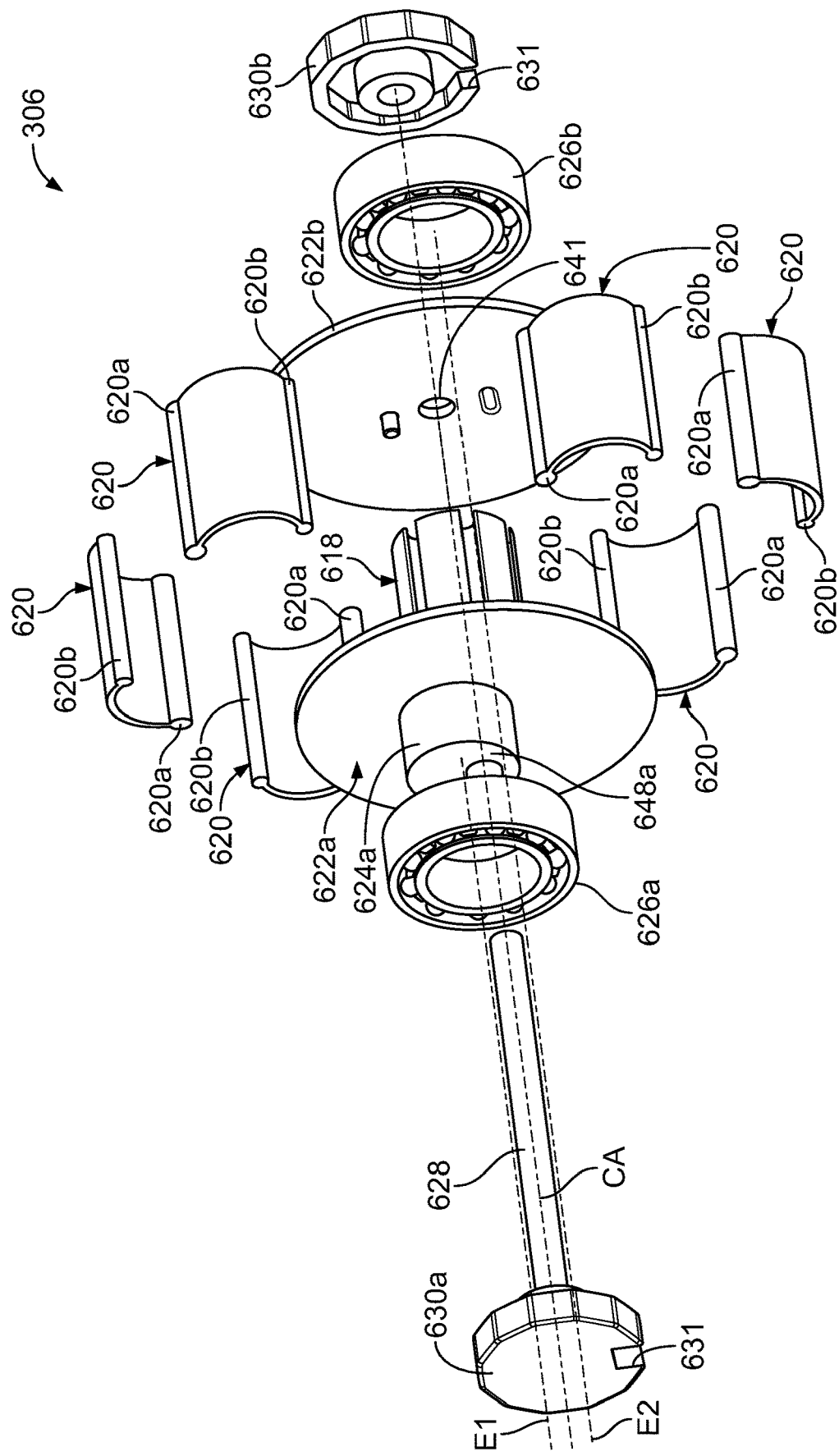
FIG. 42 is an exploded perspective view of the turbine assembly of FIG. 41.
Figure 43:
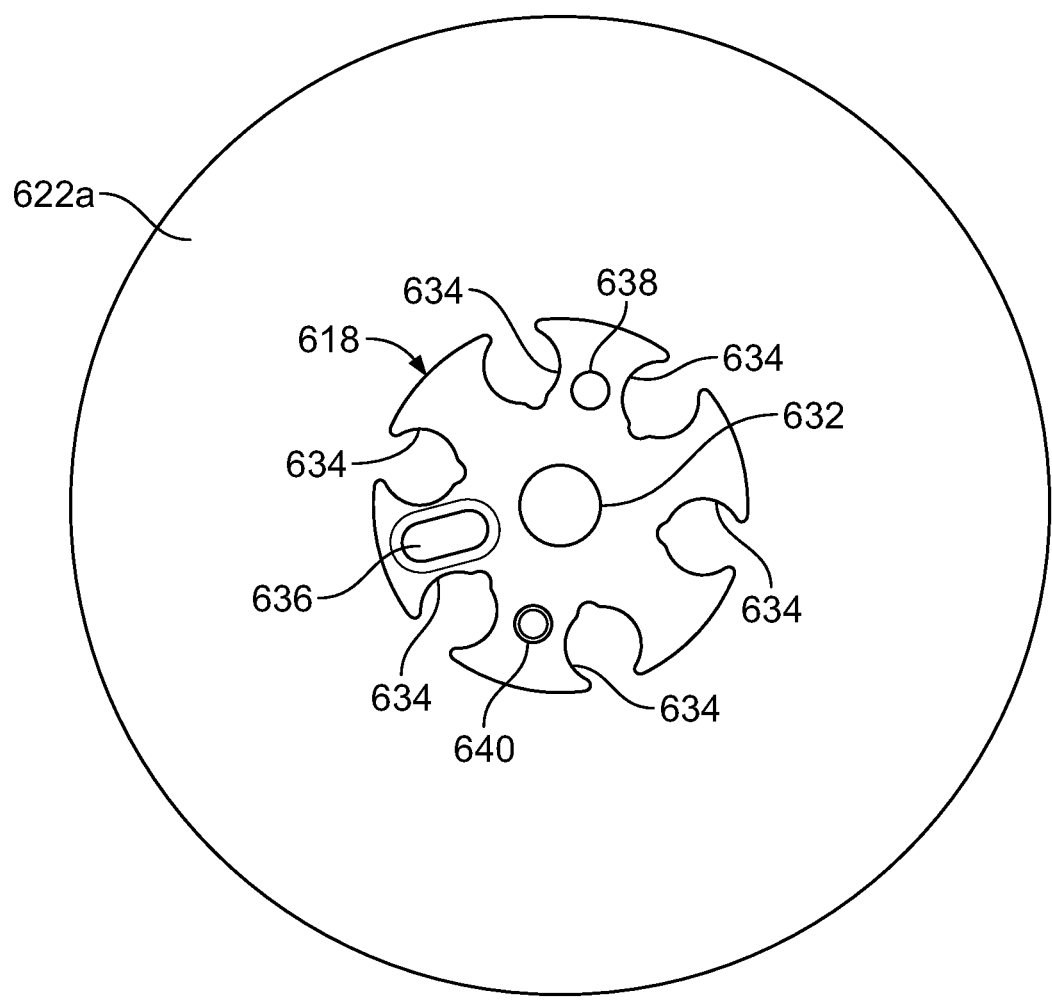
FIG. 43 is a side view of a turbine central hub of FIGS. 41 and 42 showing components for mating with a turbine retention wall.

FIGS. 41-47 illustrate the drive turbine assembly 306 of the present disclosure in greater detail. FIG. 41 is a perspective view of the drive turbine assembly 306 and FIG. 42 is an exploded perspective view of the drive turbine assembly 306. The drive turbine assembly 306 includes a central hub 618 (see FIG. 42), a plurality of removable vanes 620, a first side retention wall 622a, a second side retention wall 622b, a first eccentric 624a extending from the first side retention wall 622a, a second eccentric 624b (see FIG. 45) extending from the second side retention wall 622b, a first bearing 626a positioned about the first eccentric 624a, a second bearing 626b positioned about the second eccentric 624b, a shaft 628, a first bushing 630a, and a second bushing 630b. FIG. 41 shows the plurality of removable vanes 620 in a retracted position. FIG. 43 is a side view of the first side retention wall 622a and the central hub 618, which are interconnected. The central hub 618 includes a central opening 632, a plurality of vane edge slots 634, a first hole 636, a second hole 638, and a protrusion 640. The vane edge slots 634 are configured to be engaged by and secure the removable vanes 620. More specifically, each removable vane 620 includes a bulbous proximal edge 620a and a distal edge 620b, with the bulbous proximal edge 620a being configured and shaped so that it can slide into a vane edge slot 634 and be secured therein. The bulbous proximal edges 620a and the vane edge slots 634 can be sized and shaped so that the proximal edges 620a can only be slide in and out of the vane edge slots 634 and cannot be pulled from the vane edge slots 634. Further, the bulbous proximal edges 620a and the vane edge slots 634 can be shaped to allow rotation of the proximal edges 620a within the vane edge slots 634, allowing the vanes 620 to partially rotate when interconnected with the central hub 618. The vanes can be secured to the central hub 618 by connecting the second side retention wall 622b to the central hub 618, which is described below in connection with FIG. 44.

Figure 44:
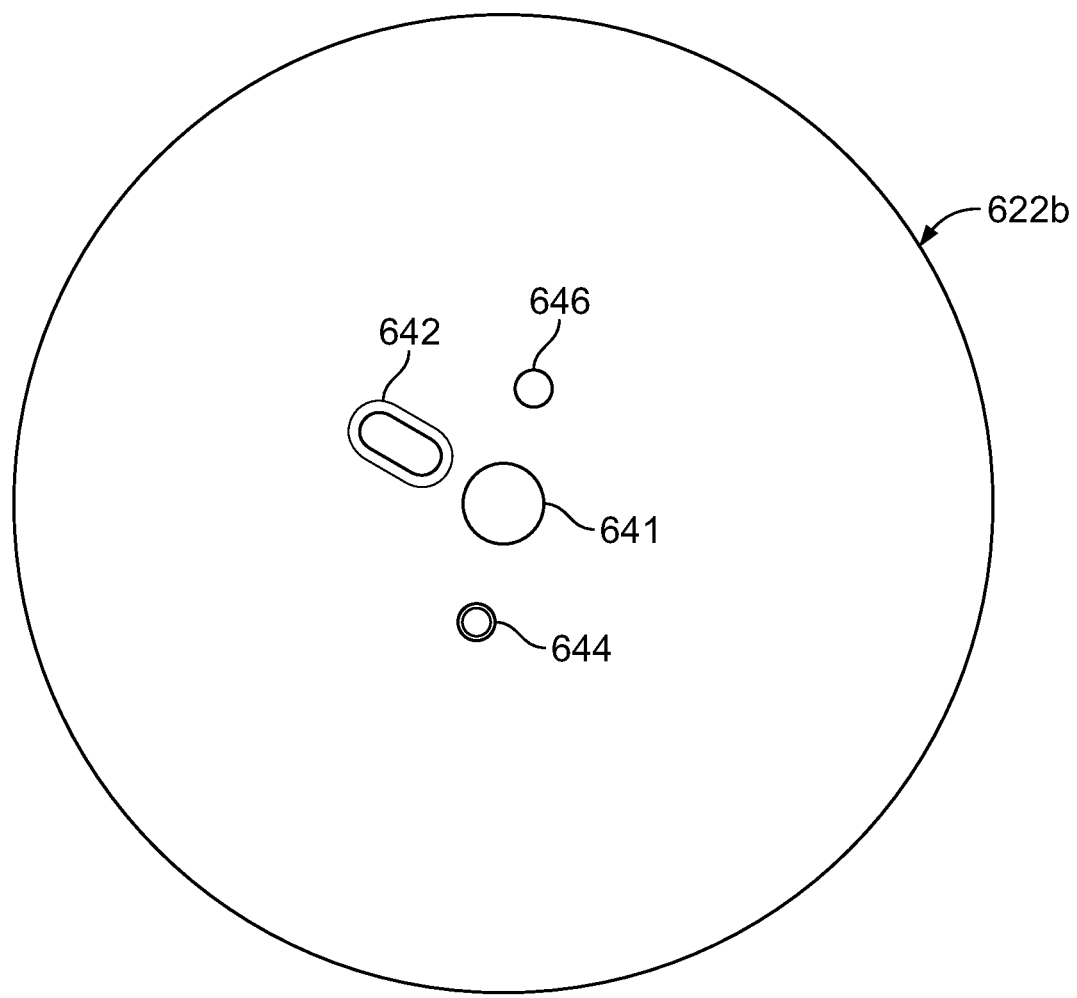
FIG. 44 is a side view of the turbine retention wall of FIGS. 41 and 42 showing components for mating with the turbine central hub.

FIG. 44 is a side view of the second side retention wall 622b, which includes a central opening 641, first protrusion 642, a second protrusion 644, and a hole 646 spaced apart at locations to match the spacing of the first hole 636, the second hole 638, and the protrusion 640 of the central hub 618, respectively, shown in FIG. 43. That is, the first protrusion 642 and the first hole 636 are sized and configured to engage one another, the second protrusion 644 and the second hole 638 are sized and configured to engage one another, and the protrusion 640 and the hole 646 are sized and configured to engage one another. This relationship allows the second side retention wall 622b to be engaged with the central hub 618 such that rotation of the central hub 618 is transferred to the second side retention wall 622b. Additionally, this connection secures the vanes 620 in the vane edge slots 634 of the central hub 618.

In connection with FIGS. 41-45, with the vanes 620 secured to the central hub 618, and the second side retention wall 622b engaged with the central hub 618, the drive turbine assembly 306 is further constructed whereby the shaft 628, which can be a stainless steel shaft, extends through an opening 648a (see FIG. 42) extending through the first eccentric 624a (which the first bearing 626a is secured about), the central opening 632 (see FIG. 43) of the central hub 618, the central opening 641 (see FIG. 44) of the second side retention wall 622b, and an opening 648b extending through the second eccentric 624b (see FIG. 45) (which the second bearing 626b is secured about). The shaft 628 is engaged on opposite ends thereof by the first bushing 630a and the second bushing 630b, thus forming the drive turbine assembly 306.

Figure 45:
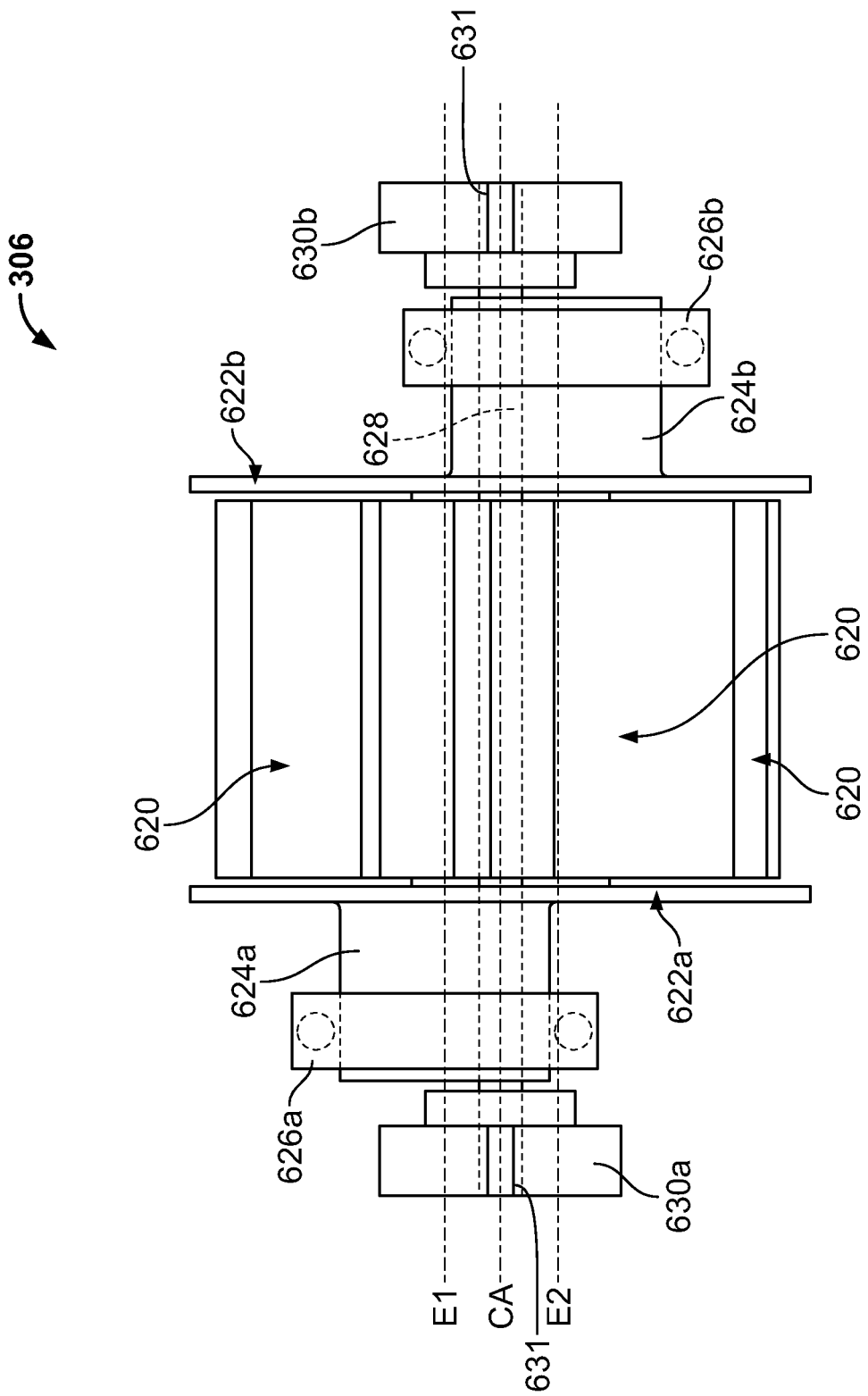
FIG. 45 is a bottom elevational view of the turbine assembly of FIG. 41 showing the eccentric nature of the first and second eccentrics in a first plane.
Figure 46:
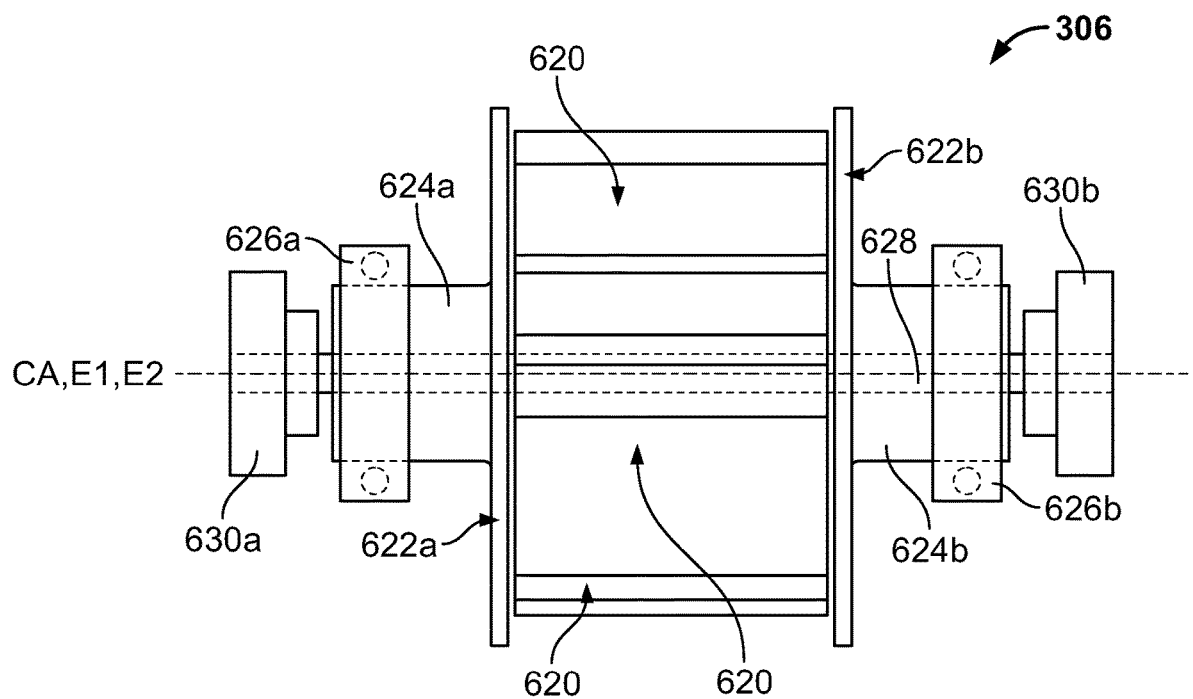
FIG. 46 is a front view of the turbine assembly of FIG. 41 showing the alignment of the turbine bearings in a second plane.

As shown in FIGS. 42 and 45, the first and second bushings 630a, 630b, the shaft 628, the first and second side retention walls 622a, 622b, the central hub 618, and the vanes 620 are aligned and concentric with a central axis CA, such that axis CA extends through the center of these components. However, the first and second eccentrics 624a, 624b, and thus the first and second bearings 626a, 626b engaged respectively thereto, are eccentric with the axis CA. The first eccentric 624a and the first bearing 626a are aligned with a first eccentric axis E1, while the second eccentric 624b and the second bearing 626b are aligned with a second eccentric axis E2. FIG. 45 is a bottom elevational view of the drive turbine assembly 306 showing the eccentric nature of the first and second eccentrics 624a, 624b and the relationship between the CA, E1, and E2 axes, as well as the components of the drive turbine assembly 306. As is illustrated in FIG. 45, the first and second eccentrics 624a, 624b, and the respective E1 and E2 axes are spaced evenly from the CA axis but are 180 degrees out of phase with each other. Accordingly, as the drive turbine assembly 306 rotates about the CA axis, the E1 and E2 axes will also rotate about the CA axis, with one of the E1 and E2 axes always on one side of the CA axis and the other one of the E1 and E2 axes being directly opposite, e.g., 180 degrees out of phase, and on the other side of the CA axis. FIG. 46 is another view of the drive turbine assembly 306 from a front view illustrating that while from one view, e.g., in one plane, the CA, E1, and E2 axes are not aligned, but in a view perpendicular to that, e.g., in a perpendicular plane, the CA, E1, and E2 axes are aligned.

Figure 47:
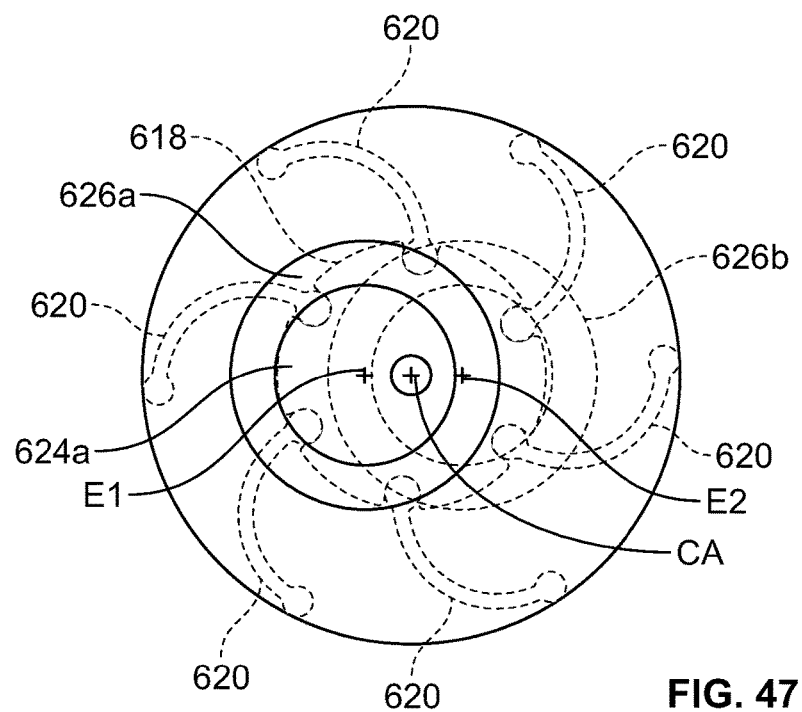
FIG. 47 is a side view of the turbine assembly of FIG. 41.

FIG. 47 is a side view of the drive turbine assembly 306 without the first and second bushings 630a, 630b showing the relationship between the CA, E1, and E2 axes, as well as the various components of the drive turbine assembly 306. Further discussion of the offset between the E1 and E2 axes and the CA axis is provided herein where the drive turbine assembly 306 is engaged with the first and second A-frame arms 304a, 304b, as illustrated in FIGS. 36 and 48.

FIG. 48 is a front view of the drive turbine assembly 306 engaged with first and second A-frame arms 304a, 304b such that the first and second bearings 626a, 626b are positioned within the bearing housing 612 (see FIGS. 38 and 49) of the respective first and second A-frame arm 304a, 304b. FIG. 49 is a partial sectional view of the drive turbine assembly 306 engaged with first and second A-frame arms 304a, 304b taken along line 49-49 of FIG. 48. As can be seen in FIG. 49, the second bearing 626b is positioned within the bearing housing 612 of the second A-frame arm 304b and is in contact with the extension plates 614a, 614b of the second A-frame arm 304b. Additionally, FIG. 49 illustrates the eccentricity between the E2 axis and the CA axis. As discussed above, the CA axis extends through the center of the shaft 628, the central hub 618, and the first and second bushings 630a, 630b, which are respectively secured in the first and second bushing housings 364a, 364b of the lower middle body 312, and thus, the CA axis is fixed in place. Additionally, as discussed above, the first and second bushing housings 364a, 364b can each include a protrusion 365 (see FIG. 37) positioned therein that is configured to engage a notch 631 of each bushing 630a, 630b (see FIGS. 41 and 42). The engagement between the respective notch 631 and protrusion 365 further secure the bushings 630a, 630b in the respective bushing housing 364a, 364b and limit rotation thereof. One of ordinary skill in the art would appreciate that, in the alternative, the bushings 630a, 630b can include a protrusion while the respective bushing housings 364a, 364b include a notch that receives a respective protrusion. Additionally, the bushing housings 364a, 364b and the bushings 630a, 630b can include complementary geometries that mate such that only a bushing 630a, 630b having the appropriate geometry will fit within the respective bushing housing 364a, 364b, and will be restrained from rotation by the bushing housing 364a, 364b when inserted therein. Being that the CA axis is fixed in place, rotation of the drive turbine assembly 306 results in rotation of the E1 axis and E2 axis about the fixed CA axis. As such, when the E2 axis is in the position illustrated in FIG. 49, e.g., laterally to the side of the CA axis, the second A-frame arm 304b is biased and slightly rotated about the pivot shaft 330 through engagement of the second bearing 626b with the first extension plate 614a of the second A-frame arm second finger 608a, which is why it is shown as tilted to the right in FIG. 49. It should therefore be understood that since the first bearing 626a is 180 degrees out of phase from the second bearing 626b, the first bearing 626a pushes the first A-frame arm 304a, which it is engaged with, in the opposite direction causing the first A-frame arm 304a to slightly rotate about the pivot shaft 330 in the opposite direction to the rotation of the second A-frame arm 304b. This is further illustrated in FIG. 36, which shows that when the first A-frame arm 304a is rotated and tilted in a first direction, the second A-frame arm 304b is rotated and tilted in the opposite direction.

Additionally, as discussed above, the square head 356 of each A-frame arm 304a, 304b is drivingly engaged with a walking pod assembly 308a, 308b (see FIG. 16). Accordingly, as the first and second A-frame arms 304a, 304b are rotated in opposite directions, the walking pod assemblies 308a, 308b are in turn rotated in opposite directions. More specifically, if the first A-frame arm 304a is rotated in a first direction then the first walking pod assembly 308a will be rotated in the first direction such that, for example, the front of the first walking pod assembly 308a will be rotated generally downward toward the pool surface while the rear of the first walking pod assembly 308a will be rotated generally upward and away from the pool surface; in contrast, the second A-frame arm 304b will be rotated in a second direction opposite the first direction resulting in the second walking pod assembly 308b being rotated in the second direction such that, for example, the front of the second walking pod assembly 308b is rotated generally upward and away from the pool surface while the rear of the second walking pod assembly 308b will be rotated generally downward and toward the pool surface, which is opposite to the first walking pod assembly 308a. This alternating movement between the first and second walking pod assemblies 308a, 308b results in motion of the cleaner 300.

FIGS. 50A-D illustrate the second bearing 626b and the second A-frame arm assembly 304b in four different positions based upon the location of the E2 axis with respect to the CA axis. Note that the E1 axis is also provided in FIGS. 50A-D for convenience even though the first bearing 626a and first A-frame arm assembly 304a are not shown.

As the drive turbine assembly 306 rotates counter-clockwise about the shaft 628, and the CA axis, the E1 and E2 axes also rotate about the shaft 628 and the CA axis because of the engagement between the first and second eccentrics 624a, 624b and the central hub 618 by way of the first and second side retention walls 622a, 622b. The rotation of the E1 and E2 axes about the CA axis causes the first and second bearings 626a, 626b push and therefore rotate the respective first and second A-frame arm assembly 304a, 304b. This occurs because the E1 axis is always kept in the center of, e.g., equidistant from, the first and second fingers 608a, 608b of the first A-frame arm assembly 304a and the E2 axis is always kept in the center of, e.g., equidistant from, the first and second fingers 608a, 608b of the second A-frame arm assembly 304b, while the CA axis is kept at a static location because of the engagement of the bushings 630a, 630b with the bushing housings 364a, 364b (see FIG. 36). Thus, the amount that the first and second A-frame arm assemblies 304a, 304b are rotated is directly related to the distance that the E1 and E2 axes are offset, or spaced from, the CA axis. FIGS. 50A-50D illustrate this motion.

Figure 50A:
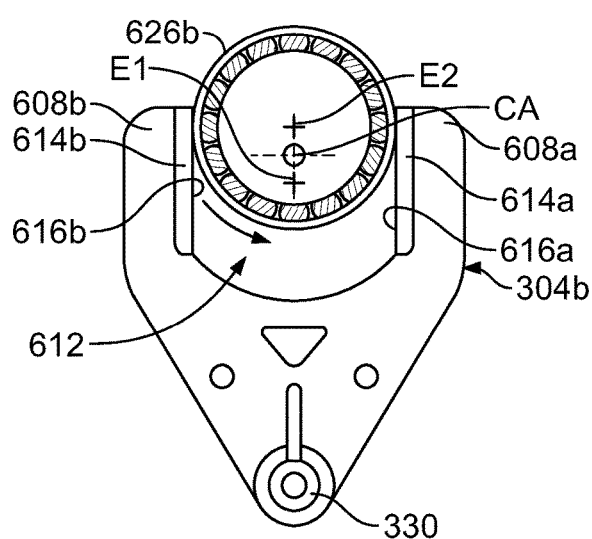
FIG. 50A is a sectional view of the turbine bearing of FIG. 48 taken along line 50-50 of FIG. 48 showing engagement of the turbine bearing with the A-frame arm in a first position.

FIG. 50A shows the second bearing 626b and the second A-frame arm assembly 304b in a first position. In the first position, the E1, CA, and E2 axes are in substantial vertical alignment, with the E1 axis being below the E2 axis. Because of this alignment, the CA axis is equidistant from both extension plates 614a, 614b of the second A-frame arm assembly 304b resulting in the second A-frame arm assembly 304b being in a vertical position where it is not tilted.

Figure 50B:
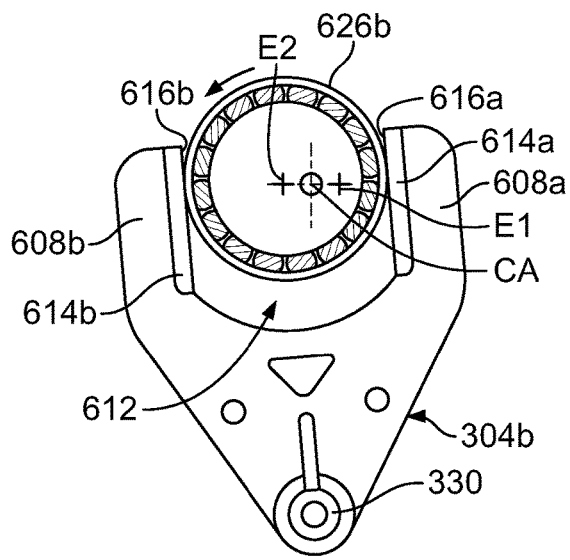
FIG. 50B is a sectional view of the turbine bearing and A-frame arm of FIG. 48 in a second position.

As the drive turbine assembly 306 rotates counter-clockwise the A-frame arm assemblies 304a, 304b are transferred to the next position. FIG. 50B shows the second bearing 626b and the second A-frame arm assembly 304b in a second position. In the second position, the E1, CA, and E2 axes are in substantial horizontal alignment. Because of this alignment, the CA axis is closer to the first extension plate 614a of the second A-frame arm assembly 304b resulting in the second bearing 626b pushing against the second extension plate 614b, and thus causing the second A-frame arm assembly 304b to rotate counter-clockwise (as per this view point) about the pivot 330, and thus tilted to the left (as per this view point).

Figure 50C:
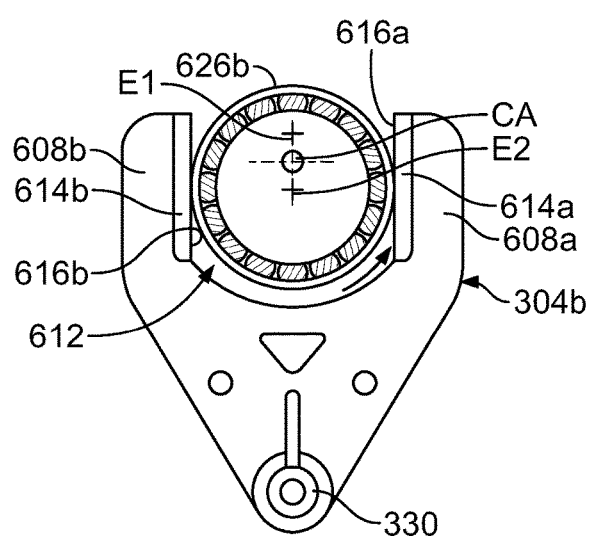
FIG. 50C is a sectional view of the turbine bearing and A-frame arm of FIG. 48 in a third position.

Continued rotation of the drive turbine assembly 306 counter-clockwise results in the A-frame arm assemblies 304a, 304b being transferred to the next position. FIG. 50C shows the second bearing 626b and the second A-frame arm assembly 304b in a third position. In the third position, the E1, CA, and E2 axes are in substantial vertical alignment, similar to the first position, but with the E1 axis above the E2 axis. Because of this alignment, the CA axis is equidistant from both extension plates 614a, 614b of the second A-frame arm assembly 304b resulting in the second A-frame arm assembly 304b being in a vertical position where it is not tilted.

Figure 50D:
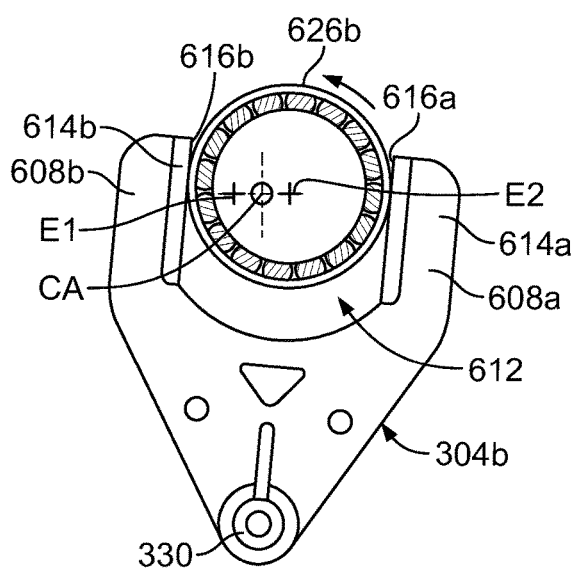
FIG. 50D is a sectional view of the turbine bearing and A-frame arm of FIG. 48 in a fourth position.

Further rotation of the drive turbine assembly 306 counter-clockwise results in the A-frame arm assemblies 304a, 304b being transferred to the next position. FIG. 50D shows the second bearing 626b and the second A-frame arm assembly 304b in a fourth position. In the fourth position, the E1, CA, and E2 axes are in substantial horizontal alignment. Because of this alignment, the CA axis is closer to the second extension plate 614b of the second A-frame arm assembly 304b resulting in the second bearing 626b pushing against the first extension plate 614a, and thus causing the second A-frame arm assembly 204b to rotate clockwise (as per this view point) about the pivot 330, and thus tilted to the right (as per this view point). Continued rotation of the drive turbine assembly 306 from the fourth position will bring the A-frame arm assemblies 304a, 304b back to the first position illustrated in FIG. 50A.

FIGS. 51-52 illustrate an alternative embodiment of the locomotion system 600 of the present disclosure. Particularly, FIG. 51 is a side view of the drive turbine assembly 306 including a fixed vane turbine 652, and in engagement with first and second A-frame arm assemblies 304a, 304b. FIG. 52 is a sectional view of the drive turbine assembly 306 of FIG. 51 taken along line 52-52 of FIG. 51. The drive turbine assembly 306 and A-frame arm assemblies 304a, 304b of FIGS. 51-52 are generally the same as previously discussed, but with the fixed vane turbine 652 replacing the central hub 618, the removable vanes 620, and the side retention walls 622a, 622b.

Figure 53:
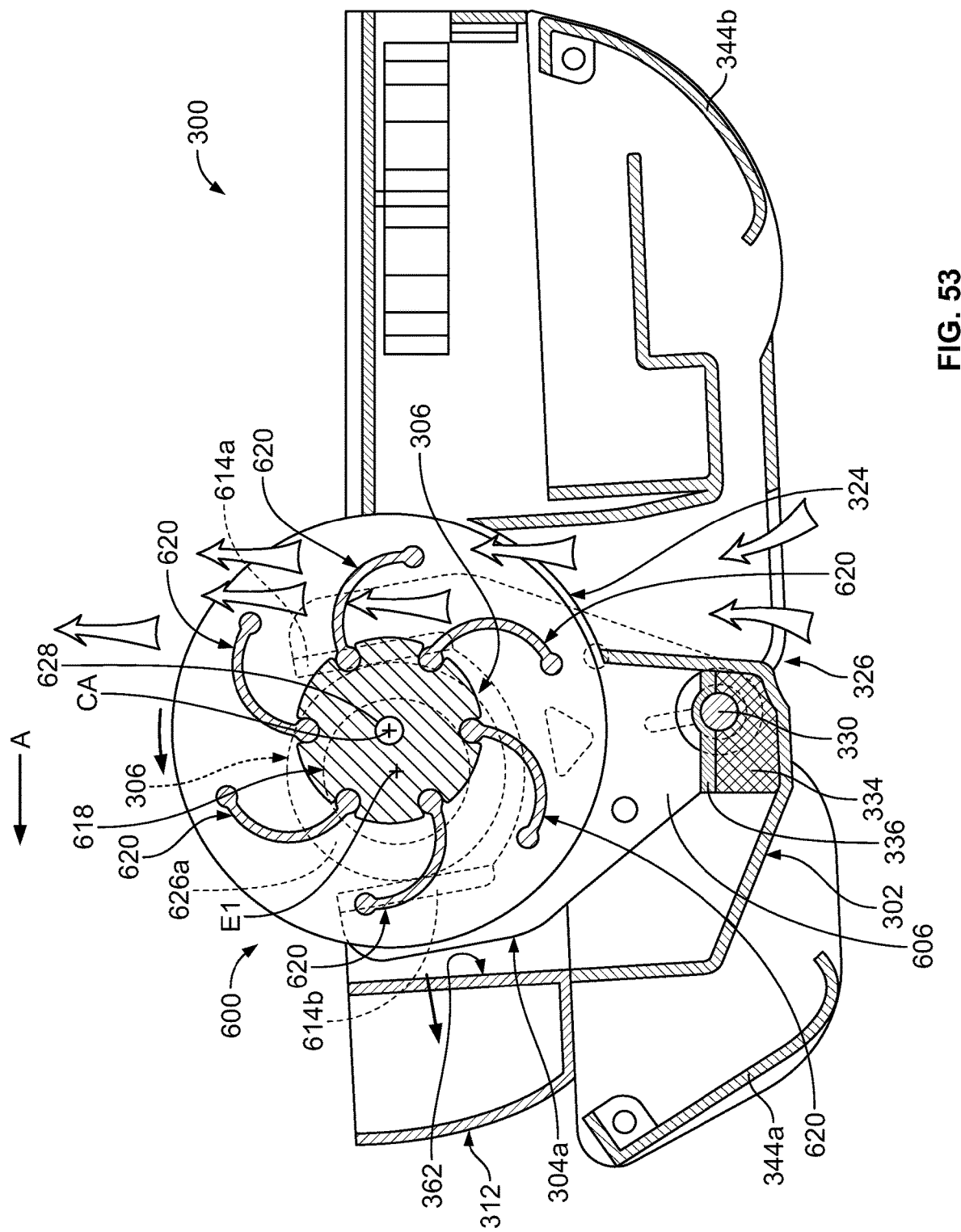
FIG. 53 is a diagrammatic partial-sectional of the locomotion system and cleaner of FIG. 36 in partial section taken along line 53-53 of FIG. 36 and showing operation of a first A-frame arm and turbine of the locomotion system.
Figure 54:
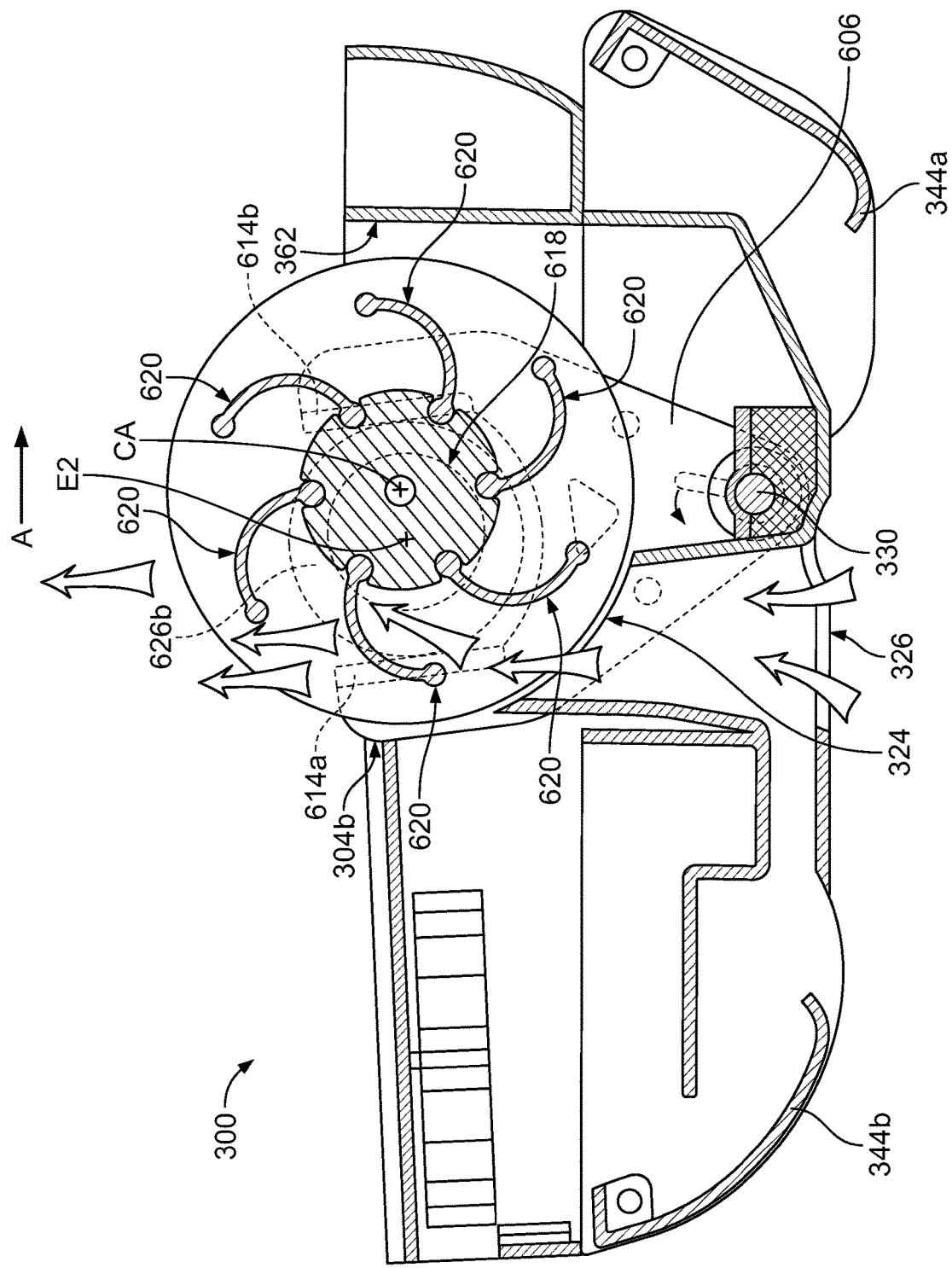
FIG. 54 is a diagrammatic partial-sectional of the locomotion system and cleaner of FIG. 36 in partial section taken along line 54-54 of FIG. 36 and showing operation of a second A-frame arm and turbine of the locomotion system.

FIG. 53 is a diagrammatic partial-sectional view of the locomotion system 600 and portion of the cleaner 300 of FIG. 36 in partial section taken along line 53-53 of FIG. 36 and showing the first A-frame arm assembly 304a. FIG. 54 is a diagrammatic partial-sectional view of the locomotion system 600 and portion of the cleaner 300 of FIG. 36 in partial section taken along line 54-54 of FIG. 36 and showing the second A-frame arm assembly 304b. FIGS. 53 and 54 illustrate the position that each of the first and second A-frame arm assemblies 304a, 304b are in at the same point in time during operation of the cleaner 300. As shown in FIGS. 53-54, the locomotion system 600 is integrated with the cleaner 300 such that it is housed within the turbine housing 362. As water is suctioned through the cleaner 300, water is drawn through the inlet 324 and into the turbine housing 362. The water being pulled through the turbine housing 362 engages the vanes 620 of the drive turbine assembly 306, causing the drive turbine assembly 306 to rotate about the shaft 628. As described in detail above, this results in the E1 axis (FIG. 53) and the E2 axis (FIG. 54) rotating about the CA axis of the shaft 628 and rocking the first and second A-frame arm assemblies 304a, 304b back and forth. In the specific position of FIGS. 53 and 54, which is the second position illustrated in FIG. 50B, the first A-frame arm assembly 304a is rotated about the pivot 330 generally toward the front of the cleaner 300 (see FIG. 53), while the second A-frame arm assembly 304b is rotated about the pivot 330 generally toward the rear of the cleaner 300 (see FIG. 54). That is, the first and second A-frame arm assemblies 304a, 304b are rotated in opposite directions. This results in, as discussed in detail above, the first and second walking pods 308a, 308b being rotated in opposite directions, e.g., the motion of the A-frame arm assemblies 304a, 304b is imparted to the connected first and second walking pods 308a, 308b, respectively. The motion of the first and second walking pods 308a, 308b results in locomotion of the cleaner 300 in the direction of arrow A.

Figure 55:
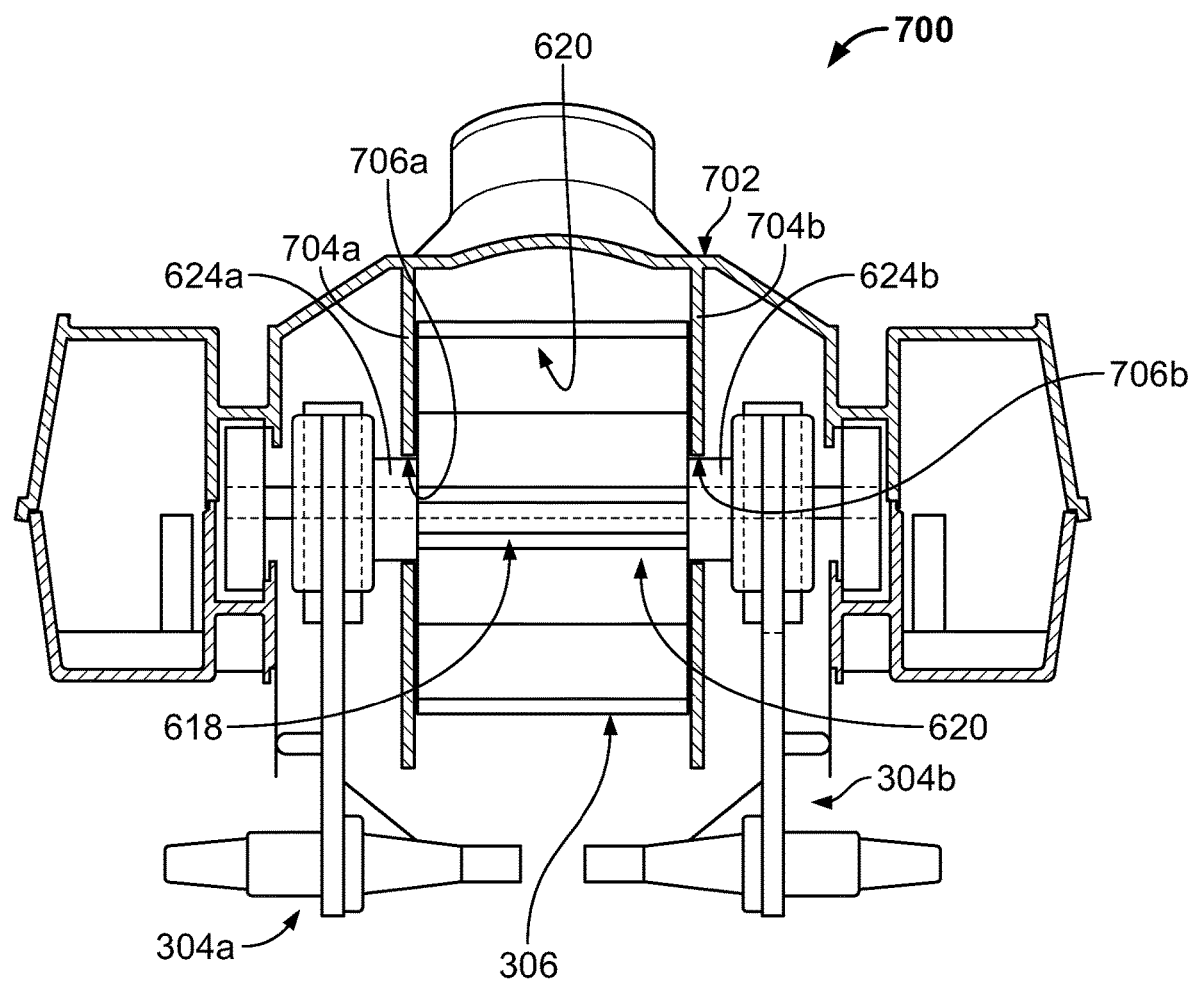
FIG. 55 is a diagrammatic partial-sectional view showing an alternative embodiment of the turbine assembly of the present disclosure incorporated into a cleaner.

FIG. 55 is a diagrammatic partial-sectional view showing the A-frame arm assemblies 304a, 304b and an alternative embodiment of the drive turbine assembly 306 of the present disclosure incorporated into a cleaner 700. It should be appreciated by one of ordinary skill in the art that the drive turbine assembly 306 need not include the side retention walls 622a, 622b as illustrated in, for example, FIGS. 41 and 42. Instead, the drive turbine assembly 306, and the first and second A-frame arm assemblies 304a, 304b, can be utilized in a cleaner 700 that includes a body 702 having first and second retention walls 704a, 704b. Specifically, the first and second retention walls 704a, 704b extend inwardly from the cleaner body 702 and the turbine vanes 620 and central hub 618 are placed between the first and second retention walls 704a, 704b. Further, the first and second retention walls 704a, 704b each include an opening 706a, 706b that respectively receive the first and second eccentrics 624a, 624b such that the eccentrics 624a, 624b can rotate within the openings 706a, 706b. In such a configuration, the first and second retention walls 704a, 704b prevent the vanes 620 from sliding out of, and disengaging, the central hub 618.

FIGS. 56A-56C are partial sectional views of a self-adjusting frame assembly 800 of the present disclosure showing the self-adjusting frame assembly 800 in three positions. The self-adjusting frame assembly 800 is an apparatus that can be implemented in a cleaner to engage and rotate walking pod assemblies (e.g., walking pod assemblies 308a, 308b of FIG. 16) and thus generate locomotion of the cleaner. Generally, the self-adjusting frame assembly 800 would replace each of the A-frame arm assemblies 304a, 304b discussed above in connection with FIGS. 34-54. FIG. 56A shows the self-adjusting frame assembly 800 in a first position. The self-adjusting frame assembly 800 includes a frame 804 and a crank 806 having a crank axis of rotation C. The frame 804 includes a shaft 808, and a frame body 810. The frame body 810 includes an internal bore 812 and a central opening 814. A bearing 816 is positioned within the central opening 814 such that the bearing rotates within the central opening 814 about a bearing axis B, which is at the center of the bearing 816 and at the center of the central opening 814. The crank 806 is engaged with the bearing 816 at a point offset from axis B and rotates about a crank axis C. The crank 806 can be rotatably connected with a turbine, horseshoe-shaped oscillator, or hammer oscillator (not shown) such that the crank 806 is rotatably driven by anyone of these devices. The crank 806 is generally eccentric and fixed in place so that it does not move vertically or horizontally.

A first end 808a of the shaft 808 is connected with a pivot 818 and a second end 808b of the shaft 808 is inserted into the internal bore 812 of the frame body 810. The shaft 808 and the internal bore 812 are sized and configured so that the shaft 808 can slide into the internal bore 812 in a piston-like motion. The frame 804 is configured to rotate the pivot 818 while the pivot 818 is constrained from moving laterally and vertically.

In operation, as the crank 806 rotates, the crank 806 forces the bearing 816, and axis B thereof, to rotate about axis C. Because the crank 806 is fixed, this results in the bearing 816 rotating within the central opening 814 of the frame body 810 and pushing the frame body 810 laterally and vertically. The lateral movement causes the frame body 810 to rotate the shaft 808 at the pivot 818 (see FIG. 56B), while the vertical movement causes the frame body 810 to further engage the shaft 808 such that the shaft 808 is inserted further into the internal bore 812. FIG. 56B shows the self-adjusting frame assembly 800 in a second position where the bearing 816 and axis B have been rotated counter-clockwise about the crank 806 and axis C resulting in the frame body 810 being moved laterally and vertically. This lateral and vertical movement of the frame body 810 results in the shaft 808 partially rotating the pivot 818 and being further inserted into the internal bore 812.

FIG. 56C shows the self-adjusting frame assembly 800 in a third position where the bearing 816 and axis B have been further rotated counter-clockwise about the crank 806 and axis C resulting in the frame being further moved laterally and vertically. This lateral and vertical movement of the frame body 810 results in the shaft 808 partially rotating the pivot 818 and being fully inserted into the internal bore 812.

As the crank 806 continually rotates, this movement is repeated continuously, causing the shaft 808 and pivot 818 to rotate back and forth. The pivot 818 can be connected with a keyed shaft that can extend to a walking pod, such as walking pods 308a, 308b, or other mode of locomotion (not shown) such that the pivot 818 can rotate the mode of locomotion and otherwise drive it. For example, the self-adjusting frame assembly 800 could be implemented in the suction cleaner 300 of FIG. 16. In this regard, two self-adjusting frame assemblies 800 could be implemented with each being connected to a respective walking pod.

Figure 57B:
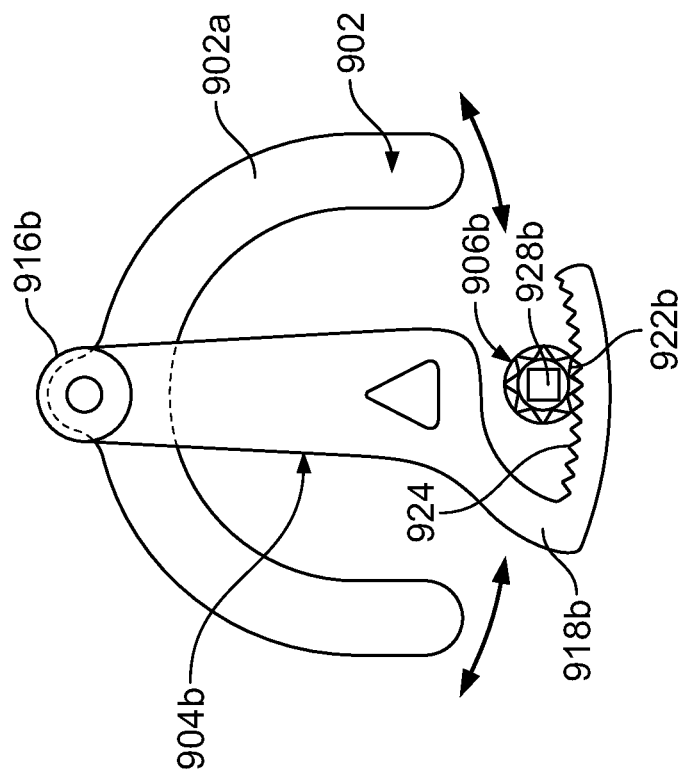
FIG. 57B is a second side view of the oscillator locomotion system of FIG. 57 showing a horseshoe shaped oscillator and a second gear frame engaged with a second rotatable component.
Figure 57A:
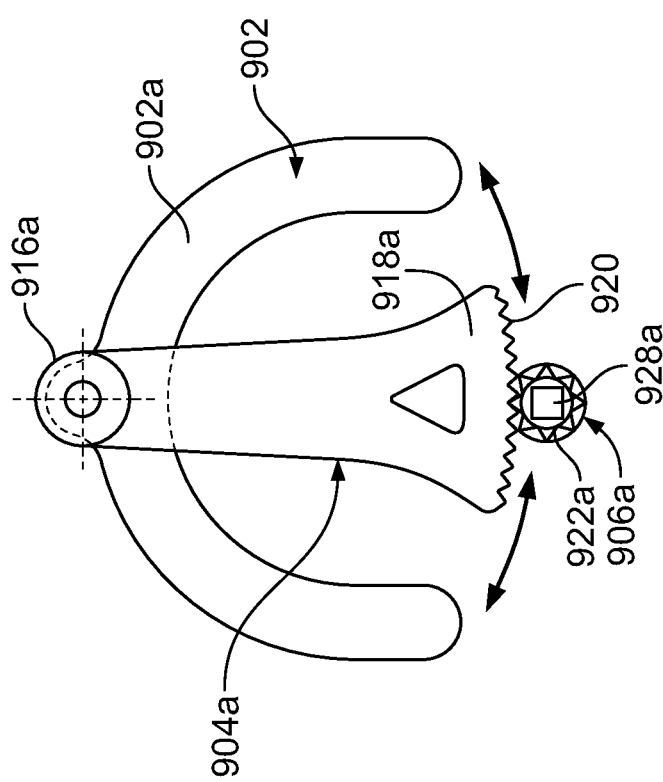
FIG. 57A is a first side view of the oscillator locomotion system of FIG. 57 showing a horseshoe shaped oscillator and a first gear frame engaged with a first rotatable component.
Figure 58B:
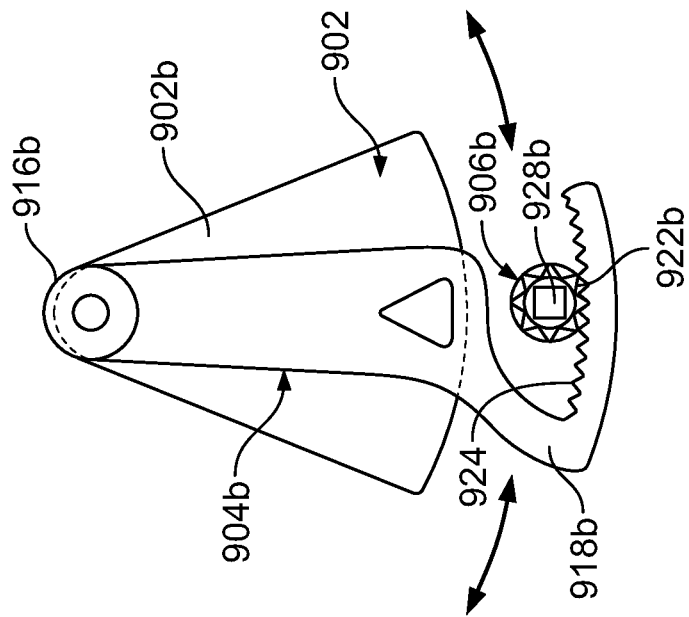
FIG. 58B is a second side view of the oscillator locomotion system of FIG. 58 showing a hammer oscillator and a second gear frame engaged with a second rotatable component.
Figure 58A:
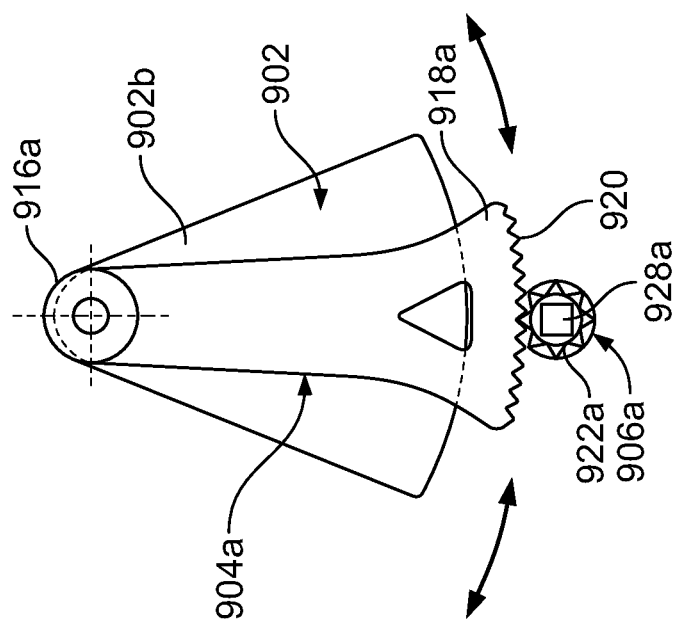
FIG. 58A is a first side view of the oscillator locomotion system of FIG. 58 showing a hammer oscillator and a first gear frame engaged with a first rotatable component.

FIGS. 57, 57A, 57B, 58A, and 58B illustrate alternative apparatuses for connection with the walking pod assemblies of a cleaner, such as walking pod assemblies 308a, 308b of FIG. 16, to rotate the walking pod assemblies and generate locomotion of the associated cleaner. For example, FIGS. 57, 57A, 57B, 58A, and 58B illustrate an alternative oscillator locomotion system 900 of the present disclosure that could be implemented in place of the locomotion system 600 of FIG. 34, including the A-frame arm assemblies 304a, 304b and drive turbine assembly 306. FIG. 57 is a partial side view of the oscillator locomotion system 900 which includes an oscillator 902 driving first and second gear frames 904a, 904b respectively engaged with first and second rotatable components 906a, 906b. FIGS. 57A and 57B are first and second side views of the oscillator locomotion system 900 showing a first embodiment of the oscillator 902 having a horseshoe-shaped configuration 902a. FIGS. 58A and 58B are first and second side views of the oscillator locomotion system 900 showing a second embodiment of the oscillator 902 having a hammer configuration 902b. The operation and functionality of the oscillator locomotion system 900 is consistent between each of FIGS. 57A, 57B, 58A, 58B, and description of the system 900 will be made only in connection with FIGS. 57A and 57B, and it should be understood by one of ordinary skill in the art that such description will hold true for and also apply to FIGS. 58A and 58B.

FIG. 57A is a first side view of the oscillator 902, first gear frame 904a, and first rotatable component 906a. FIG. 57B is a second side view of the oscillator 902, second gear frame 904b, and second rotatable component 906b. The oscillator 902 is positioned between first and second walls 908a, 908b of a pool cleaner that define a chamber 910 that water flows through. The chamber 910 can be similar to a turbine chamber, such as the turbine chamber 362 of the pool cleaner 300 of FIG. 16. The oscillator 902 is mounted to a shaft 912 that extends across the oscillator 902 and through the first and second walls 908a, 908b. The shaft 912 can be mounted to the first and second walls 908a, 908b by first and second bearings 914a, 914b that allow the shaft 912 to rotate. The shaft 912 can be further secured with a proximal end 916a, 916b of the first and second gear frames 904a, 904b. Accordingly, the oscillator 902, shaft 912, and first and second gear frames 904a, 904b are all rotationally secured to each other such that rotation of the oscillator 902 results in rotation of the shaft 912 and the first and second gear frames 904a, 904b.

The first gear frame 904a can include the proximal end 916a and a distal end 918a that includes a toothed surface 920. The toothed surface 920 is configured to engage a toothed gear 922a of the first rotatable component 906a. The toothed surface 920 engages the toothed gear 922a in an "overhand" fashion such that clockwise rotation of the toothed surface 920 results in counter-clockwise rotation of the toothed gear 922a while counter-clockwise rotation of the toothed surface 920 results in clockwise rotation of the toothed gear 922a.

The second gear frame 904b can include the proximal end 916b and a distal end 918b that has a sickle-like shape including an interior toothed surface 924. The interior toothed surface 924 is configured to engage a toothed gear 922b of the second rotatable component 906b. The toothed surface 924 engages the toothed gear 922b in an "underhand" fashion such that clockwise rotation of the toothed surface 924 results in clockwise rotation of the toothed gear 922b while counter-clockwise rotation of the toothed surface 924 results in counter-clockwise rotation of the toothed gear 922b.

The first and second rotatable components 906a, 906b can be mounted to the first and second walls 908a, 908b by a respective bearing 926a, 926b such that the first and second rotatable components 906a, 906b can rotate. The first and second rotatable components 906a, 906b can also each include a shaped head 928a, 928b extending therefrom that is connected with a means for motion of a pool cleaner such as a walking pod or other mode of locomotion (not shown) such that the shaped heads 928a, 928b can rotate the mode of locomotion and otherwise drive it. For example, the oscillator locomotion system 900 could be implemented in the suction cleaner 300 of FIG. 16. In this regard, the shaped head 928a, 928b of each respective first and second rotatable components 906a, 906b could be connected to a respective walking pod.

In operation, water flowing through the chamber 910 would cause the oscillator 902 to oscillate back and forth within the chamber 910. This oscillation would in turn cause the first and second gear frames 904a, 904b to oscillate back and forth. During this oscillation, the first gear frame 904a would rotatably drive the first rotatable member 906a in a first rotational direction as the second gear frame 904b rotatably drives the second rotatable member 906b in an opposite rotational direction. Accordingly, the first shaped head 928a would rotate an associated gear pod or other mode of locomotion in the first rotational direction, while the second shaped head 928b would rotate an associated gear pod or other mode of locomotion in an opposite rotational direction. This opposed rotation would result in the movement of a pool or spa cleaner.

Figure 60:
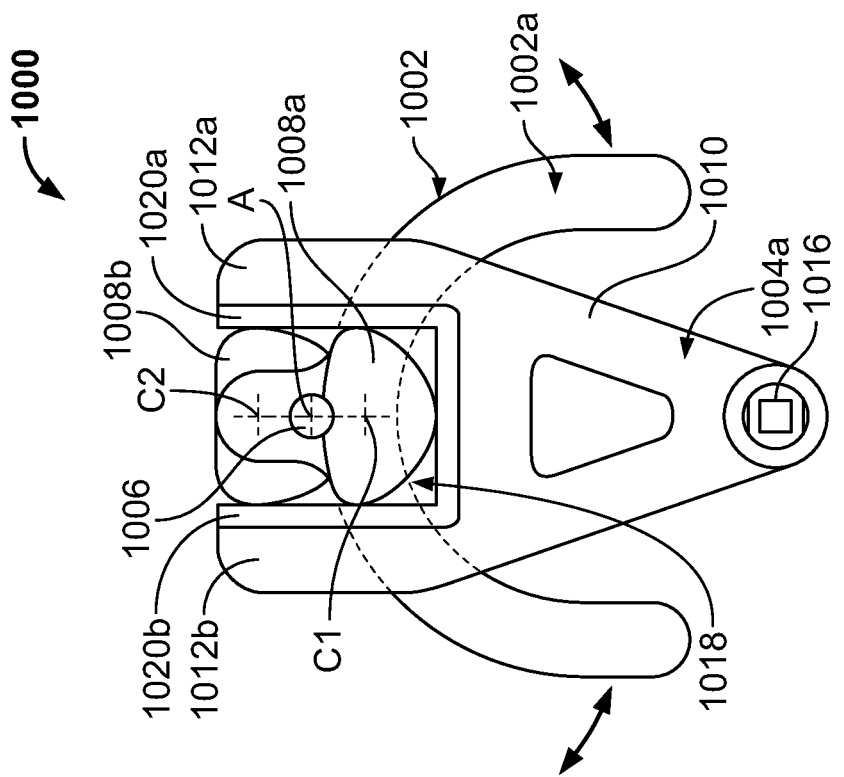
FIG. 60 is a side view of the oscillator locomotion system of FIG. 59 in a neutral position and showing a first embodiment of the oscillator having a horseshoe shaped configuration.
Figure 59:
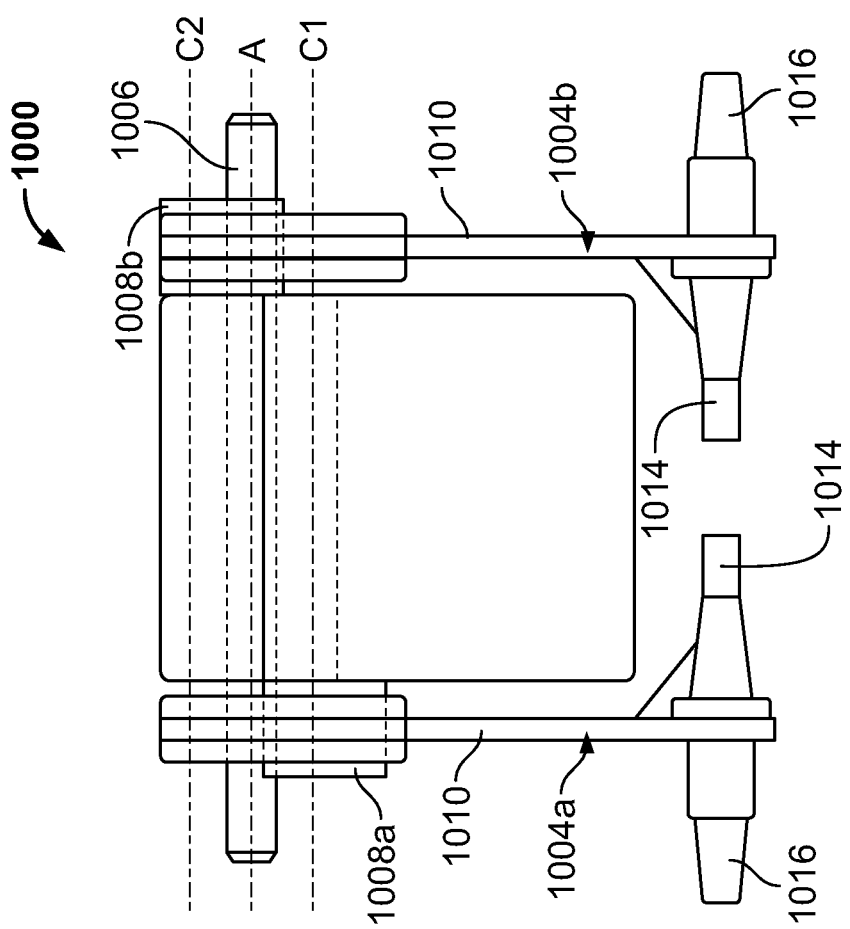
FIG. 59 is a partial side view showing an oscillator locomotion system including an oscillator and first and second cams for driving first and second A-frame arms.
Figure 61:
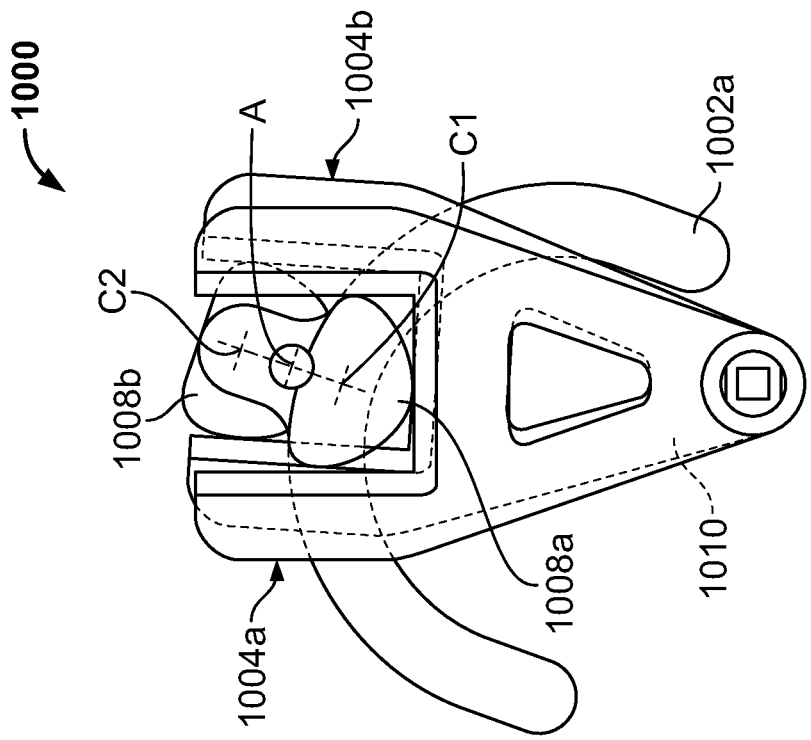
FIG. 61 is a side view of the oscillator locomotion system of FIG. 59 in a first position and showing the first embodiment of the oscillator having a horseshoe shaped configuration.
Figure 62:
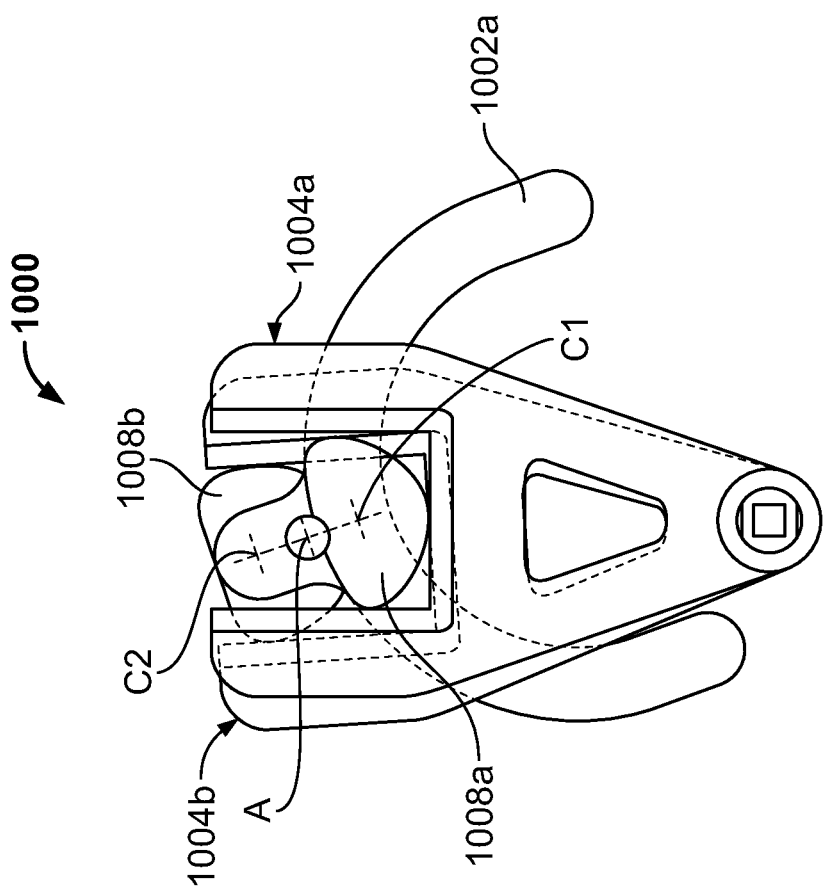
FIG. 62 is a side view of the oscillator locomotion system of FIG. 59 in a second position and showing the first embodiment of the oscillator having a horseshoe shaped configuration.
Figures 63, 64:
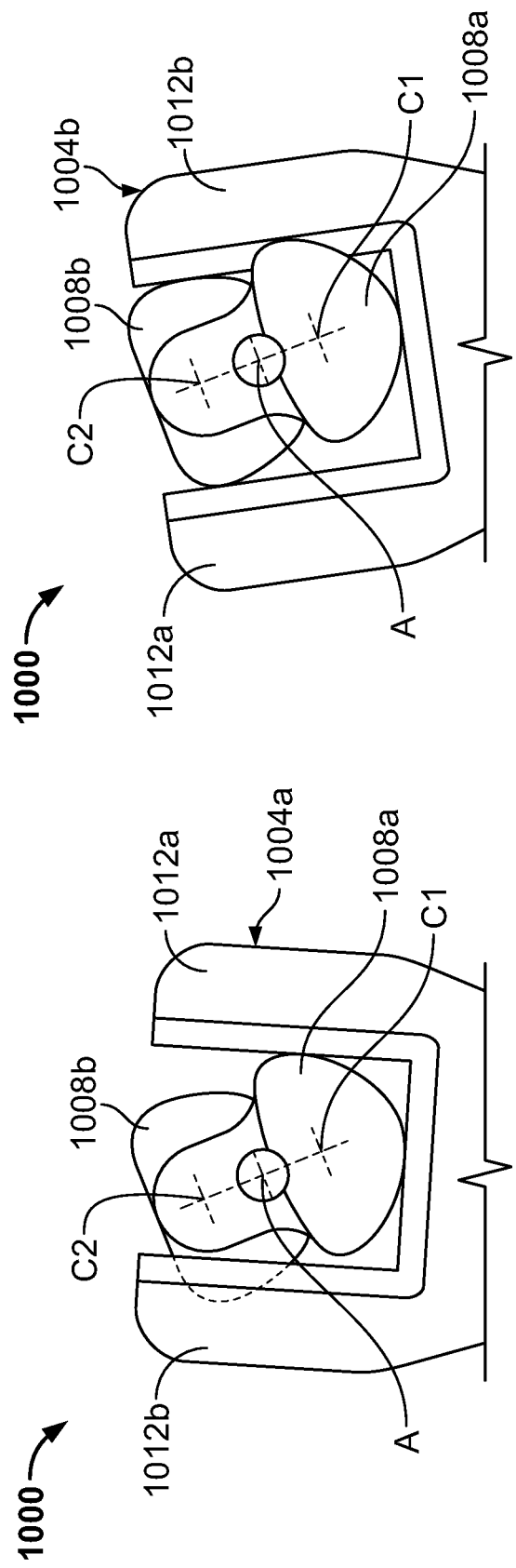
FIG. 63 is a partial side view of the first A-frame arm and cams when the oscillator locomotion system is in the first position of FIG. 61 showing engagement of the first cam with the first A-frame arm.
FIG. 64 is a partial side view of the second A-frame arm and cams when the oscillator locomotion system is in the first position of FIG. 61 showing engagement of the second cam with the second A-frame arm.
Figure 65:
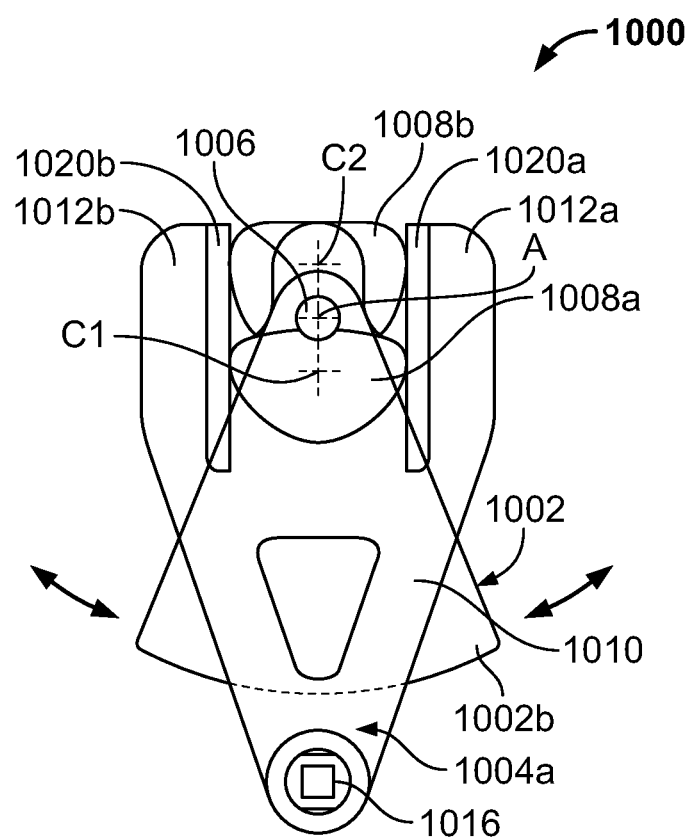
FIG. 65 is a side view of the oscillator locomotion system of FIG. 65 in a neutral position and showing a second embodiment of the oscillator having a hammer configuration.

FIGS. 59-65 illustrate an alternative oscillator locomotion system 1000 of the present disclosure that can be utilized in a suction cleaner such as the suction cleaner 300 of FIG. 16. The oscillator locomotion system 1000 could be connected with the walking pod assemblies of a cleaner, such as walking pod assemblies 308a, 308b of FIG. 16, to rotate the walking pod assemblies and generate locomotion of the associated cleaner. For example, the alternative oscillator locomotion system 1000 of the present disclosure could be implemented in place of the locomotion system 600 of FIG. 34, including the A-frame arm assemblies 304a, 304b and drive turbine assembly 306. FIG. 59 is a partial side view of the oscillator locomotion system 1000 which includes an oscillator 1002 driving first and second A-frame assemblies 1004a, 1004b. FIGS. 60-62 are first, second, and third side views of the oscillator locomotion system 1000 showing a first embodiment of the oscillator 1002 having a horseshoe-shaped configuration 1002a. FIG. 65 is a side view of the oscillator locomotion system 1000 showing a second embodiment of the oscillator 1002 having a hammer configuration 1002b. The operation and functionality of the oscillator locomotion system 1000 is consistent between each of FIGS. 59-65, and description of the system 1000 will be made only in connection with FIGS. 59-64, and it should be understood by one of ordinary skill in the art that such description will hold true for and also apply to FIG. 65.

A shaft 1006 extends through the oscillator 1002 and includes a central axis A that the oscillator 1002 rotates about. The shaft 1006 can be similar in construction to the shaft 628 discussed in connection with the drive turbine assembly 306 of FIG. 42. In accordance therewith, the shaft 628 can be connected on lateral ends thereof with first and second bushings (not shown) such that the shaft can be secured within a pool cleaner house and prevented from moving laterally. The oscillator 1002 can include first and second cams 1008a, 1008b extending laterally from the sides thereof. The first and second cams 1008a, 1008b are eccentric with the axis of rotation of the oscillator 1002, e.g., axis A. Specifically, the first cam 1008a has a central axis C1 and the second cam 1008b has a central axis C2. The first and second cams 1008a, 1008b are integral with the oscillator 1002 such that they rotate with the oscillator 1002.

The first and second A-frame arm assemblies 1004a, 1004b are substantially similar to the A-frame arm assemblies 304a, 304b discussed in connection with FIGS. 38-40. It should be understood that the A-frame arm assemblies 1004a, 1004b are identical in construction, and, accordingly, the reference numerals will be consistent between the A-frame arm assemblies 1004a, 1004b. The A-frame arm assembly 1004a, 1004b includes a body 1010 having first and second fingers 1012a, 1012b extending therefrom, a pivot shaft 1014 extending perpendicular from a first side of a lower portion of the body 1010, and a square head 1016 extending perpendicular from a second side of the lower portion of the body 1010 opposite the pivot shaft 1014. The pivot shaft 1014 and the square head 1016 are generally coaxial.

The first and second fingers 1012a, 1012b define a cam housing 1018 and each include a respective extension plate 1020a, 1020b. The pivot shaft 1014 is configured to be secured to a cleaner, such as by the pivot upper and lower brackets 334, 336 of the cleaner 300 of FIG. 16, while the square head 1016 is configured to extend to the exterior of the cleaner and engage a mode of locomotion such as the walking pod assembly 308a, 308b of FIG. 16. The square heads 1016 of the A-frame arm assemblies 1004a, 1004b mate with a square socket of the respective walking pod assembly such that rotation of the square head 1016 results in rotation of the engaged walking pod assembly.

The A-frame arm assemblies 1004a, 1004b are configured so that when they are installed in a pool cleaner the first cam 1008a can be placed in the cam housing 1018 of the first A-frame arm assembly 1004a and the second cam 1008b can be placed in the cam housing 1018 of the second A-frame arm assembly 1004b, each engaging the extension plates 1020a, 1020b of the respective A-frame arm assembly 1004a, 1004b. The oscillator 1002, and particularly the cams 1008a, 1008b, when positioned within the cam housing 1018 of each A-frame arm assembly 1004a, 1004b rotate or rock the A-frame arm assemblies 1004a, 1004b at the pivot shaft 1014, causing the square heads 1016 to rotate the respective walking pod assembly that they are engaged with.

This motion of the A-frame arm assemblies 1004a, 1004b is achieved through engagement of each cam 1008a, 1008b with the A-frame arm assembly 1004a, 1004b that it is engaged with. Specifically, as the oscillator 1002 oscillates, which occurs when water is suctioned past it, it rotates about the shaft 1006 and axis A, thus causing the cams 1008a, 1008b, and associated axes C1 and C2, to rotate about axis A. The rotation of the cams 1008a, 1008b results in the cams 1008a, 1008b "pushing" the A-frame arm assemblies 1004a, 1004b and causing them to rotate. This motion is shown in connection with FIGS. 60-64.

FIG. 60 illustrates the position of the oscillator 1002, first A-frame arm 1004a, first cam 1008a, and second cam 1008b when there is no rotation of the oscillator 1002, e.g., a neutral position. As can be seen, the A axis, the C1 axis, and the C2 axis are substantially aligned vertically and the first A-frame arm 1004a is not rotated.

FIG. 61 illustrates the position of the oscillator 1002, first A-frame arm 1004a, first cam 1008a, and second cam 1008b when the oscillator 1002, and interconnected cams 1008a, 1008b, are rotated counter-clockwise about axis A. Here, it can be seen that the axis C1 is now located slightly to the right of axis A while axis C2 is now located slightly to the left of axis A. Due to the shape of the cams 1008a, 1008b, this rotation of the oscillator 1002 and interconnected cams 1008a, 1008b results in the first cam 1008a pushing the first A-frame arm assembly 1004a to the right (clockwise rotation) (see FIG. 63 which shows this engagement in closer detail) and the second cam 1008b pushing the second A-frame arm assembly 1004b to the left (counter-clockwise rotation) (see FIG. 64 which shows this engagement in closer detail). Further, this opposing rotation of the A-frame arm assemblies 1004a, 1004b results in opposing rotation of the respective square heads 1016 thereof. Accordingly, the mode of locomotion connected to each square head 1016, e.g., foot pods, will be rotated in opposite directions.

FIG. 62 illustrates the position of the oscillator 1002, first A-frame arm 1004a, first cam 1008a, and second cam 1008b when the oscillator 1002, and interconnected cams 1008a, 1008b, are rotated clockwise about axis A. Here, it can be seen that the axis C1 is now located slightly to the left of axis A while axis C2 is now located slightly to the right of axis A. Due to the shape of the cams 1008a, 1008b, this rotation of the oscillator 1002 and interconnected cams 1008a, 1008b results in the first cam 1008a pushing the first A-frame arm assembly 1004a to the left (counter-clockwise rotation) and the second cam 1008b pushing the second A-frame arm assembly 1004b to the right (clockwise rotation). Further, this opposing rotation of the A-frame arm assemblies 1004a, 1004b results in opposing rotation of the respective square heads 1016 thereof. Accordingly, the mode of locomotion connected to each square head 1016, e.g., foot pods, will be rotated in opposite directions.

As the oscillator locomotion system 1000 continuously oscillates between the positions of FIGS. 60-62 the mode of locomotion, e.g., foot pods, connected to the A-frame arm assemblies 1004a, 1004b will continuously rock back and forth resulting in motion of the pool cleaner that the oscillator locomotion system 1000 is integrated into.

Some embodiments of the present disclosure include a pair of A-frames supporting the turbine. Each improved A-frame has a large opening and two straight long surfaces. In such embodiments, the turbine consists of two opposing eccentrics which retain two large bearings. The two large bearings remain in contact with the straight surfaces throughout operation of the cleaner. Such constant contact improves durability and a smoother functioning of the cleaner. The large bearings may be selected to also have a greater resistance to wear and tear due to the rolling action in comparison to knocking action of some prior A-frame arrangements.

Each of the improved A-frame arm assemblies and drive turbine assemblies discussed in detail above can be implemented with many pool cleaners that are currently on the market. For example, each of these improved A-frame arm assemblies and drive turbine assemblies can be added to, or substitute for parts in, known pool cleaners, such as those manufactured and produced by Hayward Industries, Inc. under the name Pool Vac, Navigator®, AquaBug®, AquaDroid®, and Pool Vac Ultra®.

While the principles of the disclosure have been shown and described in connection with specific embodiments, it is to be understood that such embodiments are by way of example and are not limiting.

Generally, pool and spa cleaners, such as pressure cleaners, include a source of pressurized fluid that is provided to the cleaner. This source of pressurized fluid is discharged through a nozzle as a venturi jet adjacent a bottom inlet of the cleaner to produce a suction effect at the inlet and pull water and debris into the cleaner through the inlet. The venturi jet will also often be directed to an internal turbine of the cleaner.

Figure 66:
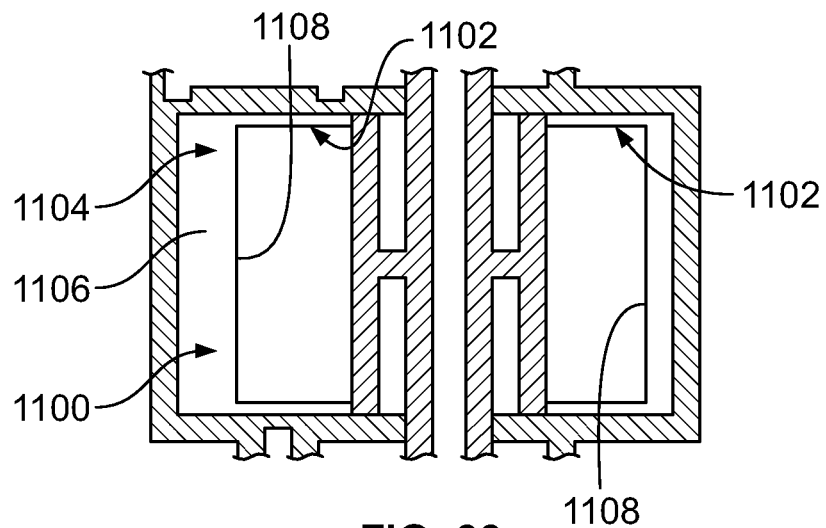
FIG. 66 is a sectional view of a turbine of the prior art.

FIG. 66 shows a fragmentary cross-sectional top plan view of a prior art turbine 1100 having a plurality of vanes 1102 having a profile which is substantially as wide as corresponding dimension of the flow-path 1104 cross-section. In such prior turbine 1100 configurations, especially in pressure-type cleaners, a venturi jet exits an inlet nozzle at a high-velocity flow. The venturi-jet velocity/speed of the water flow is reduced due to working contact or friction with the turbine vanes 1102, which fill substantially the entire width of the water-flow chamber 1104. Because of such a reduction in the speed of the water flow from the venturi jet into the turbine 1100 the venturi jet creates lesser venturi suction across the debris inlet than venturi suction which would be created at the high-velocity flow of the venturi jet at the venturi nozzle. Therefore, the reduced venturi suction is less effective in removing debris from the pool surface.

In some of such prior art embodiments of FIG. 66, the vane 1102 is configured such that the flow-path 1104 cross-section includes a lateral open region 1106 adjacent to at least one of the lateral edges 1108 of the vane 1102. Such lateral open region 1106 permits unobstructed water flow beside the vane lateral edges 1108 to facilitate debris-removing efficiency of the cleaner.

Figure 67:
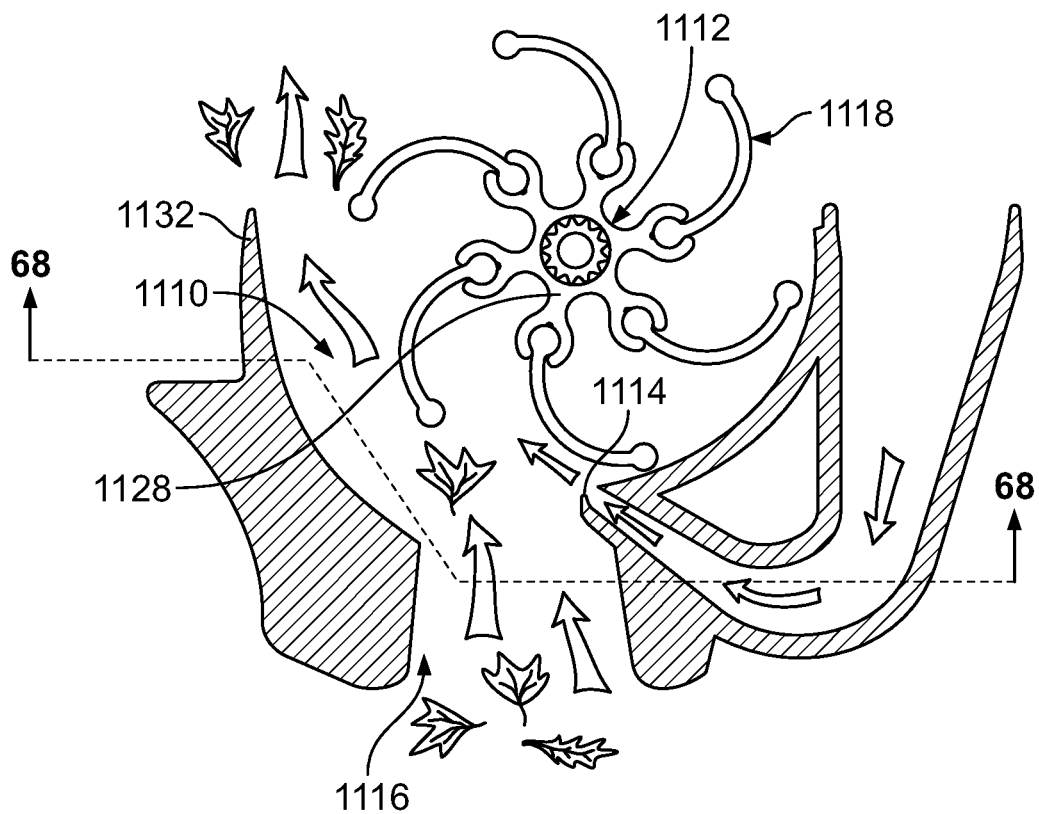
FIG. 67 is a diagrammatic partial-sectional view of a turbine of the present disclosure incorporated into a suction cleaner and showing operation thereof.
Figure 68:
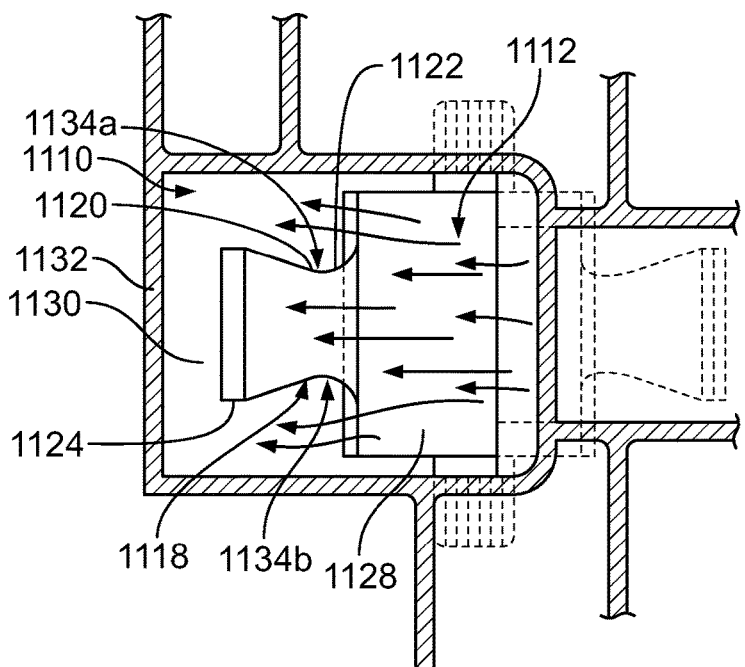
FIG. 68 is a sectional view of the turbine and turbine chamber of FIG. 67 taken along line 68-68 of FIG. 67.
Figure 69:
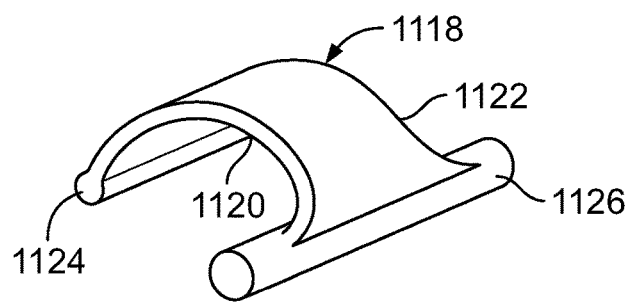
FIG. 69 is a perspective view of a turbine vane of turbine of FIG. 68.
Figure 70:
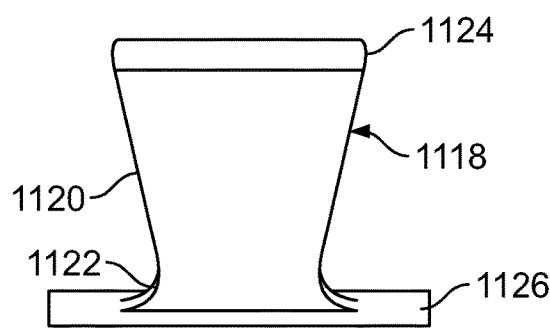
FIG. 70 is an elevational view of the turbine vane of FIG. 68.

In contrast to the prior art of FIG. 66, FIGS. 67-90 illustrate vanes and turbines of the present disclosure. FIG. 67 is a diagrammatic partial-sectional view of a turbine 1112 of the present disclosure incorporated into a turbine chamber 1110 of suction cleaner and showing operation thereof. The suction cleaner includes a venturi jet nozzle 1114 and debris inlet 1116. FIGS. 68-70 illustrate one example of a vane 1118 which has a V-shaped vane profile 1120 (e.g., the profile of the vane wall) such that the venturi jet flow from the nozzle 1114 engages such V-shaped vane profile 1120 along the central region of the vane 1118. Such vane-wall configuration narrowed at the proximal end 1122 allows for two outer jet flow streams to flow at an uninterrupted high-velocity flow speed. This significantly increases venturi suction across the debris inlet 1116 as compared to the prior configuration of the vane wall (seen in FIG. 66). Therefore, the improved configuration of the vane 1118 improves efficiency of the pool cleaner in removing debris from the pool surfaces.

FIG. 68 is a sectional view of the turbine chamber 1110 and venturi jet nozzle 1114 taken along line 68-68 of FIG. 67 showing the turbine 1112 and associated vanes 1118 in more detail. FIG. 69 is a perspective view of the vane 1118 and FIG. 70 is an elevational view of the vane 1118. The vane 1118 includes the proximal end 1122 and a distal end 1124 with the vane profile 1120 extending from the proximal end 1122 to the distal end 1124. The proximal end 1122 is connected with a mounting shaft (elongate inner member) 1126 that facilitates connection of the vane 1118 to a turbine central hub (rotor) 1128. The proximal end 1122 of the vane 1118 is generally more narrow than the distal end 1124 such that the vane profile 1120 is wider at the distal end 1124 than at the proximal end 1122, thus forming a V-shape. The V-shape of the vane profile 1120, as discussed above, allows for two outer jet flow streams to flow on lateral sides of the vane 1118. For example, as shown in FIG. 68, when the turbine 1112 and associated vanes 1118 are mounted in the turbine chamber 1110 an open flow path 1130 is formed between the distal end 1124 of the vanes 1118 and a wall 1132 of the turbine chamber 1110, which allows for fluid and debris to flow past in a similar fashion to that of the prior art shown in FIG. 66. However, the vanes 1118, due to their V-shape, also allow for two outer jet flow streams 1134*a*, 1134*b* to form between the distal end 1124 and the proximal end 1122 of each vane 1118. These additional jet flow streams increase the overall flow speed of the fluid through the turbine chamber 1110, thus increasing the venturi suction generated at the debris inlet 1116, compared to the prior art and allow for additional regions that debris can flow through.

In certain embodiments, the cleaner is a pressure cleaner with which includes a venturi jet fed by a remote pump. The venturi jet is configured and positioned to direct a jet of water across the inlet port 1116 and against the vane(s) 1118 to facilitate suction into the inlet port 1116. In some of such embodiments, at least a portion of the vane profile is narrower than the axial dimension of the venturi jet.

In some examples, the vane profile has an axial dimension which at its narrowest is no more than about two-thirds of the axial dimension of the flow-path cross-section at that position.

The vane profile may be substantially symmetrical and centrally positioned within the flow-path cross-section such that the venturi-jet is centered with respect thereto. In certain of such embodiments, the vane profile has an axial dimension which at its narrowest is no more than about two-thirds of the axial dimension of the flow-path cross-section at that position. The vane profile at the proximal edge 1122 may be narrower than the axial dimension of the venturi jet.

In some embodiments, the proximal edge 1122 of the vane 1118 is pivotally connected to the rotor 1128 via a vane-rotor interconnection. One of the rotor 1128 and vane proximal edge 1122 defines an axially-parallel slotted cavity 1136 which receives an axially-parallel elongate inner member 1126 formed by the other of the rotor 1128 and vane proximal edge 1122.

Such vane-rotor interconnection is constantly under stress of fine grit and debris getting into the cavity and locking the pivotal movement of the vane.

Figure 71:
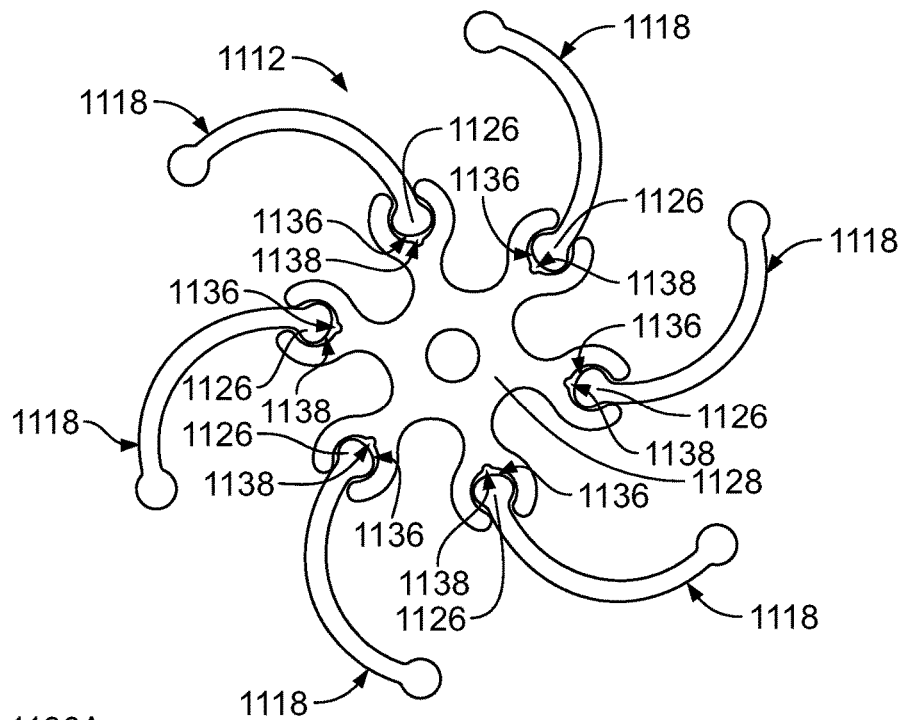
FIG. 71 is an elevational view of the turbine of FIG. 67.

FIG. 71 is an elevational view of the interconnection between a plurality of vanes 1118 and a rotor 1128. FIG. 71 illustrates another aspect of the present disclosure in which the slotted cavity 1136 and the elongate inner member 1126 may have non-congruent shapes that form at least one hollow space 1138 therebetween. Such hollow space(s) 1138 facilitate washing out of debris from within the interconnection. Such configuration minimizes locking of pivotal movement of the vane 1118 with respect to the rotor 1128.

Figure 71A:
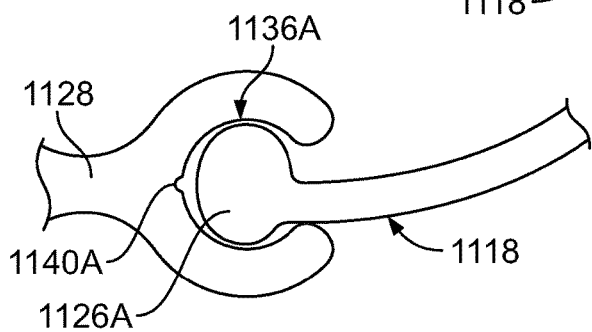
FIG. 71A is a side elevational view showing a rotor of the turbine forming a substantially round slotted cavity engaged with a proximal edge of a turbine vane having an oval cross-section.
Figure 71C:
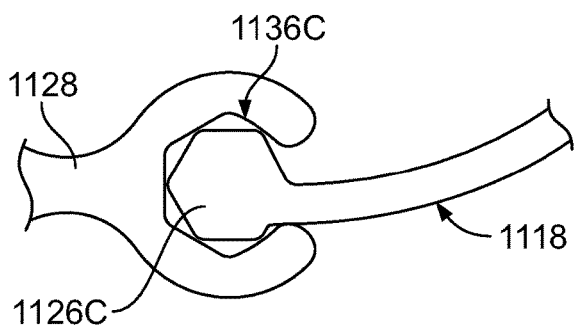
FIG. 71C is a side elevational view showing the turbine rotor forming a slotted cavity formed by five sides of a hexagon engaged with a proximal edge of a turbine vane having five corners of a hexagon.
Figure 71B:
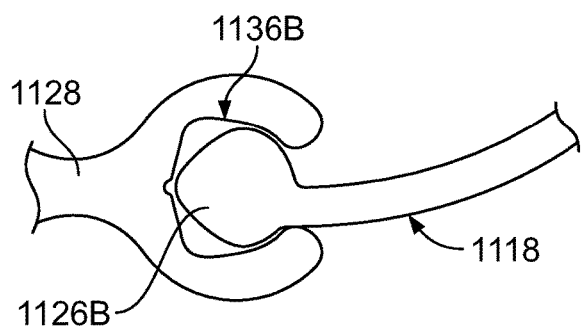
FIG. 71B is a side elevational view showing the turbine rotor forming a substantially oval slotted cavity engaged with a proximal edge of a turbine vane having an oval cross-section with a pointed end.
Figure 71D:
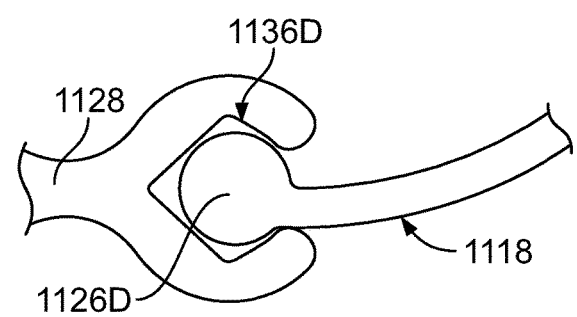
FIG. 71D is a side elevational view showing the turbine rotor forming a substantially square slotted cavity engaged with a substantially round proximal edge of a turbine vane.
Figure 71E:
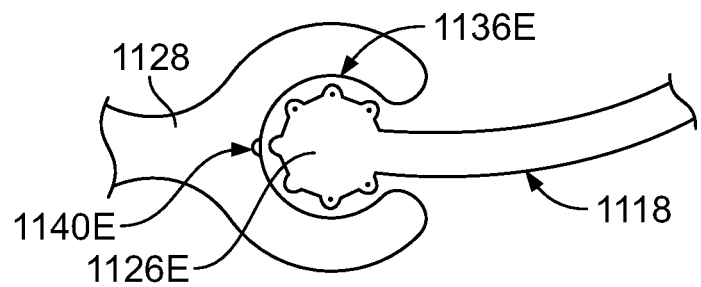
FIG. 71E is a side elevational view showing the turbine rotor forming a substantially round slotted cavity engaged with a substantially round proximal edge of a turbine vane that includes a plurality of protrusions.
Figure 71F:
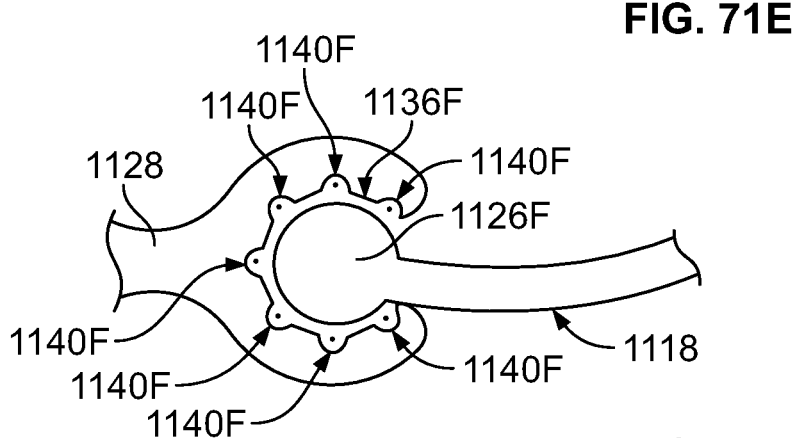
FIG. 71F is a side elevational view showing the turbine rotor forming a substantially round slotted cavity including a plurality of recesses engaged with a substantially round proximal edge of a turbine vane.
Figure 71G:
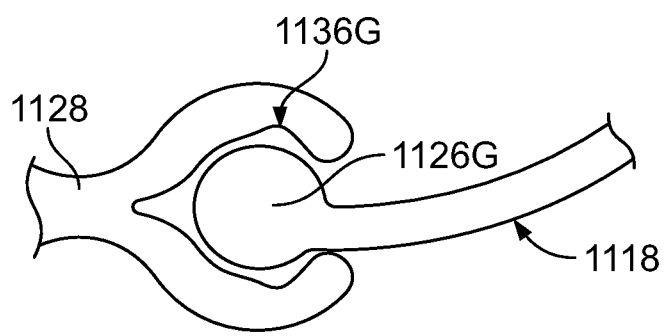
FIG. 71G is a side elevational view showing the turbine rotor forming a triangular slotted cavity engaged with a substantially round proximal edge of a turbine vane.
Figure 71H:
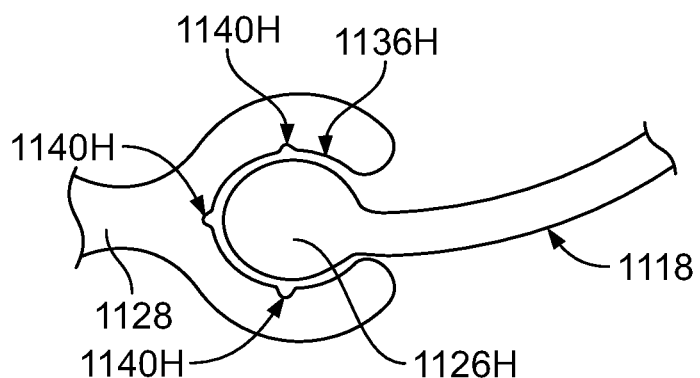
FIG. 71H is a side elevational view showing the turbine rotor forming a substantially round slotted cavity including a plurality of recesses engaged with a substantially round proximal edge of a turbine vane.
Figure 71I:
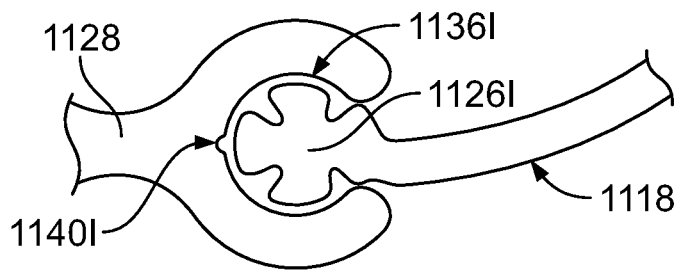
FIG. 71L is a side elevational view showing the turbine rotor forming a substantially round slotted cavity engaged with a proximal edge of a turbine vane having a cross-section resembling a four-leaf clover shape.
FIG. 71J is a side elevational view showing the turbine rotor forming a substantially round slotted cavity engaged with a proximal edge of a turbine vane having a cross-section having a four-point shape.
FIG. 71K is a side elevational view showing the turbine rotor forming a substantially round slotted cavity engaged with a proximal edge of a turbine vane having a cross-section having four substantially flat protrusions.
FIG. 71M is a side elevational view showing the turbine rotor forming a substantially round slotted cavity having a plurality of recesses engaged with a proximal edge of a turbine vane having a cross-section resembling a four-leaf clover shape.
FIG. 71N is a side elevational view showing the turbine rotor forming a substantially round slotted cavity engaged with a proximal edge of a turbine vane having a T-shaped cross-section.
FIG. 71O is a side elevational view showing the turbine rotor forming a substantially oval slotted cavity enlarging inwardly engaged with a proximal edge of a turbine vane having a substantially round cross-section.
FIG. 71P is a side elevational view showing the turbine rotor forming a substantially hexagonal slotted cavity engaged with a substantially round proximal edge of a turbine vane.
Figure 71J:
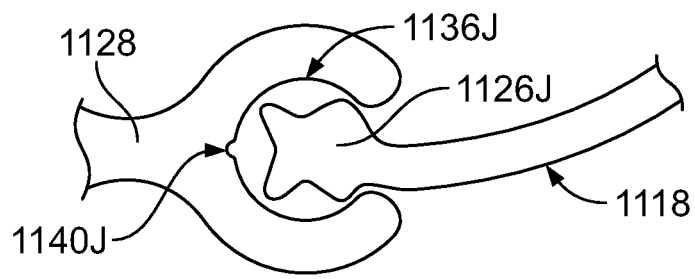
Figure 71K:
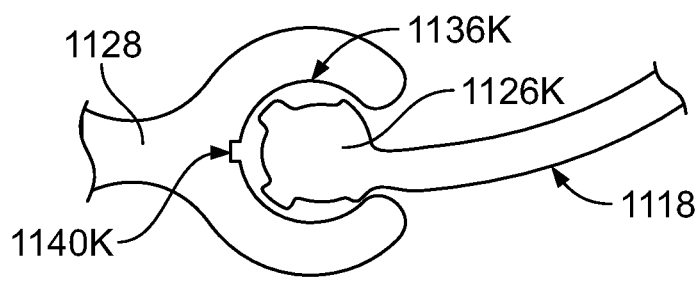
Figure 71L:
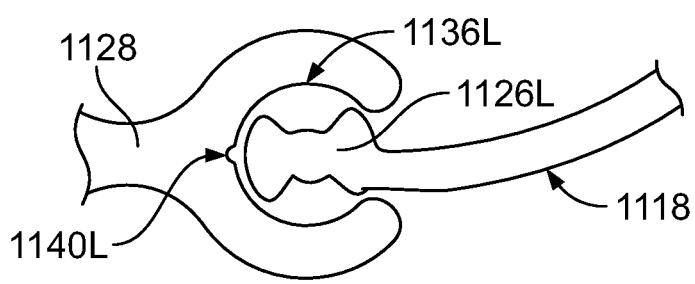
Figure 71M:
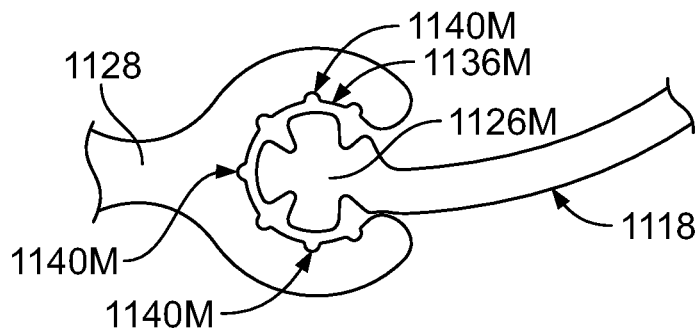
Figure 71N:
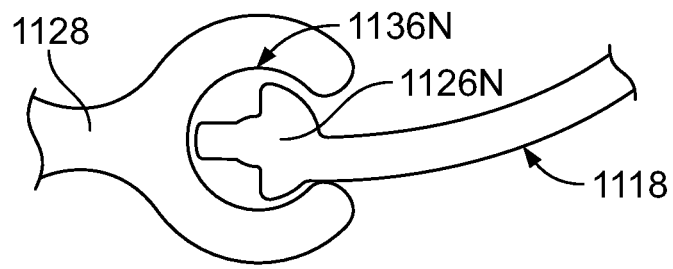
Figure 71O:
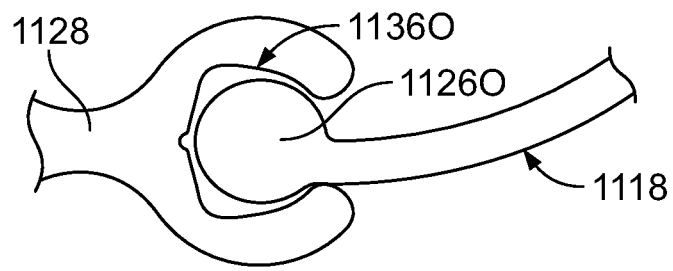
Figure 71P:
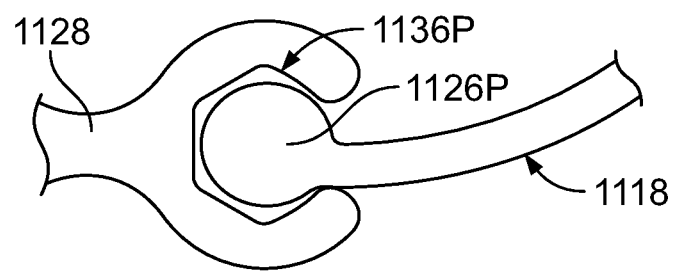

FIGS. 71A-71P illustrate alternative embodiments or shapes of the interconnection between the vane 1118 and the rotor 1128. FIGS. 71A-71P are shown diagrammatically and one of ordinary skill in the art would understand that these are side elevational views of the alternative vane 1118 and rotor 1128 interconnections. In some examples of such embodiments, such as those illustrated in FIGS. 71C, 71D, and 79P, at least one of the inner member 1126C, 1126D, 1126P and slotted cavity 1136C, 1136D, 1136P is of a substantially polygonal cross-section. In alternative examples shown in FIGS. 71A, 71B, 71E, at least one of the inner member 1126A, 1126B, 1126E and slotted cavity 1136A, 1136B, 1136E is of an irregular-shaped cross-section. In certain embodiments, the rotor 1128 defines the slotted cavity 1136A-1136P and the vane proximal edge is the elongate inner member 1126A-1126P.

FIG. 71A shows the rotor 1128 forming a slotted cavity 1136A of a substantially round cross-section with one or more grooves 1140A there along and the vane proximal edge 1126*a* having an oval cross-section.

FIG. 71B shows the rotor 1128 forming a slotted cavity 1136B of a substantially oval cross-section which is large on the inside and the vane proximal edge 1126B having an oval cross-section with a pointed end.

FIG. 71C shows the rotor 1128 defining a slotted cavity 1136C formed by five sides of a hexagon and the vane proximal edge 1126C having five corners of a hexagon, each corner corresponds to a flat side of the cavity 1136C.

FIG. 71D shows the rotor 1128 defining a substantially square slotted cavity 1136D and the vane proximal edge 1126D being substantially round.

FIG. 71E shows the rotor 1128 defining a substantially round slotted cavity 1136E which may have at least one groove 1140E and the vane proximal edge 1126E being substantially round with a plurality of protrusions there along.

FIG. 71F shows the 1128 rotor defining a substantially round slotted cavity 1136F with a plurality of recesses 1140F there along and the vane proximal edge 1126F being substantially round.

FIG. 71G shows the rotor 1128 defining a triangular slotted cavity 1136G and the vane proximal edge 1126G being substantially round.

FIG. 71H shows the rotor 1128 defining a substantially round slotted cavity 1136H with a plurality of recesses 1140H there along and the vane proximal edge 1136H being substantially round.

FIGS. 71I and 71M shows the rotor 1128 defining a substantially round slotted cavity 1136I, 1136M with one or more recesses 1140I, 1140M there along and the vane proximal edge 1126I, 1126M having a cross-section resembling a four-leaf clover shape.

FIG. 71J shows the rotor 1128 defining a substantially round slotted cavity 1136J with one or more recesses 1140J there along and the vane proximal edge 1126J having a cross-section having a four-point shape.

FIG. 71K shows the rotor 1128 defining a substantially round slotted cavity 1136K with one or more recesses 1140K there along and the vane proximal edge 1126K having a cross-section having four substantially flat protrusions.

FIG. 71L shows the rotor 1128 defining a substantially round slotted cavity 1136L with one or more recesses 1140L there along and the vane proximal edge 1126L having a cross-section having a shape resembling butterfly.

FIG. 71N shows the rotor 1128 defining a substantially round slotted cavity 1136N and the vane proximal edge 1126N having a T-shape cross-section.

FIG. 71O shows the rotor 1128 defining a substantially oval slotted cavity 1136O enlarging inwardly and the vane proximal edge 1126O having a substantially round cross-section.

FIG. 71P shows the rotor 1128 defining a substantially hexagonal slotted cavity 1136P and the vane proximal edge 1126P being substantially round.

In certain embodiments, there are a plurality of the vanes 1118 spaced around the rotor 1128. The vanes 1118 are of substantially rigid material. The wall of each of the vanes 1118 may be curved with the proximal and distal edges being substantially straight and substantially parallel.

Figure 77:
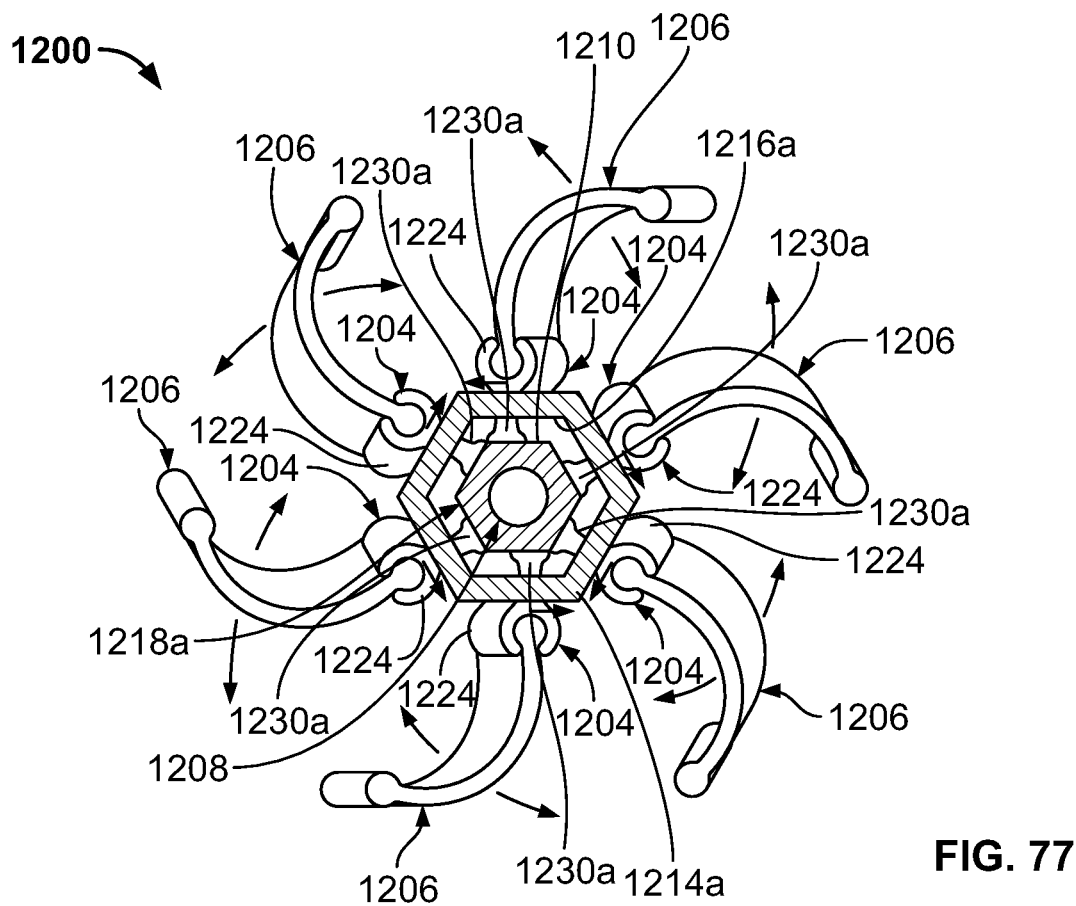
FIG. 77 is a partial sectional view of a turbine according to FIGS. 75 and 76 including a plurality of turbine vanes engaged with a plurality of turbine vane holders.
Figure 84:
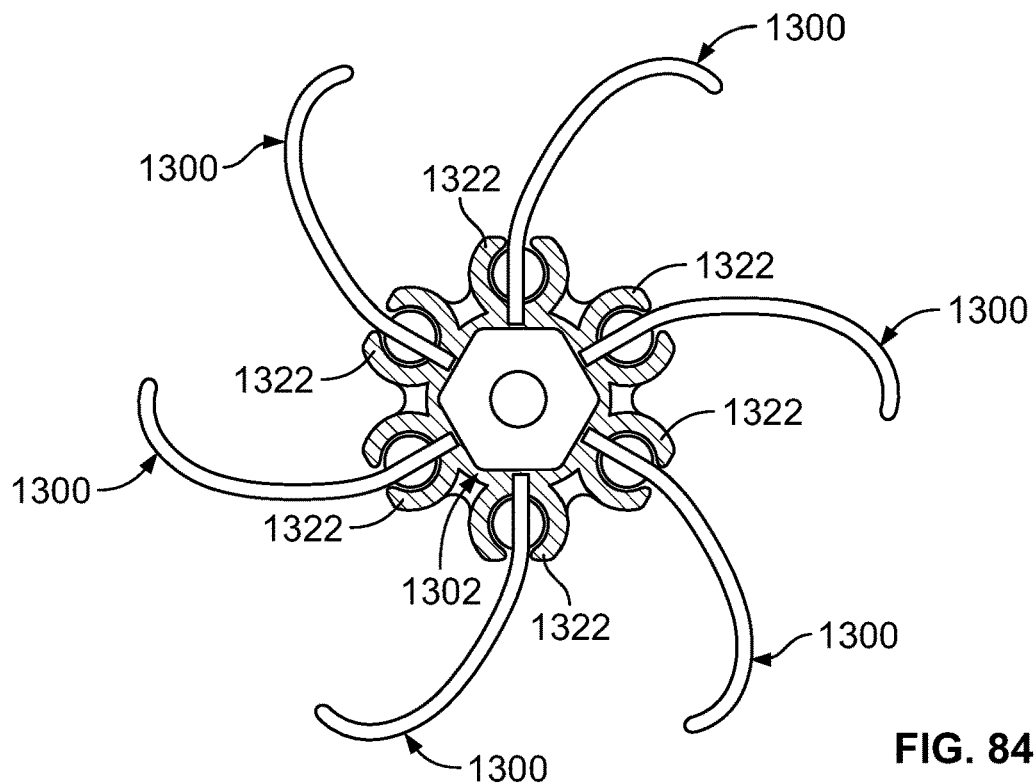
FIG. 84 is a partial sectional view of the turbine of FIGS. 82 and 83 along a transverse axis of the turbine.

FIGS. 77 and 84 illustrate yet another aspect of the present disclosure in which a vane-rotor interconnection permits movement of the vane proximal edge in a plane tangential to the rotor to positions of varying angles with respect to the rotor axis. The proximal edge of the vane may be pivotally connected to the rotor such that the vane is movable with respect to the rotor between extended and retracted positions to allow passage of substantial-size debris pieces through the chamber.

Figure 72:
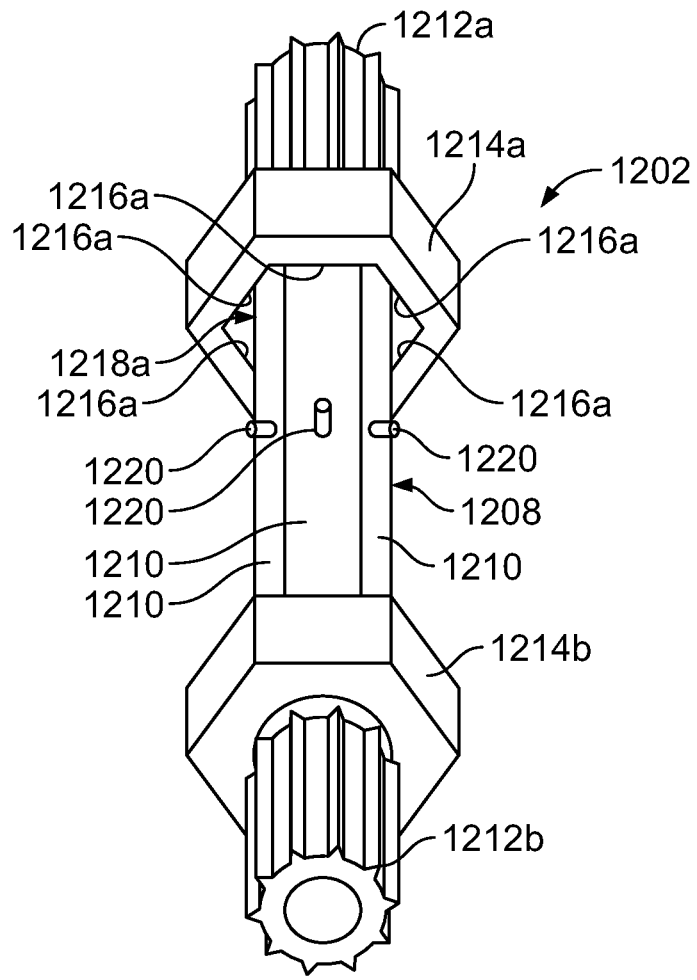
FIG. 72 is a perspective view of turbine vane hub of the present disclosure.
Figure 73:
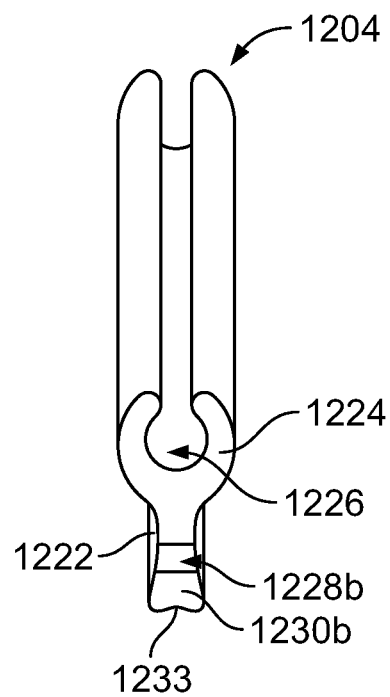
FIG. 73 is a perspective view of a turbine vane holder of the present disclosure.
Figure 74:
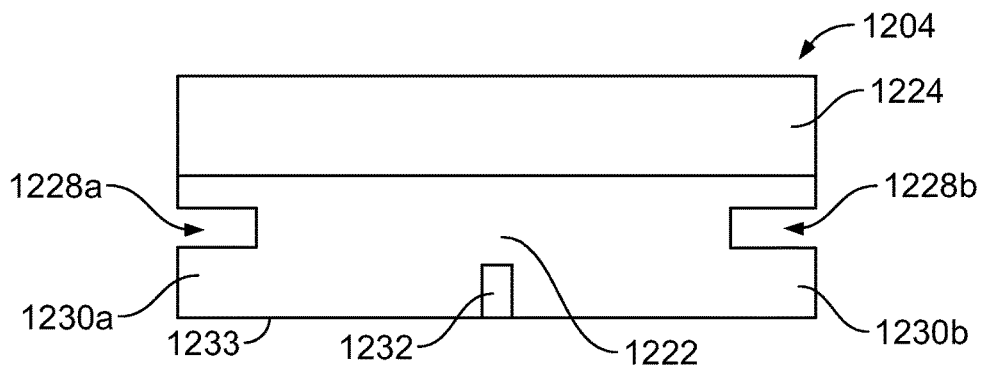
FIG. 74 is a front view of the turbine vane holder of FIG. 73.

FIGS. 72-78 illustrate a turbine 1200 (see FIG. 77) of another embodiment of the present disclosure, which includes a turbine hub or rotor 1202, a plurality of vane holders 1204, and a plurality of vanes 1206 (see FIG. 77). FIG. 72 is a perspective view of the turbine hub 1202. FIG. 73 is a perspective view of the vane holder 1204. FIG. 74 is a front view of the vane holder 1204. As shown in FIG. 72, the turbine hub 1202 includes a rotor shaft 1208 having a plurality of substantially planar shaft surfaces 1210 at substantially equal angles with respect to one another and having gears 1212a, 1212b disposed at opposite ends of the rotor shaft 1208, and first and second hexagonal cuffs 1214a, 1214b. The first and second hexagonal cuffs 1214a, 1214b respectively include a plurality of internal surfaces 1216a, 1216b that generally parallel to the planar shaft surfaces 1210 (see FIGS. 72 and 76). First and second continuous tracks 1218a, 1218b are defined by the first and second hexagonal cuffs 1214a, 1214b between the internal surfaces 1216a, 1216b thereof and the planar shaft surfaces 1210 (see FIGS. 72 and 76). The center of each shaft surface 1210 includes a protrusion 1220 extending perpendicularly therefrom.

In some embodiments such as that shown in FIGS. 72-78, the rotor 1202 includes a rotor shaft 1208 on the rotor axis. The rotor shaft 1208 has a plurality of substantially planar shaft surfaces 1210 at substantially equal angles with respect to one another. One of the vanes is supported with respect to each of the shaft surfaces 1210.

FIGS. 73 and 74 further illustrate the vane holder 1204. Each vane holder 1204 includes a body 1222 and a vane retention section 1224 defining a cavity 1226. The body 1222 includes two notches 1228a, 1228b one on each lateral side of the body 1222 thus forming first and second elongate proximal edges (fingers) 1230a, 1230b. The first and second fingers are configured and sized to fit within the first and second continuous tracks 1218a, 1218b of the turbine hub 1202, while the second hexagonal cuffs 1214a, 1214b are configured to fit within the notches 1228a, 1228b of the vane holder 1204. The vane retention section 1224 and defined cavity 1226 are configured to securely engage and hold a vane 1118. The vane holder 1204 further includes an internal cavity 1232 extending centrally into the body 1222 at a proximal edge 1233 of the vane holder 1204.

Figure 75:
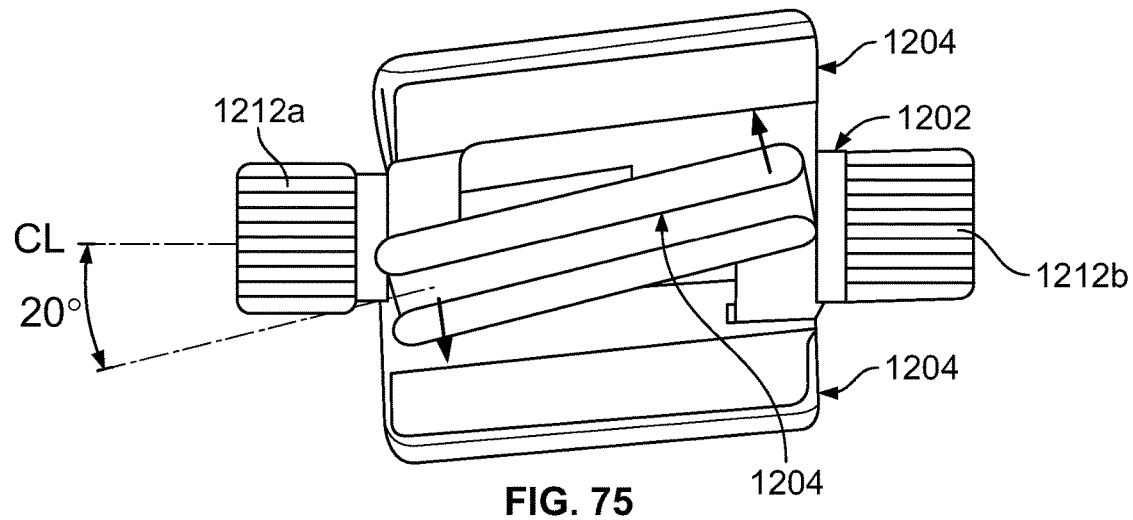
FIG. 75 is a perspective view of a turbine including a plurality of turbine vane holders according to FIG. 74 engaged with the turbine vane hub of FIG. 73.
Figure 76:
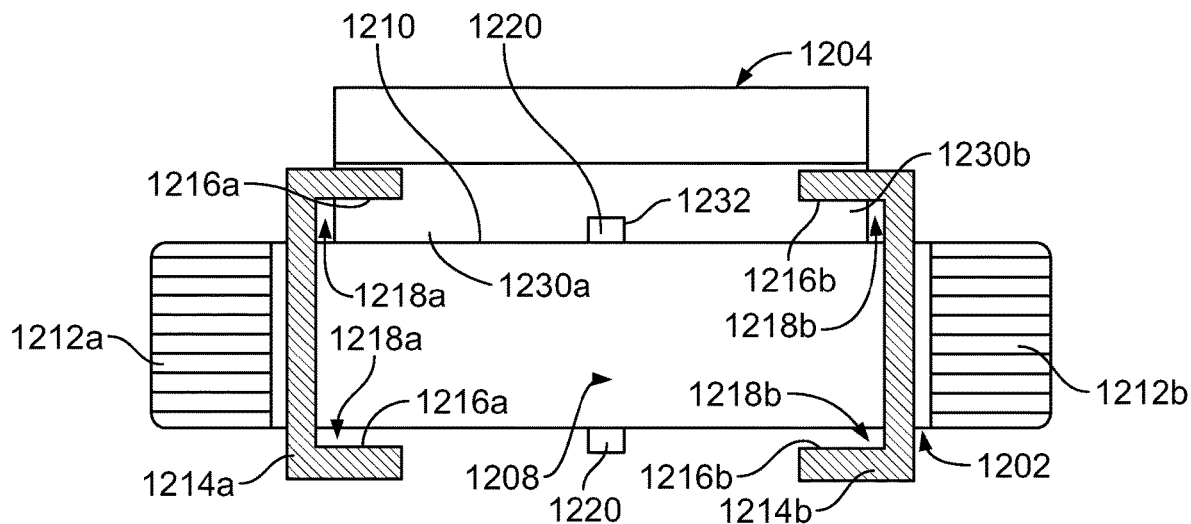
FIG. 76 is a partial sectional view of the turbine of FIG. 83 showing engagement of a turbine vane holder with the turbine vane hub.

The vane holders 1204 are configured to be attached to the hub 1202 such that each shaft surface 1210 of the shaft 1208 includes a vane holder 1204 mounted thereto. This engagement is shown in FIGS. 75 and 76. FIG. 75 is a perspective view showing a plurality of vane holders 1204 mounted to the hub 1202. FIG. 76 is a partial sectional view detailing the connection of a single vane holder 1204 to the hub 1202, with the first and second cuffs 1214a, 1214b sectioned. In connecting a vane holder 1204 to a shaft surface 1210, the protrusion 1220 of the shaft surface 1210 engages the internal cavity 1232 of the vane holder 1204 while the vane holder first leg 1230a is positioned within the first track 1218a and the vane holder second leg 1230b is positioned within the second track 1218b. As shown in FIG. 75, when a vane holder 1204 is connected to the hub 1202 it is permitted to rotate about the protrusion 1220 by an angular amount with respect to the center line CL of the hub 1202, for example, 20 degrees. The vane holder 1204 can rotate both clockwise and counter-clockwise.

FIGS. 72-76 illustrate examples of embodiments where the rotor 1202 further includes a cuff 1214a, 1214b at each end of the rotor shaft 1208. Each cuff 1214a, 1214b has inner surfaces 1216a, 1216b each substantially equidistantly spaced from the corresponding one of the shaft surfaces 1210 and forms inner-surface corners which limit the angle of rotation of the vanes.

FIGS. 72-76 also show that the turbine 1200 further includes a vane holder 1204 having a rotor-connector forming one of the cavity 1232 and the protrusion 1220 of the vane-rotor interconnection and rotatable thereabout between within the inner surfaces 1216a, 1216b of the cuffs 1214a, 1214b. In some versions, the vane holder 1204 forms an elongate slotted cavity 1226 which is pivotally engaged by the elongate proximal edge of the vane.

Figure 78:
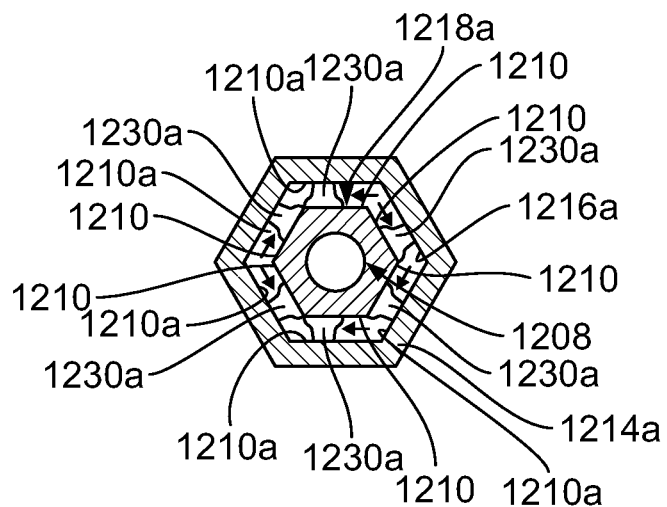
FIG. 78 is a diagrammatic sectional view showing the engagement of turbine vane hub with a plurality of turbine vane holders and illustrating the arrangement and motion of a proximal end of the turbine vane holders within a cuff of the turbine vane hub.

FIG. 77 is a partial sectional view of a turbine 1200 according to FIGS. 75 and 76 including a plurality of turbine vanes 1206, turbine vane holders 1204, and hub 1202 interconnected. FIG. 78 is a sectional view showing the interconnection between the vane holders 1204 and the hub 1202, and how the vane holders 1204 can move in relation thereto. Particularly, FIG. 77 shows how the first elongate proximal edges (fingers) 1230a move within the continuous track 1218a of the turbine hub 1202. As shown in FIG. 77, when the vanes 1206 are connected with the vane retention section 1224 of a respective vane holder 1204 the vanes 1206 are capable of rotating forward and backward therein. That is, the vanes 1206 can rotate about the axis of engagement with the vane holders 1204. Additionally, when the vane holders 1204, with the attached vanes 1206, are engaged to the hub 1202 they are capable of rotating themselves about the protrusion 1220 (see FIG. 76). Accordingly, the vanes 1206 are capable of rotating about two separate axes. Generally, these two axis will be perpendicular to one another. FIG. 77 shows the first cuff 1214a in section, illustrating the positioning of the first leg 1218a of each vane holder 1204 within the first track 1218a. As shown in FIGS. 77 and 78 each first leg 1218a of each vane holder 1204 is positioned between a shaft surface 1210 and an internal surface 1216a of the cuff 1214a that is parallel to that shaft surface 1210. As shown in FIG. 78, which is a sectional view focused solely on the interconnection between the first fingers 1218a and the first cuff 1214a, due to the matching geometries of the cuff 1214a and the shaft 1208, each first leg 1218a is restricted from moving beyond the surface 1210 that it is mounted to. That is, each first leg 1218a can rotate back and forth across the surface 1210 that it is mounted to, but cannot go around a corner to a different surface 1210. The hexagonal inner surface edge stops the vane holder 1204. Additionally, two vane holders 1204 will make contact before reaching the hexagonal inner surface edge. One of ordinary skill in the art should understand that this description in connection with the first fingers 1218a also holds true for the second fingers 1218b as well.

Each of the vane-rotor interconnections may include a cavity 1232 and a protrusion 1220 within the cavity 1232. In such embodiments, each of the cavity 1232 and the protrusion 1220 is formed at a center of one of the shaft surface 1210 and the corresponding vane proximal edge 1233 such that the vane proximal edge 1233 is rotatable thereabout.

In certain embodiments, the rotor 1202 is configured to limit the angle of rotation of the vane. The angle of rotation may be limited to about 20° with respect to the rotor axis CL.

Figure 79:
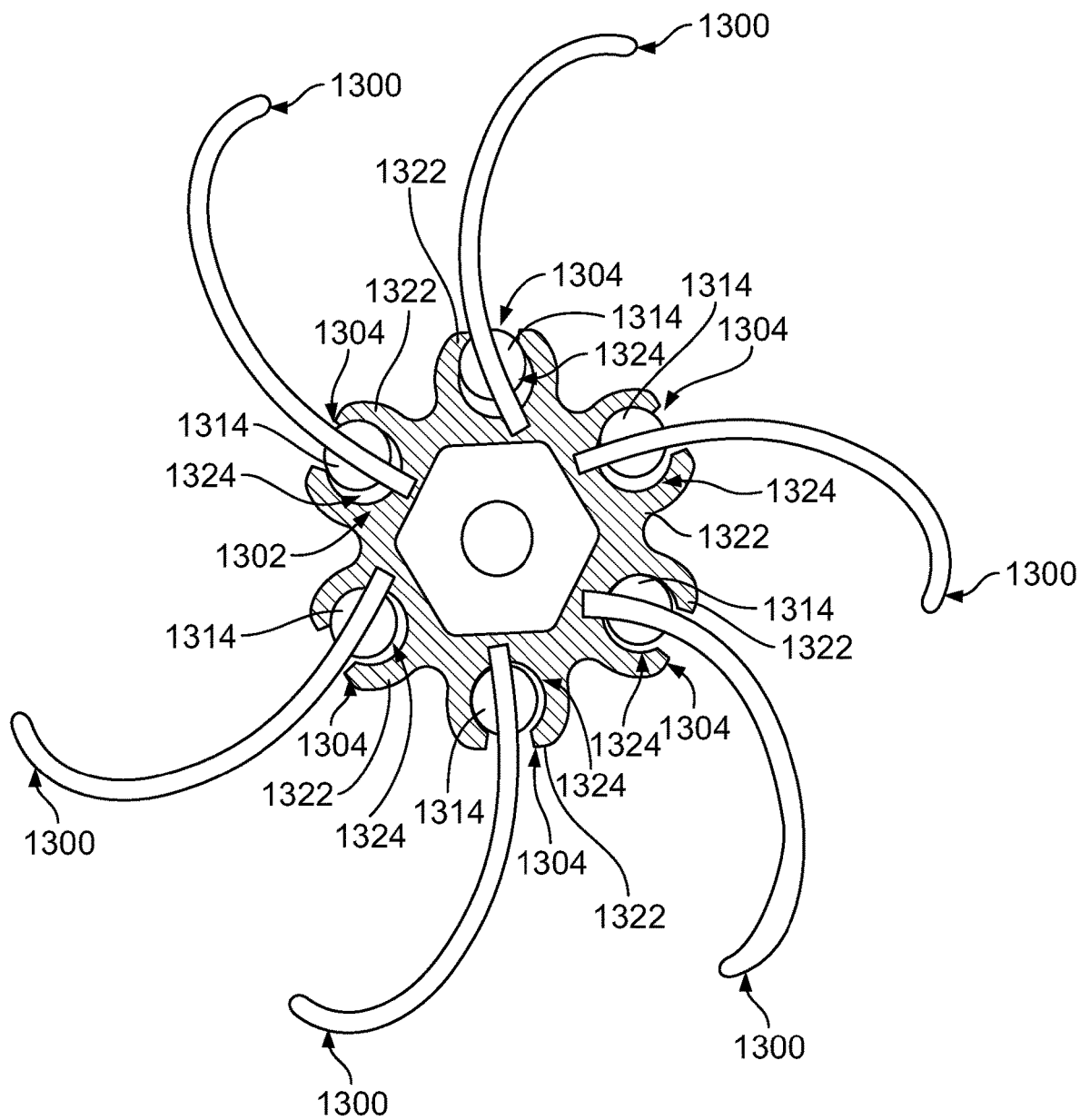
FIG. 79 is a partial sectional view of another turbine of the present disclosure.
Figure 80:
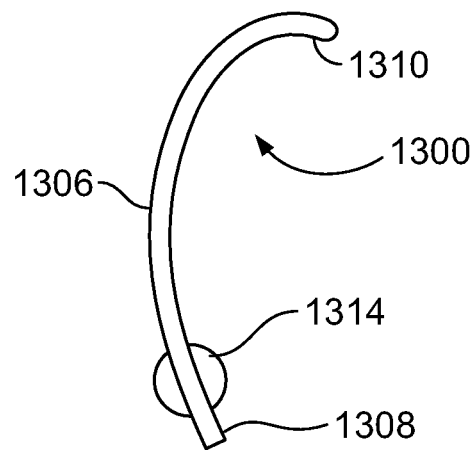
FIG. 80 is a side view of a turbine vane of FIG. 79.
Figure 81:
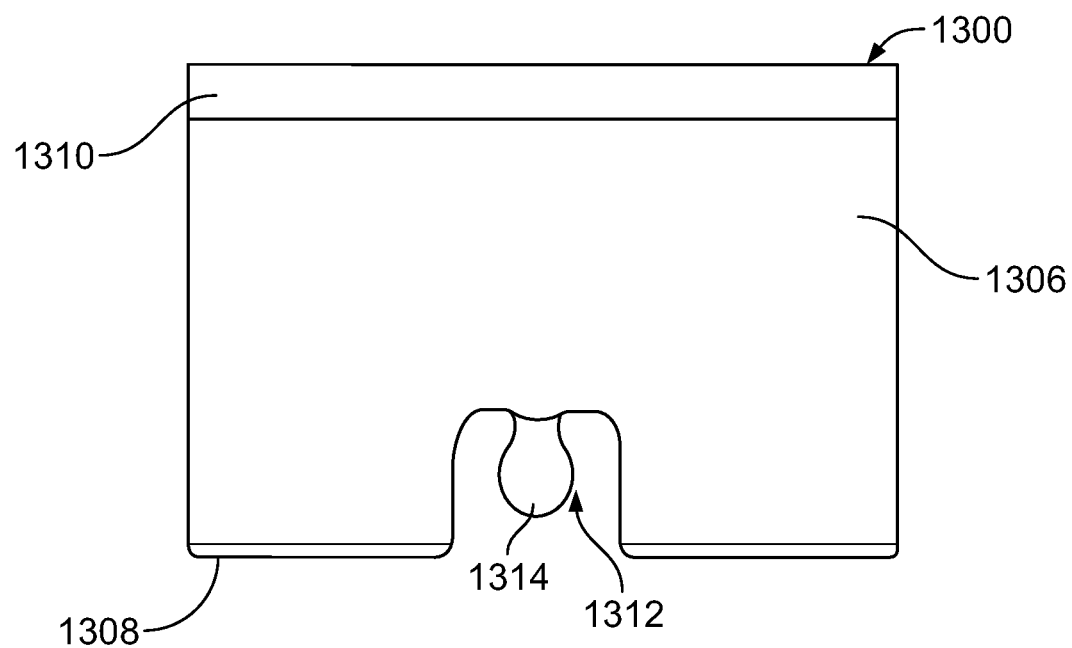
FIG. 81 is a front view of the turbine vane of FIG. 80.

FIGS. 79-85 illustrate an alternative embodiment for interconnecting a vane 1300 with a turbine rotor 1302. FIG. 79 is a partial sectional view showing a vane-rotor interconnection 1304 in which a plurality of vanes 1300 are rotatably mounted with a turbine rotor 1302. FIG. 80 is a side view of the vane 1300, and FIG. 81 is a front view of the vane 1300. The vane 1300 includes a vane body 1306 having a proximal end 1308 and a distal end 1310. The vane body 1306 generally curves from the proximal end 1308 to the distal and 1310. The vane body 1306 further includes a notch 1312 at the center of the proximal end 1308 and extending into the body 1306. A generally spherical ball 1314 extends from the body 1306 and is positioned within the notch 1312.

Figure 82:
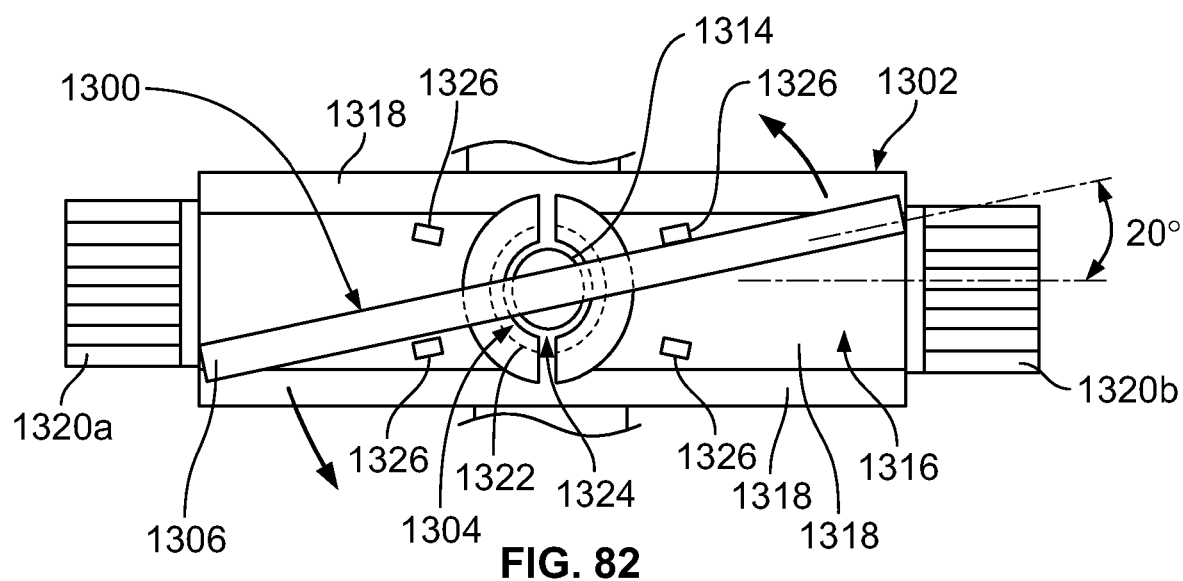
FIG. 82 is a top view showing the turbine of FIG. 79 having rotatable turbine vanes in a first position.
Figure 83:
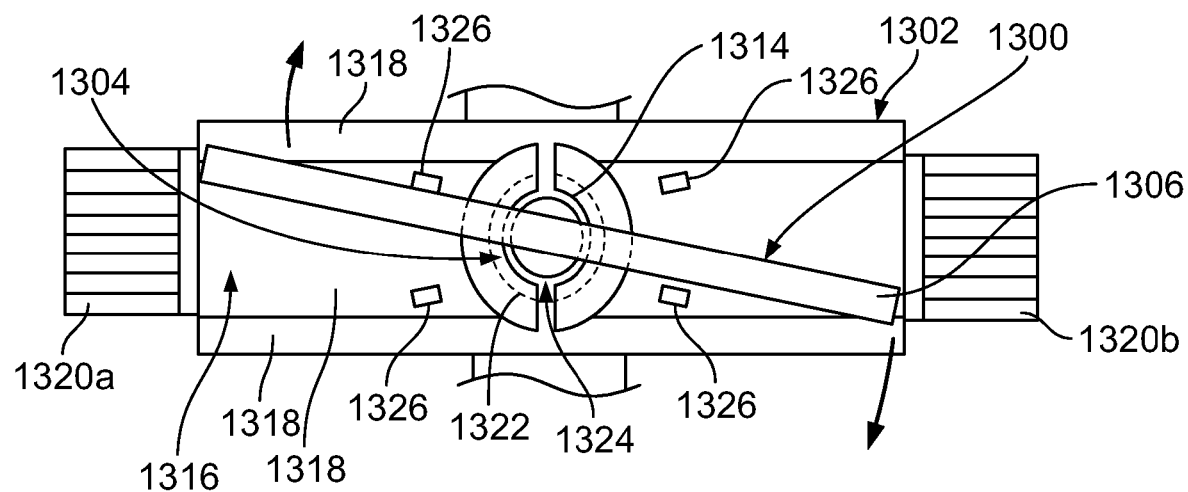
FIG. 83 is a top view of the turbine of FIG. 79 with the rotatable turbine vanes in a second position.
Figure 85:
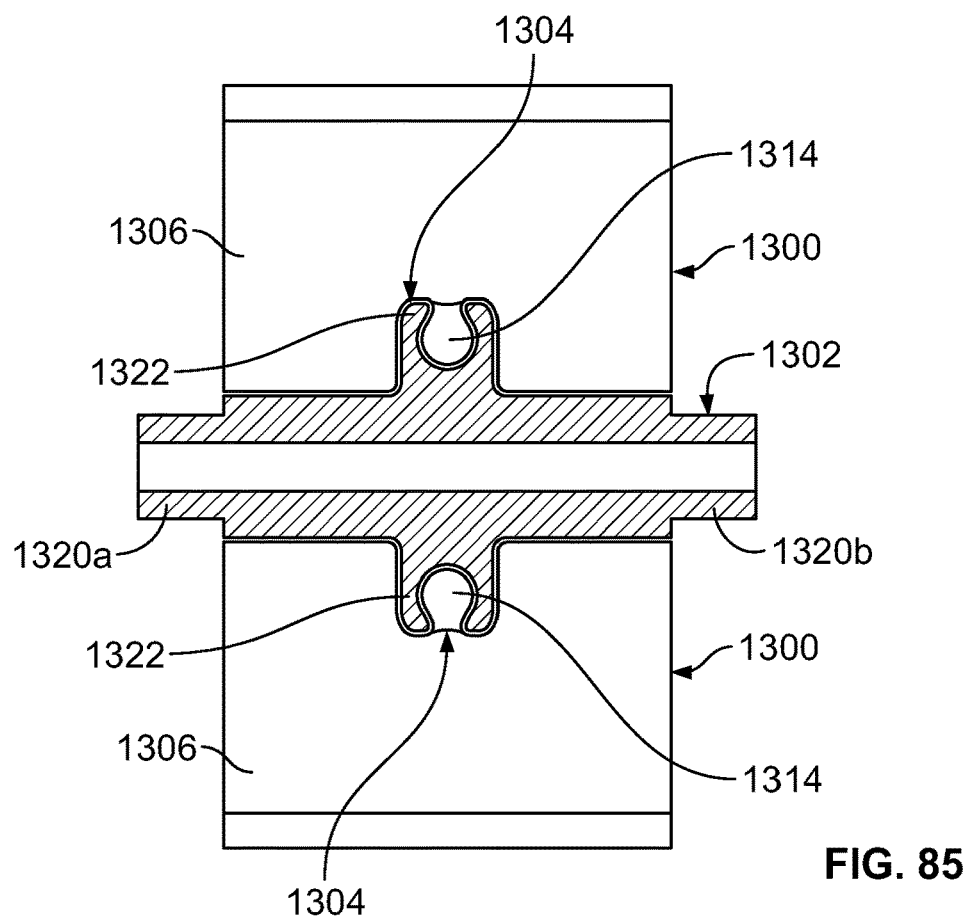
FIG. 85 is a partial sectional view of the turbine of FIGS. 79 and 80 along a longitudinal axis of the turbine.

FIGS. 82 and 83 are top views of a vane 1300 interconnected with a rotor 1302 in a first and a second rotational position. The rotor 1302 includes a shaft 1316 having a plurality of shaft surfaces 1318, and a first and second gear 1320a, 1320b on lateral ends of the shaft 1316. The rotor 1302 further includes a socket 1322 on each shaft surface 1318 that defines a cavity 1324. The socket 1322 is configured to receive the spherical ball 1314 of the vane 1300 forming the vane-rotor interconnection 1304. Accordingly, the vane-rotor interconnection 1304 is a ball-and-socket type connection that allows the vane 1300 to freely rotate about a plurality of axes. For example, FIG. 79 shows the vanes 1300 rotating forward and backward, while FIGS. 82 and 83 show the vanes 1300 rotating about an axis that is perpendicular to the shaft surfaces 1318. FIG. 85 is a partial sectional view showing the vane-rotor interconnection 1304 in additional detail.

The rotor 1302 can also include a plurality of static stops 1326 that extend upward from the shaft surfaces 1318. The static stops 1326 restrict rotational movement of the vane 1300 about an axis that is perpendicular to the shaft surfaces 1318. For example, the static stops 1326 can be positioned to permit the vane 1300 to rotate up to 20 degrees from the centerline CL of the shaft 1316, but prevent the vane 1300 from rotating greater than 20 degrees.

In certain embodiments such as those illustrated in FIGS. 79-85, the vane-rotor interconnection 1304 is a ball-and-socket type connection with the cavity 1324 and the protrusion 1314 having complementary substantially spherical shapes such that the vane 1300 is rotatable and pivotable between extended and retracted positions with respect to the rotor 1302 to allow passage of substantial-size debris pieces through a chamber.

In some versions, the rotor 1302 includes a set of protrusions 1326 in positions limiting the angle of rotation of the vane 1300, as illustrated in FIGS. 82 and 83.

Figure 86:
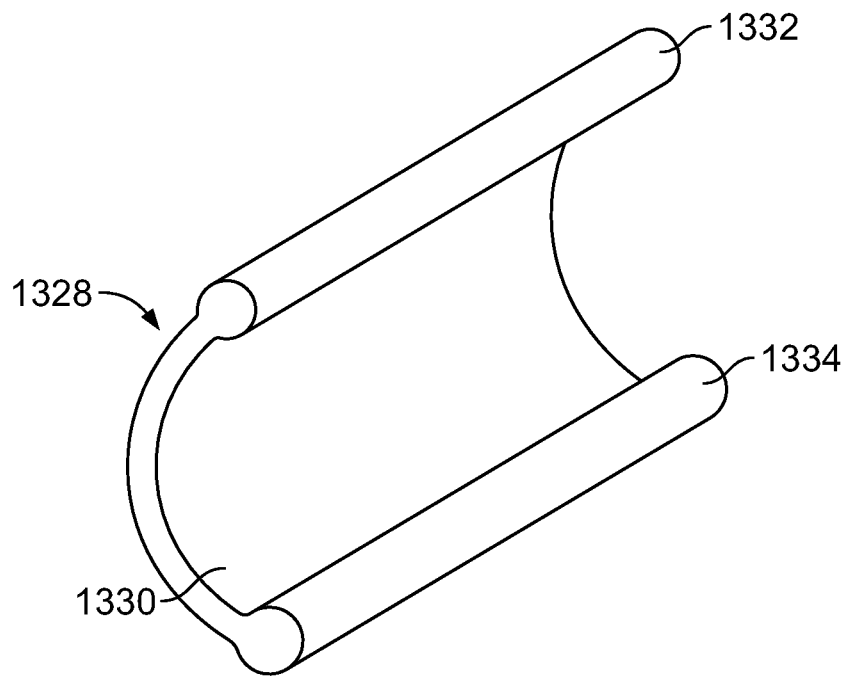
FIGS. 86-87 are perspective views of a standard turbine vane.
Figure 87:
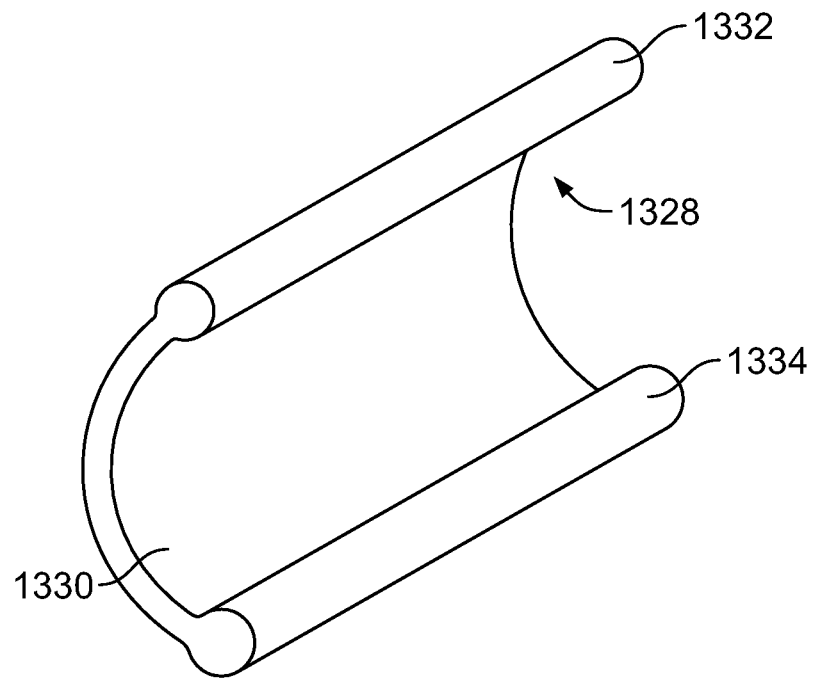

FIGS. 86 and 87 are perspective views of a vane 1328. The vane 1328 has a vane wall 1330 extending between two elongate edges 1332, 1334 which extend in edge planes substantially parallel to one another.

Figure 88:
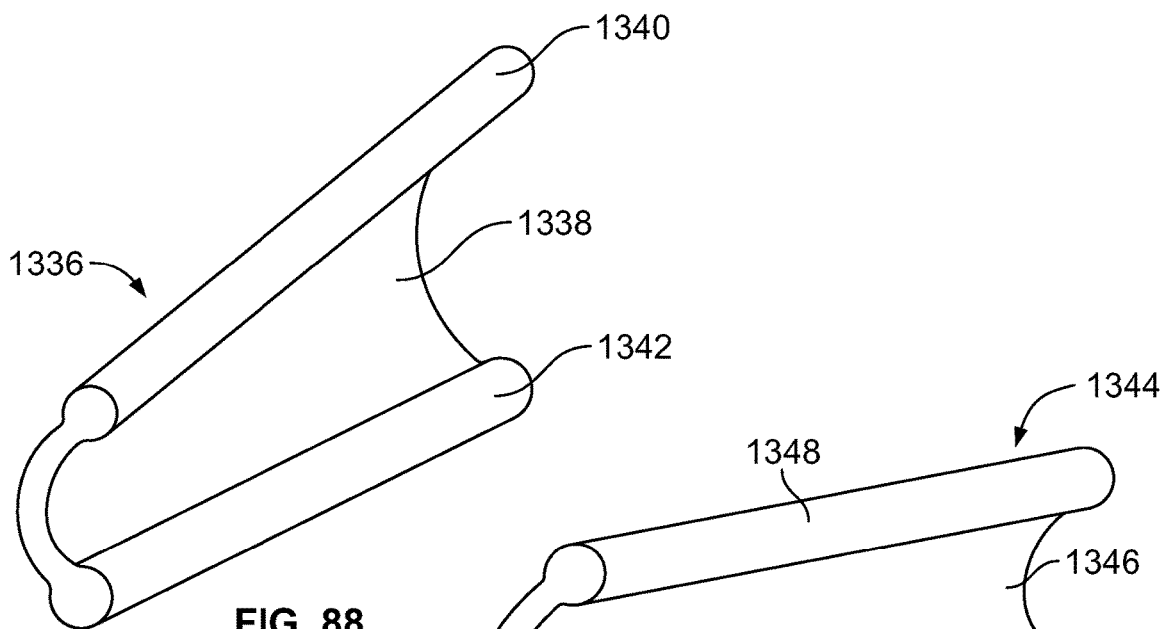
FIG. 88 is a perspective view of a right facing turbine vane of the present disclosure.
Figure 89:
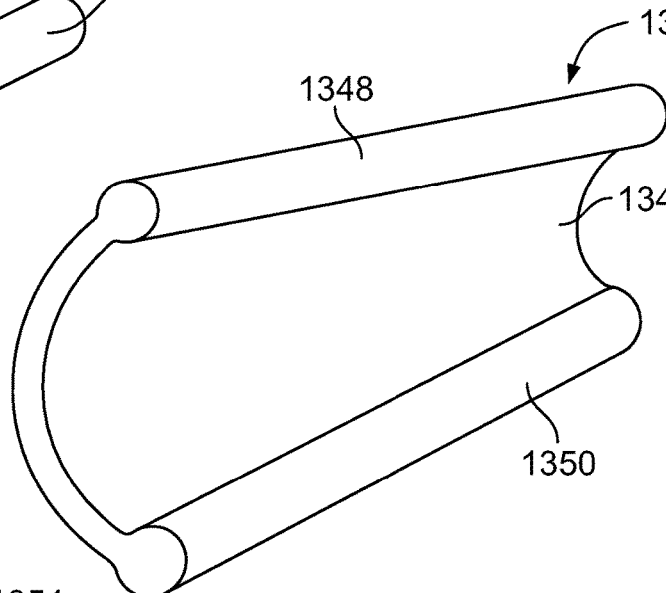
FIG. 89 is a perspective view of a left facing turbine vane of the present disclosure.

FIG. 88 is a perspective view of a first right facing vane 1336 of the present disclosure having a vane wall 1338 extending between two elongate edges 1340, 1342. FIG. 89 is a perspective view of a second left facing vane 1344 of the present disclosure having a vane wall 1346 extending between two elongate edges 1348, 1350. In still another aspect of the present disclosure, the vane edges 1340, 1342 of the first vane 1336, and the vane edges 1348, 1350 of the second vane 1344 may be angularly oriented with respect to each other such that each vane-edge projection on the plane of the other vane edge is transverse, such vane edge orientation is to facilitate passage of substantial-size debris pieces through a chamber. Examples of such improved vanes 1336, 1344 are schematically illustrated in FIGS. 88 and 89. The vane edges 1340, 1342, 1348, 1350 may be substantially straight and the wall 1338, 1346 of each of the vanes 1336, 1344 may be curved.

Figure 90:
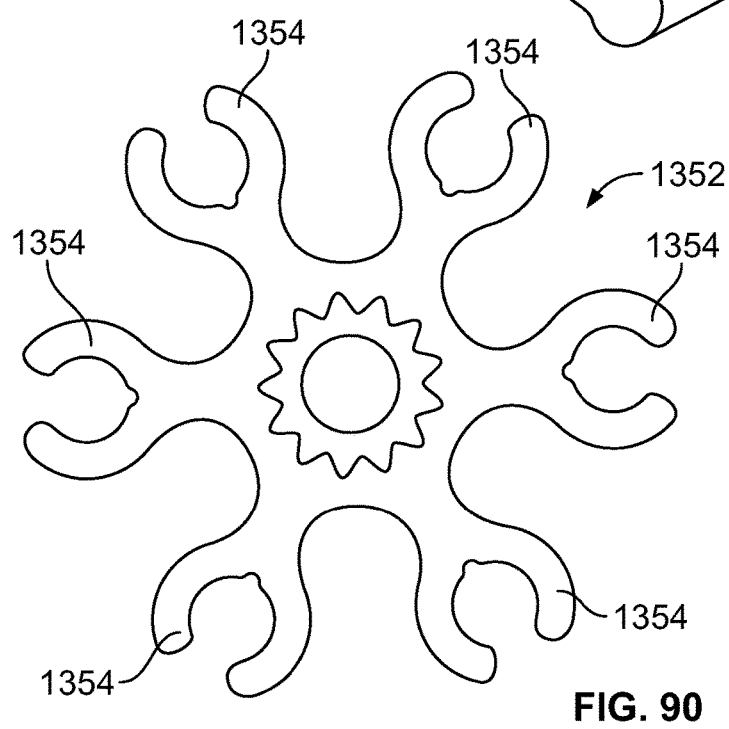
FIG. 90 is an elevational view of a turbine hub for engagement with the right facing turbine vane of FIG. 88 and left facing turbine vane of FIG. 89.

FIG. 90 is an elevational view of a turbine rotor 1352 for interconnection with a plurality of first right facing vanes 1336 (see FIG. 88) and a plurality of left facing vanes 1344 (see FIG. 89). The rotor 1352 can include a plurality of vane holders 1354-1354. The vanes 1336, 1344 can be connected to the rotor 1352 in alternating fashion such that vane holders 1354a, 1354c, 1354e are connected with right angled vanes 1336, while vane holders 1354b, 1354d, 1354f are connected with left angled vanes 1344. In certain embodiments where the turbine includes a plurality of vanes 1336, 1344 connected with respect to the rotor 1352, the proximal edges 1342, 1350 of the vanes 1336, 1344 are substantially parallel to each other. In some of such embodiments, the distal edges 1340, 1348 of adjacent vanes 1336, 1344 are transverse to each other thereby defining varying size spaces between the adjacent vanes 1336, 1344 to further facilitate passage of substantial-size debris pieces through a chamber. A diagram of an example of such turbine is shown in FIG. 90.

It will be understood that the embodiments of the present disclosure described herein are merely exemplary and that a person skilled in the art may make many variations and modifications without departing from the spirit and the scope of the disclosure. All such variations and modifications, including those discussed above, are intended to be included within the scope of the disclosure as defined by the appended claims.

What is claimed is:

1. In an automatic pool cleaner motivated by flow of water therethrough established by the pumping action of a remote pump, the cleaner including a turbine housing forming a water-flow chamber defining a flow-path cross-section and having flow inlet and outlet ports for debris-laden water flow through the chamber, the turbine including (a) a rotor having an axis and (b) at least one vane connected with respect to the rotor at a proximal vane edge, the vane extending from the proximal vane edge to a distal vane edge and forming a vane profile with opposed lateral edges extending between the proximal and distal edges, the vane edges defining a vane profile in the flow-path cross-section, the improvement comprising the vane profile being configured such that the flow-path cross-section includes a lateral open region adjacent to at least one of the lateral edges of the vane, thereby permitting unobstructed water flow beside the vane lateral edges to facilitate debris-removing efficiency of the cleaner.

2. The cleaner of claim 1 further including a venturi jet fed by the remote pump, the venturi jet being configured and positioned to direct a jet of water across the inlet port and against the vane(s) to facilitate suction into the inlet port.

3. The cleaner of claim 2 wherein the vane profile has an axial dimension which at its narrowest is no more than about two-thirds of the axial dimension of the flow-path cross-section at that position.

4. The cleaner of claim 3 wherein at least a portion of the vane profile is narrower than the axial dimension of the venturi jet.

5. The cleaner of claim 3 wherein the vane profile is substantially symmetrical and centrally positioned within the flow-path cross-section such that the venturi jet is centered with respect thereto.

6. The cleaner of claim 5 wherein the vane profile has an axial dimension which at its narrowest is no more than about two-thirds of the axial dimension of the flow-path cross-section at that position.

7. The cleaner of claim 6 wherein the vane profile at the proximal edge is narrower than the axial dimension of the venturi jet.

8. The cleaner of claim 3 wherein the proximal edge of the vane is pivotally connected to the rotor via a vane-rotor interconnection, one of the rotor and vane proximal edge defining an axially-parallel slotted cavity which receives an axially-parallel elongate inner member formed by the other of the rotor and vane proximal edge.

9. The cleaner of claim 8 wherein the slotted cavity and the elongate inner member have non-congruent shapes that form at least one hollow space therebetween to facilitate washing out of debris from within the interconnection, thereby minimizing locking of pivotal movement of the vane with respect to the rotor.

10. The cleaner of claim 9 wherein at least one of the inner member and slotted cavity is of a substantially polygonal cross-section.

11. The cleaner of claim 9 wherein at least one of the inner member and slotted cavity is of an irregular-shaped cross-section.

12. The cleaner of claim 8 wherein the rotor defines the slotted cavity and the vane proximal edge is the elongate inner member.

13. The cleaner of claim 8 wherein there is a plurality of the vanes spaced around the rotor.

14. The cleaner of claim 13 wherein:
the vanes are of a substantially rigid material; and
the wall of each of the vanes is curved with the proximal and distal edges being substantially straight and substantially parallel.

15. In an automatic pool cleaner motivated by flow of water therethrough established by the pumping action of a remote pump, the cleaner including a turbine housing forming a water-flow chamber having inlet and outlet ports, a turbine mounted for rotation in the housing and providing a flow path for water and debris therearound, the turbine including a rotor having a rotor axis and at least one vane with a proximal edge connected to the rotor, the improvement comprising a vane-rotor interconnection permitting movement of the vane proximal edge in a plane tangential to the rotor to positions of varying angles with respect to the rotor axis.

16. The cleaner of claim 15 wherein the proximal edge of the vane is pivotally connected to the rotor such that the vane is movable with respect thereto between extended and retracted positions to allow passage of substantial-size debris pieces through the chamber.

17. The cleaner of claim 15 wherein:
the rotor includes a rotor shaft on the rotor axis, the rotor shaft having a plurality of substantially planar shaft surfaces at substantially equal angles with respect to one another; and
one of the vanes is supported with respect to each of the shaft surfaces.

18. The cleaner of claim 17 wherein each vane-rotor interconnection includes a cavity and a protrusion within the cavity, each of the cavity and the protrusion being formed at a center of one of the shaft surface and the corresponding vane proximal edge such that the vane proximal edge is rotatable thereabout.

19. The cleaner of claim 18 wherein the rotor is configured to limit the angle of rotation of the vane.

20. The cleaner of claim 19 wherein the angle of rotation is limited to about 20° with respect to the rotor axis.

21. The cleaner of claim 19 wherein the rotor further includes a cuff at each end of the rotor shaft, each cuff having inner surfaces each substantially equidistantly spaced from the corresponding one of the shaft surfaces and forming inner-surface corners which limit the angle of rotation of the vanes.

22. The cleaner of claim 21 wherein the turbine further includes a vane holder having a rotor-connector forming one of the cavity and the protrusion of the vane-rotor interconnection and rotatable thereabout between within the inner surfaces of the cuffs, the vane holder forming an elongate slotted cavity which is pivotally engaged by the elongate proximal edge of the vane.

23. The cleaner of claim 15 wherein the vane-rotor interconnection is a ball-and-socket type connection with the cavity and the protrusion having complementary substantially spherical shapes such that the vane is rotatable and pivotable between extended and retracted positions with respect to the rotor to allow passage of substantial-size debris pieces through the chamber.

24. The cleaner of claim 23 wherein the rotor further includes a set of protrusions in positions limiting the angle of rotation of the vane.

25. The cleaner of claim 24 wherein the angle of rotation is limited to about 20° with respect to the rotor axis.

* * * * *